(12) United States Patent
Nysse

(10) Patent No.: US 12,722,708 B2
(45) Date of Patent: Sep. 1, 2026

(54) FRAME FOR A UTILITY VEHICLE

(71) Applicant: Polaris Industries Inc., Medina, MN (US)

(72) Inventor: Brian N. Nysse, Center City, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 373 days.

(21) Appl. No.: 18/443,885

(22) Filed: Feb. 16, 2024

(65) Prior Publication Data

US 2024/0278846 A1 Aug. 22, 2024

Related U.S. Application Data

(60) Provisional application No. 63/446,817, filed on Feb. 18, 2023.

(51) Int. Cl.
*B62D 23/00* (2006.01)
*B62D 21/18* (2006.01)

(52) U.S. Cl.
CPC .......... *B62D 23/005* (2013.01); *B62D 21/18* (2013.01)

(58) Field of Classification Search
CPC .... B62D 21/18; B62D 21/186; B62D 21/183; B62D 21/02; B62D 23/005; B62D 23/00; B62D 25/04; B62D 25/02; B62D 25/023; B21K 7/12
USPC ........... 296/187.01, 203.01, 187.12, 193.06, 296/203.03
See application file for complete search history.

(56) References Cited

U.S. PATENT DOCUMENTS 1,031,497 A 7/1912 West
1,828,743 A * 10/1931 Lovell ................. B62D 23/005 296/203.01
1,868,382 A 7/1932 Coadou
(Continued)

FOREIGN PATENT DOCUMENTS

AU 2014344796 A1 6/2016
CA 2416802 A1 10/2003
(Continued)

OTHER PUBLICATIONS

Translation of JP 3293459 (Year: 2002).*
(Continued)

*Primary Examiner* — Amy R Weisberg
*Assistant Examiner* — Veronica M Condo
(74) *Attorney, Agent, or Firm* — Merchant & Gould, P.C.

(57) ABSTRACT

An upper frame assembly for a vehicle is provided. The upper frame assembly comprises a first generally upstanding frame member comprising a first stamped frame piece coupled to a second stamped frame piece, and a first longitudinally extending frame member at least partially longitudinally aligned from a top view with the first generally upstanding frame member. The first longitudinally extending frame member comprises a third stamped frame piece coupled to a fourth stamped frame piece, and a first joint member defining a first coupling location and a second coupling location. The first joint member comprises a first joint stamped piece and a second joint stamped piece, and the first longitudinally extending frame member is coupled to the first joint member at the first coupling location. Further, the first generally upstanding frame member is coupled to the first joint member at the second coupling location.

18 Claims, 61 Drawing Sheets

(56) References Cited

U.S. PATENT DOCUMENTS

D119,377 S 3/1940 Cadwallader
2,344,864 A 3/1944 Griswold
2,468,809 A 5/1949 Brock et al.
2,553,795 A 5/1951 Staude
2,576,017 A 11/1951 John et al.
2,672,103 A 3/1954 Hohmes
2,678,231 A 5/1954 Barenyi
2,757,017 A 7/1956 Matthias et al.
2,833,366 A 5/1958 Olley
3,001,600 A 9/1961 Macpherson
3,007,726 A 11/1961 Parkin
3,048,233 A 8/1962 Crain et al.
3,193,302 A 7/1965 Hill
3,292,944 A 12/1966 Dangauthier
3,366,411 A 1/1968 Mttone
3,371,485 A 3/1968 Reichard
3,422,918 A 1/1969 Musser et al.
3,487,451 A 12/1969 Fontaine
3,508,764 A 4/1970 Dobson et al.
3,560,022 A 2/1971 Gold
3,600,768 A 8/1971 Romanzi et al.
3,603,422 A 9/1971 Cordiano
3,616,872 A 11/1971 Taylor
3,712,416 A 1/1973 Swanson et al.
3,734,219 A 5/1973 Christensen et al.
3,747,704 A 7/1973 Ware
3,787,130 A * 1/1974 Hemmings ............ B62D 31/02 403/205
3,791,482 A 2/1974 Sykora
3,800,910 A 4/1974 Rose
3,858,902 A 1/1975 Howells et al.
3,861,229 A 1/1975 Domaas
D237,873 S 12/1975 Johnson
3,948,340 A 4/1976 Breitschwerdt
3,952,512 A 4/1976 Feller
3,966,014 A 6/1976 Gowing
4,010,975 A 3/1977 Horton
4,022,599 A 5/1977 Wilson et al.
4,027,892 A 6/1977 Parks
4,041,702 A 8/1977 Habiger
4,041,703 A 8/1977 Knapp
4,046,403 A 9/1977 Yoshida
4,057,120 A 11/1977 Roethlisberger
4,098,414 A 7/1978 Abiera
4,109,751 A 8/1978 Kabele
4,114,713 A 9/1978 Mery
4,133,574 A 1/1979 Martin
4,136,756 A 1/1979 Kawamura
4,217,970 A 8/1980 Chika
4,254,746 A 3/1981 Chiba et al.
4,267,895 A 5/1981 Eggert, Jr.
4,340,123 A 7/1982 Fujikawa
4,344,718 A 8/1982 Taylor
4,366,878 A 1/1983 Warf
4,415,179 A 11/1983 Marinelli
4,425,976 A 1/1984 Kimura
4,429,588 A 2/1984 Emundts et al.
4,434,755 A 3/1984 Kazuta et al.
4,505,169 A 3/1985 Ganoung
4,529,244 A 7/1985 Zaydel
4,533,172 A 8/1985 Oliver
4,561,323 A 12/1985 Stromberg
4,577,716 A 3/1986 Norton
4,592,316 A 6/1986 Shiratsuchi et al.
4,600,072 A 7/1986 Krude
4,641,854 A 2/1987 Masuda et al.
4,650,210 A 3/1987 Hirose et al.
4,660,345 A 4/1987 Browning
4,671,521 A 6/1987 Talbot et al.
4,681,178 A 7/1987 Brown
4,686,433 A 8/1987 Shimizu
4,691,818 A 9/1987 Weber
4,705,128 A 11/1987 Krude
4,708,699 A 11/1987 Takano et al.
4,712,629 A 12/1987 Takahashi et al.
4,722,548 A 2/1988 Hamilton et al.
4,732,244 A 3/1988 Verkuylen
D297,132 S 8/1988 Ryuzoji et al.
4,772,065 A 9/1988 Nakata et al.
4,773,675 A 9/1988 Kosuge
4,779,895 A 10/1988 Rubel
D298,811 S 12/1988 Morita
4,796,013 A 1/1989 Yasuda et al.
4,817,985 A 4/1989 Enokimoto et al.
4,821,825 A 4/1989 Somerton-Rayner
4,826,205 A 5/1989 Kouda et al.
4,827,416 A 5/1989 Kawagoe et al.
D301,849 S 6/1989 Oba et al.
4,842,193 A 6/1989 Eger et al.
4,867,474 A 9/1989 Smith
D305,999 S 2/1990 Ueda et al.
4,927,170 A 5/1990 Wada
4,934,737 A 6/1990 Nakatsuka
4,941,784 A 7/1990 Flament
D312,441 S 11/1990 Guelfi et al.
4,967,944 A 11/1990 Waters
4,969,661 A 11/1990 Omura et al.
4,974,697 A 12/1990 Krude
4,995,363 A 2/1991 Terazawa et al.
5,010,970 A 4/1991 Yamamoto
5,015,009 A 5/1991 Ohyama et al.
5,016,728 A 5/1991 Zulawski
5,016,903 A 5/1991 Kijima et al.
5,020,616 A 6/1991 Yagi et al.
5,021,721 A 6/1991 Oshita et al.
5,024,460 A 6/1991 Hanson et al.
5,027,915 A 7/1991 Suzuki et al.
5,036,939 A 8/1991 Johnson et al.
5,038,582 A 8/1991 Takamatsu
5,044,614 A 9/1991 Rau
5,048,860 A 9/1991 Kanai et al.
5,062,654 A 11/1991 Kakimoto et al.
5,062,657 A 11/1991 Majeed
5,074,374 A 12/1991 Ohtake et al.
5,076,383 A 12/1991 Inoue et al.
5,078,225 A 1/1992 Ohmura et al.
5,080,392 A 1/1992 Bazergui
5,083,827 A 1/1992 Hollenbaugh, Sr.
5,109,945 A 5/1992 Koga
D327,237 S 6/1992 Miyamoto et al.
5,119,718 A 6/1992 Wagner et al.
5,129,375 A 7/1992 Takane et al.
5,163,538 A 11/1992 Derr et al.
5,167,433 A 12/1992 Ryan
5,181,696 A 1/1993 Abe
5,189,615 A 2/1993 Rubel et al.
5,195,607 A 3/1993 Shimada et al.
5,195,802 A 3/1993 Hayakawa et al.
5,201,562 A 4/1993 Dorsey
5,203,135 A 4/1993 Bastian
5,203,440 A 4/1993 Peterson et al.
5,203,585 A 4/1993 Pierce
5,203,601 A 4/1993 Guillot
5,205,371 A 4/1993 Karnopp
5,251,713 A 10/1993 Enokimoto
5,251,718 A 10/1993 Inagawa et al.
5,253,730 A 10/1993 Hayashi et al.
5,273,340 A 12/1993 Nelson et al.
5,306,044 A 4/1994 Tucker
5,307,645 A 5/1994 Pannell
5,308,279 A 5/1994 Grinberg
5,327,989 A 7/1994 Furuhashi et al.
5,342,023 A 8/1994 Kuriki et al.
D354,264 S 1/1995 McCoy
5,390,121 A 2/1995 Wolfe
5,401,056 A 3/1995 Eastman
5,465,929 A 11/1995 Dooley
5,473,990 A 12/1995 Anderson et al.
5,475,596 A 12/1995 Henry et al.
5,483,448 A 1/1996 Liubakka et al.
5,507,510 A 4/1996 Kami et al.
D373,099 S 8/1996 Molzon et al.
5,542,493 A 8/1996 Jacobson et al.
5,549,428 A 8/1996 Yeatts

(56) References Cited

U.S. PATENT DOCUMENTS 5,550,739 A 8/1996 Hoffmann et al.
D374,416 S 10/1996 Miyamoto et al.
5,562,066 A 10/1996 Gere et al.
5,642,957 A 7/1997 Lange
5,653,304 A 8/1997 Renfroe
5,660,428 A 8/1997 Catlin
D383,095 S 9/1997 Miyamoto et al.
5,676,292 A 10/1997 Miller
5,678,847 A 10/1997 Izawa et al.
5,697,633 A 12/1997 Lee
D391,911 S 3/1998 Lagaay et al.
5,738,471 A 4/1998 Zentner et al.
5,752,791 A 5/1998 Ehrlich
5,776,568 A 7/1998 Andress et al.
5,816,650 A 10/1998 Lucas, Jr.
5,819,702 A 10/1998 Mendler
5,820,114 A 10/1998 Tsai
5,820,150 A 10/1998 Archer et al.
5,833,269 A 11/1998 Gastesi
5,863,277 A 1/1999 Melbourne
D405,029 S 2/1999 Deutschman
5,883,441 A 3/1999 Shoemaker
5,887,671 A 3/1999 Yuki et al.
5,895,063 A 4/1999 Hasshi et al.
5,921,343 A 7/1999 Yamakaji
5,934,397 A 8/1999 Schaper
5,947,519 A 9/1999 Aloe et al.
5,950,750 A 9/1999 Dong et al.
5,954,364 A 9/1999 Nechushtan
5,957,252 A 9/1999 Berthold
D414,735 S 10/1999 Gerisch et al.
5,961,106 A 10/1999 Shaffer
5,961,135 A 10/1999 Smock
5,975,624 A 11/1999 Rasidescu et al.
5,976,044 A 11/1999 Kuyama
5,986,221 A 11/1999 Stanley
6,000,702 A 12/1999 Streiter
6,009,705 A 1/2000 Arnott et al.
6,010,182 A 1/2000 Townsend
6,010,190 A 1/2000 Downey
D421,934 S 3/2000 Hunter et al.
D421,935 S 3/2000 Fujieda
6,032,752 A 3/2000 Karpik et al.
6,056,077 A 5/2000 Kobayashi
6,061,617 A 5/2000 Berger et al.
6,067,078 A 5/2000 Hartman
6,068,295 A 5/2000 Skabrond et al.
6,070,681 A 6/2000 Catanzarite et al.
6,070,689 A 6/2000 Tanaka et al.
6,078,252 A 6/2000 Kulczycki et al.
D428,363 S 7/2000 Sugimoto et al.
6,086,158 A 7/2000 Zeoli
6,092,877 A 7/2000 Rasidescu et al.
D429,663 S 8/2000 Tamashima et al.
6,095,275 A 8/2000 Shaw
6,098,739 A 8/2000 Anderson et al.
6,099,039 A 8/2000 Hine
6,102,463 A 8/2000 Swanson et al.
6,112,866 A 9/2000 Boichot et al.
6,113,328 A 9/2000 Claucherty
6,120,399 A 9/2000 Okeson et al.
6,134,841 A 10/2000 Schneider
6,142,123 A 11/2000 Galasso et al.
6,149,540 A 11/2000 Johnson et al.
6,152,253 A 11/2000 Monaghan
D436,557 S 1/2001 Selby et al.
D436,559 S 1/2001 Fujieda
6,176,796 B1 1/2001 Lislegard
6,183,033 B1 2/2001 Arai et al.
6,186,547 B1 2/2001 Skabrond et al.
6,196,634 B1 3/2001 Jurinek
6,199,894 B1 3/2001 Anderson
6,202,993 B1 3/2001 Wilms et al.
6,216,809 B1 4/2001 Etou et al.
6,224,046 B1 5/2001 Miyamoto
6,226,902 B1 5/2001 Heyne
6,247,442 B1 6/2001 Bedard et al.
6,249,728 B1 6/2001 Streiter
6,257,797 B1 7/2001 Lange
6,293,588 B1 9/2001 Clune
6,293,617 B1 9/2001 Sukegawa
6,309,024 B1 10/2001 Busch
6,328,364 B1 12/2001 Darbishire
6,334,364 B1 1/2002 Suzuki
6,352,142 B1 3/2002 Kim
6,360,149 B1 3/2002 Kwon et al.
6,370,458 B1 4/2002 Shal et al.
6,412,585 B1 7/2002 DeAnda
D461,151 S 8/2002 Morris
6,467,787 B1 10/2002 Marsh
D467,200 S 12/2002 Luo et al.
6,502,886 B1 1/2003 Bleau et al.
6,507,778 B2 1/2003 Koh
6,523,627 B2 2/2003 Fukuda
6,523,634 B1 2/2003 Gagnon et al.
RE38,012 E 3/2003 Ochab et al.
D472,193 S 3/2003 Sinkwitz
6,530,730 B2 3/2003 Swensen
6,533,348 B1 3/2003 Jaekel et al.
6,542,789 B2 4/2003 Ufheil
6,547,224 B2 4/2003 Jensen et al.
6,553,761 B2 4/2003 Beck
6,581,716 B1 6/2003 Matsuura
6,582,002 B2 6/2003 Hogan et al.
6,582,004 B1 6/2003 Hamm
D476,935 S 7/2003 Boyer
6,585,223 B1 7/2003 Vandenberg
6,588,536 B1 7/2003 Chiu
6,604,034 B1 8/2003 Speck et al.
6,622,806 B1 9/2003 Matsuura
6,622,837 B2 9/2003 Ochab et al.
6,622,968 B1 9/2003 St et al.
6,626,256 B2 9/2003 Dennison et al.
6,626,260 B2 9/2003 Gagnon et al.
D480,991 S 10/2003 Rondeau et al.
6,644,709 B2 11/2003 Inagaki et al.
6,648,569 B2 11/2003 Douglass et al.
6,651,768 B2 11/2003 Fournier et al.
6,652,020 B2 11/2003 Few
6,655,717 B1 12/2003 Wang
6,682,118 B2 1/2004 Ryan
6,685,174 B2 2/2004 Behmenburg et al.
6,695,566 B2 2/2004 Rodriguez Navio
6,698,835 B2 3/2004 Kojima et al.
6,722,463 B1 4/2004 Reese
6,725,962 B1 4/2004 Fukuda
D490,018 S 5/2004 Berg et al.
6,732,830 B2 5/2004 Gagnon et al.
6,733,060 B1 5/2004 Pavkov et al.
6,745,862 B2 6/2004 Morii et al.
6,752,235 B1 6/2004 Bell et al.
6,752,401 B2 6/2004 Burdock
D492,916 S 7/2004 Rondeau et al.
6,767,022 B1 7/2004 Chevalier
6,767,040 B1 7/2004 Freijy
D493,749 S 8/2004 Duncan
D493,750 S 8/2004 Crepeau et al.
D494,890 S 8/2004 Katoh
D496,308 S 9/2004 Wu
6,786,526 B1 9/2004 Blalock
D497,324 S 10/2004 Chestnut et al.
D497,327 S 10/2004 Lai
6,799,779 B2 10/2004 Shibayama
6,799,781 B2 10/2004 Rasidescu et al.
6,805,217 B2 10/2004 Kinouchi et al.
6,808,192 B1 10/2004 Bol
D498,435 S 11/2004 Saito et al.
6,820,708 B2 11/2004 Nakamura
6,827,184 B1 12/2004 Lin
6,834,736 B2 12/2004 Kramer et al.
D501,570 S 2/2005 Tandrup et al.
6,851,679 B2 2/2005 Downey et al.
6,857,498 B2 2/2005 Vitale et al.
6,857,647 B2 2/2005 Johnsman et al.

(56) References Cited

U.S. PATENT DOCUMENTS 6,860,826 B1 3/2005 Johnson
6,868,932 B1 3/2005 Davis et al.
6,871,895 B2 3/2005 Kiester et al.
D503,657 S 4/2005 Katoh
D503,658 S 4/2005 Lu
D503,905 S 4/2005 Saito et al.
6,880,875 B2 4/2005 Mcclure et al.
6,883,851 B2 4/2005 Mcclure et al.
D504,638 S 5/2005 Tanaka et al.
6,890,010 B2 5/2005 Bergman
6,892,842 B2 5/2005 Bouffard et al.
6,892,847 B2 5/2005 Seiki
6,895,318 B1 5/2005 Barton et al.
D507,766 S 7/2005 Mcmahan et al.
6,916,142 B2 7/2005 Hansen et al.
D508,224 S 8/2005 Mays et al.
6,923,282 B2 8/2005 Chernoff et al.
6,923,507 B1 8/2005 Billberg et al.
6,926,350 B2 8/2005 Gabbianelli et al.
6,938,508 B1 9/2005 Saagge
6,942,050 B1 9/2005 Honkala et al.
6,945,541 B2 9/2005 Brown
RE38,895 E 11/2005 McLemore
D511,317 S 11/2005 Tanaka et al.
D511,717 S 11/2005 Lin
6,966,399 B2 11/2005 Tanigaki et al.
6,976,720 B1 12/2005 Bequette
6,978,857 B2 12/2005 Korenjak
D513,718 S 1/2006 Itaya et al.
6,988,759 B2 1/2006 Fin et al.
6,997,517 B1 2/2006 Schrapp et al.
7,000,931 B1 2/2006 Chevalier
7,004,137 B2 2/2006 Kunugi et al.
D516,467 S 3/2006 Wu
D517,951 S 3/2006 Luh
D517,952 S 3/2006 Luh
7,011,174 B1 3/2006 James
7,013,646 B1 3/2006 Serkh et al.
7,014,241 B2 3/2006 Toyota et al.
D518,759 S 4/2006 Kettler et al.
D519,439 S 4/2006 Dahl et al.
7,032,895 B2 4/2006 Folchert
7,035,836 B2 4/2006 Caponetto et al.
D520,912 S 5/2006 Knight et al.
D520,914 S 5/2006 Luh
D521,413 S 5/2006 Katoh
7,040,437 B1 5/2006 Fredrickson et al.
D522,924 S 6/2006 Yokoyama et al.
D523,782 S 6/2006 Lin
7,055,454 B1 6/2006 Whiting et al.
7,070,527 B1 7/2006 Saagge
7,076,351 B2 7/2006 Hamilton et al.
7,077,233 B2 7/2006 Hasegawa
7,096,988 B2 8/2006 Moriyama
7,097,166 B2 8/2006 Folchert
7,099,722 B2 8/2006 Casey
D529,414 S 10/2006 Wu et al.
D531,088 S 10/2006 Lin
7,118,151 B2 10/2006 Bejin et al.
7,124,853 B1 10/2006 Kole, Jr.
7,125,134 B1 10/2006 Hedlund et al.
D532,339 S 11/2006 Hishiki
7,136,729 B2 11/2006 Salman et al.
7,137,764 B2 11/2006 Johnson
7,140,619 B2 11/2006 Hrovat et al.
7,140,640 B2 11/2006 Tronville et al.
7,143,861 B2 12/2006 Chu
7,147,075 B2 12/2006 Tanaka et al.
D535,215 S 1/2007 Turner et al.
7,156,439 B2 1/2007 Bejin et al.
7,159,557 B2 1/2007 Yasuda et al.
7,168,516 B2 1/2007 Nozaki et al.
7,168,709 B2 1/2007 Niwa et al.
7,172,232 B2 2/2007 Chiku et al.
7,182,169 B2 2/2007 Suzuki
7,185,732 B2 3/2007 Saito et al.
D539,705 S 4/2007 Ichikawa et al.
D542,186 S 5/2007 Lai et al.
D542,188 S 5/2007 Miwa et al.
7,213,669 B2 5/2007 Fecteau et al.
7,216,733 B2 5/2007 Iwami et al.
7,234,707 B2 6/2007 Green et al.
D546,246 S 7/2007 Crepeau et al.
7,237,789 B1 7/2007 Herman
7,239,032 B1 7/2007 Wilson et al.
7,249,798 B2 7/2007 Saito et al.
D548,662 S 8/2007 Markefka
D549,133 S 8/2007 LePage
7,258,355 B2 8/2007 Amano
7,270,335 B2 9/2007 Hio et al.
7,275,512 B2 10/2007 Deiss et al.
7,281,753 B2 10/2007 Curtis et al.
7,286,919 B2 10/2007 Nordgren et al.
7,287,619 B2 10/2007 Tanaka et al.
D555,036 S 11/2007 Eck
7,322,106 B2 1/2008 Marando et al.
D561,064 S 2/2008 Jean-Philippe
D562,189 S 2/2008 Miwa et al.
7,325,866 B2 2/2008 Horton et al.
D563,274 S 3/2008 Ramos
7,337,866 B2 3/2008 Nishi et al.
7,347,296 B2 3/2008 Nakamura et al.
7,357,207 B2 4/2008 Esa
7,357,211 B2 4/2008 Inui
7,359,787 B2 4/2008 Ono et al.
7,367,247 B2 5/2008 Horiuchi et al.
7,367,417 B2 5/2008 Inui et al.
7,367,573 B2 5/2008 Kudo et al.
7,370,724 B2 5/2008 Saito et al.
7,374,012 B2 5/2008 Inui et al.
7,377,351 B2 5/2008 Smith et al.
7,380,622 B2 6/2008 Shimizu
7,380,805 B1 6/2008 Turner
7,386,378 B2 6/2008 Lauwerys et al.
7,387,180 B2 6/2008 Konno et al.
7,390,046 B2 6/2008 Ostroski et al.
7,401,794 B2 7/2008 Laurent et al.
7,401,797 B2 7/2008 Cho
7,407,190 B2 8/2008 Berg et al.
7,416,234 B2 8/2008 Bequette
7,421,954 B2 9/2008 Bose
7,427,072 B2 9/2008 Brown
D578,433 S 10/2008 Kawaguchi et al.
D578,934 S 10/2008 Tanaka et al.
7,431,024 B2 10/2008 Buchwitz et al.
7,438,147 B2 10/2008 Kato et al.
7,438,153 B2 10/2008 Kalsnes et al.
7,441,615 B2 10/2008 Borroni-Bird et al.
7,441,789 B2 10/2008 Geiger et al.
7,441,809 B1 10/2008 Coombs et al.
7,458,593 B2 12/2008 Saito et al.
D584,661 S 1/2009 Tanaka et al.
7,481,293 B2 1/2009 Ogawa et al.
7,481,610 B1 1/2009 Egigian
7,483,775 B2 1/2009 Karaba et al.
D585,792 S 2/2009 Chao et al.
D586,694 S 2/2009 Huang et al.
7,488,022 B2 2/2009 Belwafa
7,490,694 B1 2/2009 Berg et al.
7,497,299 B2 3/2009 Kobayashi
7,497,471 B2 3/2009 Kobayashi
7,497,472 B2 3/2009 Cymbal et al.
7,503,417 B2 3/2009 Lichtinger et al.
7,503,610 B2 3/2009 Karagitz et al.
7,503,737 B2 3/2009 Sherman
7,510,060 B2 3/2009 Izawa et al.
7,510,199 B2 3/2009 Nash et al.
7,510,235 B2 3/2009 Kobayashi et al.
D592,556 S 5/2009 Mehra
D592,557 S 5/2009 Mehra
D592,998 S 5/2009 Woodard et al.
D593,454 S 6/2009 Sanschagrin et al.
D595,188 S 6/2009 Tandrup
7,540,511 B2 6/2009 Saito et al.

(56) References Cited

U.S. PATENT DOCUMENTS

D595,613 S 7/2009 Lai et al.
D596,080 S 7/2009 Lai et al.
7,559,403 B2 7/2009 Schmitz
7,565,944 B2 7/2009 Sakamoto et al.
7,565,945 B2 7/2009 Okada et al.
D597,890 S 8/2009 Lai et al.
7,571,039 B2 8/2009 Chen et al.
7,575,088 B2 8/2009 Mir et al.
7,578,544 B1 8/2009 Shimamura et al.
D599,250 S 9/2009 Hirano
D599,251 S 9/2009 Yin et al.
7,581,780 B2 9/2009 Shimamura et al.
7,588,010 B2 9/2009 Mochizuki et al.
7,591,472 B2 9/2009 Kinjyo et al.
7,597,385 B2 10/2009 Shibata et al.
7,600,603 B2 10/2009 Okada et al.
7,600,762 B2 10/2009 Yasui et al.
7,600,769 B2 10/2009 Bessho et al.
7,604,084 B2 10/2009 Okada et al.
7,610,132 B2 10/2009 Yanai et al.
D604,201 S 11/2009 Kawaguchi et al.
7,611,154 B2 11/2009 Delaney
7,623,327 B2 11/2009 Ogawa
D605,555 S 12/2009 Tanaka et al.
D606,900 S 12/2009 Flores
D606,905 S 12/2009 Yao
7,625,048 B2 12/2009 Rouhana et al.
7,630,793 B2 12/2009 Thomas et al.
7,630,807 B2 12/2009 Yoshimura et al.
D607,377 S 1/2010 Shimomura et al.
7,641,208 B1 1/2010 Barron et al.
7,644,791 B2 1/2010 Davis et al.
7,644,934 B2 1/2010 Mizuta
D609,136 S 2/2010 Renchuan
D610,514 S 2/2010 Eck
7,677,343 B2 3/2010 Kitai et al.
7,677,646 B2 3/2010 Nakamura
7,682,115 B1 3/2010 Jay et al.
7,684,911 B2 3/2010 Seifert et al.
7,694,769 B2 4/2010 Mcguire
7,703,826 B1 4/2010 German
7,708,103 B2 5/2010 Okuyama et al.
7,708,106 B1 5/2010 Bergman et al.
7,717,495 B2 5/2010 Leonard et al.
7,721,840 B2 5/2010 Mccord et al.
7,728,212 B2 6/2010 Fujishima et al.
7,738,979 B2 6/2010 Schmuck et al.
7,740,103 B2 6/2010 Sasajima
7,740,256 B2 6/2010 Davis
7,742,851 B2 6/2010 Hisada et al.
D620,399 S 7/2010 Wu et al.
7,751,959 B2 7/2010 Boon et al.
D621,423 S 8/2010 Nakanishi et al.
D622,631 S 8/2010 Lai et al.
7,775,311 B1 8/2010 Hardy et al.
7,778,741 B2 8/2010 Rao et al.
7,786,886 B2 8/2010 Maruyama et al.
7,788,212 B2 8/2010 Beckmann et al.
7,795,602 B2 9/2010 Leonard et al.
D624,848 S 10/2010 Shimomura
D625,662 S 10/2010 Li
7,810,818 B2 10/2010 Bushko
7,815,246 B2 10/2010 Nakamura et al.
7,819,220 B2 10/2010 Sunsdahl et al.
7,832,770 B2 11/2010 Bradley et al.
7,841,815 B1 11/2010 Lane
D628,520 S 12/2010 Lin
7,857,086 B2 12/2010 Wakuta et al.
7,857,334 B2 12/2010 Seki
D631,395 S 1/2011 Tandrup et al.
7,862,061 B2 1/2011 Jung
7,874,606 B2 1/2011 Yamamura et al.
D633,006 S 2/2011 Sanschagrin et al.
7,878,285 B2 2/2011 Oda et al.
7,885,750 B2 2/2011 Lu
7,891,684 B1 2/2011 Luttinen et al.
7,899,594 B2 3/2011 Messih et al.
7,904,225 B2 3/2011 Takeda et al.
7,905,540 B2 3/2011 Kiley et al.
7,912,610 B2 3/2011 Saito et al.
7,913,505 B2 3/2011 Nakamura
7,913,782 B1 3/2011 Foss et al.
D636,295 S 4/2011 Eck et al.
D636,704 S 4/2011 Yoo et al.
7,926,822 B2 4/2011 Ohletz et al.
7,931,106 B1 4/2011 Suzuki et al.
D638,755 S 5/2011 Bracy et al.
7,942,427 B2 5/2011 Lloyd
7,950,486 B2 5/2011 Van et al.
D640,171 S 6/2011 Danisi
D640,598 S 6/2011 Zhang
D640,604 S 6/2011 Lai et al.
D640,605 S 6/2011 Lai et al.
7,954,679 B2 6/2011 Edwards
7,959,163 B2 6/2011 Beno et al.
7,962,261 B2 6/2011 Bushko et al.
7,963,529 B2 6/2011 Oteman et al.
7,970,512 B2 6/2011 Lu et al.
D641,288 S 7/2011 Sun
7,984,915 B2 7/2011 Post et al.
D642,493 S 8/2011 Goebert et al.
D643,781 S 8/2011 Nagao et al.
7,988,210 B2 8/2011 Shibata et al.
8,002,061 B2 8/2011 Yamamura et al.
8,005,596 B2 8/2011 Lu et al.
8,016,339 B2 9/2011 Hamaguchi et al.
8,025,326 B2 9/2011 Ostroski et al.
8,027,775 B2 9/2011 Takenaka et al.
D646,200 S 10/2011 Zhang
D646,603 S 10/2011 Zhang
8,029,021 B2 10/2011 Leonard et al.
8,032,281 B2 10/2011 Bujak et al.
8,047,324 B2 11/2011 Yao et al.
8,050,818 B2 11/2011 Mizuta
8,050,857 B2 11/2011 Lu et al.
8,052,202 B2 11/2011 Nakamura
8,052,206 B2 11/2011 Wang et al.
8,056,392 B2 11/2011 Ryan et al.
8,056,912 B2 11/2011 Kawabe et al.
8,065,054 B2 11/2011 Tarasinski et al.
D650,311 S 12/2011 Bracy
8,075,002 B1 12/2011 Pionke et al.
8,079,602 B2 12/2011 Kinsman et al.
8,086,371 B2 12/2011 Furuichi et al.
D652,348 S 1/2012 King et al.
8,087,676 B2 1/2012 Mcintyre
8,095,268 B2 1/2012 Parison et al.
8,100,434 B2 1/2012 Miura
8,104,524 B2 1/2012 Manesh et al.
8,108,104 B2 1/2012 Hrovat et al.
8,116,938 B2 2/2012 Itagaki et al.
8,121,757 B2 2/2012 Song et al.
8,126,618 B2 2/2012 Yamada et al.
8,136,857 B2 3/2012 Shimizu et al.
8,136,859 B2 3/2012 Morita et al.
D657,720 S 4/2012 Eck et al.
D657,721 S 4/2012 Miyanishi
8,152,880 B2 4/2012 Matschl et al.
D660,746 S 5/2012 Bracy
8,167,325 B2 5/2012 Lee et al.
8,170,749 B2 5/2012 Mizuta
8,176,957 B2 5/2012 Manesh et al.
8,205,910 B2 6/2012 Leonard et al.
8,209,087 B2 6/2012 Haegglund et al.
D662,855 S 7/2012 Wang
8,214,106 B2 7/2012 Ghoneim et al.
8,215,694 B2 7/2012 Smith et al.
8,219,262 B2 7/2012 Stiller
8,225,894 B2 7/2012 Mizuta
8,229,642 B2 7/2012 Post et al.
8,231,164 B2 7/2012 Schubring et al.
D665,309 S 8/2012 Lepine et al.
D665,705 S 8/2012 Lepine et al.
8,235,443 B2 8/2012 Kokawa et al.

(56) References Cited

U.S. PATENT DOCUMENTS 8,240,748 B2 8/2012 Chapman
8,260,496 B2 9/2012 Gagliano
8,267,457 B2 9/2012 Yamada et al.
8,269,512 B2 9/2012 Ootaka
8,271,175 B2 9/2012 Takenaka et al.
D668,184 S 10/2012 Tashiro
8,296,010 B2 10/2012 Hirao et al.
D671,037 S 11/2012 Wu et al.
8,302,711 B2 11/2012 Kinsman et al.
8,308,170 B2 11/2012 Van et al.
8,315,764 B2 11/2012 Chen et al.
8,316,977 B2 11/2012 Tsumiyama et al.
8,321,088 B2 11/2012 Brown et al.
8,322,497 B2 12/2012 Marjoram et al.
8,328,235 B2 12/2012 Schneider et al.
D674,728 S 1/2013 Matsumura
8,352,143 B2 1/2013 Lu et al.
8,355,840 B2 1/2013 Ammon et al.
8,371,642 B2 * 2/2013 Baccouche ............ B62D 25/06 296/187.12
8,374,748 B2 2/2013 Jolly
8,376,373 B2 2/2013 Conradie
8,376,441 B2 2/2013 Nakamura et al.
8,382,125 B2 2/2013 Sunsdahl et al.
8,396,627 B2 3/2013 Jung et al.
D679,627 S 4/2013 Li et al.
D680,468 S 4/2013 Li et al.
D680,469 S 4/2013 Li et al.
8,417,417 B2 4/2013 Chen et al.
8,424,832 B2 4/2013 Robbins et al.
D682,737 S 5/2013 Li et al.
D682,738 S 5/2013 Li et al.
8,434,774 B2 5/2013 Leclerc et al.
8,442,720 B2 5/2013 Lu et al.
8,444,161 B2 5/2013 Leclerc et al.
8,447,489 B2 5/2013 Murata et al.
8,453,775 B2 6/2013 Belzile et al.
8,457,841 B2 6/2013 Knoll et al.
8,464,817 B2 6/2013 Usami et al.
8,464,824 B1 6/2013 Reisenberger
8,465,050 B1 6/2013 Spindler et al.
8,465,077 B2 6/2013 Ostroski et al.
8,473,157 B2 6/2013 Savaresi et al.
8,496,268 B2 7/2013 Theodore
8,499,882 B2 8/2013 Tsumiyama et al.
8,511,732 B2 8/2013 Inoue et al.
8,517,136 B2 8/2013 Hurd et al.
8,517,395 B2 8/2013 Knox et al.
D689,396 S 9/2013 Wang
8,522,911 B2 9/2013 Hurd et al.
8,538,628 B2 9/2013 Backman
D691,519 S 10/2013 Fisher
D691,924 S 10/2013 Smith
8,548,678 B2 10/2013 Ummethala et al.
8,548,710 B1 10/2013 Reisenberger
8,550,221 B2 10/2013 Paulides et al.
8,556,015 B2 10/2013 Itoo et al.
8,556,324 B1 10/2013 Yamamoto et al.
8,573,605 B2 11/2013 Di Maria
8,585,088 B1 11/2013 Kaku et al.
D694,668 S 12/2013 Li et al.
D694,671 S 12/2013 Lai et al.
8,596,398 B2 12/2013 Bennett
8,596,405 B2 12/2013 Sunsdahl et al.
8,613,335 B2 12/2013 Deckard et al.
8,613,336 B2 12/2013 Deckard et al.
8,613,337 B2 12/2013 Kinsman et al.
8,626,388 B2 1/2014 Oikawa
8,626,389 B2 1/2014 Sidlosky
D699,627 S 2/2014 Tang
8,640,814 B2 2/2014 Deckard et al.
8,641,052 B2 2/2014 Kondo et al.
8,641,133 B1 2/2014 Scaringe et al.
8,645,024 B2 2/2014 Daniels
8,651,557 B2 2/2014 Suzuki
8,657,050 B2 2/2014 Yamaguchi
8,657,058 B2 2/2014 Takagi
D701,143 S 3/2014 Shan
D701,469 S 3/2014 Lai et al.
8,668,236 B1 3/2014 Yamamoto et al.
8,672,106 B2 3/2014 Laird et al.
8,672,337 B2 3/2014 Van et al.
8,672,387 B1 3/2014 Kaku et al.
D703,102 S 4/2014 Eck et al.
8,700,260 B2 4/2014 Jolly et al.
8,712,599 B1 4/2014 Westpfahl
8,712,639 B2 4/2014 Lu et al.
8,718,872 B2 5/2014 Hirao et al.
8,725,351 B1 5/2014 Selden et al.
8,731,774 B2 5/2014 Yang
8,746,719 B2 6/2014 Safranski et al.
8,768,577 B2 7/2014 Lougheed et al.
8,781,705 B1 7/2014 Reisenberger
D711,778 S 8/2014 Chun et al.
8,800,706 B2 8/2014 Deckard et al.
D712,309 S 9/2014 Wu et al.
D712,311 S 9/2014 Morgan et al.
D714,186 S 9/2014 Wu et al.
8,827,019 B2 9/2014 Deckard et al.
8,827,020 B2 9/2014 Deckard et al.
8,827,025 B2 9/2014 Hapka
8,827,028 B2 9/2014 Sunsdahl et al.
8,827,357 B2 9/2014 Kaku et al.
8,869,929 B2 10/2014 Yamamoto
8,870,711 B2 10/2014 Pohl et al.
D716,693 S 11/2014 Higashikawa
D716,694 S 11/2014 Higashikawa
D717,695 S 11/2014 Matsumura
D719,061 S 12/2014 Tandrup et al.
8,905,168 B2 12/2014 Kaku et al.
D721,300 S 1/2015 Li et al.
D722,538 S 2/2015 Song et al.
8,944,449 B2 2/2015 Hurd et al.
8,960,347 B2 2/2015 Bennett
8,960,805 B2 2/2015 Nakamura et al.
D724,997 S 3/2015 Brew et al.
8,973,691 B2 3/2015 Morgan et al.
8,973,693 B2 3/2015 Kinsman et al.
8,979,123 B1 3/2015 Takahashi et al.
8,997,908 B2 4/2015 Kinsman et al.
8,998,253 B2 4/2015 Novotny et al.
8,998,283 B1 4/2015 Yamamoto et al.
9,004,510 B2 4/2015 Leonard et al.
9,004,532 B1 4/2015 Hirooka
9,004,535 B2 4/2015 Wu
9,010,768 B2 4/2015 Kinsman et al.
9,016,760 B2 4/2015 Kuroda et al.
D730,239 S 5/2015 Gonzalez
9,022,160 B2 5/2015 Smith et al.
9,027,937 B2 5/2015 Ryan et al.
9,045,014 B1 6/2015 Verhoff et al.
9,045,163 B2 6/2015 Theodore
9,050,890 B2 6/2015 Buerkle et al.
9,061,711 B2 6/2015 Kuroda et al.
9,063,832 B2 6/2015 Schlangen et al.
D734,689 S 7/2015 Hashimoto
D735,077 S 7/2015 Sato et al.
9,075,699 B2 7/2015 Wetterlund
D735,615 S 8/2015 Itaya et al.
D736,118 S 8/2015 Hashimoto et al.
9,102,205 B2 8/2015 Kvien et al.
D737,724 S 9/2015 Schroeder et al.
9,150,182 B1 10/2015 Schlangen et al.
9,152,607 B2 10/2015 Wetterlund et al.
9,211,924 B2 12/2015 Safranski et al.
9,216,777 B2 12/2015 Nakamura et al.
9,217,501 B2 12/2015 Deckard et al.
9,221,496 B2 12/2015 Barr et al.
9,242,680 B2 1/2016 Schwab
9,248,860 B2 2/2016 Saje et al.
9,266,417 B2 2/2016 Nadeau et al.
9,266,569 B1 * 2/2016 Tew ...................... B62D 33/06
D751,467 S 3/2016 Lai et al.
9,273,760 B2 3/2016 Pohl

(56) References Cited

U.S. PATENT DOCUMENTS 9,279,234 B1 3/2016 Gielda et al.
9,287,595 B2 3/2016 Fujii et al.
D755,077 S 5/2016 Lyons et al.
D756,845 S 5/2016 Flores
9,327,587 B2 5/2016 Spindler et al.
9,327,678 B1 5/2016 Stockmeier et al.
9,365,241 B1 6/2016 Taracko et al.
9,365,251 B2 6/2016 Safranski et al.
9,366,280 B2 6/2016 Whiting et al.
D761,698 S 7/2016 Umemoto
9,381,803 B2 7/2016 Galsworthy et al.
9,393,894 B2 7/2016 Steinmetz et al.
D762,517 S 8/2016 Hashimoto et al.
D763,732 S 8/2016 Okuyama et al.
D764,350 S 8/2016 Okuyama et al.
D764,972 S 8/2016 Gonzalez
D764,973 S 8/2016 Mikhailov et al.
D764,974 S 8/2016 Mikhailov et al.
9,421,860 B2 8/2016 Schuhmacher et al.
9,428,031 B2 8/2016 Kuwabara et al.
D767,444 S 9/2016 Chun et al.
9,434,244 B2 9/2016 Sunsdahl et al.
9,457,756 B2 10/2016 Hirooka et al.
9,469,329 B1 10/2016 Leanza
D774,955 S 12/2016 Lai et al.
D774,957 S 12/2016 Umemoto
9,540,052 B2 1/2017 Burt, II et al.
9,566,858 B2 2/2017 Hicke et al.
9,573,561 B2 2/2017 Muto et al.
9,592,713 B2 3/2017 Kinsman et al.
9,592,782 B2 3/2017 Raska et al.
9,623,912 B2 4/2017 Schlangen
D785,502 S 5/2017 Dunshee et al.
D786,133 S 5/2017 Song et al.
D787,985 S 5/2017 Wilcox et al.
9,649,923 B2 5/2017 Perlo et al.
9,649,928 B2 5/2017 Danielson et al.
9,650,078 B2 5/2017 Kinsman et al.
9,656,640 B1 5/2017 Verhoff et al.
9,701,346 B2 7/2017 Deckard et al.
9,713,976 B2 7/2017 Miller et al.
9,718,351 B2 8/2017 Ripley et al.
9,725,023 B2 8/2017 Miller et al.
9,738,134 B1 8/2017 Rittenour et al.
9,771,112 B2 9/2017 Spindler et al.
D800,015 S 10/2017 Lyons et al.
9,776,481 B2 10/2017 Deckard et al.
9,789,909 B2 * 10/2017 Erspamer ................. B60N 2/68
9,789,922 B2 10/2017 Dosenbach et al.
9,809,102 B2 11/2017 Sunsdahl et al.
9,878,650 B2 1/2018 Reed et al.
9,889,777 B2 2/2018 Proulx et al.
9,895,946 B2 2/2018 Schlangen et al.
9,908,577 B2 3/2018 Novak et al.
9,932,073 B2 4/2018 Dube et al.
9,944,158 B2 4/2018 Beach
9,944,177 B2 4/2018 Fischer et al.
9,950,674 B1 4/2018 Kalergis et al.
10,011,189 B2 7/2018 Sunsdahl et al.
10,017,090 B2 7/2018 Franker et al.
10,037,304 B2 7/2018 Smith et al.
D832,149 S 10/2018 Wilcox et al.
10,099,547 B2 10/2018 Bessho et al.
10,112,555 B2 10/2018 Aguilera et al.
10,124,709 B2 11/2018 Bohnsack et al.
10,131,206 B1 11/2018 Kirkpatrick
D835,545 S 12/2018 Hanten et al.
10,154,377 B2 12/2018 Post et al.
10,166,836 B2 1/2019 Rittenour et al.
10,167,023 B2 * 1/2019 Schneider ............ B62D 29/007
10,183,605 B2 1/2019 Weber et al.
10,202,149 B1 2/2019 Johnson et al.
10,207,555 B2 2/2019 Mailhot et al.
10,232,785 B1 3/2019 Mullen et al.
10,232,788 B1 3/2019 Hagedorn et al.
10,300,786 B2 5/2019 Nugteren et al.
10,328,919 B2 6/2019 Misunou et al.
D852,674 S 7/2019 Wilcox et al.
10,359,011 B2 7/2019 Dewit et al.
10,369,861 B2 8/2019 Deckard et al.
10,399,435 B2 9/2019 Bastien et al.
10,427,578 B2 10/2019 Deckard et al.
10,450,006 B2 10/2019 Kinsman et al.
10,479,422 B2 11/2019 Hollman et al.
10,569,642 B2 2/2020 Borud et al.
D879,663 S 3/2020 Barlow et al.
10,603,997 B2 3/2020 Bergstrom et al.
10,607,091 B2 3/2020 Kawamoto et al.
10,625,639 B2 4/2020 Deschamps
10,655,574 B2 5/2020 Hamada et al.
10,718,238 B2 7/2020 Wenger et al.
10,793,031 B1 10/2020 Daniels et al.
10,800,250 B2 10/2020 Nugteren et al.
10,800,470 B2 10/2020 Barkey
10,843,743 B2 11/2020 St-Pierre et al.
D904,931 S 12/2020 Lai et al.
10,864,828 B2 12/2020 Sunsdahl et al.
10,915,600 B2 2/2021 Smith et al.
10,926,618 B2 2/2021 Deckard et al.
10,926,664 B2 2/2021 Sunsdahl et al.
10,946,736 B2 3/2021 Fischer et al.
10,960,941 B2 3/2021 Endrizzi et al.
10,967,825 B2 4/2021 Hisamura et al.
10,981,470 B2 4/2021 Milton et al.
10,988,187 B2 4/2021 Schounard et al.
10,994,645 B2 5/2021 Deckard et al.
11,066,105 B2 7/2021 Lutz et al.
11,173,808 B2 11/2021 Swain et al.
11,192,597 B2 12/2021 Peterson et al.
11,285,807 B2 3/2022 Galsworthy et al.
11,292,531 B2 * 4/2022 Kim .................... B62D 27/023
11,345,406 B2 5/2022 Johnson
11,370,262 B2 6/2022 Weiss
11,391,253 B1 7/2022 Gilge et al.
11,391,361 B2 7/2022 Leclair et al.
11,400,985 B2 8/2022 Stojkovic
11,420,683 B2 8/2022 Newcomb
11,448,311 B2 9/2022 Davis
11,479,302 B2 10/2022 Rasa
D971,786 S 12/2022 Nolte et al.
11,628,722 B2 4/2023 Rasa et al.
11,634,060 B2 4/2023 Bjerketvedt et al.
11,752,860 B2 9/2023 Fields et al.
11,753,087 B2 9/2023 Peterson et al.
11,794,822 B2 10/2023 Schounard et al.
11,814,104 B2 11/2023 Rasa
12,012,027 B2 6/2024 Bjerketvedt et al.
12,017,702 B2 6/2024 Erspamer et al.
12,233,939 B2 * 2/2025 Aizik ..................... B62D 25/02
2001/0005803 A1 6/2001 Cochofel et al.
2001/0007396 A1 7/2001 Mizuta
2001/0013433 A1 8/2001 Szymkowiak
2001/0021887 A1 9/2001 Obradovich et al.
2001/0031185 A1 10/2001 Swensen
2001/0035642 A1 11/2001 Gotz et al.
2001/0041126 A1 11/2001 Morin et al.
2002/0017765 A1 2/2002 Mallette et al.
2002/0017797 A1 2/2002 Jach et al.
2002/0023792 A1 2/2002 Bouffard et al.
2002/0033622 A1 3/2002 Jarnail et al.
2002/0063440 A1 5/2002 Spurr et al.
2002/0074760 A1 6/2002 Eshelman
2002/0074852 A1 6/2002 Scrivens et al.
2002/0082752 A1 6/2002 Obradovich
2002/0093224 A1 7/2002 Richardson et al.
2002/0109325 A1 8/2002 Purick
2002/0135175 A1 9/2002 Schroth
2002/0147072 A1 10/2002 Goodell et al.
2002/0162224 A1 11/2002 Gabbianelli et al.
2002/0178968 A1 12/2002 Christensen
2003/0001409 A1 1/2003 Semple et al.
2003/0015531 A1 1/2003 Choi
2003/0020323 A1 1/2003 Smith
2003/0029413 A1 2/2003 Sachdev et al.

(56) References Cited

U.S. PATENT DOCUMENTS

2003/0040827 A1 2/2003 Chernoff et al.
2003/0057724 A1 3/2003 Inagaki et al.
2003/0073400 A1 4/2003 Dahl et al.
2003/0125857 A1 7/2003 Madau et al.
2003/0132075 A1 7/2003 Drivers
2003/0137121 A1 7/2003 Lenz et al.
2003/0168267 A1 9/2003 Borroni-Bird et al.
2003/0168887 A1 9/2003 Stoffels et al.
2003/0173754 A1 9/2003 Bryant
2003/0197393 A1 10/2003 Hanagan
2003/0200016 A1 10/2003 Spillane et al.
2003/0205867 A1 11/2003 Coelingh et al.
2003/0213628 A1 11/2003 Rioux et al.
2003/0224665 A1 12/2003 Neumann et al.
2003/0231926 A1 12/2003 Thach
2004/0007843 A1 1/2004 Reineck
2004/0010383 A1 1/2004 Lu et al.
2004/0041358 A1 3/2004 Hrovat et al.
2004/0079561 A1 4/2004 Ozawa et al.
2004/0090020 A1 5/2004 Braswell
2004/0094912 A1 5/2004 Niwa et al.
2004/0107591 A1 6/2004 Cuddy
2004/0108159 A1 6/2004 Rondeau et al.
2004/0116247 A1 6/2004 Wakamatsu
2004/0153782 A1 8/2004 Fukui et al.
2004/0169347 A1 9/2004 Seki
2004/0172955 A1 9/2004 Runk et al.
2004/0195018 A1 10/2004 Inui et al.
2004/0195019 A1 10/2004 Kato et al.
2004/0195034 A1 10/2004 Kato et al.
2004/0195797 A1 10/2004 Nash et al.
2004/0206567 A1 10/2004 Kato et al.
2004/0206568 A1 10/2004 Davis et al.
2004/0207190 A1 10/2004 Nakagawa et al.
2004/0221669 A1 11/2004 Shimizu et al.
2004/0226384 A1 11/2004 Shimizu et al.
2004/0231630 A1 11/2004 Liebert
2004/0231900 A1 11/2004 Tanaka et al.
2005/0006168 A1 1/2005 Iwasaka et al.
2005/0012421 A1 1/2005 Fukuda et al.
2005/0045414 A1 3/2005 Takagi et al.
2005/0056472 A1 3/2005 Smith et al.
2005/0073187 A1 4/2005 Frank et al.
2005/0077098 A1 4/2005 Takayanagi et al.
2005/0098964 A1 5/2005 Brown
2005/0116505 A1 6/2005 Carcioffi
2005/0131604 A1 6/2005 Lu
2005/0173177 A1 8/2005 Smith et al.
2005/0173180 A1 8/2005 Hypes et al.
2005/0181905 A1 8/2005 Ali et al.
2005/0206111 A1 9/2005 Gibson et al.
2005/0231145 A1 10/2005 Mukai et al.
2005/0235767 A1 10/2005 Shimizu et al.
2005/0235768 A1 10/2005 Shimizu et al.
2005/0242677 A1 11/2005 Akutsu et al.
2005/0246052 A1 11/2005 Coleman et al.
2005/0248116 A1 11/2005 Fanson
2005/0248173 A1 11/2005 Bejin et al.
2005/0253433 A1 11/2005 Brown et al.
2005/0257989 A1 11/2005 Iwami et al.
2005/0257990 A1 11/2005 Shimizu
2005/0267660 A1 12/2005 Fujiwara et al.
2005/0269141 A1 12/2005 Davis et al.
2005/0279244 A1 12/2005 Bose
2005/0279330 A1 12/2005 Okazaki et al.
2005/0280219 A1 12/2005 Brown
2006/0000458 A1 1/2006 Dees et al.
2006/0006010 A1 1/2006 Nakamura et al.
2006/0006696 A1 1/2006 Umemoto et al.
2006/0017240 A1 1/2006 Laurent et al.
2006/0017301 A1 1/2006 Edwards
2006/0022619 A1 2/2006 Koike et al.
2006/0032690 A1 2/2006 Inomoto et al.
2006/0032700 A1 2/2006 Mzanko
2006/0037805 A1 2/2006 Muraro
2006/0042862 A1 3/2006 Saito et al.
2006/0055139 A1 3/2006 Furumi et al.
2006/0065472 A1 3/2006 Ogawa et al.
2006/0071441 A1 4/2006 Mathis
2006/0075840 A1 4/2006 Saito et al.
2006/0076180 A1 4/2006 Saito et al.
2006/0107920 A1 5/2006 Serkh et al.
2006/0108174 A1 5/2006 Saito et al.
2006/0131088 A1 6/2006 Pawusch et al.
2006/0162990 A1 7/2006 Saito et al.
2006/0169525 A1 8/2006 Saito et al.
2006/0175124 A1 8/2006 Saito et al.
2006/0180383 A1 8/2006 Bataille et al.
2006/0180385 A1 8/2006 Yanai et al.
2006/0181104 A1 8/2006 Khan et al.
2006/0185741 A1 8/2006 Mckee
2006/0185927 A1 8/2006 Sakamoto et al.
2006/0186699 A1 8/2006 Davis et al.
2006/0191734 A1 8/2006 Kobayashi
2006/0191735 A1 8/2006 Kobayashi
2006/0191737 A1 8/2006 Kobayashi
2006/0191739 A1 8/2006 Koga
2006/0196721 A1 9/2006 Saito et al.
2006/0196722 A1 9/2006 Makabe et al.
2006/0201270 A1 9/2006 Kobayashi
2006/0207823 A1 9/2006 Okada et al.
2006/0207824 A1 9/2006 Saito et al.
2006/0207825 A1 9/2006 Okada et al.
2006/0208564 A1 9/2006 Yuda et al.
2006/0212200 A1 9/2006 Yanai et al.
2006/0219452 A1 10/2006 Okada et al.
2006/0219463 A1 10/2006 Seki et al.
2006/0219469 A1 10/2006 Okada et al.
2006/0219470 A1 10/2006 Imagawa et al.
2006/0220330 A1 10/2006 Urquidi et al.
2006/0220341 A1 10/2006 Seki et al.
2006/0236980 A1 10/2006 Maruo et al.
2006/0238001 A1 10/2006 Konermann et al.
2006/0255610 A1 11/2006 Bejin et al.
2006/0255637 A1 11/2006 O'Connor
2006/0261570 A1 11/2006 Eshelman et al.
2006/0270503 A1 11/2006 Suzuki et al.
2006/0278197 A1 12/2006 Takamatsu et al.
2006/0288800 A1 12/2006 Mukai et al.
2007/0000715 A1 1/2007 Denney
2007/0013181 A1 1/2007 Heck
2007/0018419 A1 1/2007 Kinouchi et al.
2007/0021222 A1 1/2007 Voigt
2007/0023221 A1 2/2007 Okuyama et al.
2007/0023566 A1 2/2007 Howard
2007/0026954 A1 2/2007 Langer et al.
2007/0068726 A1 3/2007 Shimizu
2007/0073461 A1 3/2007 Fielder
2007/0074588 A1 4/2007 Harata et al.
2007/0074589 A1 4/2007 Harata et al.
2007/0074927 A1 4/2007 Okada et al.
2007/0074928 A1 4/2007 Okada et al.
2007/0095601 A1 5/2007 Okada et al.
2007/0096449 A1 5/2007 Okada et al.
2007/0119650 A1 5/2007 Eide
2007/0120332 A1 5/2007 Bushko et al.
2007/0158920 A1 7/2007 Delaney
2007/0170683 A1 7/2007 Shimizu et al.
2007/0175696 A1 8/2007 Saito et al.
2007/0176386 A1 8/2007 Schlangen et al.
2007/0181358 A1 8/2007 Nakagaki et al.
2007/0210617 A1 9/2007 Nakamura
2007/0214818 A1 9/2007 Nakamura
2007/0215404 A1 9/2007 Lan et al.
2007/0221430 A1 9/2007 Allison
2007/0227793 A1 10/2007 Nozaki et al.
2007/0242398 A1 10/2007 Ogawa
2007/0255466 A1 11/2007 Chiao
2007/0256882 A1 11/2007 Bedard et al.
2007/0261904 A1 11/2007 Fecteau et al.
2007/0267837 A1 11/2007 Sanville
2008/0000849 A1 1/2008 Zhang et al.
2008/0023240 A1 1/2008 Sunsdahl et al.
2008/0023249 A1 1/2008 Sunsdahl et al.

(56) References Cited

U.S. PATENT DOCUMENTS

2008/0028603 A1 2/2008 Takegawa et al.
2008/0032618 A1 2/2008 Katoh et al.
2008/0041335 A1 2/2008 Buchwitz et al.
2008/0042390 A1 2/2008 Geslin et al.
2008/0053738 A1 3/2008 Kosuge et al.
2008/0053743 A1 3/2008 Tomita
2008/0059034 A1 3/2008 Lu
2008/0084091 A1 4/2008 Nakamura et al.
2008/0093883 A1 4/2008 Shibata et al.
2008/0106115 A1 5/2008 Hughes
2008/0143505 A1 6/2008 Maruyama et al.
2008/0169694 A1 7/2008 Speh et al.
2008/0172155 A1 7/2008 Takamatsu et al.
2008/0179853 A1 7/2008 Kuwabara et al.
2008/0183353 A1 7/2008 Post et al.
2008/0199253 A1 8/2008 Okada et al.
2008/0201044 A1 8/2008 Yamada et al.
2008/0243336 A1 10/2008 Fitzgibbons
2008/0256738 A1 10/2008 Malone
2008/0257630 A1 10/2008 Takeshima et al.
2008/0275606 A1 11/2008 Tarasinski et al.
2008/0283326 A1 11/2008 Bennett et al.
2008/0284124 A1 11/2008 Brady et al.
2008/0296884 A1 12/2008 Rouhana et al.
2008/0308334 A1 12/2008 Leonard et al.
2009/0000846 A1 1/2009 Nemec et al.
2009/0000849 A1 1/2009 Leonard et al.
2009/0001748 A1 1/2009 Brown et al.
2009/0014977 A1 1/2009 Molenaar
2009/0037051 A1 2/2009 Shimizu et al.
2009/0038774 A1 2/2009 Ogiso et al.
2009/0065285 A1 3/2009 Maeda et al.
2009/0071737 A1 3/2009 Leonard et al.
2009/0071739 A1 3/2009 Leonard et al.
2009/0078082 A1 3/2009 Poskie et al.
2009/0078491 A1 3/2009 Tsutsumikoshi et al.
2009/0090575 A1 4/2009 Nagasaka
2009/0091101 A1 4/2009 Leonard et al.
2009/0093928 A1 4/2009 Getman et al.
2009/0108546 A1 4/2009 Ohletz et al.
2009/0108617 A1 4/2009 Songwe
2009/0108632 A1 4/2009 Wen et al.
2009/0121518 A1 5/2009 Leonard et al.
2009/0152035 A1 6/2009 Okada et al.
2009/0152036 A1 6/2009 Okada et al.
2009/0178871 A1 7/2009 Sunsdahl et al.
2009/0183937 A1 7/2009 Yamamura et al.
2009/0183938 A1 7/2009 Cover et al.
2009/0184531 A1 7/2009 Yamamura et al.
2009/0184534 A1 7/2009 Smith et al.
2009/0184536 A1 7/2009 Kubota
2009/0184537 A1 7/2009 Yamamura et al.
2009/0184541 A1 7/2009 Yamamura et al.
2009/0189373 A1 7/2009 Schramm et al.
2009/0200823 A1 8/2009 Vertanen
2009/0205891 A1 8/2009 Parrett et al.
2009/0240427 A1 9/2009 Siereveld et al.
2009/0241708 A1 10/2009 Schaedler et al.
2009/0253521 A1 10/2009 Arden et al.
2009/0261542 A1 10/2009 Mcintyre
2009/0263259 A1 10/2009 Picton et al.
2009/0294195 A1 12/2009 Otsuka et al.
2009/0295185 A1 12/2009 Abe et al.
2009/0301830 A1 12/2009 Kinsman et al.
2009/0302590 A1 12/2009 Van et al.
2009/0309313 A1 12/2009 Knorr et al.
2010/0012412 A1 1/2010 Deckard et al.
2010/0017059 A1 1/2010 Lu et al.
2010/0019538 A1 1/2010 Kiley et al.
2010/0057297 A1 3/2010 Itagaki et al.
2010/0078253 A1 4/2010 Rolfe et al.
2010/0078256 A1 4/2010 Kuwabara et al.
2010/0087975 A1 4/2010 Dower
2010/0090797 A1 4/2010 Koenig et al.
2010/0121529 A1 5/2010 Savaresi et al.
2010/0152969 A1 6/2010 Li et al.
2010/0155170 A1 6/2010 Melvin et al.
2010/0172770 A1 7/2010 Ichise et al.
2010/0187032 A1 7/2010 Yamamura et al.
2010/0187033 A1 7/2010 Hayashi et al.
2010/0194086 A1 8/2010 Yamamura et al.
2010/0194087 A1 8/2010 Yamamura et al.
2010/0201156 A1 8/2010 Nakamura
2010/0211261 A1 8/2010 Sasaki et al.
2010/0213733 A1 8/2010 Stark et al.
2010/0230876 A1 9/2010 Inoue et al.
2010/0252972 A1 10/2010 Cox et al.
2010/0253018 A1 10/2010 Peterson
2010/0301571 A1 12/2010 Van et al.
2010/0314184 A1 12/2010 Stenberg et al.
2010/0314191 A1 12/2010 Deckard et al.
2010/0317484 A1 12/2010 Gillingham et al.
2010/0317485 A1 12/2010 Gillingham et al.
2011/0013952 A1 1/2011 Shimazu
2011/0025012 A1 2/2011 Nakamura
2011/0035089 A1 2/2011 Hirao et al.
2011/0035105 A1 2/2011 Jolly
2011/0062748 A1 3/2011 Kaita et al.
2011/0074123 A1 3/2011 Fought et al.
2011/0074447 A1 3/2011 Ootaka
2011/0094813 A1 4/2011 Suzuki et al.
2011/0094816 A1 4/2011 Suzuki et al.
2011/0094818 A1 4/2011 Suzuki et al.
2011/0115259 A1 5/2011 Mizuta
2011/0139528 A1 6/2011 Eaton et al.
2011/0143113 A1 6/2011 Hatta et al.
2011/0148144 A1 6/2011 Kosuge et al.
2011/0148355 A1 6/2011 Nakamura et al.
2011/0153158 A1 6/2011 Acocella
2011/0155087 A1 6/2011 Wenger et al.
2011/0156428 A1 6/2011 Inoue et al.
2011/0156438 A1 6/2011 Ichihara et al.
2011/0209937 A1 9/2011 Belzile et al.
2011/0240250 A1 10/2011 Azuma
2011/0240394 A1 10/2011 Hurd et al.
2011/0289896 A1 12/2011 Sasahara et al.
2011/0297462 A1 12/2011 Grajkowski et al.
2011/0298189 A1 12/2011 Schneider et al.
2011/0309118 A1 12/2011 Wada
2012/0009860 A1 1/2012 Wihinen
2012/0029770 A1 2/2012 Hirao et al.
2012/0029779 A1 2/2012 Dickinson et al.
2012/0031688 A1 2/2012 Safranski et al.
2012/0031693 A1 2/2012 Deckard et al.
2012/0031694 A1 2/2012 Deckard et al.
2012/0037437 A1 2/2012 Fernandez-Mateo
2012/0053790 A1 3/2012 Oikawa
2012/0053791 A1 3/2012 Harada
2012/0055728 A1 3/2012 Bessho et al.
2012/0073527 A1 3/2012 Oltmans et al.
2012/0073537 A1 3/2012 Oltmans et al.
2012/0078470 A1 3/2012 Hirao et al.
2012/0085588 A1 4/2012 Kinsman et al.
2012/0119454 A1 5/2012 Di Maria
2012/0153718 A1 6/2012 Rawlinson et al.
2012/0160589 A1 6/2012 Tsumiyama et al.
2012/0161468 A1 6/2012 Tsumiyama et al.
2012/0168268 A1 7/2012 Bruno et al.
2012/0175177 A1 7/2012 Lee et al.
2012/0186872 A1 7/2012 Akuta
2012/0190232 A1 7/2012 Akuta
2012/0190251 A1 7/2012 Akuta
2012/0193163 A1 8/2012 Wimpfheimer et al.
2012/0212013 A1 8/2012 Ripley et al.
2012/0217078 A1 8/2012 Kinsman et al.
2012/0223500 A1 9/2012 Kinsman et al.
2012/0231645 A1 9/2012 Byrne
2012/0234620 A1 9/2012 Boyarski et al.
2012/0247888 A1 10/2012 Chikuma et al.
2012/0258839 A1 10/2012 Smithson et al.
2012/0265402 A1 10/2012 Post et al.
2012/0277953 A1 11/2012 Savaresi et al.
2012/0326410 A1 12/2012 West et al.
2013/0009350 A1 1/2013 Wolf-Monheim

(56) References Cited

U.S. PATENT DOCUMENTS

2013/0018559 A1 1/2013 Epple et al.
2013/0030650 A1 1/2013 Norris et al.
2013/0033070 A1 2/2013 Kinsman et al.
2013/0041545 A1 2/2013 Baer et al.
2013/0060423 A1 3/2013 Jolly
2013/0060444 A1 3/2013 Matsunaga et al.
2013/0062098 A1 3/2013 Ikeda et al.
2013/0066525 A1 3/2013 Tomik et al.
2013/0074487 A1 3/2013 Herold et al.
2013/0079988 A1 3/2013 Hirao et al.
2013/0087396 A1 4/2013 Itoo et al.
2013/0087397 A1 4/2013 Yamamoto et al.
2013/0087398 A1 4/2013 Kotani et al.
2013/0103259 A1 4/2013 Eng et al.
2013/0158799 A1 6/2013 Kamimura
2013/0161921 A1 6/2013 Cheng et al.
2013/0168994 A1 7/2013 Yamamoto et al.
2013/0190980 A1 7/2013 Ramirez Ruiz
2013/0197732 A1 8/2013 Pearlman et al.
2013/0197756 A1 8/2013 Ramirez Ruiz
2013/0199097 A1 8/2013 Spindler et al.
2013/0218414 A1 8/2013 Meitinger et al.
2013/0226405 A1 8/2013 Koumura et al.
2013/0239567 A1 9/2013 Ohnishi et al.
2013/0240273 A1 9/2013 Langer et al.
2013/0241228 A1 9/2013 Nakamura et al.
2013/0256050 A1 10/2013 Novotny et al.
2013/0261893 A1 10/2013 Yang
2013/0291533 A1 11/2013 Inoue et al.
2013/0304319 A1 11/2013 Daniels
2013/0319785 A1 12/2013 Spindler et al.
2013/0328277 A1 12/2013 Ryan et al.
2013/0333375 A1 12/2013 Inoue et al.
2013/0334394 A1 12/2013 Parison et al.
2013/0338869 A1 12/2013 Tsumano
2013/0340422 A1 12/2013 Inoue et al.
2013/0341143 A1 12/2013 Brown
2013/0345933 A1 12/2013 Norton et al.
2014/0000174 A1 1/2014 Minagawa et al.
2014/0001717 A1 1/2014 Giovanardi et al.
2014/0005888 A1 1/2014 Bose et al.
2014/0008136 A1 1/2014 Bennett
2014/0012467 A1 1/2014 Knox et al.
2014/0015313 A1 1/2014 Shiba
2014/0015314 A1 1/2014 Shiba
2014/0034409 A1 2/2014 Nakamura et al.
2014/0046539 A1 2/2014 Wijffels et al.
2014/0049067 A1 2/2014 Kasuya et al.
2014/0058606 A1 2/2014 Hilton
2014/0060953 A1 3/2014 Wetterlund
2014/0060954 A1 3/2014 Smith et al.
2014/0062048 A1 3/2014 Schlangen et al.
2014/0065936 A1 3/2014 Smith et al.
2014/0067215 A1 3/2014 Wetterlund et al.
2014/0090918 A1 4/2014 Sunsdahl et al.
2014/0095022 A1 4/2014 Cashman et al.
2014/0102819 A1 4/2014 Deckard et al.
2014/0102820 A1 4/2014 Deckard et al.
2014/0103627 A1 4/2014 Deckard et al.
2014/0109627 A1 4/2014 Lee et al.
2014/0124279 A1 5/2014 Schlangen et al.
2014/0125018 A1 5/2014 Brady et al.
2014/0129083 A1 5/2014 O'Connor et al.
2014/0131971 A1 5/2014 Hou
2014/0134884 A1 5/2014 Okamoto et al.
2014/0136048 A1 5/2014 Ummethala et al.
2014/0144719 A1 5/2014 Morgan et al.
2014/0156143 A1 6/2014 Evangelou et al.
2014/0167372 A1 6/2014 Kim et al.
2014/0182957 A1 7/2014 Honda et al.
2014/0203533 A1 7/2014 Safranski et al.
2014/0217774 A1 8/2014 Peterson et al.
2014/0225403 A1 8/2014 Shimada et al.
2014/0262569 A1 9/2014 Inoue et al.
2014/0262584 A1 9/2014 Lovold et al.
2014/0265285 A1 9/2014 Erspamer
2014/0294195 A1 10/2014 Perez et al.
2014/0353956 A1 12/2014 Bjerketvedt et al.
2014/0358373 A1 12/2014 Kikuchi et al.
2014/0360794 A1 12/2014 Tallman
2015/0002404 A1 1/2015 Hooton
2015/0029018 A1 1/2015 Bowden et al.
2015/0039199 A1 2/2015 Kikuchi
2015/0047917 A1* 2/2015 Burt .................. B62D 25/2036 180/68.5
2015/0057885 A1 2/2015 Brady et al.
2015/0061275 A1 3/2015 Deckard et al.
2015/0194656 A1 7/2015 Nakayama et al.
2015/0210137 A1 7/2015 Kinsman et al.
2015/0259011 A1 9/2015 Deckard et al.
2015/0274212 A1 10/2015 Karube et al.
2015/0274215 A1 10/2015 Karube et al.
2015/0291056 A1 10/2015 Nozaki
2015/0330351 A1 11/2015 Ragazzi et al.
2015/0367891 A1 12/2015 Deschamps
2015/0375803 A1 12/2015 Raska
2016/0023621 A1 1/2016 Books et al.
2016/0046193 A1 2/2016 Park
2016/0052582 A1 2/2016 Louisa
2016/0059660 A1 3/2016 Brady et al.
2016/0061314 A1 3/2016 Kuhl et al.
2016/0090958 A1 3/2016 Berkson
2016/0108866 A1 4/2016 Dewit et al.
2016/0176283 A1 6/2016 Hicke et al.
2016/0176284 A1 6/2016 Nugteren et al.
2016/0176449 A1 6/2016 Kazakoff et al.
2016/0185329 A1 6/2016 Lee et al.
2016/0257360 A1 9/2016 Mackenzie et al.
2016/0264114 A1 9/2016 Maruo et al.
2016/0332543 A1 11/2016 Ecker et al.
2016/0332553 A1 11/2016 Miller et al.
2016/0336578 A1 11/2016 Mack et al.
2016/0341148 A1 11/2016 Maki et al.
2016/0347159 A1 12/2016 Perlo et al.
2016/0368395 A1 12/2016 Murase
2017/0003414 A1 1/2017 Agnihotri et al.
2017/0013336 A1 1/2017 Stys et al.
2017/0018755 A1 1/2017 Dekeuster et al.
2017/0096225 A1 4/2017 Smith et al.
2017/0101019 A1 4/2017 Jung et al.
2017/0106747 A1 4/2017 Safranski et al.
2017/0120946 A1 5/2017 Gong et al.
2017/0131095 A1 5/2017 Kim
2017/0136874 A1 5/2017 Harris et al.
2017/0152810 A1 6/2017 Wicks
2017/0175621 A1 6/2017 Schenkel
2017/0190328 A1 7/2017 Nakazawa et al.
2017/0199094 A1 7/2017 Duff et al.
2017/0233007 A1 8/2017 Park
2017/0246943 A1 8/2017 Salz-Breuer et al.
2017/0320366 A1 11/2017 Milton et al.
2017/0334500 A1 11/2017 Jarek et al.
2017/0341482 A1 11/2017 Takezawa
2017/0361676 A1 12/2017 Androulakis et al.
2018/0022391 A1 1/2018 Lutz et al.
2018/0065465 A1 3/2018 Ward et al.
2018/0086180 A1 3/2018 Herrmann et al.
2018/0142609 A1 5/2018 Seo et al.
2018/0147966 A1 5/2018 Reed et al.
2018/0178677 A1 6/2018 Swain et al.
2018/0178858 A1 6/2018 Hollman et al.
2018/0179991 A1 6/2018 Oakden-Graus et al.
2018/0281861 A1 10/2018 Gordon
2018/0326843 A1 11/2018 Danielson et al.
2019/0009668 A1 1/2019 Kuramoto et al.
2019/0009823 A1 1/2019 Savard et al.
2019/0009835 A1 1/2019 D'Amico
2019/0042535 A1 2/2019 Smith et al.
2019/0047622 A1 2/2019 Johnson et al.
2019/0110161 A1 4/2019 Rentz et al.
2019/0143871 A1 5/2019 Weber et al.
2019/0159367 A1 5/2019 Umino
2019/0168637 A1 6/2019 Abe et al.
2019/0193501 A1 6/2019 Brady et al.

(56) References Cited

U.S. PATENT DOCUMENTS

| | | | |
|---|---|---|---|
| 2019/0210457 | A1 | 7/2019 | Galsworthy et al. |
| 2019/0210668 | A1 | 7/2019 | Endrizzi et al. |
| 2019/0211915 | A1 | 7/2019 | Davis et al. |
| 2019/0217753 | A1 | 7/2019 | Mcgraw et al. |
| 2019/0217909 | A1 | 7/2019 | Deckard et al. |
| 2019/0232911 | A1 | 8/2019 | Hisamura et al. |
| 2019/0256010 | A1 | 8/2019 | Baba et al. |
| 2019/0264635 | A1 | 8/2019 | Oltmans et al. |
| 2019/0265064 | A1 | 8/2019 | Koenig et al. |
| 2019/0291572 | A1 | 9/2019 | Denis et al. |
| 2019/0293733 | A1 | 9/2019 | Esaka et al. |
| 2019/0299736 | A1 | 10/2019 | Hisamura et al. |
| 2019/0306599 | A1 | 10/2019 | Nagai et al. |
| 2019/0308672 | A1 | 10/2019 | Schounard et al. |
| 2019/0366883 | A1 | 12/2019 | Ultsch et al. |
| 2019/0367117 | A1 | 12/2019 | Fischer et al. |
| 2020/0001673 | A1 | 1/2020 | Schlangen et al. |
| 2020/0010005 | A1 | 1/2020 | Bjerketvedt et al. |
| 2020/0010120 | A1 | 1/2020 | Kinsman et al. |
| 2020/0010125 | A1 | 1/2020 | Peterson et al. |
| 2020/0047818 | A1 | 2/2020 | Ebisumoto et al. |
| 2020/0070709 | A1 | 3/2020 | Weber et al. |
| 2020/0122776 | A1 | 4/2020 | Schlangen et al. |
| 2020/0132736 | A1 | 4/2020 | Fujioka |
| 2020/0148084 | A1 | 5/2020 | Holm et al. |
| 2020/0180476 | A1 | 6/2020 | Salenbien |
| 2020/0223366 | A1 | 7/2020 | Heinz et al. |
| 2020/0262285 | A1 | 8/2020 | Sunsdahl et al. |
| 2020/0282936 | A1 | 9/2020 | Davis et al. |
| 2020/0346542 | A1 | 11/2020 | Rasa et al. |
| 2021/0001687 | A1 | 1/2021 | Enke et al. |
| 2021/0003615 | A1 | 1/2021 | Sasaki et al. |
| 2021/0013643 | A1 | 1/2021 | Yang |
| 2021/0024007 | A1 | 1/2021 | Fredrickson et al. |
| 2021/0078639 | A1 | 3/2021 | Gordon |
| 2021/0094627 | A1 | 4/2021 | Clark et al. |
| 2021/0101438 | A1 | 4/2021 | Hayes et al. |
| 2021/0101442 | A1 | 4/2021 | Nishino et al. |
| 2021/0129921 | A1 | 5/2021 | Rasa |
| 2021/0213822 | A1 | 7/2021 | Ripley et al. |
| 2021/0214022 | A1 | 7/2021 | Schounard et al. |
| 2021/0245644 | A1 | 8/2021 | Bjerketvedt et al. |
| 2021/0269096 | A1 | 9/2021 | Erspamer et al. |
| 2021/0293283 | A1 | 9/2021 | Olason, Jr. |
| 2021/0354542 | A1 | 11/2021 | Schleif et al. |
| 2021/0380170 | A1 | 12/2021 | Wilmot et al. |
| 2022/0033004 | A1 | 2/2022 | Kinsman et al. |
| 2022/0042281 | A1 | 2/2022 | Gentle et al. |
| 2022/0073154 | A1 | 3/2022 | Peterson et al. |
| 2022/0169114 | A1 | 6/2022 | Harris et al. |
| 2022/0227202 | A1 | 7/2022 | Maier et al. |
| 2022/0281275 | A1 | 9/2022 | Schlangen et al. |
| 2022/0315115 | A1 | 10/2022 | Lyons et al. |
| 2022/0339998 | A1 | 10/2022 | Barillot et al. |
| 2023/0027831 | A1 | 1/2023 | Rasa |
| 2023/0064416 | A1 | 3/2023 | Rubanovich et al. |
| 2023/0101665 | A1 | 3/2023 | Inami et al. |
| 2023/0103246 | A1 | 3/2023 | Inami et al. |
| 2023/0150426 | A1 | 5/2023 | Nelapati et al. |
| 2023/0234490 | A1 | 7/2023 | Bjerketvedt et al. |
| 2023/0256815 | A1 | 8/2023 | Dunne et al. |
| 2023/0322076 | A1 | 10/2023 | Frank et al. |
| 2023/0331081 | A1 | 10/2023 | Weber et al. |
| 2023/0339541 | A1 | 10/2023 | Nysse et al. |
| 2024/0010281 | A1 | 1/2024 | Schounard et al. |
| 2024/0017608 | A1 | 1/2024 | Williams et al. |
| 2024/0025489 | A1 | 1/2024 | Peterson et al. |
| 2024/0083511 | A1 | 3/2024 | Rasa |

FOREIGN PATENT DOCUMENTS

| | | | |
|---|---|---|---|
| CA | 2746655 | A1 | 7/2010 |
| CA | 2825896 | A1 | 8/2012 |
| CA | 2826756 | A1 | 8/2012 |
| CA | 2901541 | A1 | 9/2014 |
| CA | 2910026 | A1 | 12/2014 |
| CA | 2921360 | A1 | 2/2015 |
| CA | 2933980 | A1 | 6/2015 |
| CA | 2903511 | A1 | 12/2016 |
| CA | 177158 | | 8/2018 |
| CH | 317335 | | 11/1956 |
| CN | 2255379 | | 6/1997 |
| CN | 2544987 | | 4/2003 |
| CN | 1660615 | | 8/2005 |
| CN | 1746803 | | 3/2006 |
| CN | 1749048 | | 3/2006 |
| CN | 1810530 | | 8/2006 |
| CN | 101372199 | | 2/2009 |
| CN | 201276159 | | 7/2009 |
| CN | 101511664 | | 8/2009 |
| CN | 101549626 | | 10/2009 |
| CN | 101878146 | | 11/2010 |
| CN | 201723635 | | 1/2011 |
| CN | 102069813 | | 5/2011 |
| CN | 102168732 | | 8/2011 |
| CN | 201914049 | | 8/2011 |
| CN | 102256825 | | 11/2011 |
| CN | 202040257 | | 11/2011 |
| CN | 102300734 | | 12/2011 |
| CN | 102616104 | | 8/2012 |
| CN | 102627063 | | 8/2012 |
| CN | 102678808 | | 9/2012 |
| CN | 102729760 | | 10/2012 |
| CN | 202468817 | | 10/2012 |
| CN | 102840265 | | 12/2012 |
| CN | 202986930 | | 6/2013 |
| CN | 103256153 | | 8/2013 |
| CN | 103370221 | | 10/2013 |
| CN | 104321241 | | 1/2015 |
| CN | 104661903 | | 5/2015 |
| CN | 105074163 | | 11/2015 |
| CN | 105089901 | | 11/2015 |
| CN | 105263787 | | 1/2016 |
| CN | 204978149 | | 1/2016 |
| CN | 105377672 | | 3/2016 |
| CN | 107249910 | | 10/2017 |
| CN | 107878153 | | 4/2018 |
| CN | 304577688 | | 4/2018 |
| CN | 109789894 | | 5/2019 |
| CN | 110816683 | A | 2/2020 |
| CN | 212690200 | U | 3/2021 |
| DE | 0037435 | | 10/1886 |
| DE | 0116605 | | 2/1900 |
| DE | 1755101 | | 4/1971 |
| DE | 2210070 | | 9/1973 |
| DE | 2752798 | A1 | 6/1978 |
| DE | 3007726 | A1 | 9/1981 |
| DE | 3033707 | | 4/1982 |
| DE | 4129643 | A1 | 3/1993 |
| DE | 19508302 | A1 | 9/1996 |
| DE | 19949787 | A1 | 4/2000 |
| DE | 19922745 | A1 | 12/2000 |
| DE | 202005005999 | U1 | 8/2006 |
| DE | 102006011416 | A1 | 9/2007 |
| DE | 102008050671 | A1 | 4/2010 |
| DE | 102010020544 | A1 | 1/2011 |
| DE | 102014216871 | A1 | 2/2015 |
| DE | 102016012781 | A1 | 4/2017 |
| DE | 102017106299 | A1 | 9/2018 |
| DE | 102022122753 | A1 | 5/2023 |
| EM | 004169266-0001 | | 8/2017 |
| EP | 0237085 | | 9/1987 |
| EP | 0238077 | A2 | 9/1987 |
| EP | 0398804 | A1 | 11/1990 |
| EP | 0403803 | A1 | 12/1990 |
| EP | 0544108 | A1 | 6/1993 |
| EP | 0546295 | A1 | 6/1993 |
| EP | 0405123 | | 10/1993 |
| EP | 0568251 | A1 | 11/1993 |
| EP | 0575962 | A1 | 12/1993 |
| EP | 0473766 | | 2/1994 |
| EP | 0691226 | A1 | 1/1996 |
| EP | 0697306 | A1 | 2/1996 |
| EP | 0709247 | A2 | 5/1996 |

(56) References Cited

FOREIGN PATENT DOCUMENTS

| | | | | |
|---|---|---|---|---|
| EP | 0794096 | A2 | 9/1997 | |
| EP | 0893618 | A2 | 1/1999 | |
| EP | 1013310 | A1 | 6/2000 | |
| EP | 1172239 | A2 | 1/2002 | |
| EP | 1215107 | A1 | 6/2002 | |
| EP | 1219475 | A1 | 7/2002 | |
| EP | 1318064 | A2 | 6/2003 | |
| EP | 1318938 | A2 | 6/2003 | |
| EP | 1449688 | A2 | 8/2004 | |
| EP | 1479933 | A2 | 11/2004 | |
| EP | 1493624 | A1 | 1/2005 | |
| EP | 1164897 | | 2/2005 | |
| EP | 1557345 | A2 | 7/2005 | |
| EP | 1564123 | A2 | 8/2005 | |
| EP | 1600326 | A1 | 11/2005 | |
| EP | 1602523 | A2 | 12/2005 | |
| EP | 1627762 | A2 | 2/2006 | |
| EP | 2057060 | A2 | 5/2009 | |
| EP | 2123933 | A2 | 11/2009 | |
| EP | 2236395 | A1 | 10/2010 | |
| EP | 2351659 | A1 | 8/2011 | |
| EP | 2517904 | A1 | 10/2012 | |
| EP | 2581240 | B1 | 6/2017 | |
| EP | 4159495 | A1 | 4/2023 | |
| EP | 4163189 | A1 | 4/2023 | |
| FR | 2460797 | A1 | 1/1981 | |
| FR | 2623776 | A1 | 6/1989 | |
| FR | 2891330 | A1 | 3/2007 | |
| FR | 2907410 | A1 | 4/2008 | |
| FR | 2914597 | A1 | 10/2008 | |
| FR | 2935642 | | 3/2010 | |
| FR | 2936028 | A1 | 3/2010 | |
| GB | 0510996 | A | 8/1939 | |
| GB | 2036659 | A | 7/1980 | |
| GB | 2081191 | A | 2/1982 | |
| GB | 2316923 | A | 3/1998 | |
| GB | 2347398 | A | 9/2000 | |
| GB | 2417226 | A | 2/2006 | |
| GB | 2423066 | A | 8/2006 | |
| GB | 2436091 | A | 9/2007 | |
| GB | 2471506 | A | 1/2011 | |
| GB | 2558771 | A | 7/2018 | |
| JP | 53-101625 | U | 8/1978 | |
| JP | 59-032525 | A | 2/1984 | |
| JP | 60-067206 | | 4/1985 | |
| JP | 60-067268 | A | 4/1985 | |
| JP | 60-067269 | A | 4/1985 | |
| JP | 63-025977 | | 5/1988 | |
| JP | 02-155815 | A | 6/1990 | |
| JP | 04-368211 | A | 12/1992 | |
| JP | 05-149443 | A | 6/1993 | |
| JP | 05-178055 | A | 7/1993 | |
| JP | 06-156036 | A | 6/1994 | |
| JP | 06-325977 | A | 11/1994 | |
| JP | 07-040783 | | 2/1995 | |
| JP | 07-117433 | | 5/1995 | |
| JP | 2848140 | B2 * | 1/1999 | ........... B62D 23/005 |
| JP | 11-091637 | A | 4/1999 | |
| JP | 2898949 | B2 | 6/1999 | |
| JP | 11-334447 | A | 12/1999 | |
| JP | 2000-177434 | A | 6/2000 | |
| JP | 2001-018623 | A | 1/2001 | |
| JP | 3137209 | B2 | 2/2001 | |
| JP | 2001-121939 | A | 5/2001 | |
| JP | 2001-130304 | A | 5/2001 | |
| JP | 3293459 | B2 * | 6/2002 | |
| JP | 2002-219921 | A | 8/2002 | |
| JP | 2003-237530 | A | 8/2003 | |
| JP | 2004-308453 | A | 11/2004 | |
| JP | 2005-041394 | A | 2/2005 | |
| JP | 2005-193788 | A | 7/2005 | |
| JP | 2006-232058 | A | 9/2006 | |
| JP | 2006-232061 | A | 9/2006 | |
| JP | 2006-256579 | A | 9/2006 | |
| JP | 2006-256580 | A | 9/2006 | |
| JP | 2006-281839 | A | 10/2006 | |
| JP | 2007-083864 | A | 4/2007 | |
| JP | 2007-106319 | A | 4/2007 | |
| JP | 2008-308121 | A | 12/2008 | |
| JP | 2009-035220 | A | 2/2009 | |
| JP | 2009-160964 | A | 7/2009 | |
| JP | 2010-095106 | A | 4/2010 | |
| JP | 2010-162946 | A | 7/2010 | |
| JP | 2011-126405 | A | 6/2011 | |
| JP | 2017-043130 | A | 3/2017 | |
| WO | 92/10693 | A1 | 6/1992 | |
| WO | 92/18347 | A1 | 10/1992 | |
| WO | 98/00430 | A1 | 1/1998 | |
| WO | 98/30430 | A1 | 7/1998 | |
| WO | 00/53057 | A1 | 9/2000 | |
| WO | 02/22427 | A2 | 3/2002 | |
| WO | 03/42026 | A1 | 5/2003 | |
| WO | 03/55716 | A1 | 7/2003 | |
| WO | 03/70543 | A1 | 8/2003 | |
| WO | 2007/103197 | A2 | 9/2007 | |
| WO | 2008/005131 | A2 | 1/2008 | |
| WO | 2008/013564 | A1 | 1/2008 | |
| WO | 2008/016377 | A2 | 2/2008 | |
| WO | 2008/115459 | A1 | 9/2008 | |
| WO | 2009/017533 | A1 | 2/2009 | |
| WO | 2009/096998 | A1 | 8/2009 | |
| WO | 2009/137579 | A1 | 11/2009 | |
| WO | 2010/074990 | A2 | 7/2010 | |
| WO | 2010/148014 | A1 | 12/2010 | |
| WO | 2011/047593 | A1 | 4/2011 | |
| WO | 2011/119764 | A1 | 9/2011 | |
| WO | 2011/127138 | A2 | 10/2011 | |
| WO | 2012/040553 | A2 | 3/2012 | |
| WO | 2012/109546 | A1 | 8/2012 | |
| WO | 2012/174793 | A1 | 12/2012 | |
| WO | 2013/116459 | A1 | 8/2013 | |
| WO | 2013/166310 | A1 | 11/2013 | |
| WO | 2014/039432 | A2 | 3/2014 | |
| WO | 2014/039433 | A2 | 3/2014 | |
| WO | 2014/047488 | A1 | 3/2014 | |
| WO | 2014/059258 | A1 | 4/2014 | |
| WO | 2014/143953 | A2 | 9/2014 | |
| WO | 2014/193975 | A1 | 12/2014 | |
| WO | 2016/038591 | A1 | 3/2016 | |
| WO | 2016/099770 | A2 | 6/2016 | |
| WO | 2016/100697 | A1 | 6/2016 | |
| WO | 2016/118585 | A2 | 7/2016 | |
| WO | 2016/186942 | A1 | 11/2016 | |
| WO | 2017/196776 | A1 | 11/2017 | |
| WO | 2018/096513 | A1 | 5/2018 | |
| WO | 2018/118176 | A1 | 6/2018 | |
| WO | 2018/118508 | A2 | 6/2018 | |
| WO | 2019/140026 | A1 | 7/2019 | |
| WO | 2020/223379 | A1 | 11/2020 | |
| WO | 2022/232437 | A1 | 11/2022 | |

OTHER PUBLICATIONS

Translation of JP 2848140 (Year: 1999).*

Polaris Ranger Brochure ATVs and Side .times. Sides Brochure 2010, .COPYRGT. 2009, 26 pages.

Polaris Ranger Brochure ATVs and Side x Sides Brochure 2010, (Copyrights) 2009; 26 pages.

Polaris Ranger Off-Road Utility Vehicles Brochure 2004, (Copyrights) 2003; 20 pages.

Polaris Ranger Rzr Brochure 2011, (Copyrights) 2010; 16 pages.

Polaris Ranger Welcome to Ranger Country Brochure 2006, (Copyrights) 2005; 24 pages.

Polaris Ranger Work/Play Only Brochure 2008, (Copyrights) 2007; 28 pages.

Radiator Relocation Kit for Polaris Scrambler, High Lifter, http://www.highlifter.com/p. 4598-radiator-relocation-kit-for- polaris-scra- mbler-8501000-see-apps.aspx, last accessed Nov. 4, 2015, 1 page.

Radiator Relocation Kit-Polaris Sportsman 550/850, High Lifter, http://www.highlifter.com/p. 2686-radiator-relocation- kit-polaris-sportsma- n-550850-see-apps.aspx, last accessed Nov. 4, 2015, 2 p. .

(56) References Cited

OTHER PUBLICATIONS

Ray Sedorchuk, New for 2004, Yamaha Rhino 660 4x4, ATV Connection Magazine, (Copyrights) 2006; 3 pages.
Redline Specs, copyright 2008, available at www.RedlinePerforms.com., 2 pages.
Renegade X Mr 1000R, Can-Am, http://can-am.brp.com/off-road/atv/renegade/renegade-x-mr-1000R.html, copyright 2003-2015, 12 pages.
Ridenow Powersports. 2017 Can-Am Maverick X3 Walk Around. YouTube. Sep. 14, 2016 (Sep. 14, 2016). [retrieved on Jul. 6, 2021]. Retrieved from internet: <URL: https://www.youtube.com/watch?v=51OslScF-y4> entire video. See pp. 6-8 of the ISA/237.
Robby Gordon's RZR-S 4 seater-Yamaha Rhino Forum-Rhino Forums.net, dated Nov. 11, 2009, 14 pages.
Second Office Action issued by the China National Intellectual Property Administration, dated Jul. 3, 2020, for Chinese Patent Application No. 201680028024.5; 7 pages.
Select Increments 2007-2018 Compatible With Jeep Wrangler JK and Unlimited With Infinity or Alpine Premium Factory Systems Pillar Pods with Kicker speakers PP0718-IA-K (Select), Dec. 14, 2018; 6 pages.
Shock Owner's Manual: Float ATV Front Applications—Fox Racing Shox, 2004, 21 pgs.
Shock Owner's Manual: Float ATV+Snowmobile—Fox Racing Shox, 2006, 18 pgs.
Shock Owner's Manual: Float MXR—Fox Racing Shox, 2006, 16 pgs.
Shock Owner's Manual: Float X Evol—Snowmobile Applications, 2006, 32 pgs.
Side by Side Sports.com, Polaris Ranger Rear Cage Extension and Seat Set, available at www. sidebysidesports. com/porarecaexan.html, last accessed on Mar. 29, 2011.
Suzuki; 1991 Suzuki GSX1100G Cylinder OEM Parts Diagram; retrieved Mar. 17, 2022; https://www.revzilla.com/oem/suzuki/1991-suzuki-gsx1100g/cylinder?submodel=gsx1100gp (Year: 2017).
Tellico 4x4.com, Polaris Ranger Accessories and Ranger Parts for Crew 500, 700, 800, XP, available at www.tellico4x4.com/index.php/cPath/3523, last accessed on Mar. 29, 2011.
Troy Merrifield & Damon Flippo, Rise of the Machine: Let the "Revolution" Begin. One Seat at a Time., CartWheelin' Magazine, published at least as early as Jan. 2008, available at http://www.1redline.com/news.sub .- events/PDF/cart. sub .- wheelin.sub .- article.pdf, last accessed on Feb. 15, 2012, pp. 14-19.
Troy Merrifield, Redline's Rockin' Riot, UTV Off-Road Magazine, published in vol. 4, Issue 1, Feb./Mar. 2009, available at http://www.1redline.com/news.sub.-events/PDF/Redline.sub.-Riot.sub.-Ar-ticle.sub.-01.sub.-2009.pdf., last accessed on Feb. 15, 2012, pp. 16-19.
Welcome to Ranger Country brochure, .COPYRGT. 2005, Polaris Industries Inc., 24 pgs.
Welcome to Ranger Country brochure, .COPYRGT. 2006, Polaris Industries Inc., 20 pgs.
Work/Play Only Ranger brochure, .COPYRGT. 2007, Polaris Industries Inc., 28 pgs.
Written Opinion issued by the European Patent Office, dated May 14, 2018, for International Patent Application No. PCT/US2017/054006; 9 pages.
Written Opinion of the International Search Authority issued by the European Patent Office, dated Sep. 14, 2009, for related International Application No. PCT/US2010/038709, 6 pages.
Written Opinion of the International Searching Authority, dated Feb. 3, 2013, for related International Patent Application No. PCT/US2011/046395; 7 pages.
Written Opinion of the International Searching Authority, issued by the European Patent Office, dated Jan. 9, 2015, for corresponding International patent application No. PCT/US2014/019952; 7 pages.
Yamaha Company Website, 2006 Rhino 450 Auto 4x4, copyright 2006; 4 pages.
Yamaha, Company Website, 2006 Rhino 450 Auto 4x4, (Copyrights) 2005; 3 pages.
Yamaha, Company Website, 2006 Rhino 660 Auto 4 x 4, (Copyrights) 2006; 4 pages.
Yamaha, Company Website, Rhino 660 Auto 4x4 Exploring Edition Specifications, (Copyrights) 2006; 3 pages.
International Search Report and Written Opinion issued by the European Patent Office, dated Feb. 18, 2014, for International Application No. PCT/US2013/068937; 11 pages.
International Search Report and Written Opinion issued by the European Patent Office, dated Jan. 14, 2014, for International Patent Application No. PCT/US2013/064516; 24 pages.
International Search Report and Written Opinion issued by the European Patent Office, dated Jul. 25, 2014, for related International Application No. PCT/US2014/028152; 21 pages.
International Search Report and Written Opinion issued by the European Patent Office, dated Jul. 23, 2013, for International PCT Application No. PCT/US2013/039304; 11 pages.
International Search Report and Written Opinion issued by the European Patent Office, dated Jun. 28, 2012, for International PCT Application No. PCT/US2012/024664; 19 pages.
International Search Report and Written Opinion issued by the European Patent Office, dated Mar. 17, 2014, for related International Application No. PCT/US2013/057819; 16 pages.
International Search Report and Written Opinion issued by the European Patent Office, dated Oct. 2, 2008, in related International Patent Application No. PCT/US2008/003483; 18 pages.
International Search Report and Written Opinion issued by the European Patent Office, dated Sep. 9, 2014, for related International Application No. PCT/US2014/039824; 10 pages.
International Search Report and Written Opinion issued by the European Patent Office, dated Sep. 21, 2016, for related International Patent Application No. PCT/US2016/014062; 17 pages.
International Search Report and Written Opinion issued by the European Patent Office, mailed Dec. 18, 2009, for International Patent Application No. PCT/US2009/042986; 15 pages.
International Search Report and Written Opinion issued by the European Patent Office, mailed Sep. 4, 2009, for International Patent Application No. PCT/US2009/042985; 18 pages.
International Search Report and Written Opinion issued by the International Searching Authority, dated Oct. 21, 2020, for International Patent Application No. PCT/US2020/42787; 18 pages.
International Search Report and Written Opinion of the International Searching Authority, dated Sep. 27, 2017, for related International patent application No. PCT/US2017/038985; 15 pages.
International Search Report and Written Opinion received for PCT Patent Application No. PCT/US13/57818, mailed on May 2, 2016, 18 pages.
International Search Report and Written Opinion received for PCT Patent Application No. PCT/US14/39824, mailed on Sep. 19, 2014, 9 pages.
International Search Report and Written Opinion received for PCT Patent Application No. PCT/US2016/031992, mailed on Sep. 19, 2016, 20 pages.
International Search Report and Written Opinion received for PCT Patent Application No. PCT/US2019/012958, mailed on Jul. 3, 2019, 27 pages.
International Search Report and Written Opinion received for PCT Patent Application No. PCT/US21/31782, mailed on Aug. 5, 2021, 11 pages.
International Search Report and Written Opinion received for PCT Patent Application No. PCT/US21/31804, mailed on Aug. 9, 2021, 6 pages.
International Search Report issued by the European Patent Office, dated Jun. 3, 2008, in related International Patent Application No. PCT/US2008/003480; 5 pages.
International Search Report issued by the European Patent Office, dated May 14, 2018, for International Patent Application No. PCT/US2017/054006; 6 pages.
International Search Report issued by the European Patent Office, dated May 16, 2014, for corresponding International patent application No. PCT/2014/019952; 3 pages.
International Search Report issued by the European Patent Office, dated Sep. 14, 2010, for related International Application No. PCT/2010/038709, 5 pages.

(56) References Cited

OTHER PUBLICATIONS

International Search Report of the International Searching Authority, dated Sep. 4, 2012, for related International Patent Application No. PCT/US2011/046395; 6 pages.
Kawasaki Mule The Off-Road Capable 610 4x4 Brochure 2011, (Copyrights) 2010; 6 pages.
Kawasaki Mule Utility Vehicle Brochure 2009, (Copyrights) 2008; 10 pages.
Kawasaki Teryx 750 FL 4x4 Sport Brochure 2011, (Copyrights) 2010; 6 pages.
Kawasaki Teryx Recreation Utility Vehicle Brochure 2009, (Copyrights) 2008; 8 pages.
Mtx (Imtx Audio Thunder Sports RZRPod65-owners-manual, 2016); 8 pages.
Office Action issued by the Canadian Intellectual Property Office, dated Apr. 1, 2021, for Canadian Patent Application to. 2,985,632; 4 pages.
Office Action issued by the Canadian Intellectual Property Office, dated Jan. 8, 2021, for Canadian Patent Application No. 3,038,943; 6 pages.
Office Action issued by the Canadian Intellectual Property Office, dated Jun. 15, 2020, for Canadian Patent Application No. 2,901,541; 6 pages.
Office Action issued by the Canadian Intellectual Property Office, dated Jun. 4, 2020, for Canadian Patent Application No. 3,038,943; 6 pages.
Office Action issued by the Canadian Intellectual Property Office, dated May 1, 2023, for Canadian Patent Application No. 3095808; 7 pages.
Office Action issued by the Canadian Intellectual Property Office, dated Oct. 16, 2019, for Canadian Patent Application No. 2,901,541; 7 pages.
Office Action issued by the Canadian Intellectual Property Office, dated Oct. 27, 2020, for Canadian Patent Application No. 3,044,002; 4 pages.
Office Action issued by the Canadian Intellectual Property Office, dated Oct. 5, 2023, for Canadian Patent Application No. 3, 167,426; 6 pages.
Office Action issued by the Canadian Patent Office, dated Mar. 22, 2018, for related Canadian Patent Application No. 2,870,867, 6 pages.
Office Action issued on Sep. 18, 2020, for Mexican Patent Application No. MX/a/2016/000762; 5 pages.
Office Action received for Chinese Patent Application No. 17150711. 4, mailed on Jun. 15, 2018, 4 pages.
Office Action received for European Application No. 13722652.8, mailed on May 11, 2016, 4 pages.
Office Action received for European Application No. 14726795.9, mailed on Mar. 9, 2018, 6 pages.
Outlander X mr 850, available at https://can-am.brp.com/off-road/atv/outlander/outlander-x-mr-850.html; . COPYRGT. 2003-2017; 3 pages.
Patent Examination Report issued by the Australian Government IP Australia, dated Apr. 7, 2016, for Australian Patent Application No. 2013329090; 3 pages.
Pictures of Vehicle publicly disclosed in Jul. 2008, 3 pages.
Polaris Industries, Ranger Catalog, 2007, 28 pages.
Polaris Industries, Ranger RZR Catalog, 2008, 12 pages.
Polaris Off Road Facebook Live video from Jul. 29, 2021, available at https://www.facebook.com/PolarisORV/videos/889983808560488/; 1 page.
Polaris Ranger Brochure 2009, (Copyrights) 2008; 32 pages.
Polaris Ranger Brochure 2011, (Copyright) 2010, 22 pages.
"FIAT 500 Owner Handbook", Jul. 2001 (2001-07), Fiat Group Automobiles S.p.A, Turin (IT).
1st Office Action issued by the China National Intellectual Property Administration (CNIPA) dated Oct. 25, 2018, for Chinese Patent Application No. 201680006568.1; 10 pages.
2008 Dealer Expo Top UTV Products-Rhino, Ranger and RZRs were everything at the . . . , dated Feb. 18, 2008, 6 pages.
2009 Honda Big Red, ATV Illustrated at http://www.atvillustrated.com/?q=node/6615/20/2008, 6 pgs.
2016 MUDPRO 700 Limited, Artic Cat, http://www.articcat.com/dirt/atvs/model/2016-en-mudpro-700-limited/, copyright 2015, 23 pages.
2nd Written Opinion of the International Searching Authority in PCT/US2011/046395, Mar. 1, 2013, 9 pages.
Artic Cat, Company Website, Prowler XT650 H1, undated; 9 pages.
Article 34 Amendment filed with the European Patent Office, dated Dec. 12, 2016, for related International Patent Application No. PCT/US2016/014062; 6 pages.
Boss Plow System for RANGER, at http:www.purepolaris.com/Detail.aspx?ItemID=2876870(PolarisPGACatalog), May 14, 2008, 2 pgs.
Boss Smarthitch 2 at http:www.bossplow.com/smarthitch.html, May 14, 2008, 13 pgs.
BRP Can-Am Commander photo, undated; 1 page.
Buyer's Guide Supplement, 2006 Kart Guide, Powersports Business Magazine; 6 pages.
Club Car, Company Website, product pages for XRT 1500 SE, undated; 2 pages.
CN103256153A Machine English translation (Year: 2013).
Communication Pursuant to Article 34(3) EPC issued by the European Patent Office, dated Oct. 30, 2018, for European Patent Application 14726795.9; 8 pages.
Communication Pursuant to Rules 161 ( 1) and 162 EPC dated Sep. 7, 2017, for European Patent Application No. 167072552; 2 pages.
Diver Down Snorkel for Polaris Scrambler 850/1000, High Lifter, last accessed Nov. 4, 2015, http://www.highlifter.com/p-4687-diver-down-snorkel-for-polaris-scrambler- - 8501000-see-apps.aspx; 1 page.
Duneguide.com, "Product Review 2009 Honda Big Red MUV," retrieved from http:www.duneguide.com/ProductReview.sub.--Honda.sub.--BigRed.htm, May 20, 2008, 3 pgs.
English translation of Office Action issued on Sep. 18, 2020, for Mexican Patent Application No. MX/a/2016/000762; 4 pages.
Eulenbach, Dr.Ing. Dieter, NIVOMAT: The Automatic Level Control System with Spring Function and Damping Function, Lecture given as part of the course "Springing and damping systems for road and rail vehicles" at the Technical Academy of Esslingen, Oct. 11, 2000, 18 pgs.
European Search Report and Search Opinion Received for EP Application No. 17150711.4, mailed on Jun. 7, 2017, 7 pages.
European Search Report issued by the European Patent Office, dated Jun. 4, 2019, for European Patent Application No. 19155252.0; 8 pages.
Examination Report issued by Intellectual Property India, dated Mar. 12, 2019, for Indian Patent Application No. 7003/DELNP/2013; 7 pages.
Examination Report No. 1 issued by the Australian Government IP Australia, dated Aug. 20, 2018 for Australian Patent Application 2016209449; 4 pages.
Examination Report No. 1 issued by the Australian Government IP Australia, dated Jul. 11, 2017, for corresponding Australian patent application No. 2016238831; 3 pages.
Examination Report No. 1 issued by the Australian Government IP Australia, dated Nov. 29, 2018, for Australian Patent Application No. 2018204263; 4 pages.
High-Performance "Truck Steering" Automotive Engineering, Society of Automotive Engineers. Warrendale, US, vol. 98. No. 4, Apr. 1, 1990, pp. 56-60.
Honda Hippo 1800 New Competition for Yamaha's Rhino, Dirt Wheels Magazine, Apr. 2006; pp. 91-92.
Improved Fox Shox, Motocross Action, Mar. 1977 issue, 1 pg.
International Preliminary Report on Patentability issued by the European Patent Office, dated Aug. 31, 2010, for International Patent Application No. PCT/US2009/042986; 14 pages.
International Preliminary Report on Patentability issued by the European Patent Office, dated Jul. 6, 2015, for International Patent Application No. PCT/US2014/039824; 12 pages.
International Preliminary Report on Patentability issued by the European Patent Office, dated Jun. 9, 2015, for corresponding International patent application No. PCT/US2014/019952; 20 pages.

(56) References Cited

OTHER PUBLICATIONS

International Preliminary Report on Patentability issued by the European Patent Office, dated Jun. 6, 2017, for related International Patent Application No. PCT/US2016/014062; 18 pages.
International Preliminary Report on Patentability issued by the European Patent Office, dated Mar. 8, 2013, for International PCT Application No. PCT/US2012/024664; 24 pages.
International Preliminary Report on Patentability issued by the European Patent Office, dated May 11, 2009, in related International Patent Application No. PCT/US2008/003483; 21 pages.
International Preliminary Report on Patentability issued by the European Patent Office, dated Sep. 2, 2009, for related International Patent Application No. PCT/US2010/038709, 45 pages.
International Preliminary Report on Patentability issued by the European Patent Office, mailed on Jun. 11, 2015, for International Patent Application No. PCT/US2014/028152; 35 pages.
International Preliminary Report on Patentability issued by The International Bureau of WIPO, dated Apr. 14, 2015, for International Patent Application No. PCT/US2013/064516; 18 pages.
International Preliminary Report on Patentability issued by The International Bureau of WIPO, dated Jul. 14, 2020, for International Patent Application No. PCT/US2019/012958; 19 pages.
International Preliminary Report on Patentability issued by the International Bureau of WIPO, dated May 12, 2015, for International Application No. PCT/US2013/068937; 7 pages.
International Preliminary Report on Patentability issued by The International Bureau of WIPO, dated Nov. 9, 2010, for International Patent Application No. PCT/US2009/042985; 13 pages.
International Preliminary Report on Patentability issued by the International Searching Authority, dated May 10, 2016, for related International Patent Application No. PCT/US2013/057818, 12 pages.
International Preliminary Report on Patentability issued by the International Searching Authority, dated Nov. 15, 2022, for International Patent Application No. PCT/US2021/031782; 9 pages.
International Preliminary Report on Patentability received for PCT Patent Application No. PCT/US13/57819, mailed on Mar. 19, 2015, 10 pages.
International Preliminary Report on Patentability received for PCT Patent Application No. PCT/US2016/031992, mailed on Nov. 30, 2017, 15 pages.
International Preliminary Report on Patentability received for PCT Patent Application No. PCT/US2017/054006, mailed on Jul. 4, 2019, 11 pages.
International Preliminary Report on Patentability, dated Jan. 3, 2019, for related International patent application No. PCT/US2017/038985; 9 pages.
International Preliminary Report on Patentability, dated May 28, 2013, for related International Patent Application No. PCT/US2011/046395, 31 pages.
International Preliminary Report on Patentablility issued by the European Patent Office, dated Nov. 4, 2014, for International PCT Application No. PCT/US2013/039304; 7 pages.
International Search Report and Written Opinion issued by the European Patent Office, dated Aug. 27, 2008, in related International Patent Application No. PCT/US2008/003485; 15 pages.

* cited by examiner 2
4
6
8
10
12
14
16
18
20
22
24
26
28
29
30
32
34
36
38
40
42
44
46
48
50
52
54
56
58
60
62
64
128
134
140
146
152
158

FRAME FOR A UTILITY VEHICLE

CROSS-REFERENCE TO RELATED APPLICATIONS

The present disclosure claims priority to U.S. Provisional Patent Application No. 63/446,817, filed Feb. 18, 2023, titled FRAME FOR A UTILITY VEHICLE, the entire disclosure of which is expressly incorporated by reference herein.

BACKGROUND

Utility vehicles, or UTVs, are used for on- or off-road applications. A UTV includes a frame assembly configured to support a powertrain, which is operably coupled to the front and/or rear wheels to provide motive power to drive the vehicle.

The frame assembly of the vehicle is generally designed to absorb the shocks of off-road use, protect the occupants, and be efficiently manufactured. Frame assemblies may be designed and manufactured using various methods that often must balance between factors such as strength, rigidity, component size, repairability, and manufacturability.

SUMMARY

The present disclosure relates to powersports vehicles (e.g., off-road vehicles (ORVs), utility vehicles (UTVs) or recreational vehicles) and, more particularly, to a frame system for a powersports vehicle.

In embodiments of the present disclosure, an upper frame assembly for a utility vehicle is provided. The utility vehicle comprising a first generally upstanding frame member comprising a first stamped frame piece coupled to a second stamped frame piece and a first longitudinally extending frame member at least partially longitudinally aligned from a top view with the first generally upstanding frame member. The first longitudinally extending frame member comprising a third stamped frame piece coupled to a fourth stamped frame piece. Further, the upper frame assembly comprises a first joint member defining a first coupling location and a second coupling location, and the first joint member comprising a first joint stamped piece and a second joint stamped piece. The first longitudinally extending frame member is coupled to the first joint member at the first coupling location, and the first generally upstanding frame member is coupled to the first joint member at the second coupling location.

In another embodiment of the present disclosure, a frame assembly for a utility vehicle is provided. The frame assembly comprises an upper frame assembly comprising a first generally upstanding member positioned at a front portion of the upper frame assembly. The first generally upstanding member comprising a first stamped frame piece and a second stamped frame piece. The upper frame assembly further comprises a second generally upstanding member positioned at the front portion of the upper frame assembly, and the second generally upstanding member is laterally spaced from the first generally upstanding member. Further, the second generally upstanding member comprises a third stamped frame piece and a fourth stamped frame piece. An upper cross-member is extending between the first generally upstanding member and the second generally upstanding member, and the upper cross-member comprises a fifth stamped frame piece and a sixth stamped frame piece. The frame assembly further includes a lower frame assembly comprising a third generally upstanding member at least partially longitudinally aligned with the first generally upstanding member and a fourth generally upstanding member at least partially longitudinally aligned with the second generally upstanding member. The lower frame assembly further comprising a lower cross-member extending between the third generally upstanding member and the fourth generally upstanding member, the lower cross-member comprising a seventh stamped frame piece. The first generally upstanding member, the second generally upstanding member, the upper cross-member, and the lower cross-member cooperate to define a front opening, and the seventh stamped frame piece is coupled to, and at least partially overlaps the first stamped frame piece.

In yet another embodiment of the present disclosure, an upper frame assembly configured to surround an operator area is provided. The upper frame assembly comprising a first generally upstanding frame piece coupled to a second generally upstanding frame piece. The first generally upstanding frame piece is facing generally outwardly from the operator area having a first portion and the second generally upstanding frame piece is facing generally inwardly toward the operator area and having a second portion. A first generally horizontal frame piece is coupled to a second generally horizontal frame piece, and the first generally horizontal frame piece is facing generally outwardly from the operator area and having a third portion and the second generally horizontal frame piece is facing generally inwardly toward the operator area and having a fourth portion. Further, a first joint frame piece is coupled to a second joint frame piece, and the first joint frame piece is facing generally outwardly from the operator area and has a fifth portion and a sixth portion and the second joint frame piece is facing generally inwardly toward the operator area and having a seventh portion and an eighth portion. The first generally horizontal frame piece is coupled to the first joint frame piece and the third portion overlaps the fifth portion such that the third portion is positioned outwardly from the fifth portion relative to the operator area, and the first generally upstanding frame piece is coupled to the first joint frame piece and the sixth portion overlaps the first portion such that the sixth portion is positioned outwardly from the first portion relative to the operator area.

In yet another embodiment of the present disclosure, an upper frame assembly configured to surround an operator area is provided. The upper frame assembly comprising a first generally upstanding frame member comprising a first edge and a first generally horizontal frame member comprising a second edge, the first generally horizontal frame member longitudinally aligned with the first generally upstanding frame member from a top view. Further, a first joint frame member is coupled between each of the first generally upstanding frame member and the first generally horizontal frame member, the first joint frame member having a third edge and a fourth edge. A first cross-member is coupled to the first joint frame member and the first cross-member has a fifth edge and a sixth edge. A first generally continuous edge extends along the fifth edge, the third edge, and the first edge, and a second generally continuous edge extends along the sixth edge, the fourth edge, and the second edge.

In yet another embodiment of the present disclosure, a frame for a utility vehicle is configured to surround an operator area. The frame comprises a lower frame assembly, an upper frame assembly, and a frame subassembly. The lower frame assembly comprises a lower forward pillar, a lower rearward pillar longitudinally spaced from the lower forward pillar, and the lower rearward pillar having an upper extent comprising a first opening. Further, the lower frame assembly comprises a first generally horizontal frame member coupled between the lower forward pillar and the lower rearward pillar. The upper frame assembly comprises an upper forward pillar configured to couple with the lower forward pillar and an upper rearward pillar longitudinally spaced from the upper forward pillar. The upper rearward pillar is configured to couple with the lower rearward pillar and the upper rearward pillar comprises a first frame piece and a second frame piece coupled to the first frame piece. The frame subassembly comprises a first frame subassembly piece and a second frame subassembly piece coupled to the first frame subassembly piece. The first frame subassembly piece is coupled to the first frame piece and the second frame subassembly piece is coupled to the second frame piece, and the frame subassembly is configured to fit within the first opening.

In yet another embodiment of the present disclosure, a method of joining an upper frame assembly to a lower frame assembly is provided. The upper frame assembly includes a first generally upstanding frame member comprising a first frame piece and a second frame piece. The lower frame assembly includes a first lower generally upstanding frame member comprising a third frame piece and a fourth frame piece coupled to the third frame piece, and the first lower generally upstanding frame member comprising an opening between the third frame piece and the fourth frame piece. A first frame subassembly comprises a first subassembly piece and a second subassembly piece coupled to the first subassembly piece, the first frame subassembly having an upper portion and a lower portion. The method comprising coupling the first subassembly piece to the first frame piece, coupling the second frame piece to each of the first subassembly piece and the first frame piece, inserting the lower portion of the first frame subassembly into the opening, and coupling the first lower generally upstanding frame member to the lower portion of the frame subassembly.

In yet another embodiment of the present disclosure, a frame assembly configured to surround an operator area is provided. The frame assembly comprising an upper frame assembly, a lower frame assembly, and a frame subassembly. The upper frame assembly comprising a first generally upstanding member, and the first generally upstanding member comprising an upper outer frame piece facing an exterior of the operator area and an upper inner frame piece facing an interior of the operator area. The lower frame assembly comprising a second generally upstanding member positioned vertically below the first generally upstanding member. The second generally upstanding member comprising a lower outer frame piece facing an exterior of the operator area and a lower inner frame piece facing an interior of the operator area. Further, the frame subassembly is configured to couple between the upper outer frame piece and the upper inner frame piece and configured to couple between the lower outer frame piece and the lower inner frame piece. The upper outer frame piece is configured to extend below, and cover from an outside perspective, a top portion of the lower outer frame piece.

In yet another embodiment of the present disclosure, a method of assembling an upper frame assembly with a coupling member is provided. The upper frame assembly includes a first upper frame portion, a second upper frame portion, a first cross-member, and a second cross-member. The first upper frame portion comprises a first generally upstanding member and a second generally upstanding member longitudinally spaced from the first generally upstanding member. A first generally longitudinally extending member is coupled to each of the first generally upstanding member and the second generally upstanding member. The second upper frame portion comprises a third generally upstanding member, a fourth generally upstanding member longitudinally spaced from the third generally upstanding member, and a second generally longitudinally extending member coupled to each of the third generally upstanding member and the fourth generally upstanding ember. Further, the first cross-member is coupled to the first upper frame portion and the second cross-member is coupled to the second upper frame portion. The method comprising coupling a coupling member between each of the first cross-member and the second cross-member such that the first upper frame portion is coupled to the second upper frame portion.

In yet another embodiment of the present disclosure, a utility vehicle is provided. The utility vehicle comprising a frame assembly comprising an upper frame assembly surrounding an operator area and a lower frame assembly coupled to the upper frame assembly. The upper frame assembly extends along a vehicle centerline, and the upper frame assembly comprises a first generally upstanding frame member and a second generally upstanding frame member. The first generally upstanding frame member comprises a first frame piece coupled to a second frame piece, and the first frame piece is facing generally outwardly from the operator area. The first frame piece comprises a first portion and a second portion, and the first portion is positioned further from the vehicle centerline than the second portion. A first seal is positioned on the second portion of the first frame piece. A door is supported by the second generally upstanding frame member, and the door comprises an edge portion configured to receive a second seal, and the second seal is configured to engage the first portion of the first frame piece when the door is in a closed position.

BRIEF DESCRIPTION OF THE DRAWINGS

FIG. 34A is an embodiment of a door ring comprised of a plurality of frame members of the present disclosure.

FIG. 34B is an alternative embodiment of a door ring comprised of a single frame member of the present disclosure.

DETAILED DESCRIPTION OF THE DRAWINGS

Figure 1:
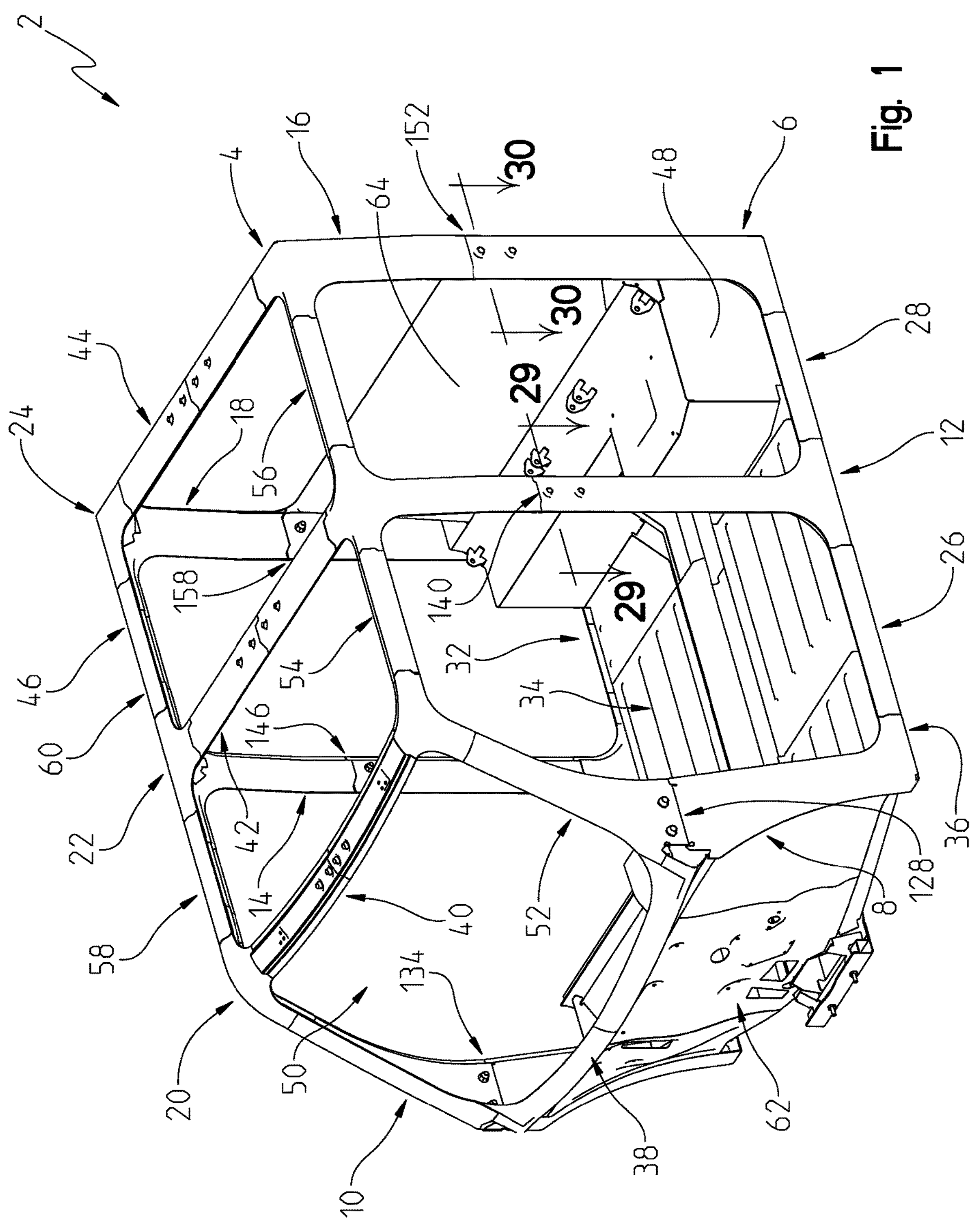
FIG. 1 is a front left perspective view of a frame assembly of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but still cooperate or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

In some instances throughout this disclosure, positional relationships (e.g., top, bottom, right, left, front, back) may be used in reference to the described vehicle frame. Such use is intended to refer to typical use of the positional relationships. That is, a left view coincides with a perspective viewing the driver's side of the vehicle frame, i.e., the left side of the vehicle frame from the perspective of a driver (or passenger) seated within an operator area thereof. A right view is opposite of the left view. A front view coincides with a perspective viewing the vehicle frame head on from a position directly forward of the vehicle frame and a back, and a rear view is opposite of the front view. A top view coincides with a perspective viewing the vehicle frame from a top-down perspective from a position vertically above the vehicle frame and a bottom view is opposite of the top view.

Throughout this disclosure, fasteners used may be bolts, rivets, screws, hook and latch mechanisms, latches, pins, or other coupling methods as required or desired for a particular fastening application. Fasteners may be permanent, semi-permanent, or removable and reusable. Fasteners may also include joining methods such as welding (e.g., gas metal arc welding (GMAW), mig welding, tig welding, stick welding, sonic welding, plastic welding, laser welding, or another type of welding).

Referring to FIGS. 1-7, a vehicle frame 2 includes an upper frame assembly 4 and a lower frame assembly 6. In various embodiments, upper frame assembly 4 and lower frame assembly 6 cooperate to surround an operator area 50. Operator area 50 may be configured to support a plurality of passengers, cargo, or other items. In various embodiments, vehicle frame 2 may include a plurality of seats (not shown) configured to support one passenger, two passengers, three passengers, four passengers, five passengers, or six passengers. In embodiments, vehicle frame 2 is split into upper frame assembly 4 and lower frame assembly 6 to improve the manufacturability of either of, or both of, upper frame assembly 4 and lower frame assembly 6. In embodiments, upper frame assembly 4 is able to be replaced with an aftermarket frame assembly, or a customizable frame assembly from the Original Equipment Manufacturer (OEM).

Vehicle frame 2 is configured to be supported by a plurality of ground engaging members (not shown) which may be wheels, skis, tracks, or other suitable members for engaging a ground surface (not shown). A suspension (not shown) or a plurality of suspensions may be coupled between vehicle frame 2 and the plurality of ground engaging members. Vehicle frame 2 may also be configured to support a powertrain (not shown). Example powertrains include an internal combustion engine, an electric motor, a hybrid engine, or other suitable power sources. Vehicle frame 2 may also be configured to support a plurality of driveline components such as one or more transmissions, one or more differentials, one or more drive shafts, and one or more power supplies (e.g., batteries, fuel tank, capacitors, etc.).

Vehicle frame 2 includes a first (e.g., left-side) A-pillar 8, a second (e.g., right-side) A-pillar 10 laterally spaced from first A-pillar 8, a first (e.g., left-side) B-pillar 12 positioned longitudinally rearward of first A-pillar 8, a second (e.g., right-side) B-pillar 14 laterally spaced from first B-pillar 12, a first (e.g., left-side) C-pillar 16 positioned longitudinally rearward of first B-pillar 12 and a second (e.g., right-side) C-pillar 18 laterally spaced from first C-pillar 16. In various embodiments, each A-pillar 8, 10 is a generally upstanding member extending upwardly at a front portion 20 of vehicle frame 2. Each B-pillar 12, 14 is a generally upstanding member extending upwardly at a generally middle portion 22 of vehicle frame 2 (i.e., spaced longitudinally from the front and from the rear). Each C-pillar 16, 18 is a generally upstanding member extending upwardly at a rear portion 24 of vehicle frame 2. As used within this disclosure, the term 'generally upstanding member' means a member that is more vertical than horizontal. In various embodiments, vehicle frame 2 may only include first A-pillar 8, second A-pillar 10, first C-pillar 16, and second C-pillar 18. In various embodiments, vehicle frame 2 may only include first A-pillar 8, second A-pillar 10, first B-pillar 12, and second B-pillar 14, such as embodiments where only a single row of seating is accommodated by the vehicle frame.

Still referring to FIGS. 1-7, a first longitudinally extending frame member 26 (FIGS. 1 and 3) extends between first A-pillar 8 and first B-pillar 12 at a lower extent 36 of vehicle frame 2 and a second longitudinally extending frame member 28 extends between first B-pillar 12 and first C-pillar 16 at lower extent 36 of vehicle frame 2. Further, a third longitudinally extending frame member 30 (FIGS. 2 and 4) extends between second A-pillar 10 and second B-pillar 14 at lower extent 36 of vehicle frame 2 and a fourth longitudinally extending frame member 32 extends between second B-pillar 14 and second C-pillar 18 at lower extent 36 of vehicle frame 2. Illustratively, each of longitudinally extending frame members 26, 28, 30, 32 are generally horizontally extending frame members. Further, longitudinally extending frame members 26, 28 are generally (e.g., at least partially) longitudinally aligned (e.g., coaxial) when viewed from a top perspective and longitudinally extending frame members 30, 32 are generally (e.g., at least partially) longitudinally aligned (e.g., coaxial) when viewed from a top perspective. As used within this disclosure, the term 'generally horizontally extending frame member' means a member that is more horizontal than vertical. In various embodiments, 'generally horizontally extending frame member' may indicate that the member is within +/−15 degrees from horizontal, or in some instances, within +/−5 degrees from horizontal.

A floor assembly 34 extends generally along lower extent 36 of vehicle frame 2 between each of A-pillars 8, 10, B-pillars 12, 14, C-pillars 16, 18, and longitudinally extending frame members 26, 28, 30, 32. Floor assembly 34 may be a single piece or may be multiple pieces. Floor assembly 34 is configured to support seats and/or seat frames (not shown), passengers (not shown), storage (not shown), and other components and items within operator area 50. A bench 48 may be supported by floor assembly 34 generally within rear portion 24. Bench 48 may be configured to support a seat, storage, accessories, batteries, fuel tanks, or other components.

Vehicle frame 2 also includes a first cross member 38 (FIG. 1) extending between first A-pillar 8 and second A-pillar 10 at a vertical position between lower extent 36 and an upper extent 46 of vehicle frame 2. Additionally, a second cross member 40 extends between first A-pillar 8 and second A-pillar 10 generally at upper extent 46. Each of cross member 38 and cross member 40 are generally within front portion 20 of vehicle frame 2. In various embodiments, portions of each of cross member 38, cross member 40, first A-pillar 8, and second A-pillar 10 create a forward, or front opening 52 configured to receive a windshield (not shown). An operator (not shown) is able to look forwardly and outwardly through forward opening 52 when seated within the operator area 50. A third cross member 42 extends between first B-pillar 12 and second B-pillar 14 generally at upper extent 46, and generally within middle portion 22. A fourth cross member 44 extends between first C-pillar 16 and second C-pillar 18 generally at upper extent 46, and generally within rear portion 24. In various embodiments, each of cross member 38, cross member 40, cross member 42, cross member 44 are generally horizontally and laterally extending members.

Figure 2:
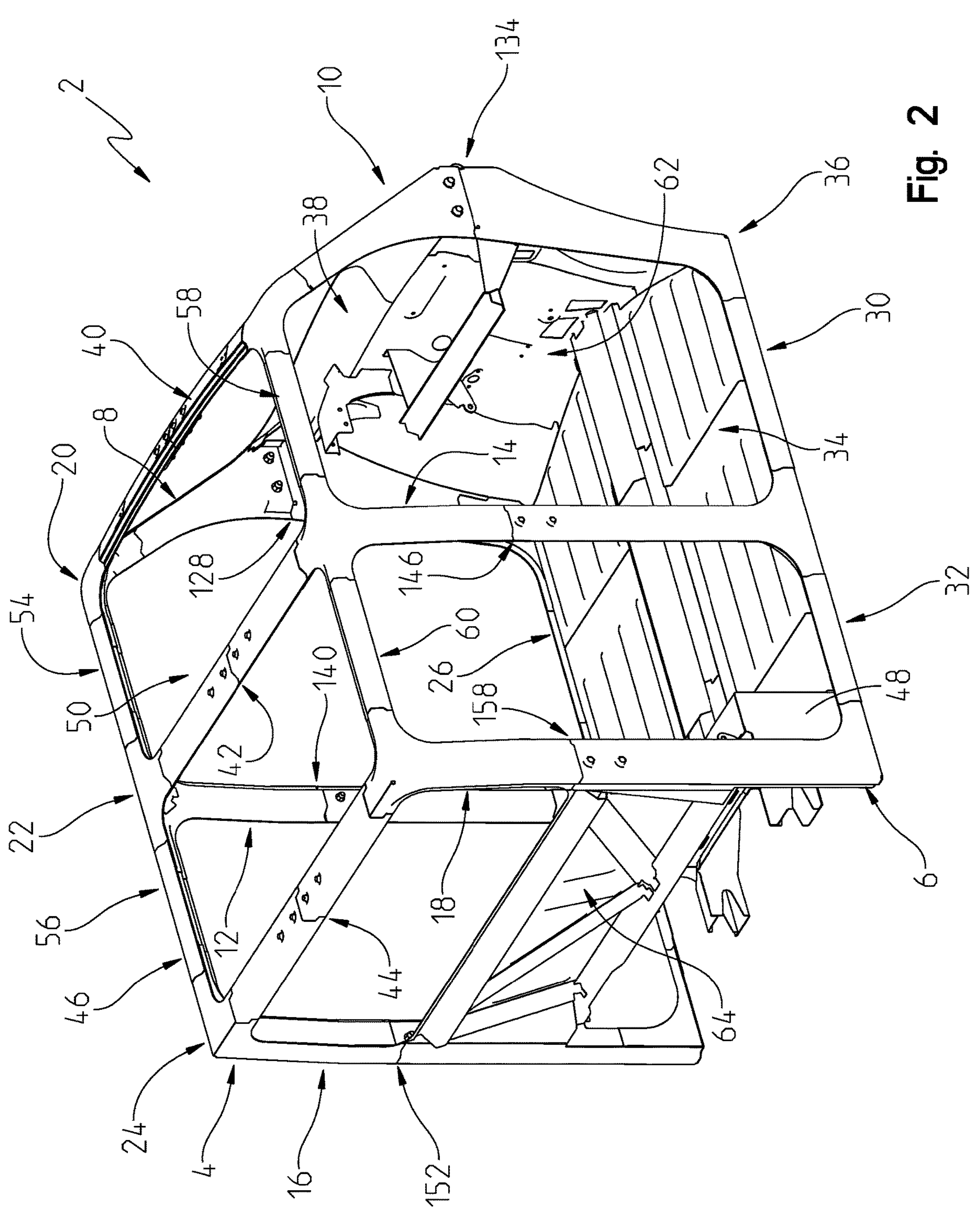
FIG. 2 is a rear right perspective view of the frame assembly of FIG. 1.
Figure 3:
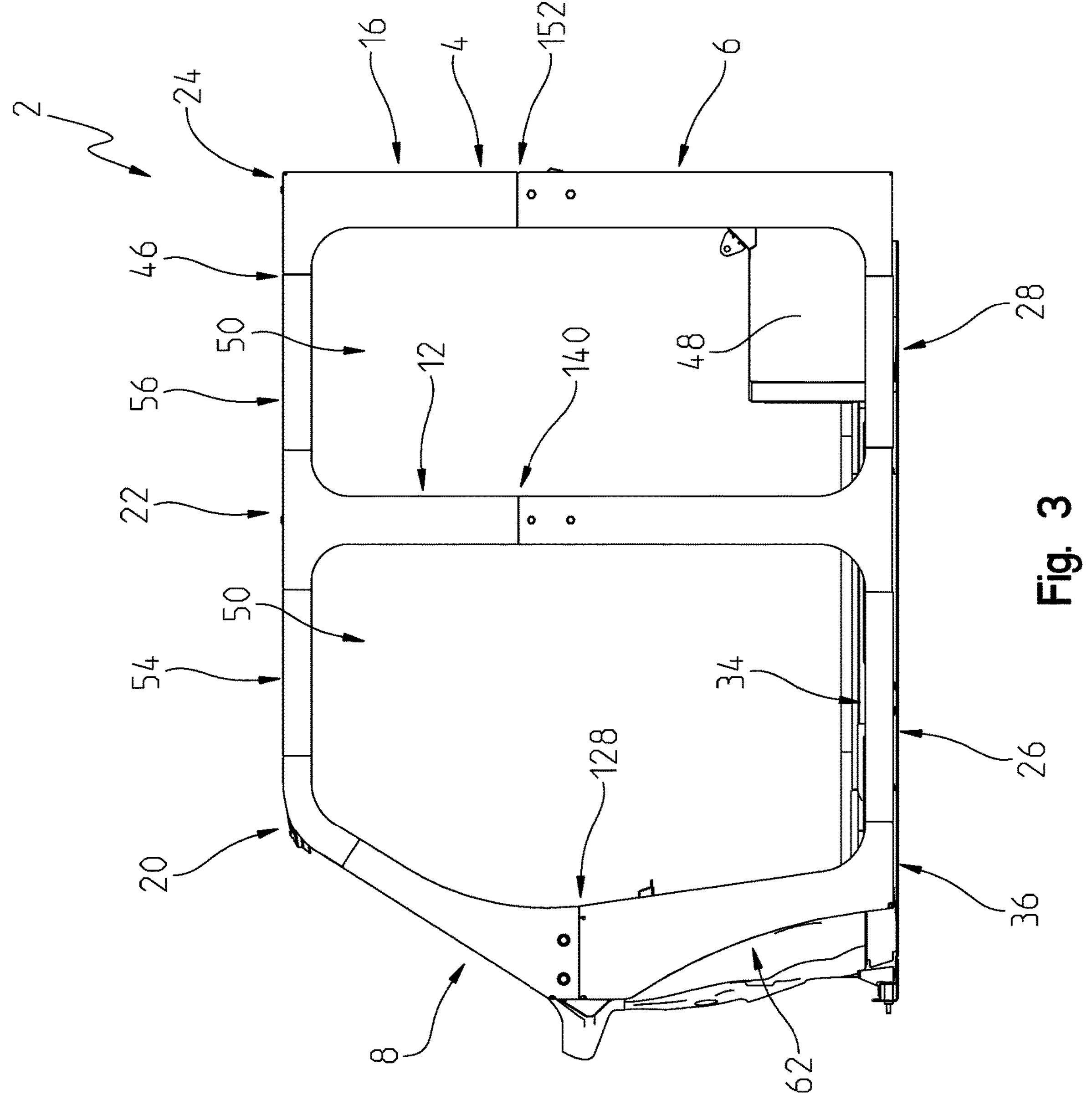
FIG. 3 is a left-side view of the frame assembly of FIG. 1.
Figure 4:
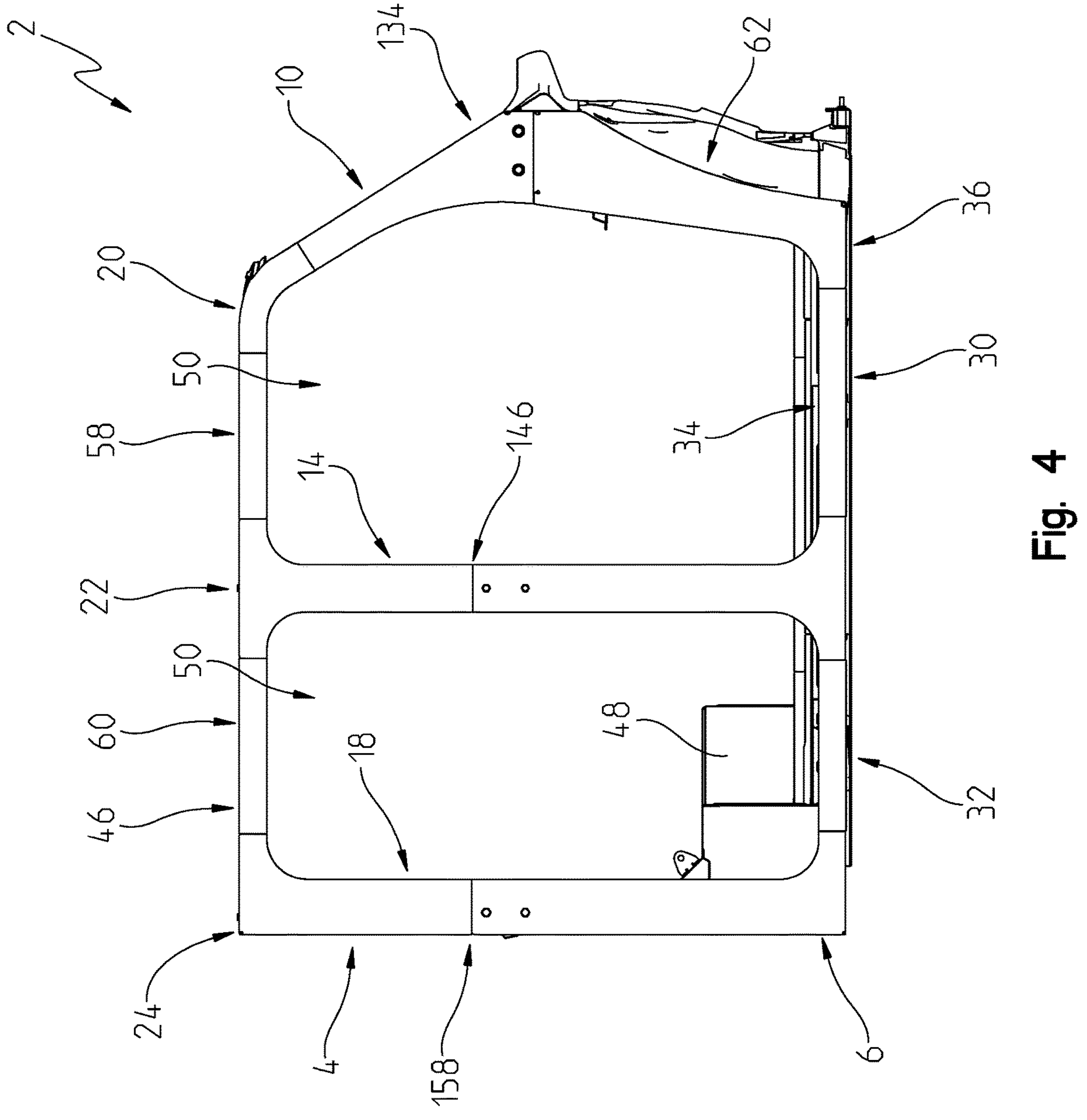
FIG. 4 is a right-side view of the frame assembly of FIG. 1.
Figure 5:
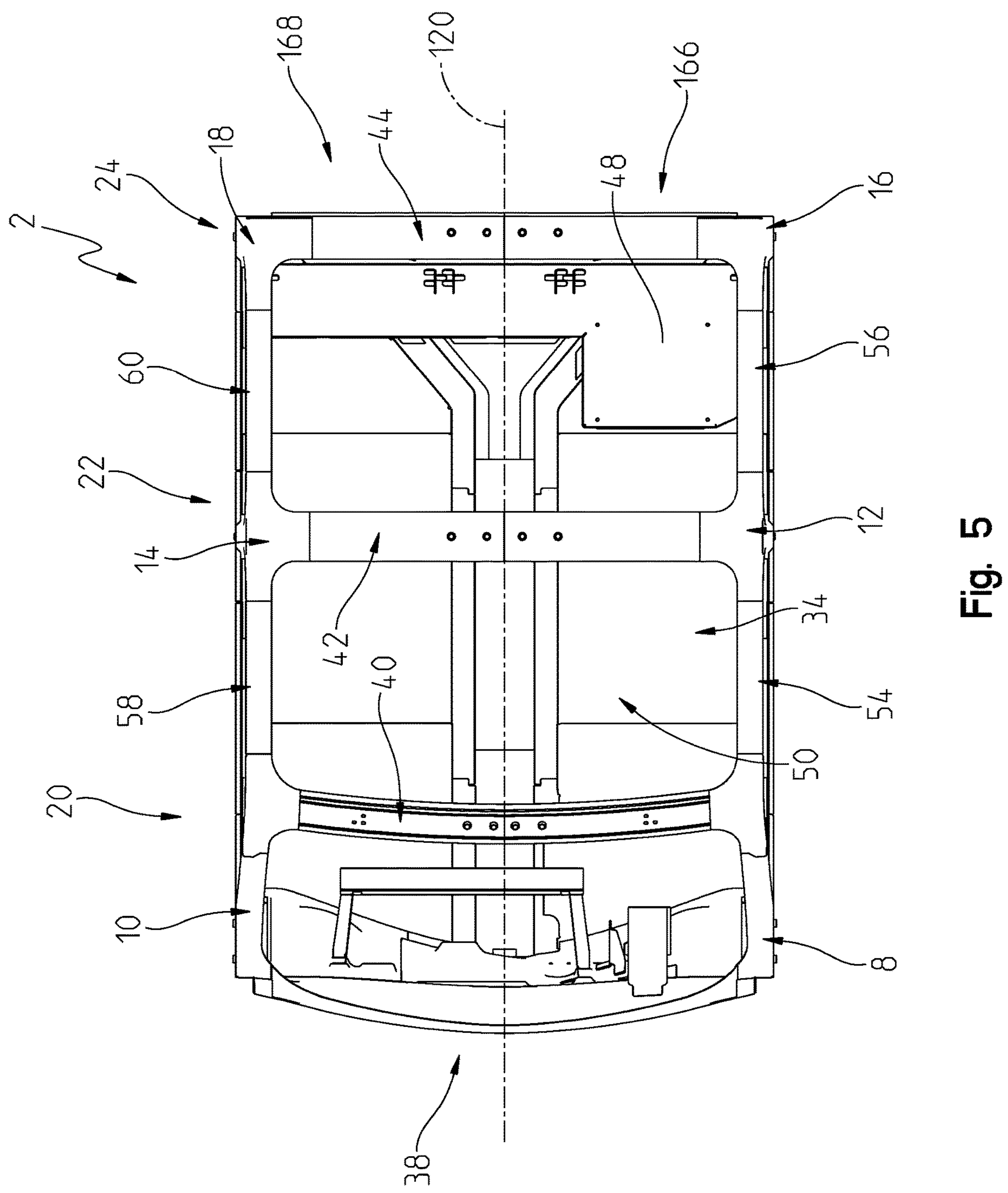
FIG. 5 is a top side view of the frame assembly of FIG. 1.
Figures 6, 7:
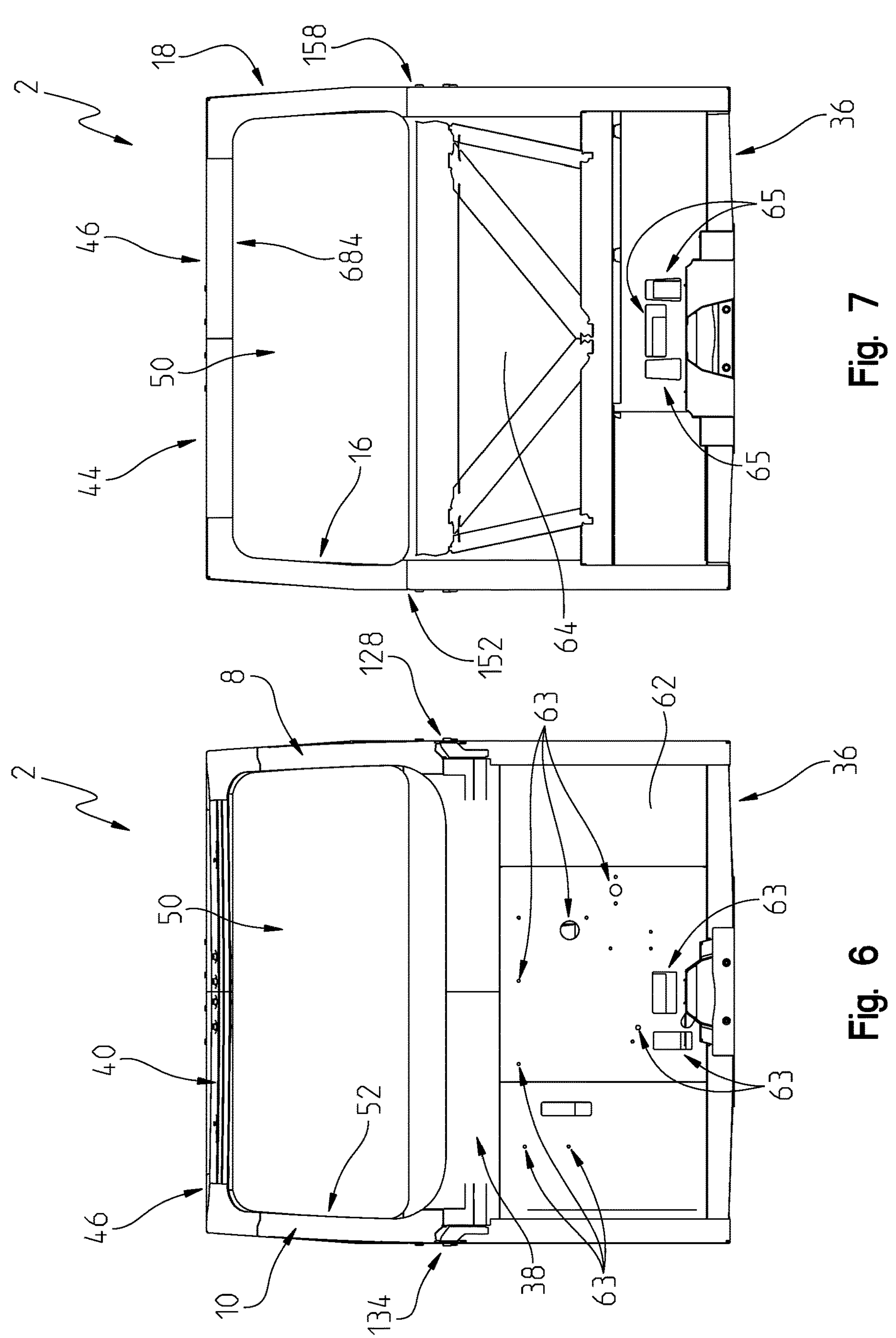
FIG. 6 is a front view of the frame assembly of FIG. 1.
FIG. 7 is a rear view of the frame assembly of FIG. 1.

As best seen in FIGS. 1, 2 and 5, a fifth longitudinally extending frame member 54 extends between first A-pillar 8 and first B-pillar 12 at upper extent 46 of vehicle frame 2 and a sixth longitudinally extending frame member 56 extends between first B-pillar 12 and first C-pillar 16 at upper extent 46 of vehicle frame 2. Further, a seventh longitudinally extending frame member 58 extends between second A-pillar 10 and second B-pillar 14 at upper extent 46 of vehicle frame 2, and an eighth longitudinally extending frame member 60 extends between second B-pillar 14 and second C-pillar 18 at upper extent 46 of vehicle frame 2. Illustratively, each of longitudinally extending frame members 54, 56, 58, 60 are generally horizontally extending frame members. Further, longitudinally extending frame member 54, 56 are generally (e.g., at least partially) longitudinally aligned (e.g., coaxial) as illustrated from the top perspective of FIG. 5, and longitudinally extending frame members 58, 60 are generally (e.g., at least partially) longitudinally aligned (e.g., coaxial) when as also illustrated from the top perspective.

Vehicle frame 2 also includes a front wall 62 (FIGS. 1-4 and 6) extending laterally and vertically between first A-pillar 8, second A-pillar 10, cross member 38, and floor assembly 34. Front wall 62 is configured to reduce or prevent intrusion of material (e.g., fluids, debris, or the like), heat, or sound into at least a portion of operator area 50. Front wall 62 also may be configured to support additional components (not shown) e.g., steering components, suspension components, powertrain components, driveline components, dash components, or the like. In embodiments, front wall 62 may define one or more apertures 63 configured to enable components such as cables, shafts, tubes, ducts, component attachment points, or the like, to traverse a plane defined by front wall 62. Vehicle frame 2 also includes a rear wall 64 (FIGS. 1, 2 and 7) extending laterally between first C-pillar 16 and second C-pillar 18 and having a vertical extent generally coextensive with the top of lower frame assembly 6. Rear wall 64 is configured to protect operator area 50 and may also be configured to support additional components (not shown) e.g., steering components, suspension components, powertrain components, driveline components, dash components, or the like and/or may also be configured as a back rest for passengers seated within operator area 50. In embodiments, rear wall 64 may be configured to reduce intrusion of material (e.g., fluids, debris, or the like), heat, or sound into at least a portion of operator area 50. In embodiments, rear wall 64 may define one or more apertures 65 configured to enable components such as cables, shafts, tubes, ducts, component attachment points, or the like, to traverse a plane defined by rear wall 64.

Figure 8:
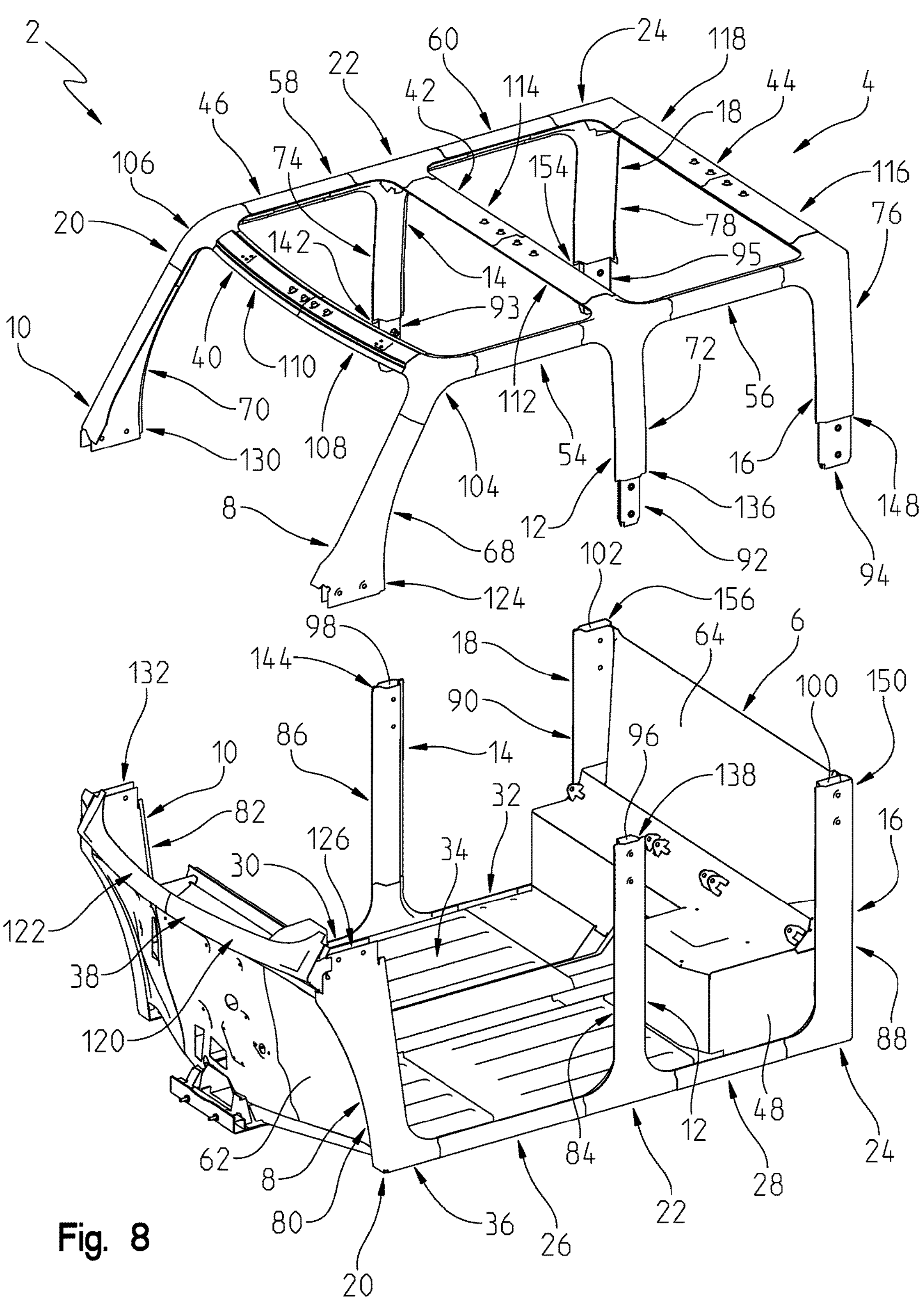
FIG. 8 is an exploded view of the frame assembly of FIG. 1, including an upper frame assembly spaced apart from a lower frame assembly.

Referring now to FIG. 8, A-pillar 8 includes an upper A-pillar member 68 and a lower A-pillar member 80. Upper A-pillar member 68 includes a first mounting portion 124 and lower A-pillar member 80 includes a second mounting portion 126 configured to couple to first mounting portion 124. Illustratively, upper A-pillar member 68 and lower A-pillar member 80 are configured to be coupled at a first mounting location 128 (FIG. 1) by first mounting portion 124 and second mounting portion 126. Further, A-pillar 10 includes an upper A-pillar member 70 and a lower A-pillar member 82. Upper A-pillar member 70 includes a first mounting portion 130 and lower A-pillar member 82 includes a second mounting portion 132 configured to couple to first mounting portion 130. Illustratively, upper A-pillar member 70 and lower A-pillar member 82 are configured to be coupled at a second mounting location 134 (FIG. 1) by first mounting portion 130 and second mounting portion 132.

Referring still to FIG. 8, the left-side B-pillar 12 includes an upper B-pillar member 72 and a lower B-pillar member 84. Upper B-pillar member 72 includes a first mounting portion 136 and lower B-pillar member 84 includes a second mounting portion 138. Illustratively, an aperture 96 extends downwardly into second mounting portion 138. A frame subassembly, or first joiner 92 is configured to be coupled to upper B-pillar member 72 and extend downwardly from first mounting portion 136. Illustratively, upper B-pillar member 72 and lower B-pillar member 84 are coupled, by joiner 92, at a third mounting location 140 (FIG. 1). Similarly, the right-side B-pillar 14 includes an upper B-pillar member 74 and a lower B-pillar member 86. Upper B-pillar member 74 includes a first mounting portion 142 and lower B-pillar member 86 includes a second mounting portion 144. Illustratively, an aperture 98 extends downwardly into second mounting portion 144. A frame subassembly, or second joiner 93 is configured to be coupled to upper B-pillar member 74 and extend downwardly from first mounting portion 142. Illustratively, upper B-pillar member 74 and lower B-pillar member 86 are coupled, by second joiner 93, at a fourth mounting location 146 (FIG. 1). In various embodiments, second joiner 93 is identical or substantially similar to joiner 92.

Referring still to FIG. 8, the left-side C-pillar 16 includes an upper C-pillar member 76 and a lower C-pillar member 88. Upper C-pillar member 76 includes a first mounting portion 148 and lower C-pillar member 88 includes a second mounting portion 150. Illustratively, an aperture 100 extends downwardly into second mounting portion 150. A frame subassembly, or third joiner 94 is configured to be coupled to upper C-pillar member 76 and extend downwardly from first mounting portion 148. Illustratively, upper C-pillar member 76 and lower C-pillar member 88 are coupled, by third joiner 94, at a fifth mounting location 152 (FIG. 1). Similarly, the right-side C-pillar 18 includes an upper C-pillar member 78 and a lower C-pillar member 90. Upper C-pillar member 78 includes a first mounting portion 154 and lower C-pillar member 90 includes a second mounting portion 156. Illustratively, an aperture 102 extends downwardly into second mounting portion 156. A frame subassembly, or fourth joiner 95 is configured to be coupled to upper C-pillar member 78 and extend downwardly from first mounting portion 154. Illustratively, upper C-pillar member 78 and lower C-pillar member 90 are coupled, by fourth joiner 95, at a sixth mounting location 158 (FIG. 1). In various embodiments, fourth joiner 95 is identical or substantially similar to third joiner 94.

Figure 9:
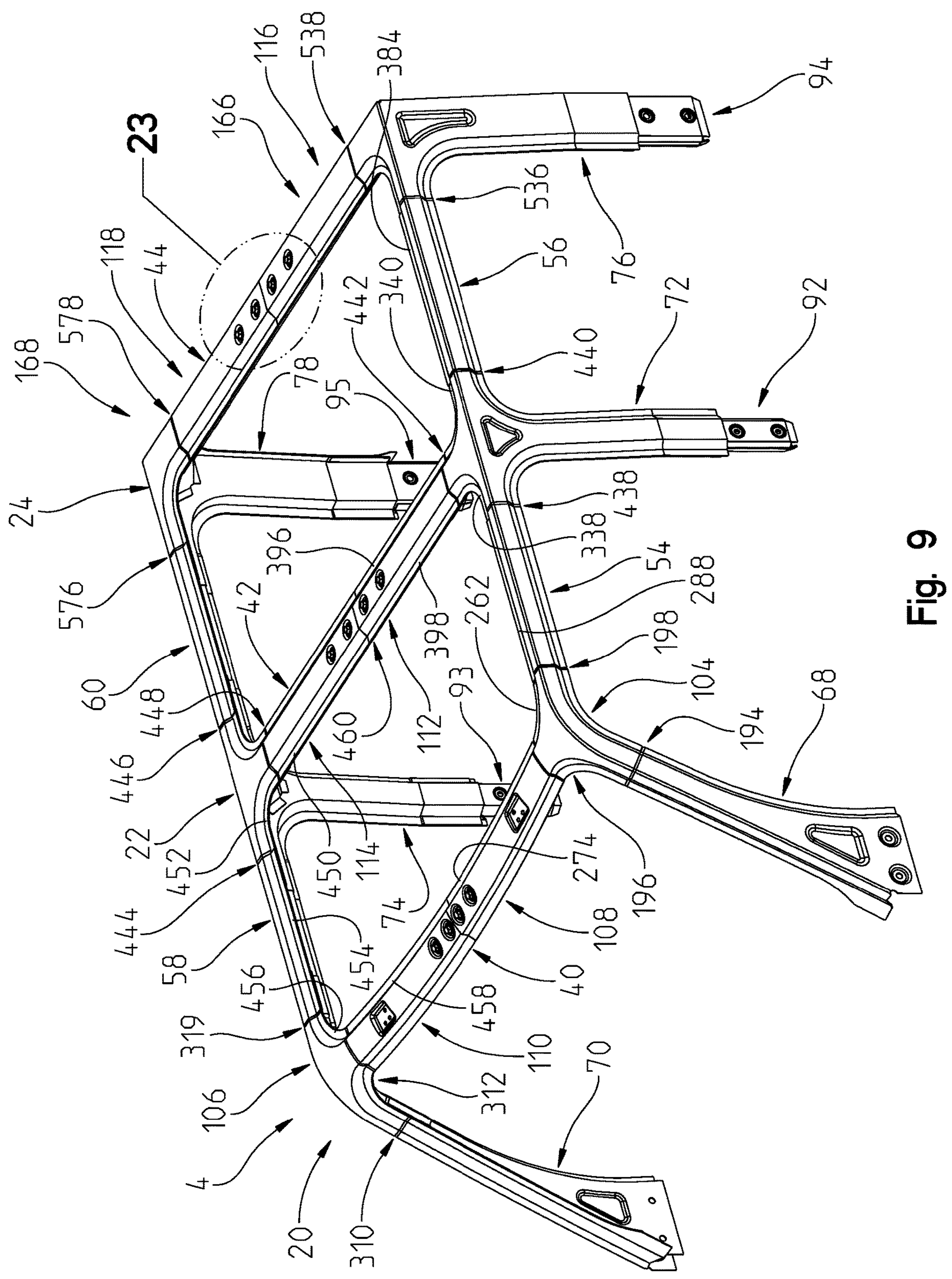
FIG. 9 is a front left perspective view of the upper frame assembly of the frame assembly of FIG. 1.

Still referring to FIG. 8, second cross member 40 includes a first member 108 and a second member 110, third cross member 42 includes a first member 112 and a second member 114 and fourth cross member 44 includes a first member 116 and a second member 118. Vehicle frame 2 also includes a first joint member, or left joint member 104 and a second joint member, or right joint member 106. First joint member 104 is positioned between, and coupled to, each of upper A-pillar member 68 of A-pillar 8 at a first joint 194 (FIG. 9), fifth frame member 54 at a third joint 198 (FIG. 9), and first member 108 of second cross member 40 at a second joint 196 (FIG. 9). Similarly, second joint member 106 is positioned between and coupled to each of upper A-pillar member 70 at a first joint 310 (FIG. 14E), frame member 58 at a second joint 319 (FIG. 14E), and second member 110 at a third joint 312 (FIG. 14E).

Figure 10:
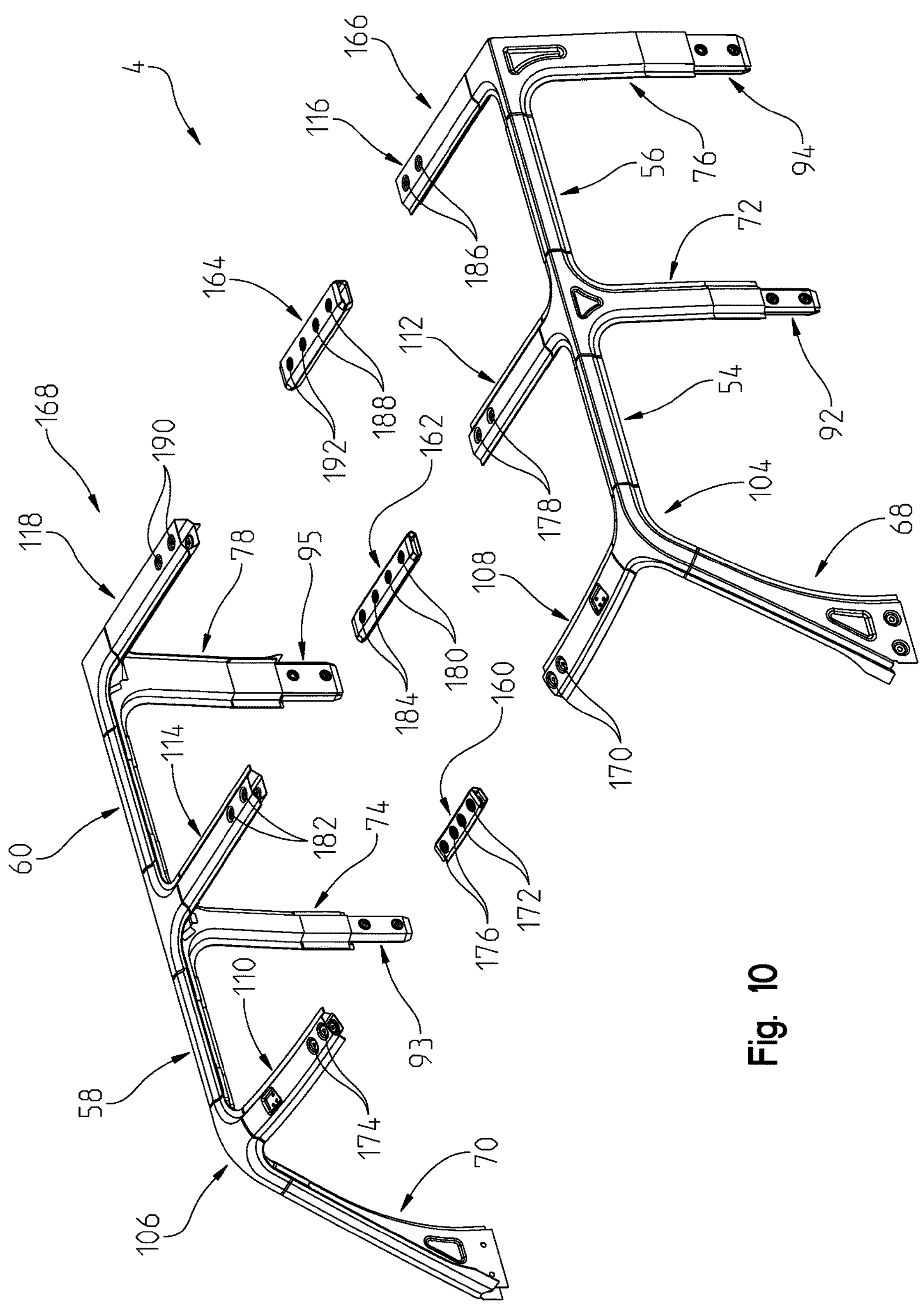
FIG. 10 is an exploded view of the upper frame assembly of FIG. 9, exploded along a longitudinal centerline into a right portion and a left portion.

Now referring to FIGS. 9-10, upper frame assembly 4 may be split into a left portion or left subassembly 166 and a right portion or right subassembly 168. Left portion 166 includes upper A-pillar member 68, upper B-pillar member 72, upper C-pillar member 76, first joint member 104, fifth frame member 54, sixth frame member 56, first member 108, first member 112, and first member 116. Right portion 168 includes upper A-pillar member 70, upper B-pillar member 74, upper C-pillar member 78, second joint member 106, seventh frame member 58, eighth frame member 60, second member 110, second member 114, and second member 118. In various embodiments, upper frame assembly 4 is split along a longitudinal centerline 120 (FIG. 5). Splitting upper frame assembly 4 into left portion 166 and right portion 168 allows for easier manufacturing, shipping, and assembly. For example, by splitting upper frame assembly 4 into left portion 166 and right portion 168, each of left portion 166 and right portion 168 may be shipped separately in smaller containers than the full upper frame assembly 4 assembly.

Figures 23, 24:
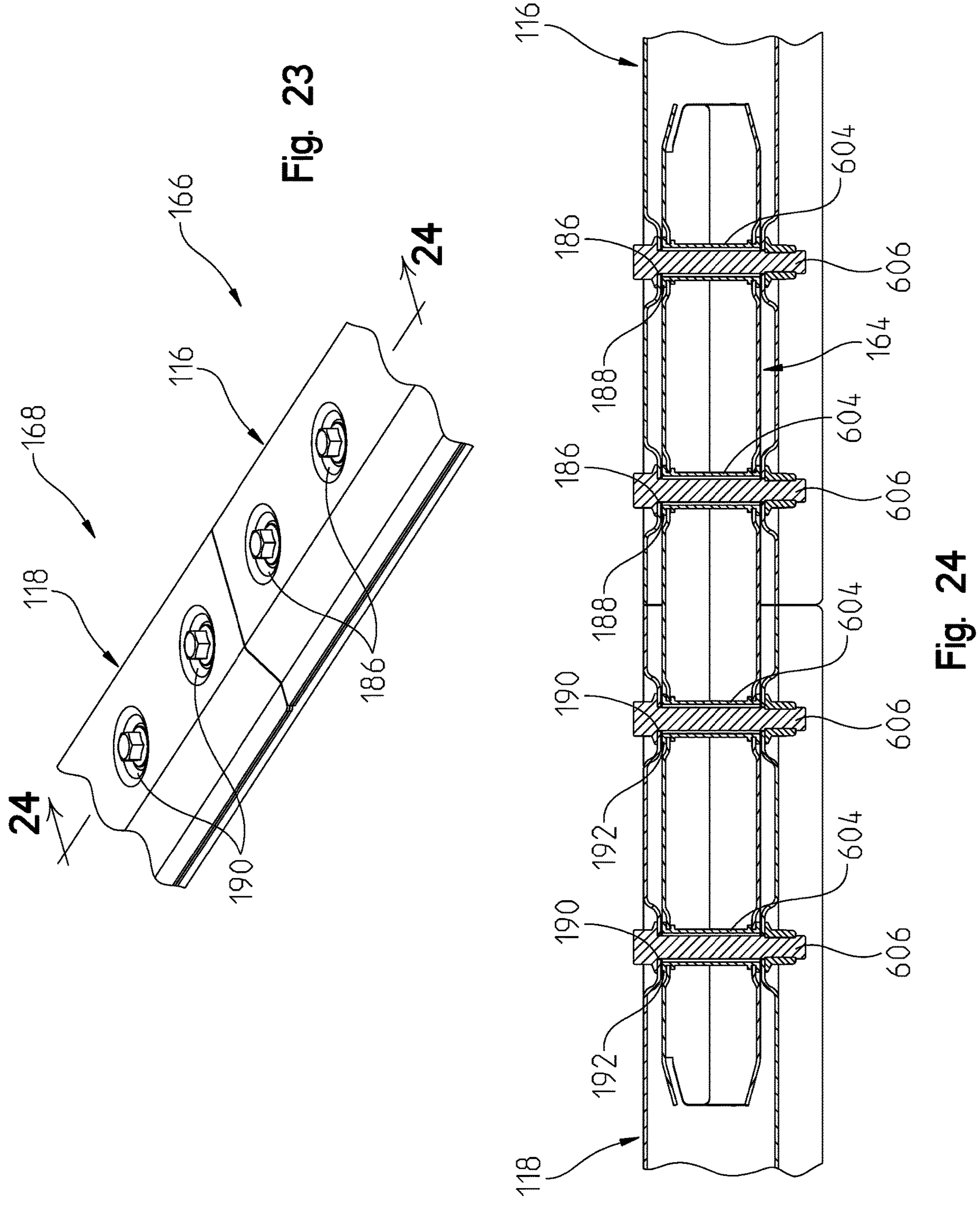
FIG. 23 is a perspective view of a coupling system between the right portion and the left portion of the upper frame assembly of FIG. 9.
FIG. 24 is a cross section view of the coupling system of FIG. 23, taken along line 24-24 in FIG. 23.
Figure 25:
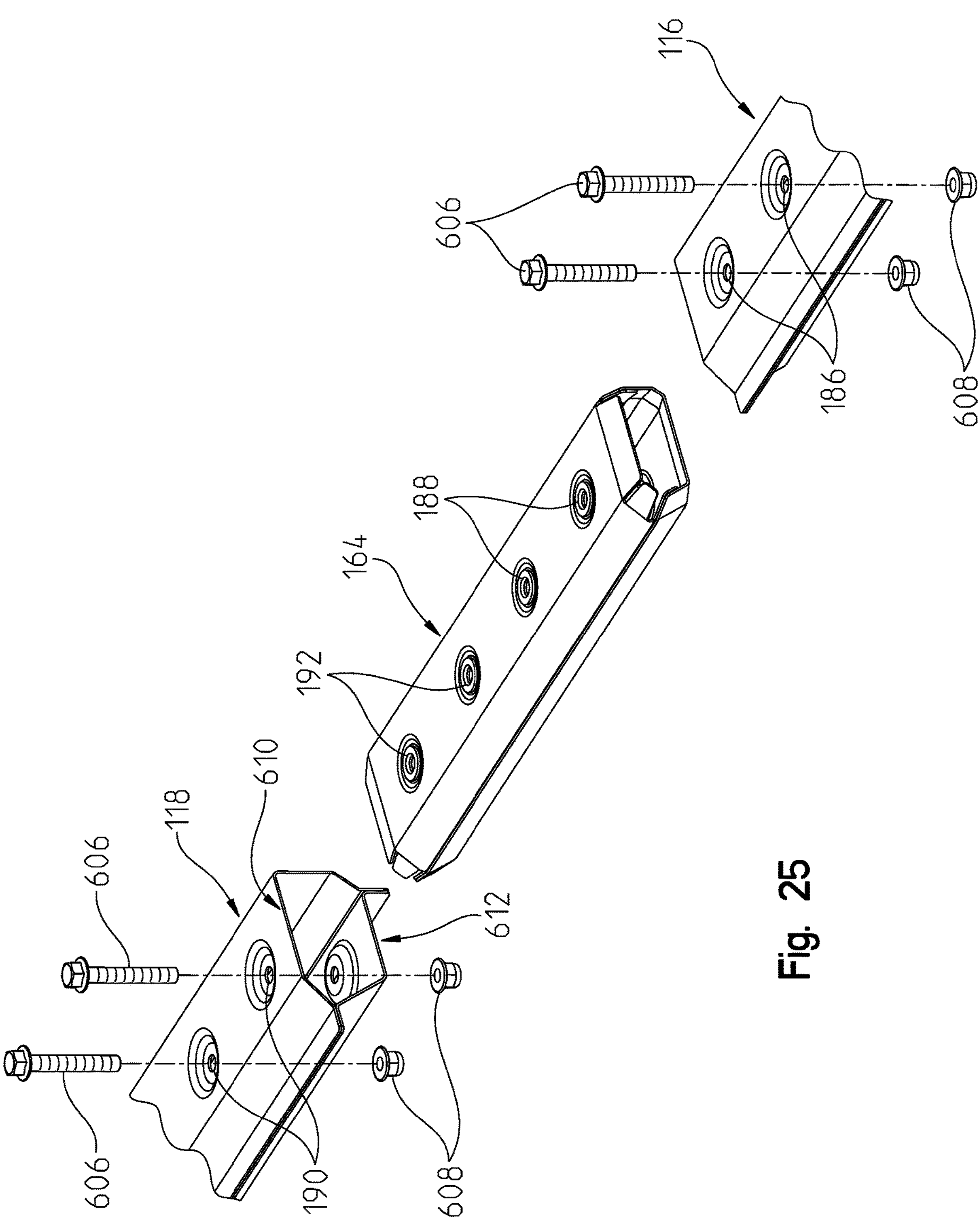
FIG. 25 is an exploded view of the coupling system of FIG. 23.
Figure 26:
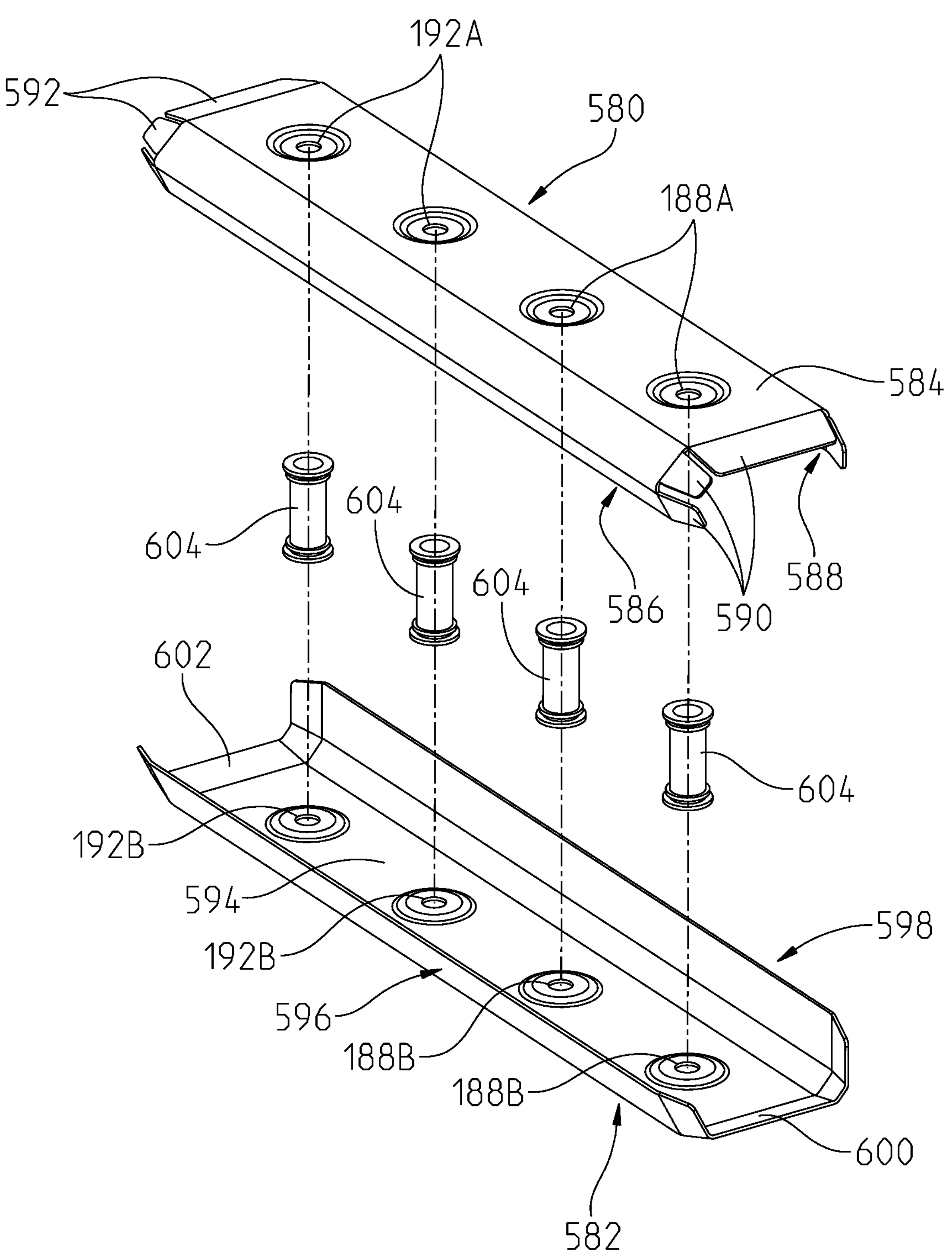
FIG. 26 is an exploded view of a coupling member of the coupling system of FIG. 23.

Referring to FIG. 10, first member 108 of cross member 40 (FIG. 9) defines a pair of apertures 170 and second member 110 defines a pair of apertures 174. Left portion 166 is coupled to right portion 168 by a first joiner, or first coupling member 160 coupled between first member 108 and second member 110. That is, first joiner 160 defines a first pair of apertures 172 configured to align with apertures 170 and a second pair of apertures 176 configured to align with apertures 174. A plurality of fasteners (similar to fasteners 606, FIG. 24) extend through apertures 170, 172 and a plurality of fasteners (similar to fasteners 606, FIG. 24) extend through apertures 174, 176 to couple first member 108 and second member 110 via joiner 160. Similarly with respect to cross member 42 rearward of cross member 40 (FIG. 9), first member 112 defines a pair of apertures 178 and second member 114 defines a pair of apertures 182. Left portion 166 is coupled to right portion 168 by a second joiner, or second coupling member 162 coupled between first member 112 and second member 114. That is, second joiner 162 defines a first pair of apertures 180 configured to align with apertures 178 and a second pair of apertures 184 configured to align with apertures 182. A plurality of fasteners (similar to fasteners 606, FIG. 24) extend through apertures 178, 180 and a plurality of fasteners (similar to fasteners 606, FIG. 24) extend through apertures 182, 184 to couple first member 112 and second member 114. Similarly, with respect to cross member 44 rearward of cross members 40 and 42 (FIG. 9), first member 116 defines a pair of apertures 186 and second member 118 defines a pair of apertures 190. Left portion 166 is coupled to right portion 168 by a third joiner, or third coupling member 164 coupled between first member 116 and second member 118. That is, third joiner 164 defines a first pair of apertures 188 configured to align with apertures 186 and a second pair of apertures 192 configured to align with apertures 190. A plurality of fasteners (similar to fasteners 606, FIG. 24) extend through apertures 186, 188 and a plurality of fasteners (similar to fasteners 606, FIG. 24) extend through apertures 190, 192 to couple first member 116 and second member 118.

In embodiments, upper frame assembly 4 may be split along the longitudinal centerline 120 to increase the overall strength of upper frame assembly 4. That is, first joiner 160, second joiner 162, and third joiner 164 are positioned along longitudinal centerline L to centralize the bolted joints of upper frame assembly 4 and move the bolted joints away from the lateral extents of upper frame assembly 4 which may increase the strength of upper frame assembly 4.

In embodiments, third mounting location 140, first mounting portion 142, second mounting portion 144 may be configured to couple through one or more overlapping members which may be joined by one or more fasteners, welds, or other coupling methods which may reduce the part count at each of third mounting location 140, first mounting portion 142, second mounting portion 144. In embodiments, each of second cross member 40, third cross member 42, and fourth cross member 44 are continuous cross-members made from a single monolithic piece of material. That is, in various embodiments, second cross member 40 is a continuous cross-member that extends between first A-pillar 8 and second A-pillar 10, third cross member 42 is a continuous cross-member that extends between first B-pillar 12 and second B-pillar 14, and fourth cross member 44 is a continuous cross-member that extends between first C-pillar 16 and second C-pillar 18.

Vehicle frame 2 includes a plurality of frame members, as previously described. In various embodiments, each frame member described herein is made from at least one, and in some cases a plurality of, stamped frame pieces. In embodiments, at least one frame member may be cast, hydroformed, or manufactured by other methods. Each stamped frame piece may be created using any stamping technique, such as punching, blanking, bending, coining, embossing, and flanging. In embodiments, one or more stamped frame pieces may be created by a press-brake method. Further, each stamped frame piece may be created from a coil of sheet metal or a blank form of sheet metal. Each stamped frame piece may be created using a progressive die stamping method, a multi-slide stamping method, a deep drawing method or a short run stamping method.

Stamping allows for increased flexibility in design choices when creating frame members. Frame members may be created from two or more stamped frame pieces that are coupled together using one or more of adhesives, welds, spot welding, fasteners, other coupling methods, or combinations thereof. Frame pieces created by a stamping method allows for frame members to have variable cross-sectional widths and geometries along their lengths, and also allows for curves and bends that may otherwise be challenging to create using other manufacturing methods. In embodiments, stamping allows for members to be created using pieces of different materials, grades of materials, piece thickness, or the like. In embodiments, a frame member may be made of an outer frame piece and an inner frame piece, and the outer frame piece may be made of a softer material than the inner material so that the outer frame piece may absorb impacts better while the inner frame piece prevents intrusions from debris or the like.

Figure 12:
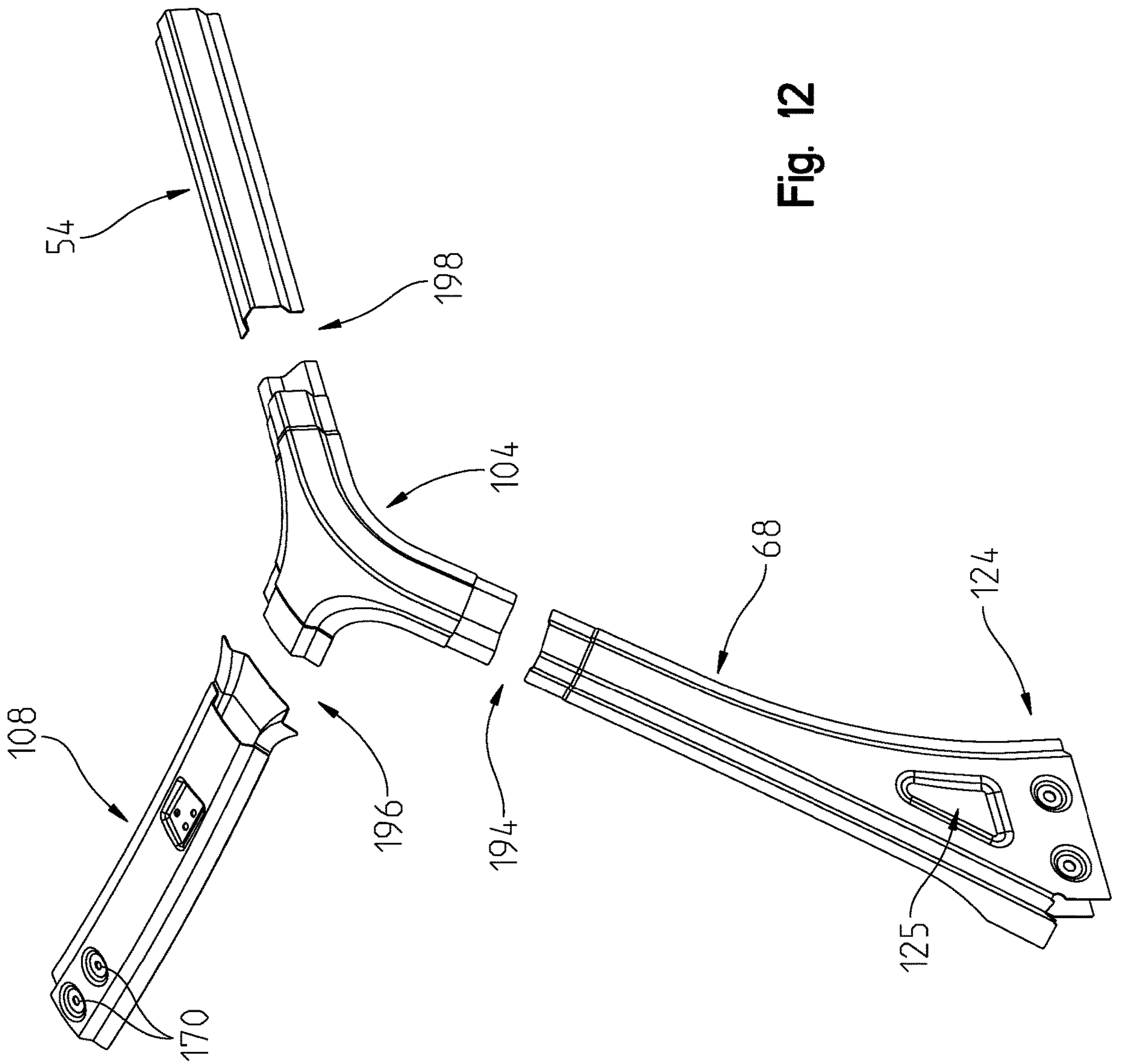
FIG. 12 is an exploded view of the upper A-pillar portion of FIG. 11A.

Stamping frame pieces also allows for subassemblies of stamped frame pieces to be created which may then be used to create bigger portions of frame assemblies. Additionally, frame pieces may be created to have specific geometries that allow for integration and coupling with other frame pieces or components (e.g., a seal as further discussed below). Stamped frame pieces may be created with various embossed or bent portions. Various embossed portions may increase rigidity in the stamped components. In embodiments, a boss 125 (FIG. 12) is positioned adjacent first mounting portion 124 to increase the rigidity of upper A-pillar member 68.

While stamping characterizes a method of making a stamped part, a stamped part is also a structural characteristic distinct from parts which have been made by other processes (e.g., forging, casting, extrusion, etc.). For a person of ordinary skill in the art, a stamped component can be readily distinguished visually by its telltale tool marks, microstructurally by elongated grain structures and other microstructural characteristics, and mechanically by measures of hardness, ductility and the like for a given alloy.

Figure 13:
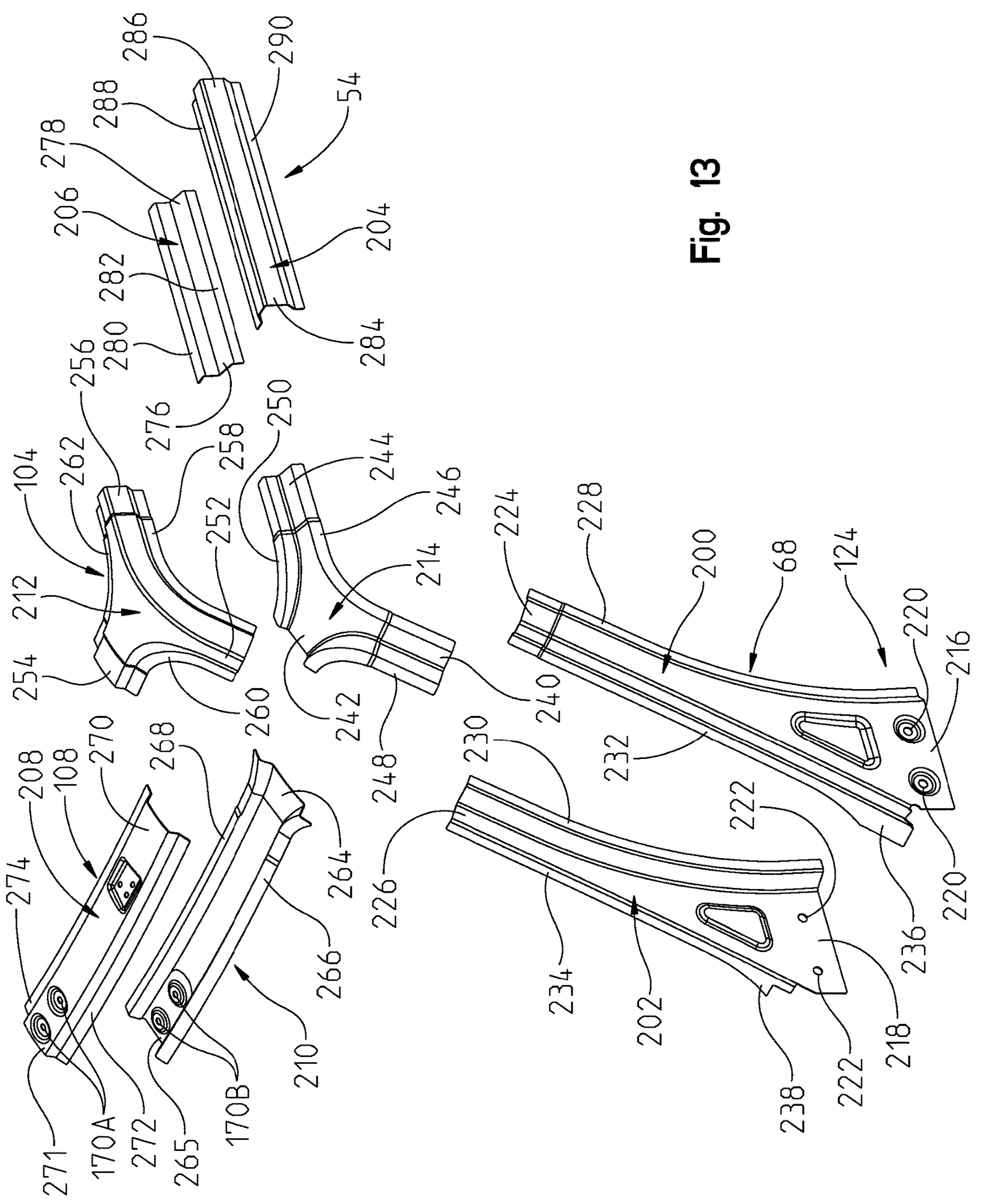
FIG. 13 is an exploded view of each member of the upper A-pillar portion of FIG. 11A.

Now referring to FIGS. 11A-14E and particularly FIG. 13, upper A-pillar member 68 includes an outer stamped frame piece, or first stamped frame piece 200 and an inner stamped frame piece, or second stamped frame piece 202. First stamped frame piece 200 includes a first end portion 216 defining a pair of apertures 220 and a second end portion 224. A first edge 228 extends along a rearward portion of first stamped frame piece 200 between first end portion 216 and second end portion 224 and a second edge 232 extends along a forward portion of first stamped frame piece 200 opposite of first edge 228 between first end portion 216 and second end portion 224. Second edge 232 includes an end portion 236 positioned adjacent first end portion 216. Similarly, second stamped frame piece 202 includes a first end portion 218 defining a pair of apertures 222 and a second end portion 226. A first edge 230 extends along a rearward portion of second stamped frame piece 202 between first end portion 218 and second end portion 226 and a second edge 234 extends along a forward portion of second stamped frame piece 202 opposite of first edge 230 between first end portion 218 and second end portion 226. Second edge 234 includes an end portion 238 positioned adjacent first end portion 218.

In various embodiments, first stamped frame piece 200 and second stamped frame piece 202 are coupled by a plurality of spot welds 231 (e.g., FIG. 11B) affixing first edge 228 and first edge 230 and a plurality of spot welds 235 (e.g., FIG. 11B) affixing second edge 232 and second edge 234. In various embodiments, an adhesive may be placed between first edge 228 and first edge 230 and an adhesive may be placed between second edge 232 and second edge 234.

Although not shown in detail, second A-pillar 10 is constructed similarly to first A-pillar 8. That is, second A-pillar 10 is symmetrical to first A-pillar 8 about longitudinal centerline 120 such that second A-pillar 10 is a mirror image of first A-pillar 8 and similarly includes a first stamped frame piece (similar to first stamped frame piece 200) and a second stamped frame piece (similar to second stamped frame piece 202).

First member 108 (FIG. 13) includes an outer stamped frame piece, or first stamped frame piece 208 and an inner stamped frame piece, or second stamped frame piece 210. First stamped frame piece 208 includes a first end portion 270 and a second end portion 271 defining a pair of apertures 170A. A first edge 272 extends along a forward portion of first stamped frame piece 208 between first end portion 270 and second end portion 271 and a second edge 274 extends along a rearward portion of first stamped frame piece 208 between first end portion 270 and second end portion 271. Similarly, second stamped frame piece 210 includes a first end portion 264 and a second end portion 265 defining a pair of apertures 170B. A first edge 266 extends along a forward portion of second stamped frame piece 210 between first end portion 264 and second end portion 265 and a second edge 268 extends along a rearward portion of second stamped frame piece 210 between first end portion 264 and second end portion 265.

Illustratively, apertures 170 include apertures 170A and apertures 170B. First stamped frame piece 208 is coupled to second stamped frame piece 210 by a plurality of spot welds affixing first edge 272 and first edge 266 and a plurality of spot welds affixing second edge 274 and second edge 268. In various embodiments, an adhesive may be placed between first edge 272 and first edge 266 and an adhesive may be placed between second edge 274 and second edge 268.

Although not shown in detail, second member 110 is constructed similarly to first member 108. That is, second member 110 is symmetrical to first member 108 about longitudinal centerline 120 such that second member 110 is a mirror image of first member 108 and similarly includes a first stamped frame piece (similar to first stamped frame piece 208) and a second stamped frame piece (similar to second stamped frame piece 210). The first stamped frame piece of second member 110 has a forward edge 316 (FIG. 14E) that is coplanar with first edge 272.

Still referring to FIGS. 11A-14E and particularly FIG. 13, fifth frame member 54 includes an outer stamped frame piece, or first stamped frame piece 204 and an inner stamped frame piece, or second stamped frame piece 206. First stamped frame piece 204 includes a first end portion 284 and a second end portion 286. A first edge 288 extends on a first side of first stamped frame piece 204 between first end portion 284 and second end portion 286 and a second edge 290 extends on a second side opposite the first side of the first stamped frame piece 204 between first end portion 284 and second end portion 286. Similarly, second stamped frame piece 206 includes a first end portion 276 and a second end portion 278. A first edge 280 extends on a first side of second stamped frame piece 206 between first end portion 276 and second end portion 278 and a second edge 282 extends on a second side opposite the first side of the second stamped frame piece 206 between first end portion 276 and second end portion 278.

First stamped frame piece 204 and second stamped frame piece 206 are coupled together by a plurality of spot welds affixing first edge 280 and first edge 288 and a plurality of spot welds affixing second edge 282 and second edge 290. In various embodiments, an adhesive may be placed between first edge 280 and first edge 288 and an adhesive may be placed between second edge 282 and second edge 290. In various embodiments, spot welds and adhesives may be used together.

Although not shown, seventh frame member 58 is constructed similarly to fifth frame member 54. That is, seventh frame member 58 is symmetrical to fifth frame member 54 about longitudinal centerline 120 such that seventh frame member 58 includes a first stamped frame piece (similar to first stamped frame piece 204) and a second stamped frame piece (similar to second stamped frame piece 206).

First joint member 104 includes an outer stamped frame piece, or first stamped frame piece 212 and an inner stamped frame piece, or second stamped frame piece 214. First stamped frame piece 212 is generally an arcuately T-shaped piece and includes a first end portion 252, a second end portion 254, and a third end portion 256. A first edge 260 extends between first end portion 252 and second end portion 254, a second edge 262 extends between second end portion 254 and third end portion 256, and a third edge 258 extends between first end portion 252 and third end portion 256. In various embodiments, each of first edge 260, second edge 262, and third edge 258 are arcuately shaped. Similarly, second stamped frame piece 214 is generally an arcuately T-shaped piece and includes a first end portion 240, a second end portion 242, and a third end portion 244. A first edge 248 extends between first end portion 240 and second end portion 242, a second edge 250 extends between second end portion 242 and third end portion 244, and a third edge 246 extends between third end portion 244 and first end portion 240. In various embodiments, each of first edge 248, second edge 250, and third edge 246 are arcuately shaped.

In various embodiments, first stamped frame piece 204 and second stamped frame piece 206 are coupled by a plurality of spot welds affixing first edge 248 and first edge 260, a plurality of spot welds affixing second edge 250 and second edge 262, and a plurality of spot welds affixing third edge 246 and third edge 258. An adhesive may be placed between first edge 248 and first edge 260, an adhesive may be placed between second edge 250 and second edge 262, and an adhesive may be placed between third edge 246 and third edge 258. In various embodiments, both spot welds and an adhesive may be used to couple first stamped frame piece 204 and second stamped frame piece 206.

Although not shown in detail, second joint member 106 (FIG. 9) is constructed similarly to first joint member 104. That is, second joint member 106 is symmetrical to first joint member 104 about longitudinal centerline 120 such that second joint member 106 is a mirror image of first joint member 104 and similarly includes a first stamped frame piece (similar to first stamped frame piece 212) and a second stamped frame piece (similar to second stamped frame piece 214).

Figure 14A:
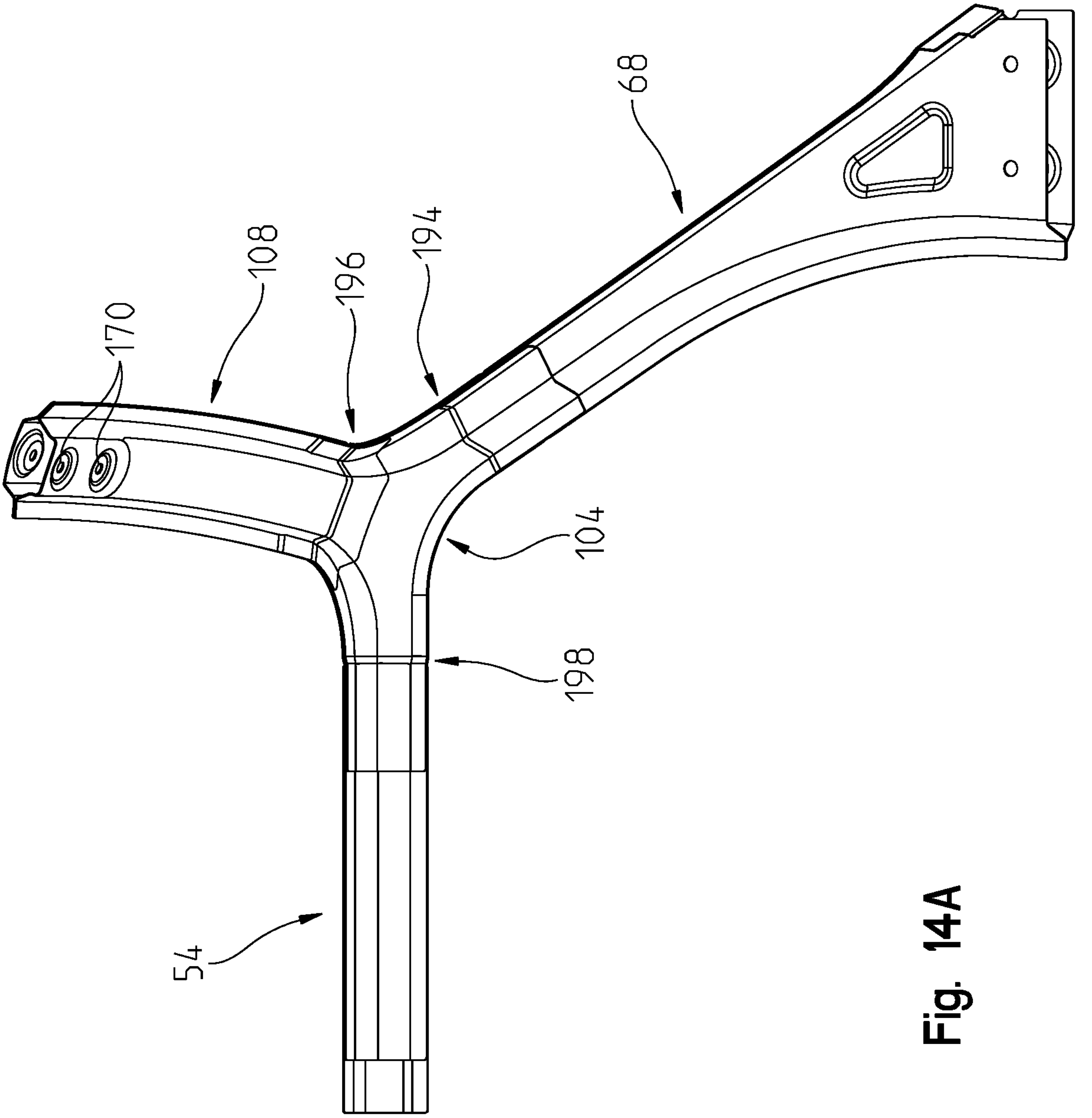
FIG. 14A is a right-side view of the upper A-pillar portion of FIG. 11A.
Figure 14B:
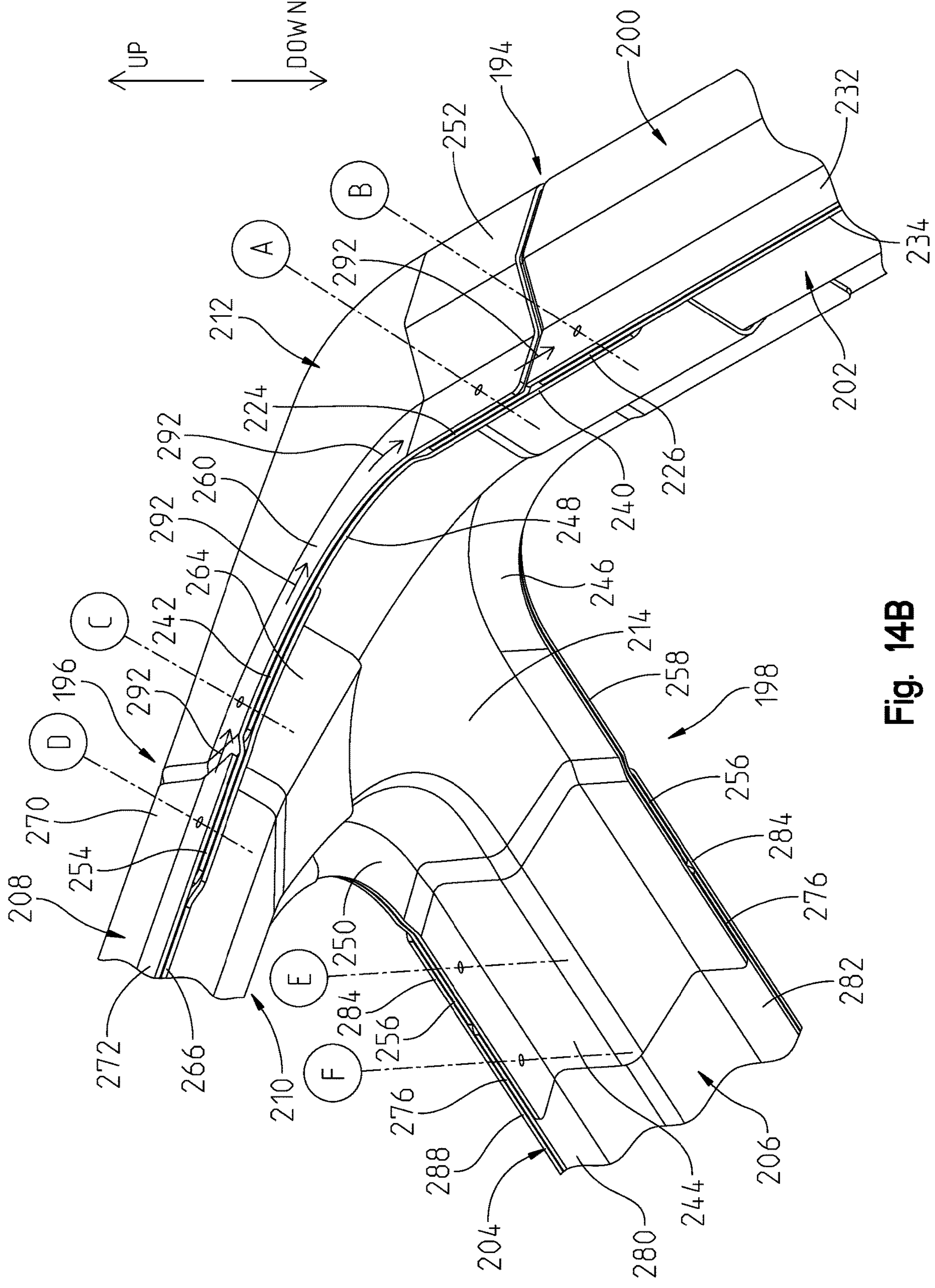
FIG. 14B is a perspective view of a joint member of the upper A-pillar portion of FIG. 11A.
Figure 14C:
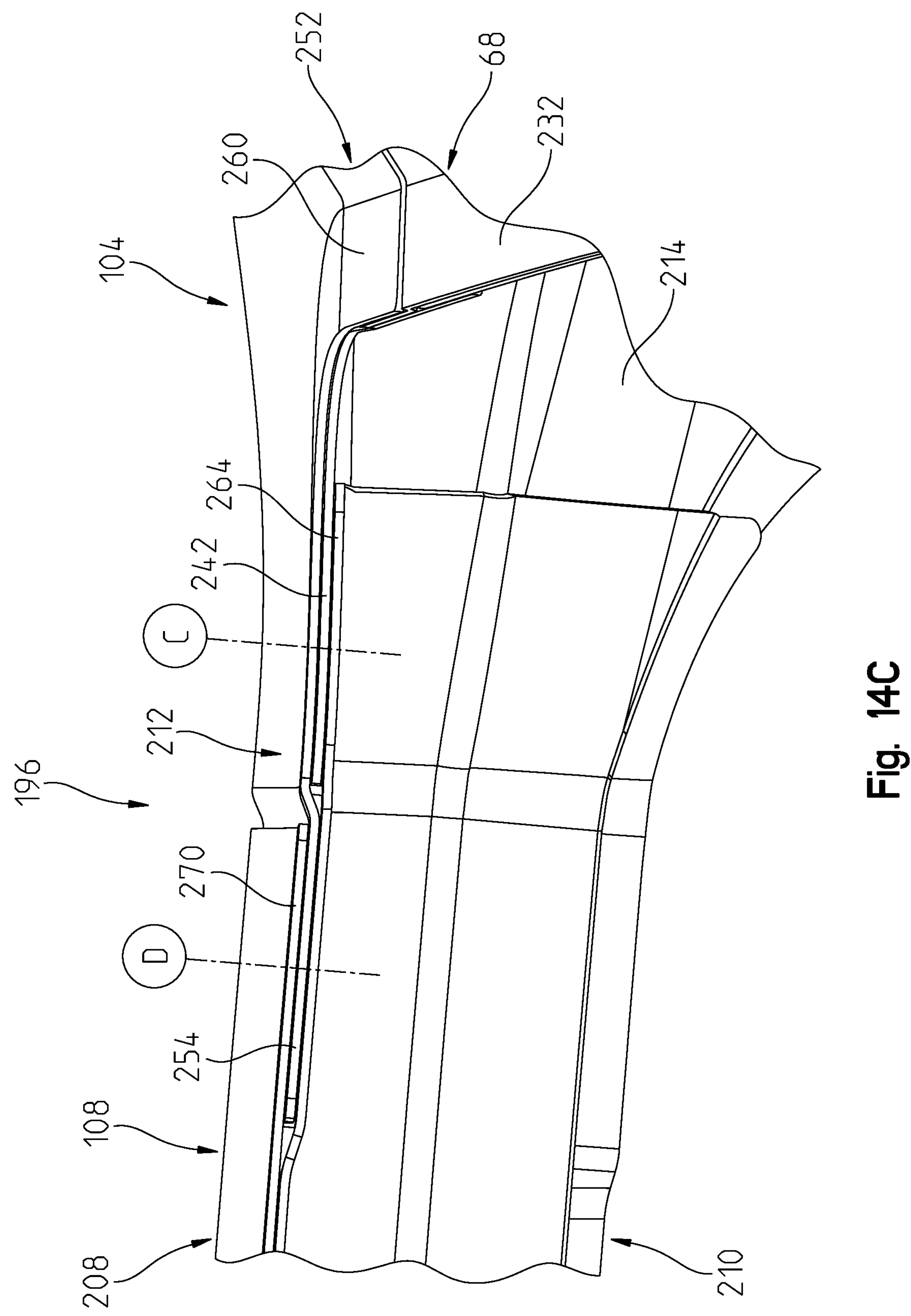
FIG. 14C is a side view of a lap joint of the joint member of FIG. 14B and a cross-member of the upper A-pillar portion of FIG. 11A.
Figure 14D:
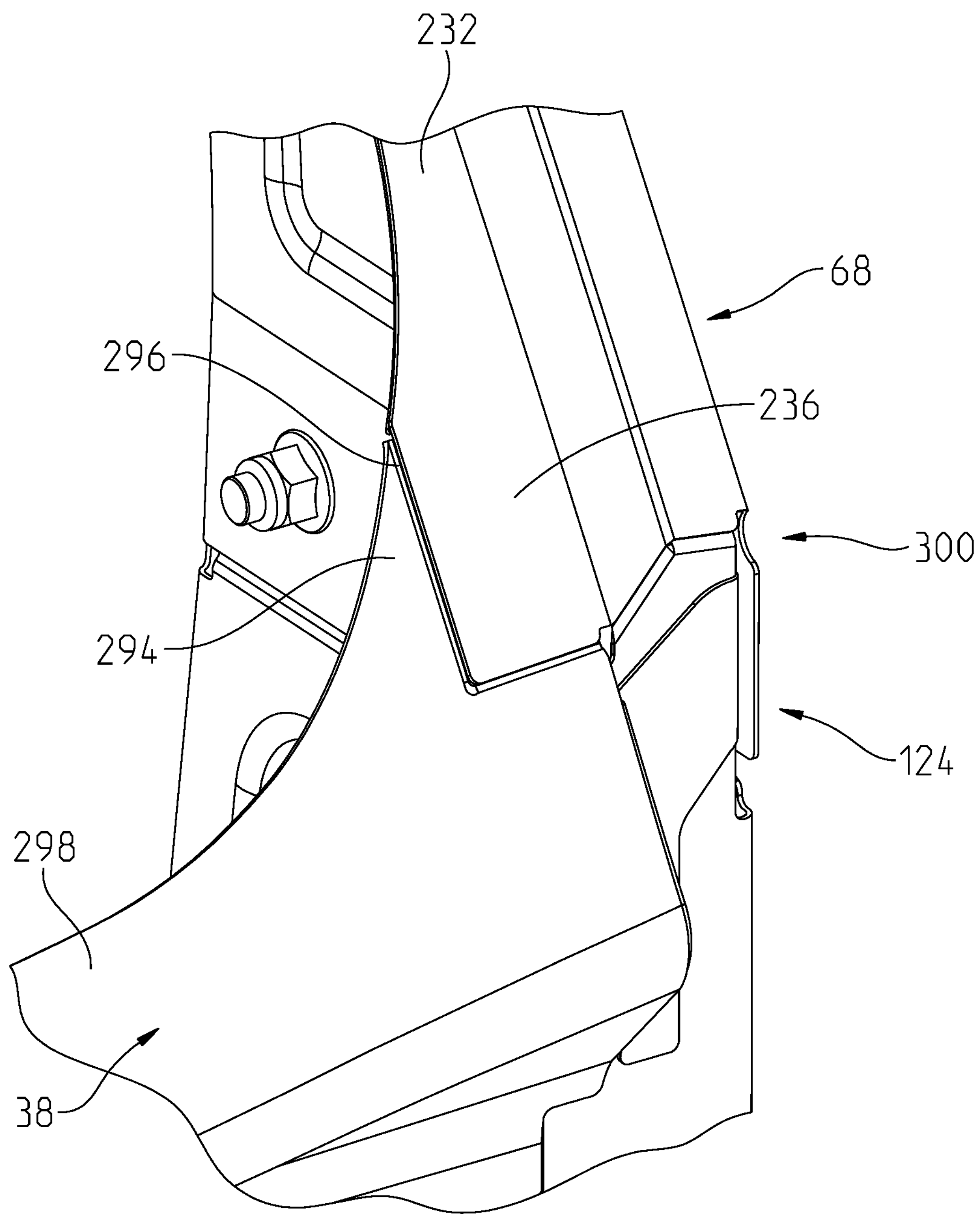
FIG. 14D is a perspective view of a lower portion of the upper A-pillar portion of FIG. 11A coupled to the lower frame assembly.
Figure 14E:
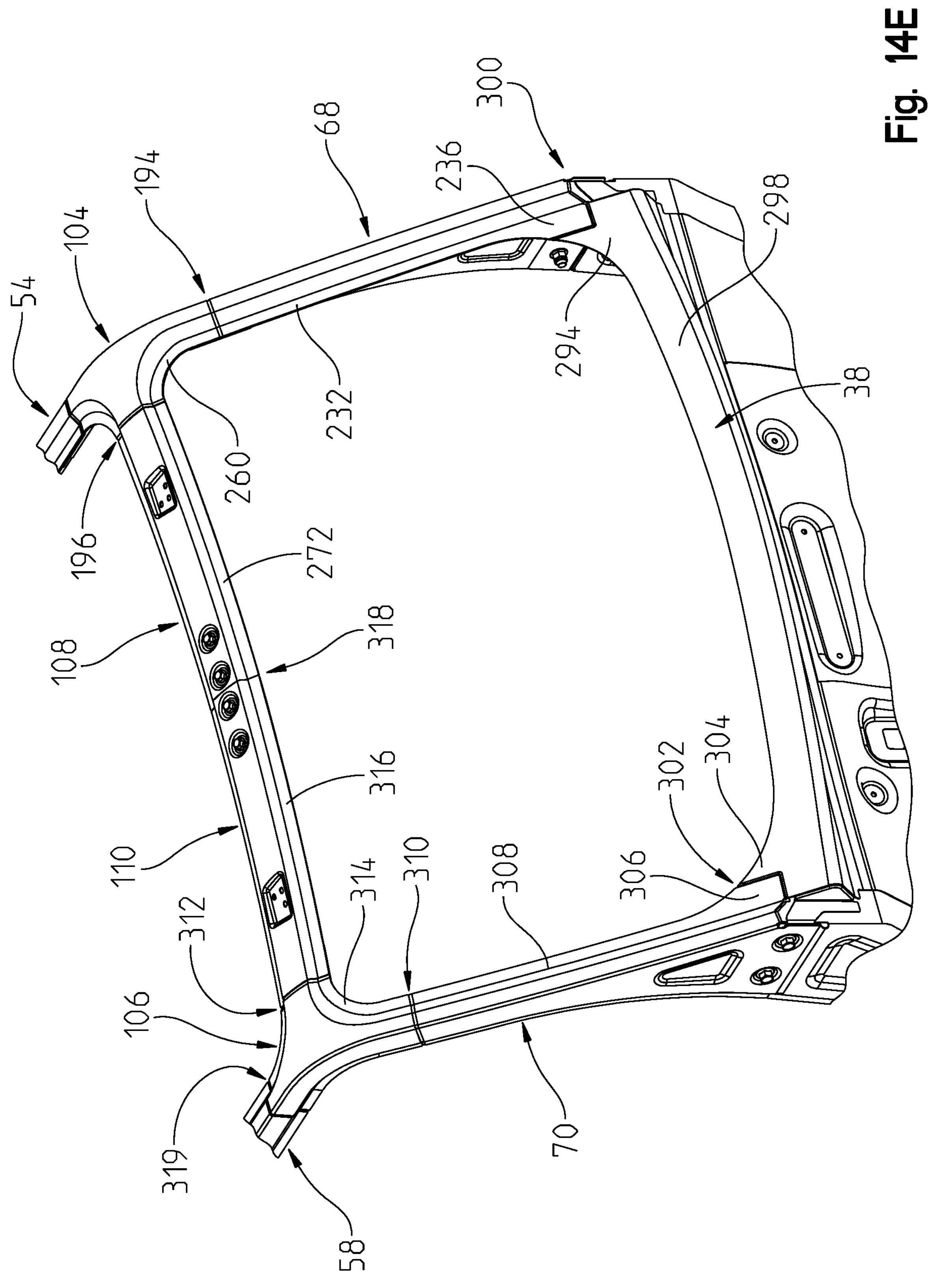
FIG. 14E is a perspective view of a forward opening, or a windshield, of the upper frame assembly of FIG. 9.

Still referring to FIGS. 11A-14E and particularly FIG. 14A, first joint member 104 is coupled between each of upper A-pillar member 68, first member 108, and fifth frame member 54. Illustratively, upper A-pillar member 68 is coupled to first joint member 104 at first joint 194, first member 108 is coupled to first joint member 104 at second joint 196, and fifth frame member 54 is coupled to first joint member 104 at third joint 198. That is, second end portion 224 of first stamped frame piece 200 and second end portion 226 of second stamped frame piece 202 are coupled to each of first end portion 240 of second stamped frame piece 214 and first end portion 252 of first stamped frame piece 212 to couple upper A-pillar member 68 to first joint member 104 at first joint 194. Further, first end portion 270 of first stamped frame piece 208 and first end portion 264 of second stamped frame piece 210 are coupled to each of second end portion 254 of first stamped frame piece 212 and second end portion 242 of second stamped frame piece 214 to couple first member 108 to first joint member 104 at second joint 196. Further, first end portion 284 of first stamped frame piece 204 and first end portion 276 of second stamped frame piece 206 are coupled to each of third end portion 256 of first stamped frame piece 212 and third end portion 244 of second stamped frame piece 214 to couple frame member 54 to first joint member 104 at third joint 198.

As best seen in FIG. 14B, each of first joint 194, second joint 196, and third joint 198 includes a plurality of overlapping pieces to create a lap joint. That is, at first joint 194, each of first stamped frame piece 200 and second stamped frame piece 202 overlap at least a portion of at least one of first stamped frame piece 212 and second stamped frame piece 214. Further, at first joint 194, each of first stamped frame piece 212 and second stamped frame piece 214 overlap at least a portion of at least one of first stamped frame piece 200 and second stamped frame piece 202. A first line ‘A’ extends through first joint 194 at a first location and extends orthogonal to a top surface of first edge 260. The first line ‘A’ extends through each of first end portion 252 of first stamped frame piece 212, second end portion 224 of first stamped frame piece 200, and first end portion 240 of second stamped frame piece 214. A second line ‘B’ extends through first joint 194 at a second location and extends orthogonal to a top surface of second edge 232. The second line ‘B’ extends through each of first stamped frame piece 200, second stamped frame piece 202, and first end portion 240 of second stamped frame piece 214. At least one spot weld is provided at the location of first line ‘A’ and at least one spot weld is provided at the location of second line ‘B’ to affix all the above-mentioned components to one another. In various embodiments, adhesive is placed between first end portion 252 and second end portion 224 and between second end portion 224 and first end portion 240 and between first stamped frame piece 200 and second end portion 226 and between second end portion 226 and first end portion 240. Overlapping first stamped frame piece 200, second stamped frame piece 202, first stamped frame piece 212, and second stamped frame piece 214 increases the strength of first joint 194 relative to non-overlapped joints.

Still referring to FIG. 14B, first joint 194 is created such that a generally continuous and flat surface is defined along and across a junction between first edge 260 and second edge 232. That is, second end portion 224 of first stamped frame piece 200 is shaped during the stamping process so that it may bend underneath first end portion 252 of first stamped frame piece 212 at first joint 194. Further, first end portion 240 of second stamped frame piece 214 is shaped during the stamping process so that it may bend underneath second end portion 224 of first stamped frame piece 200 and sandwich second end portion 224 between first end portion 240 of second stamped frame piece 214 and first end portion 252 of first stamped frame piece 212. As used herein, a generally continuous and flat surface is one that has minimal bumps, protrusions, and dips. A generally continuous and flat surface at a joint member has aesthetic benefits over frame members or pieces that have any protrusions, dips, or other inconsistencies in the surface of the joint. Additionally, for example, by bending second end portion 224 relative to first stamped frame piece 200, a shelf-like structure is created on second end portion 224 relative to first stamped frame piece 200 for first end portion 252 of first stamped frame piece 212 to sit within, which may simplify the assembly process and may otherwise increase consistency and repeatability of the assembly process.

Still referring to first joint 194 shown, e.g., in FIG. 14B, the outwardly facing frame pieces are first end portion 252 of first stamped frame piece 212 and first stamped frame piece 200. First joint member 104 is positioned vertically higher than upper A-pillar member 68 (FIG. 9), and first end portion 252 extends downwardly and over second end portion 224 of first stamped frame piece 200 which encourages any fluid that contacts first stamped frame piece 212 to flow downwardly in the direction of arrows 292 (FIG. 14B), past first joint 194. This arrangement of first stamped frame piece 212 and first stamped frame piece 200 reduces fluid intrusion into operator area 50 through first joint 194. Still referring to first joint 194, a generally continuous and flat surface is defined along and across a junction between third edge 258 and first edge 228 in substantially the same manner that a generally continuous and flat surface is defined along and across a junction between first edge 260 and second edge 232.

As best seen in FIGS. 14B-14C, at second joint 196 each of first stamped frame piece 208 and second stamped frame piece 210 overlap at least a portion of at least one of first stamped frame piece 212 and second stamped frame piece 214. Further, at second joint 196, each of first stamped frame piece 212 and second stamped frame piece 214 overlap at least a portion of at least one of first stamped frame piece 208 and second stamped frame piece 210. A third line 'C' extends through second joint 196 at a third location and extends orthogonal to a top surface of first edge 272. The third line 'C' extends through each of first end portion 270 of first stamped frame piece 208, second end portion 254 of first stamped frame piece 212, and first end portion 264 of second stamped frame piece 210. A fourth line 'D' extends through second joint 196 at a fourth location and extends orthogonal to a top surface of first edge 272. The fourth line 'D' extends through each of first stamped frame piece 212, second end portion 242 of second stamped frame piece 214, and first end portion 264 of second stamped frame piece 210. At least one spot weld is provided at the location of third line 'C' and at least one spot weld is provided at the location of fourth line 'D' to affix all the above-mentioned components to one another. In various embodiments, adhesive is placed between first end portion 270 and second end portion 254 and between first end portion 270 and first end portion 264 and between first stamped frame piece 212 and second end portion 242 and between second end portion 242 and first end portion 264. Overlapping first stamped frame piece 208, second stamped frame piece 210, first stamped frame piece 212, and second stamped frame piece 214 increases the strength of second joint 196 relative to non-overlapped joints.

Still referring to FIGS. 14B-14C, second joint 196 is created such that a generally continuous and flat surface is defined along and across a junction between first edge 272 and first edge 260. That is, second end portion 254 of first stamped frame piece 212 is shaped during the stamping process so that it may bend underneath first end portion 270 of first stamped frame piece 208 at second joint 196. Further, first end portion 264 of second stamped frame piece 210 is shaped during the stamping process so that it may bend underneath second end portion 254 and sandwich second end portion 254 between first end portion 270 and first end portion 264. Further, by bending second end portion 254 relative to first stamped frame piece 212, a shelf-like structure is created on second end portion 254 relative to first stamped frame piece 212 for first end portion 270 of first stamped frame piece 208 to sit within, which may simplify the assembly process and may otherwise increase consistency and repeatability of the assembly process. Still referring to second joint 196, the outer facing frame pieces are first end portion 270 of first stamped frame piece 208 and first stamped frame piece 212. First end portion 270 extends over second end portion 254 of first stamped frame piece 212 which encourages any fluid that contacts first stamped frame piece 212 to flow downwardly in the direction of arrows 292, past second joint 196. This arrangement of first stamped frame piece 208 first stamped frame piece 212 reduces water intrusion into operator area 50 through second joint 196. Still referring to second joint 196, a generally continuous and flat surface is defined along and across a junction between second edge 262 and second edge 274 in substantially the same manner that a generally continuous and flat surface is defined along and across a junction between first edge 260 and first edge 272.

Referring again to FIG. 14B, at third joint 198 each of first stamped frame piece 204 and second stamped frame piece 206 overlap at least a portion of at least one of first stamped frame piece 212 and second stamped frame piece 214 and each of first stamped frame piece 212 and second stamped frame piece 214 overlap at least a portion of at least one of first stamped frame piece 204 and second stamped frame piece 206. A fifth line 'E' extends through third joint 198 at a fifth location and extends orthogonal to a top surface of first edge 288. The fifth line 'E' extends through each of third end portion 244 of second stamped frame piece 214, third end portion 256 of first stamped frame piece 212, and first end portion 284 of first stamped frame piece 204. A sixth line 'F' extends through third joint 198 at a sixth location and extends orthogonal to a top surface of first edge 288. The sixth line 'F' extends through each of third end portion 244 of second stamped frame piece 214, first end portion 276 of second stamped frame piece 206, and first end portion 284 of first stamped frame piece 204. At least one spot weld is provided at the location of fifth line 'E' and at least one spot weld is provided at the location of sixth line 'F'. In various embodiments, adhesive is placed between first end portion 284 and third end portion 256 and between third end portion 256 and third end portion 244 and between third end portion 244 and first end portion 276 and between first end portion 276 and first stamped frame piece 204. Overlapping first stamped frame piece 204, second stamped frame piece 206, first stamped frame piece 212, and second stamped frame piece 214 increases the strength of third joint 198 relative to non-overlapped joints.

Third joint 198 is created such that a generally continuous and flat surface is defined along and across a junction between first edge 288 and second edge 262. That is, third end portion 256 of first stamped frame piece 212 is shaped during the stamping process so that it may bend underneath rear portion 24 of first stamped frame piece 204 at third joint 198. Further, third end portion 244 of second stamped frame piece 214 is shaped during the stamping process so that it may bend underneath third end portion 256 and first end portion 276 and sandwich first end portion 276 between third end portion 244 and first end portion 284. Further, by bending third end portion 256 relative to first stamped frame piece 212, a shelf-like structure is created at third end portion 256 relative to first stamped frame piece 212 for first end portion 284 of first stamped frame piece 204 to sit within, which may simplify the assembly process and may otherwise increase consistency and repeatability of the assembly process. Still referring to third joint 198, the outer facing frame pieces are first end portion 270 of first stamped frame piece 208 and first stamped frame piece 212. Overlapping multiple frame pieces (e.g., first stamped frame piece 212, second stamped frame piece 214, first stamped frame piece 204, and second stamped frame piece 206) reduces water intrusion into operator area 50 through third joint 198. Still referring to third joint 198, a generally continuous and flat surface is defined along and across a junction between third edge 258 and second edge 290 in substantially the same manner that a generally continuous and flat surface is defined along and across a junction between second edge 262 and first edge 280.

Figure 11A:
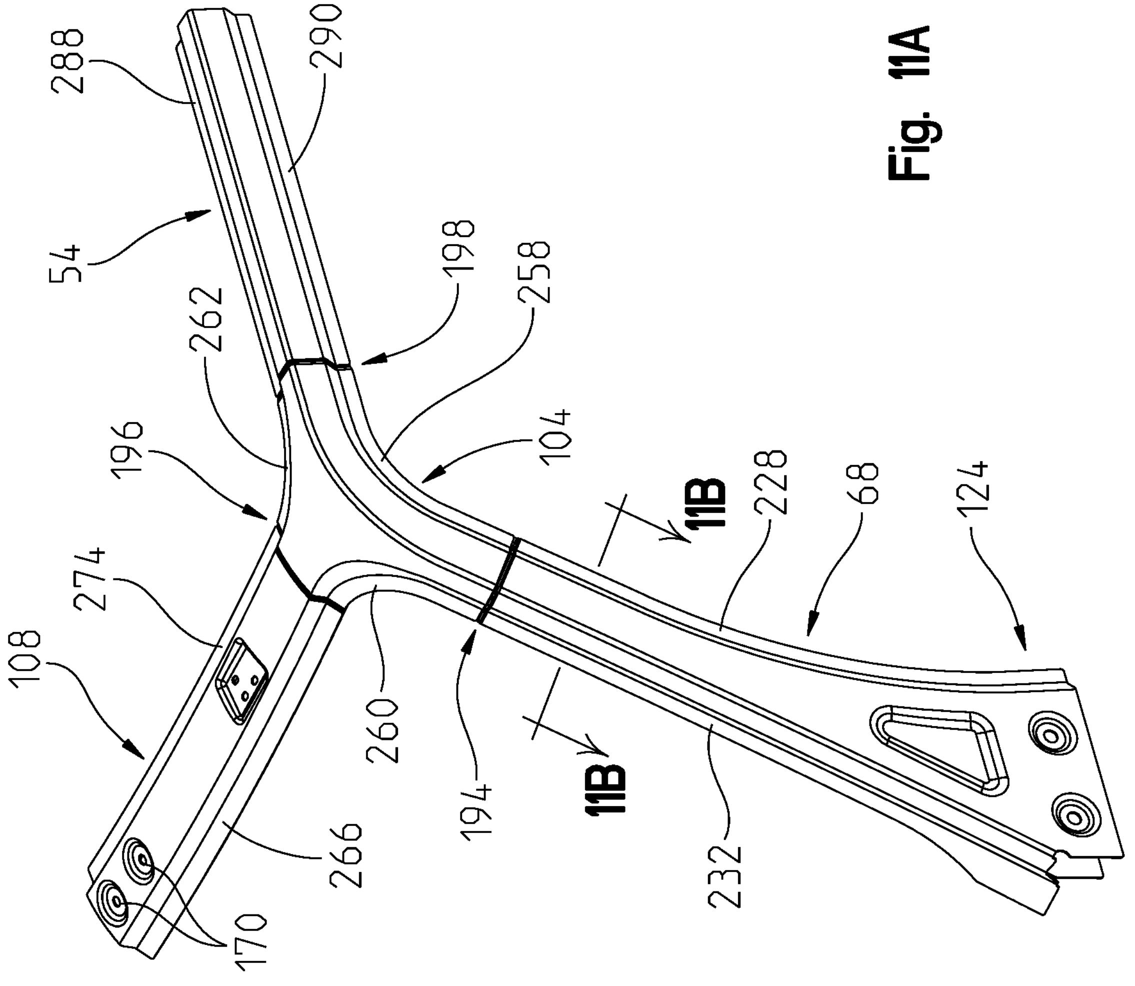
FIG. 11A is a front left perspective view of an upper A-pillar portion of the upper frame assembly of FIG. 9.
Figure 11B:
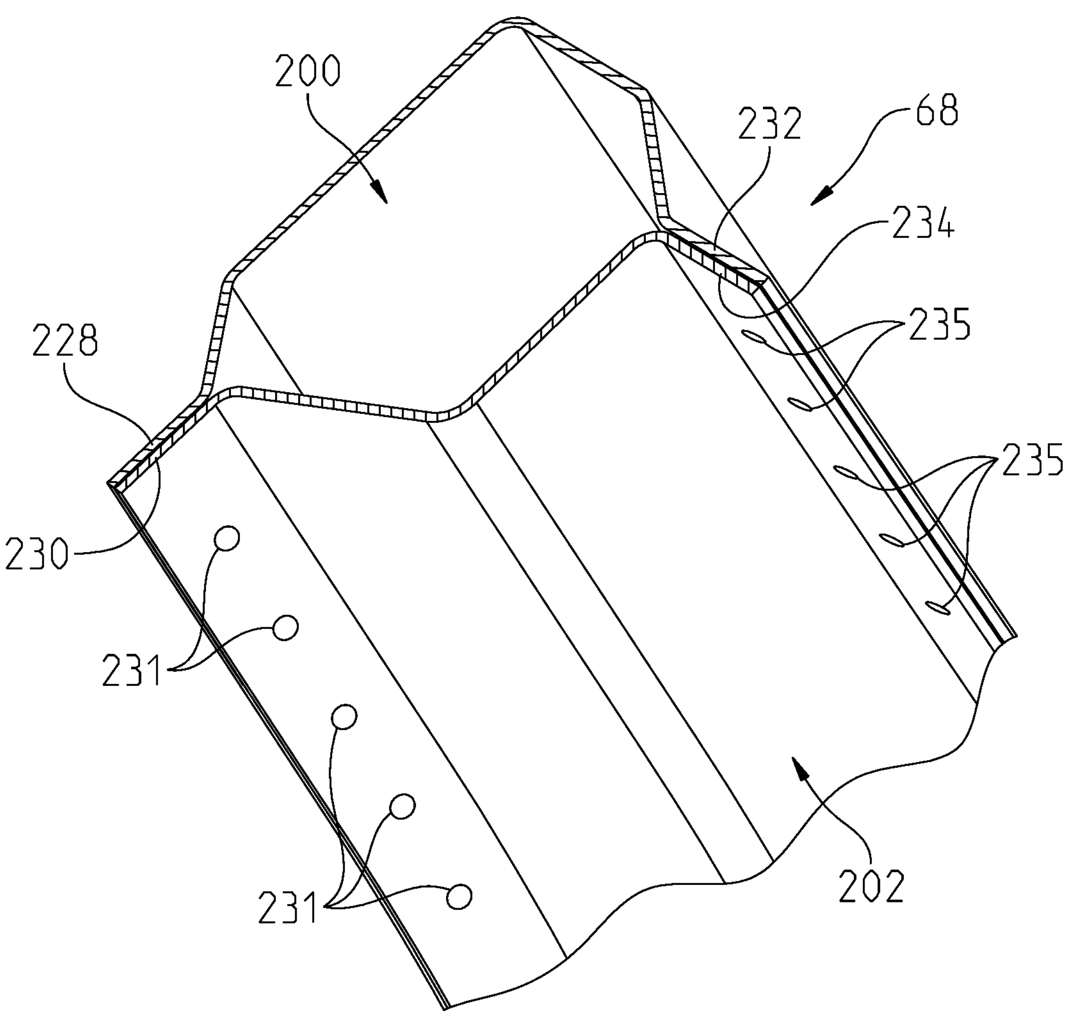
FIG. 11B is a cross-section of the A-pillar of the upper A-pillar portion of FIG. 11A taken along line 11B-11B in FIG. 11A.

As best seen in FIG. 11A, a generally continuous and flat surface is defined along and across a junction between first edge 266 of first member 108, first edge 260 of left joint member 104, and second edge 232 of upper A-pillar member 68. Further, a generally continuous and flat surface is defined along and across a junction between second edge 290 of frame member 54, third edge 258 of 104, and first edge 228 of upper A-pillar member 68, and a generally continuous and flat surface is defined along and across a junction between second edge 274 of first member 108, second edge 262 of left joint member 104, and first edge 288 of frame member 54.

Now referring to FIG. 14D, a fourth joint 300 is created between cross member 38 and upper A-pillar member 68. Illustratively, cross member 38 includes an outer surface 298 which includes an extension 294 extending generally upwardly toward end portion 236 of upper A-pillar member 68. Cross member 38 also includes a first portion 296 configured to interface with end portion 236. That is, during the stamping process, first portion 296 is bent relative to outer surface 298 of cross member 38 which creates a shelf-like structure for end portion 236 of upper A-pillar member 68 to sit within. The interface of end portion 236 and outer surface 298 of first cross member 38 creates a generally continuous and flat surface.

As best seen in FIG. 14E, a generally continuous and flat surface is defined along and across a forward opening perimeter 318 surrounding forward opening 52. That is, upper A-pillar member 68 includes second edge 232, first joint member 104 includes first edge 260, and first member 108 includes first edge 272. Similarly, upper A-pillar member 70 is constructed in a similar manner to upper A-pillar member 68 and upper A-pillar member 70 has an edge 308 similar to second edge 232 and an end portion 306 at a lower end thereof similar to end portion 236. Further, second joint member 106 is constructed in a similar manner to first joint member 104 and second joint member 106 has an edge 314 similar to first edge 260. Further, second member 110 is constructed in a similar manner to first member 108 and second member 110 has an edge 316 similar to first edge 272. Outer surface 298 of first cross member 38 extends between upper A-pillar member 68 and upper A-pillar member 70 and extension 294 interfaces with end portion 236 and an extension 304 of outer surface 298 interfaces with end portion 306 at a joint 302. The generally continuous and flat surface surrounds perimeter 318 of forward opening 52 along the entirety of outer surface 298, second edge 232, first edge 260, first edge 272, edge 316, edge 314, and edge 308.

Now referring to FIGS. 15A-18, upper B-pillar member 72 includes a first stamped frame piece 320 and a second stamped frame piece 342. First stamped frame piece 320 includes a first portion 322 extending generally vertically and a second portion 324 extending generally horizontal, and the second portion 324 is coupled to the first portion 322. In various embodiments, first stamped frame piece 320 is a single piece and second portion 324 is bent relative to first portion 322 during the manufacturing process. First stamped frame piece 320 includes a first end portion 326, a second end portion 328, a third end portion 330, and a fourth end portion 332. A first edge 334 extends between first end portion 326 and third end portion 330, a second edge 336 extends between first end portion 326 and second end portion 328, a third edge 338 extends between second end portion 328 and fourth end portion 332, and a fourth edge 340 extends between third end portion 330 and fourth end portion 332.

Second stamped frame piece 342 includes a first end portion 348, a second end portion 346, and a third end portion 344. A first edge 350 extends between first end portion 348 and third end portion 344, a second edge 352 extends between first end portion 348 and second end portion 346, and a third edge 354 extends between second end portion 346 and third end portion 344. In various embodiments, second stamped frame piece 342 is a generally T-shaped member and second edge 352 is configured to align with second edge 336 and first edge 350 is configured to align with first edge 334. Further, third edge 354 is generally straight and configured to couple with second portion 324 of first stamped frame piece 320. Second stamped frame piece 342 is configured to couple to first stamped frame piece 320 through a plurality of spot welds and/or adhesive may be placed between second edge 336 and second edge 352 and between first edge 334 and first edge 350. Further, a plurality of spot welds and/or adhesive may be placed between second stamped frame piece 342 and at least one of third edge 338 and fourth edge 340.

Upper B-pillar member 72 is configured to couple to fifth frame member 54 at a first mounting location 438. That is, second end portion 328 of first stamped frame piece 320 and second end portion 346 of second stamped frame piece 342 are configured to couple to second end portion 278 of second stamped frame piece 206 and second end portion 286 of first stamped frame piece 208. In various embodiments, at first mounting location 438, at least one of second end portion 346 and second end portion 328 is configured to overlap with at least one of second end portion 278 and second end portion 286.

Figure 15A:
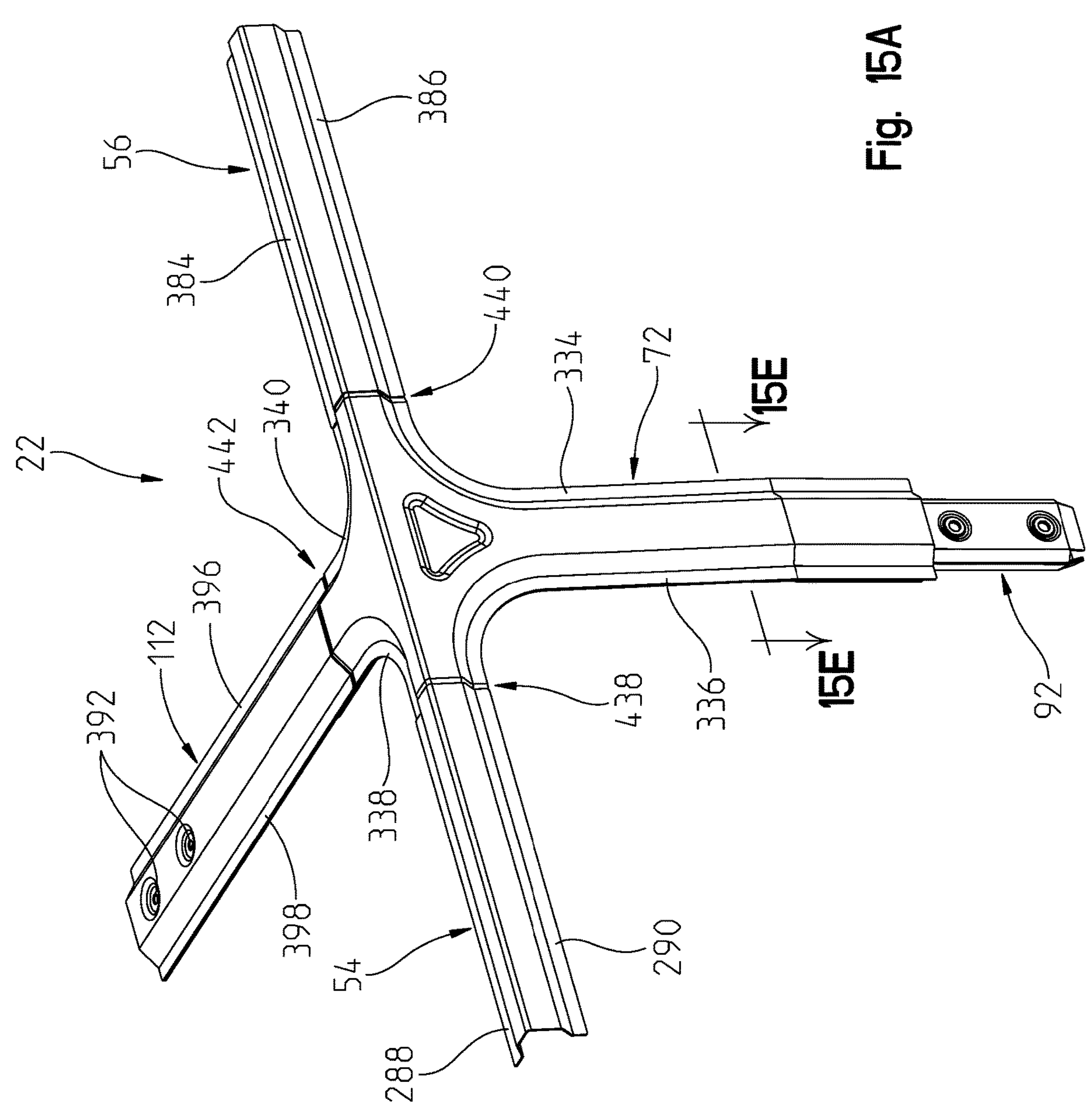
FIG. 15A is a front left perspective view of an upper B-pillar portion of the upper frame assembly of FIG. 9.
Figure 15B:
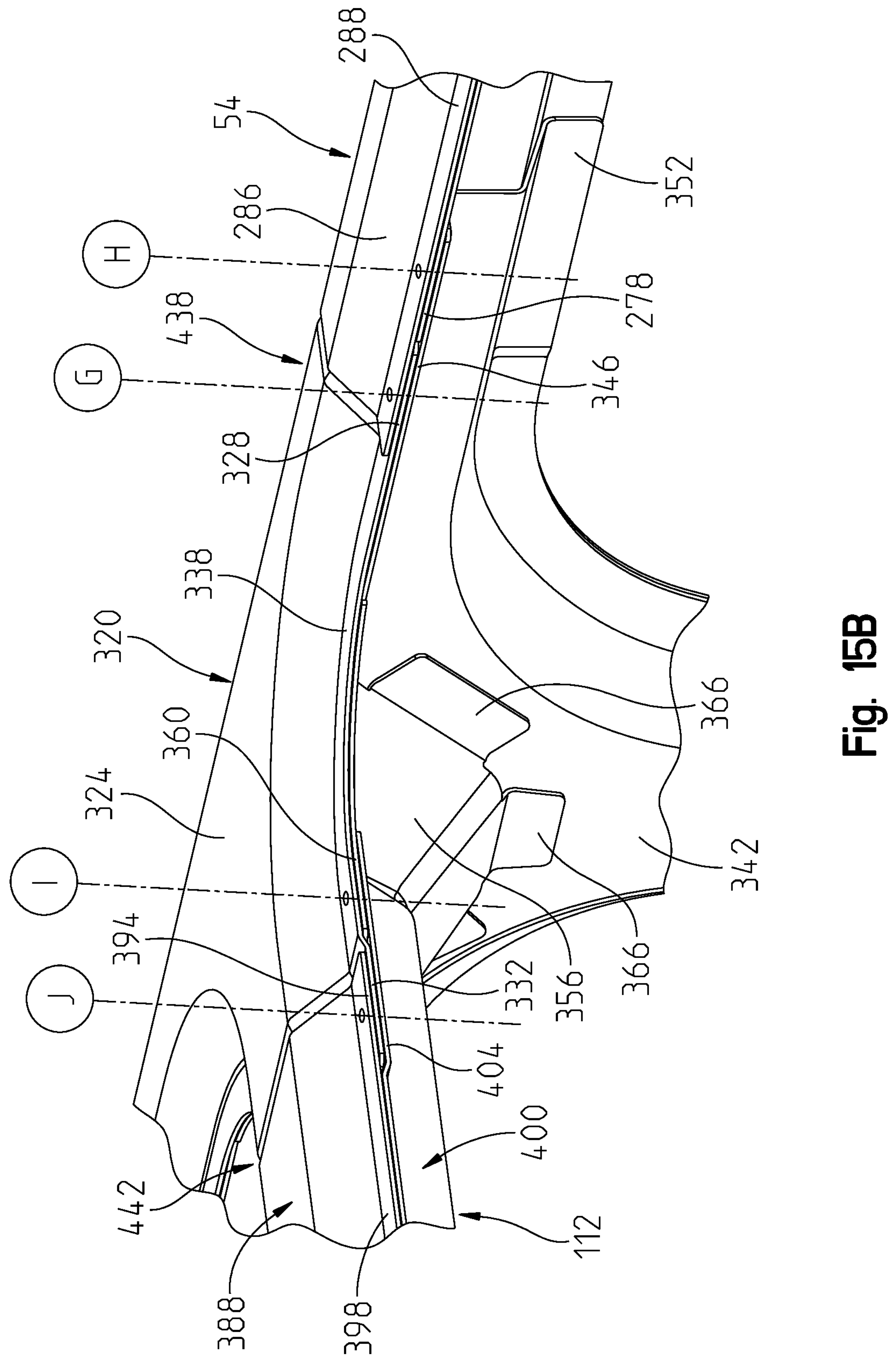
FIG. 15B is a perspective view of a joint member of the upper B-pillar portion of FIG. 15A.
Figure 15C:
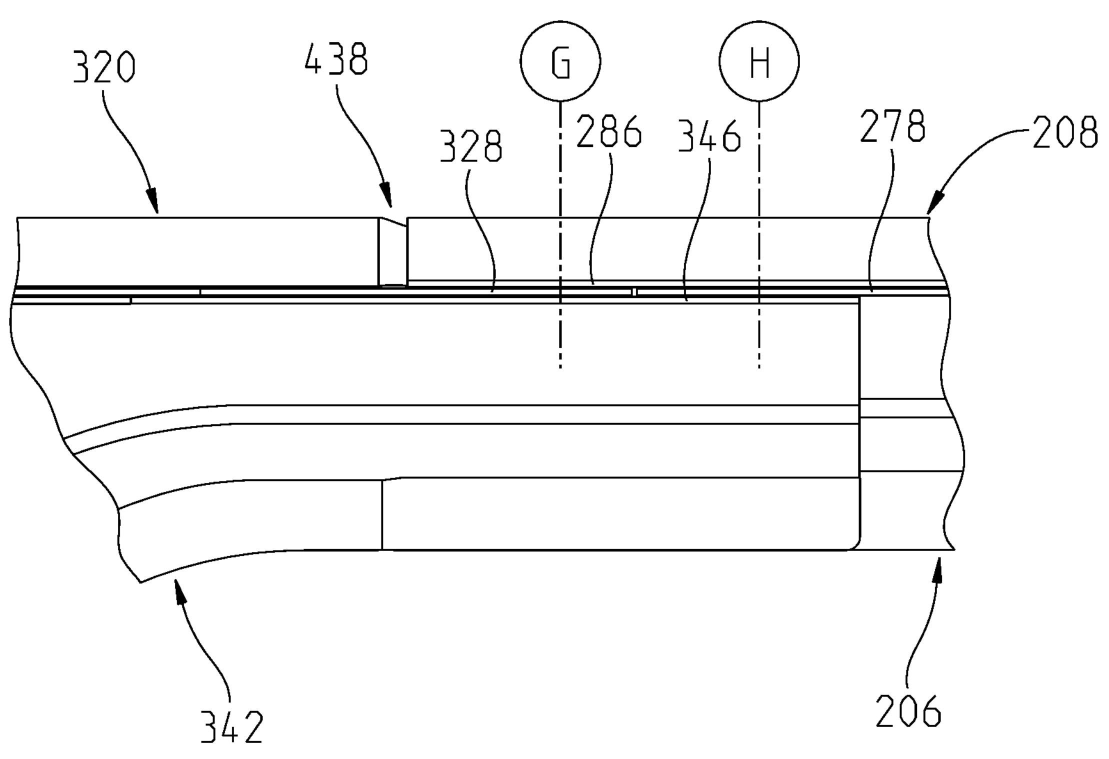
FIG. 15C is a side view of a lap joint of the joint member and a frame member of the upper B-pillar portion of FIG. 15A.
Figure 15D:
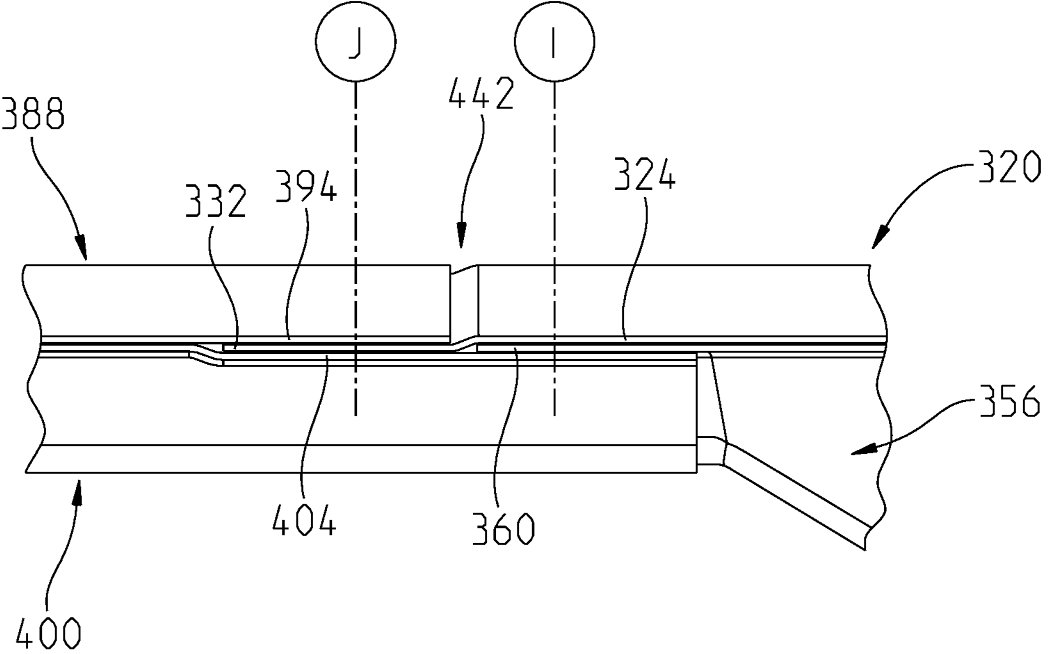
FIG. 15D is a side view of a lap joint of the joint member and a cross member of the upper B-pillar portion of FIG. 15A.
Figure 15E:
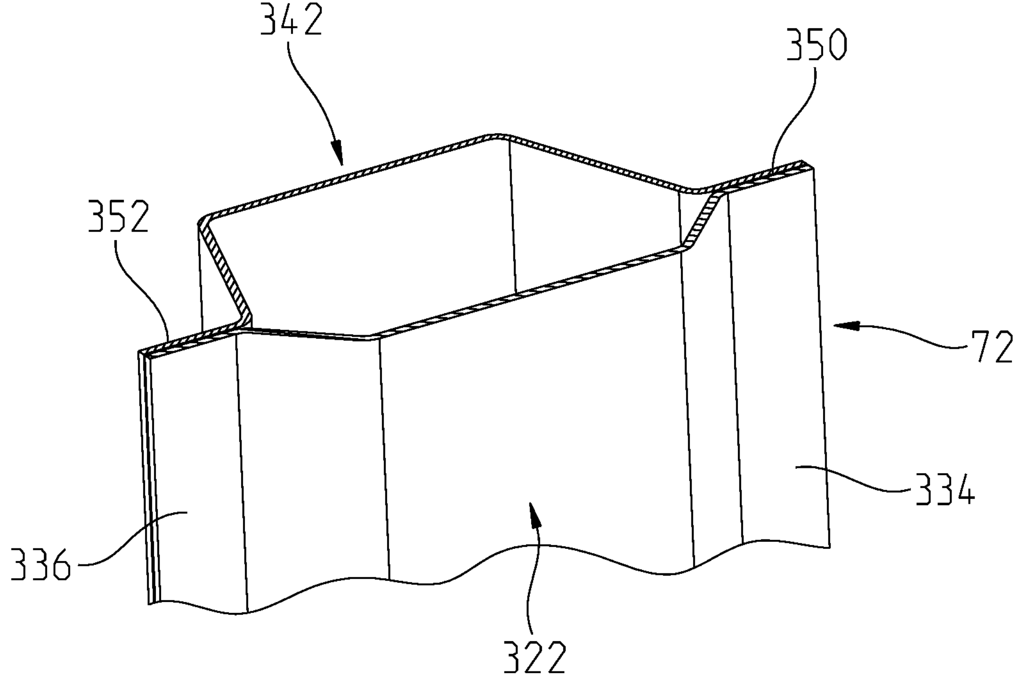
FIG. 15E is a cross-section of the B-pillar of the upper B-pillar portion of FIG. 15A, taken along line 15E-15E in FIG. 15A.

Referring to FIGS. 15B-15C, a seventh line 'G' extends through first mounting location 438 at a seventh location and extends orthogonal to a top surface of first edge 288. First mounting location 438 is configured such that line 'G' extends through each of second end portion 286 of first stamped frame piece 208, second end portion 328 of first stamped frame piece 320, and second end portion 346 of second stamped frame piece 342. Further, a line 'H' extends through first mounting location 438 at an eighth location and extends orthogonal to a top surface of first edge 288. First mounting location 438 is configured such that line 'H' extends through each of second end portion 286 of first stamped frame piece 208, second end portion 278 of second stamped frame piece 206, and second end portion 346 of second stamped frame piece 342.

Referring again to FIGS. 15A-18, upper B-pillar member 72 is configured to couple to first member 112 at a second mounting location 442 (FIG. 15A). In various embodiments, first member 112 includes a first stamped frame piece 388 and a second stamped frame piece 400. First stamped frame piece 388 includes a first end portion 390, a second end portion 394 generally opposite first end portion 390, a first edge 396 extending between first end portion 390 and second end portion 394, and a second edge 398 extending between first end portion 390 and second end portion 394 generally opposite first edge 396. A pair of apertures 392A are positioned adjacent first end portion 390. Second stamped frame piece 400 includes a first end portion 402, a second end portion 404 generally opposite first end portion 402, a first edge 406 extending between first end portion 402 and second end portion 404, and a second edge 408 extending between first end portion 402 and second end portion 404 generally opposite first edge 406. A pair of apertures 392B are positioned adjacent first end portion 402. First stamped frame piece 388 is coupled to second stamped frame piece 400, and in the various embodiments, first edge 396 is coupled to first edge 406 by a plurality of spot welds and second edge 398 is coupled to second edge 408 by a plurality of spot welds (i.e., similar to spot welds 231/235, FIG. 11B). In various embodiments, an adhesive may be placed between first edge 396 and first edge 406 and between second edge 398 and second edge 408. When first stamped frame piece 388 and second stamped frame piece 400 are coupled together, each of apertures 392A and apertures 392B are aligned such that a fastener may be inserted through each of apertures 392A and apertures 392B.

In various embodiments, a gusset bracket 356 (FIG. 15B) is coupled to each of first stamped frame piece 320, second stamped frame piece 342, and first member 112 to provide additional support at second mounting location 442. Bracket 356 includes a center portion 358 configured to sit within second end portion 404, a first extension 360 extending outwardly (i.e., forwardly) from center portion 358 and configured to sit within second edge 408. Similarly, a second extension 362 extends outwardly (i.e., rearwardly) from center portion 358 and is configured to sit within first edge 406. Illustratively, first extension 360 is coupled between each of second edge 408 and third edge 338 and configured with an arcuate portion configured to match with third edge 338 (FIG. 15B) and second extension 362 is coupled between each of first edge 406 and fourth edge 340 and configured with an arcuate portion configured to match with fourth edge 340. Bracket 356 further includes support frame portions 364 which extend outwardly from center portion 358 toward second stamped frame piece 342. A tab 366 extends outwardly from each of support frame portions 364 generally parallel to second stamped frame piece 342 and is configured to be fixed to second stamped frame piece 342 through a spot weld, an adhesive, another coupling method, or a combination thereof.

Referring again to FIGS. 15B and 15D, a ninth line ‘I’ extends through second mounting location 442 at a ninth location and extends orthogonally to a top surface of third edge 338. Second mounting location 442 is configured such that line ‘I’ extends through each of second portion 324 of first stamped frame piece 320, first extension 360 of gusset bracket 356, and second end portion 404 of second stamped frame piece 400. Further, a line ‘J’ extends through second mounting location 442 at a tenth location and extends orthogonally to a top surface of second edge 398. Second mounting location 442 is configured such that line ‘J’ extends through each of second end portion 394 of first stamped frame piece 388, fourth end portion 332 of first stamped frame piece 320, and second end portion 404 of second stamped frame piece 400.

Referring again to FIGS. 15A-18, upper B-pillar member 72 is configured to couple to frame member 56 at third mounting location 440. In the various embodiments, frame member 56 includes a first stamped frame piece 368 and a second stamped frame piece 378. First stamped frame piece 368 includes a first end portion 370 and a second end portion 372. A first edge 374 extends between first end portion 370 and second end portion 372, and a second edge 376 extends between first end portion 370 and second end portion 372 generally opposite first edge 374. Second stamped frame piece 378 includes a first end portion 380 and a second end portion 382. A first edge 384 extends between first end portion 380 and second end portion 382, and a second edge 386 extends between first end portion 380 and second end portion 382 generally opposite first edge 384. First stamped frame piece 368 and second end portion 372 are coupled together by a plurality of spot welds affixing first edge 374 and first edge 384 and a plurality of spot welds affixing second edge 376 and second edge 386 (i.e., similar to spot welds 231/235, FIG. 11B). In various embodiments, an adhesive is placed between first edge 374 and first edge 384 and between second edge 376 and second edge 386.

In various embodiments, third end portion 330 of first stamped frame piece 320 and third end portion 344 of second stamped frame piece 342 are configured to couple to second end portion 372 of first stamped frame piece 368 and second end portion 382 of second stamped frame piece 378. In various embodiments, at third mounting location 440, at least one of third end portion 330 and third end portion 344 is configured to overlap with at least one of second end portion 372 and second end portion 382. The overlapping pieces of third mounting location 440 are overlapped in substantially the same manner as the overlapping pieces of first mounting location 438.

Figure 17:
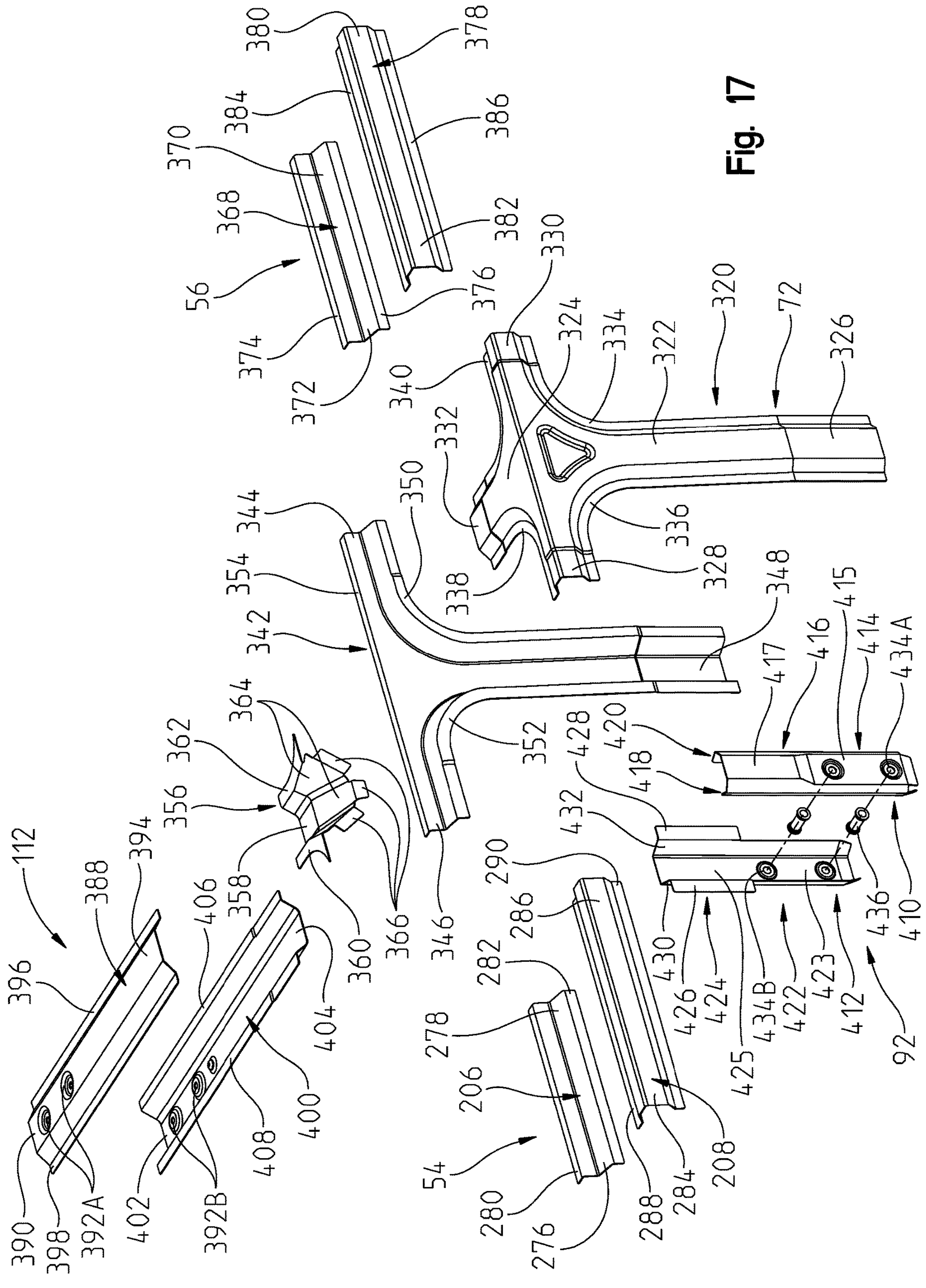
FIG. 17 is an exploded view of each member of the upper B-pillar portion of FIG. 15A.
Figure 18:
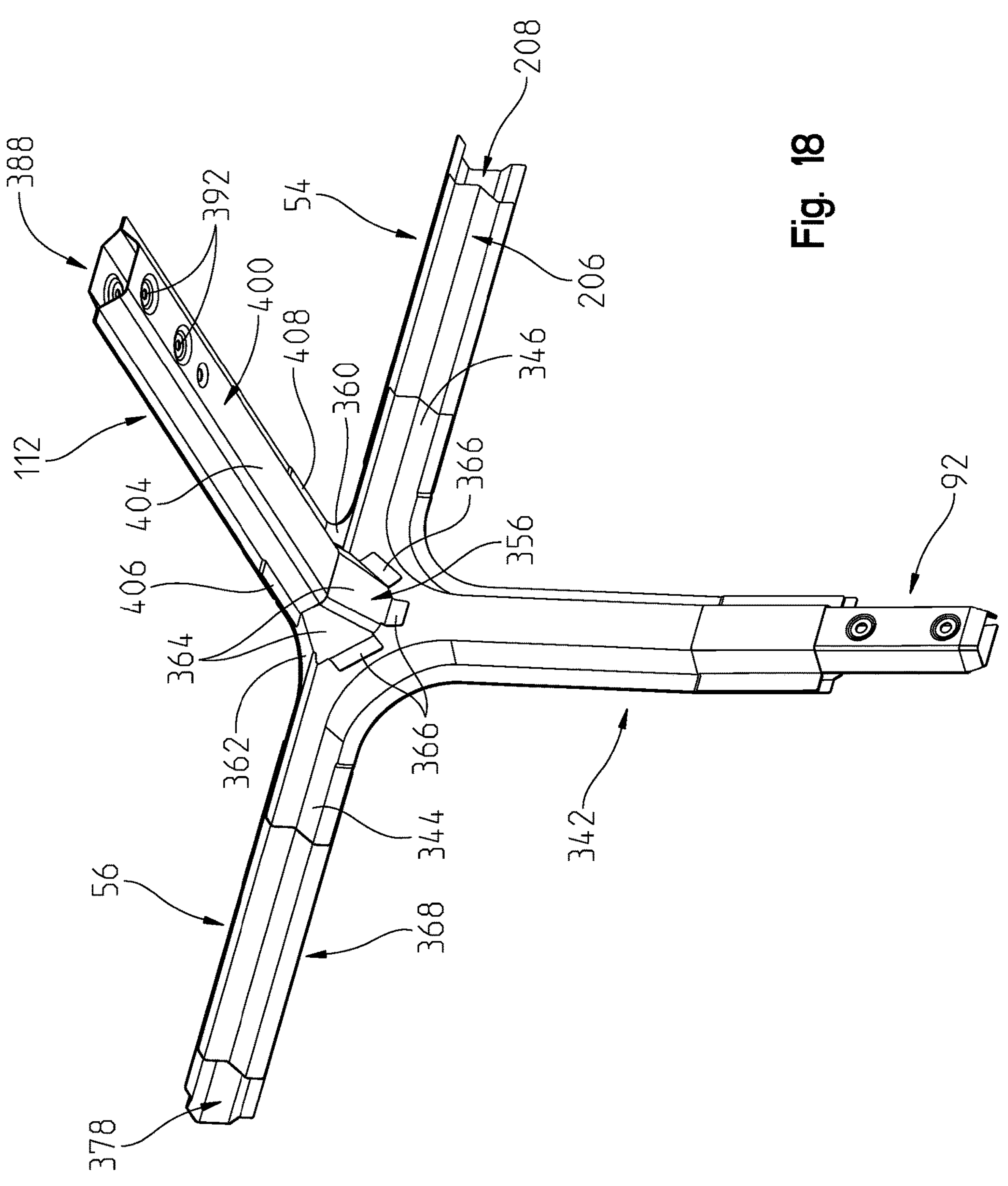
FIG. 18 is a rear right perspective view of the upper B-pillar portion of FIG. 15A.

Referring to FIG. 17, joiner 92 includes a first stamped frame piece 410 and a second stamped frame piece 412. In various embodiments, first stamped frame piece 410 includes a lower portion 414 with a lower face 415 and an upper portion 416 with an upper face 417. In various embodiments, lower face 415 and upper face 417 are not coplanar. That is, upper face 417 is offset from lower face 415. A first flange 418 extends outwardly from a first side of each of lower portion 414 and upper portion 416, and a second flange 420 extends outwardly from a second side of each of lower portion 414 and upper portion 416, generally opposite of first flange 418. A pair of apertures 434A are positioned along lower face 415. Second stamped frame piece 412 includes a lower portion 422 with a lower face 423 and an upper portion 424 with an upper face 425. In various embodiments, lower face 423 and upper face 425 are coplanar. That is, lower face 423 and upper face 425 extend along the same plane. In various embodiments, a pair of apertures 434B are positioned along lower face 423. A first flange 430 extends obliquely outwardly from a first side of each of lower face 423 and upper face 425 and a second flange 432 extends obliquely outwardly from a second side of each of lower face 423 and upper face 425 generally opposite first flange 430. A first tab 426 extends outwardly from first flange 430 and a second tab 428 extends outwardly from second flange 432. Illustratively, each of first flange 430 and second flange 432 are at an obtuse angle relative to lower face 423 and upper face 425 such that the first flange 418 and second flange 420 of first stamped frame piece 410 fit between first flange 430 and second flange 432. In various embodiments, the angle between first flange 418 and upper face 417 and the angle between upper face 425 and first flange 430 are supplementary angles. That is, flanges 430 and 418 are angled such that they are generally parallel when first stamped frame piece 410 and second stamped frame piece 412 are coupled together. When mounting location 140 and second stamped frame piece 412 are coupled together, each of apertures 434A and apertures 434B are aligned such that a fastener 614 (FIG. 29) can extend through each of apertures 434A and apertures 434B. Further, a pair of bushings 436 are configured to extend between apertures 434A and apertures 434B to provide additional support between first stamped frame piece 410 and second stamped frame piece 412. Fasteners 614 extend through each of apertures 434A, 434B and bushings 436.

In various embodiments, upper B-pillar member 74 of right portion 168 is constructed in substantially the same manner and way as upper B-pillar member 72 of left portion 166. That is upper B-pillar member 74 is configured to couple to seventh frame member 58 at a first mounting location 444 in the same way that upper B-pillar member 72 couples to fifth frame member 54 at first mounting location 438. Further, upper B-pillar member 74 is configured to couple to eighth frame member 60 at a second mounting location 446 in the same way that upper B-pillar member 72 couples to sixth frame member 56 at third mounting location 440. Further, upper B-pillar member 74 is configured to couple to second member 114 at a third mounting location 448 in the same way that upper B-pillar member 72 couples to first member 112 at second mounting location 442. Further, a generally continuous and flat surface is created around a first roof perimeter 460 defined by second edge 274 of first member 108, second edge 262 of left joint member 104, first edge 288 of fifth frame member 54, third edge 338 of upper B-pillar member 72, second edge 398 of first member 112, as well as an edge 450 (similar to second edge 398) on second member 114, an edge 452 (similar to third edge 338) on upper B-pillar member 74, an edge 454 (similar to first edge 288) on seventh frame member 58, an edge 456 (similar to second edge 262) on second joint member 106, and an edge 458 (similar to second edge 274) on second member 110.

Now referring to FIGS. 19A-22, upper C-pillar member 76 is configured to couple to frame member 56 at a first mounting location 536 and further configured to couple to first member 116 at a second mounting location 538. Upper C-pillar member 76 includes an outer stamped frame piece, or first stamped frame piece 462, and an inner stamped frame piece, or second stamped frame piece 464. First stamped frame piece 462 includes a first portion 466, a second portion 468, and a third portion 470. Illustratively, the second portion 468 is generally orthogonal to the first portion 466, and the third portion 470 is generally orthogonal to each of the first portion 466 and the second portion 468. In various embodiments, first stamped frame piece 462 is a unitary piece, and each of first portion 466, second portion 468, and third portion 470 are positioned orthogonal to each other during the stamping process. First stamped frame piece 462 further includes a first end portion 472, a second end portion 474, and a third end portion 476. A first edge 478 extends between first end portion 472 and second end portion 474, a second edge 480 extends between second end portion 474 and third end portion 476, and a third edge 482 extends between third end portion 476 and first end portion 472.

Second stamped frame piece 464 includes a first portion 484 generally parallel to first portion 466 of first stamped frame piece 462, a second portion 486 generally parallel to second portion 468 of first stamped frame piece 462, and a third portion 488 generally parallel to third portion 470 of first stamped frame piece 462. Second stamped frame piece 464 includes a first end portion 490 and a second end portion 492. A third end portion 487 is positioned at a generally upper end of, and extends outwardly from second portion 486, and a fourth end portion 489 extends outwardly from third portion 488. A first edge 494 extends between first end portion 490 and second end portion 492, a second edge 496 extends between second end portion 492 and fourth end portion 489, and a third edge 497 extends between third end portion 487 and first end portion 490. In various embodiments, first stamped frame piece 462 and second stamped frame piece 464 are coupled together by a plurality of spot welds affixing first edge 494 and first edge 478 (i.e., similar to spot welds 231/235, FIG. 11B), a plurality of spot welds affixing second edge 496 and second edge 480 (i.e., similar to spot welds 231/235, FIG. 11B), and a plurality of spot welds affixing third edge 497 and third edge 482 (i.e., similar to spot welds 231/235, FIG. 11B). In various embodiments, an adhesive may be placed between first edge 494 and first edge 478, between second edge 496 and second edge 480, and between third edge 497 and third edge 482.

A gusset bracket 498 (FIGS. 19B and 20) may be coupled to either, or both of, first stamped frame piece 462 and second stamped frame piece 464, to increase the rigidity of upper C-pillar member 76 and/or the connection between upper C-pillar member 76 and first member 116. In various embodiments, gusset bracket 498 a primary face 500, an extension 502 extending outwardly from primary face 500 at an angle relative to primary face 500. Gusset bracket 498 also includes a plurality of tabs 504A extending outwardly from primary face 500 and a tab 504B extending outwardly from extension 502. Illustratively, tabs 504A are configured to couple to first portion 484 of second stamped frame piece 464 by one or more spot welds, an adhesive, or another coupling method. Further, each of extension 502 and tab 504B are configured to couple with first member 116.

Referring still to FIGS. 19A-22, first member 116 includes an outer stamped frame piece, or first stamped frame piece 506 and an inner stamped frame piece, or second stamped frame piece 508. First stamped frame piece 506 includes a first portion 510 extending generally horizontally and a second portion 514 extending generally orthogonal to the first portion 510. Second portion 514 is coupled to first portion 510. First stamped frame piece 506 also includes a first end portion 518 and a second end portion 520 disposed opposite of first end portion 518. A first edge 512 extends along first portion 510 between first end portion 518 and second end portion 520 at a generally forward portion of first stamped frame piece 506 and a second edge 516 extends along second portion 514 between first end portion 518 and second end portion 520 at a generally rearward portion of first stamped frame piece 506. A pair of apertures 522A are positioned adjacent the second end portion 520.

Second stamped frame piece 508 includes a first face 524 and a second face 526 coupled to the first face 524. Second stamped frame piece 508 includes a first end portion 534 and a second end portion 532 disposed opposite of first end portion 534. A first edge 528 extends along second face 526 between first end portion 534 and second end portion 532 at a generally forward position of second stamped frame piece 508 and a second edge 530 extends along first face 524 between first end portion 534 and second end portion 532 at a generally rearward position of second stamped frame piece 508. A pair of apertures 522B are positioned adjacent second end portion 532.

In various embodiments, first stamped frame piece 506 is configured to couple to second stamped frame piece 508 by a plurality of spot welds (i.e., similar to spot welds 231/235, FIG. 11B) affixing first edge 512 and first edge 528 and a plurality of spot welds affixing second edge 530 and second edge 516. In various embodiments, an adhesive is placed between first edge 512 and first edge 528 and between second edge 530 and second edge 516. Further when first stamped frame piece 506 is coupled to second stamped frame piece 508, first portion 510 is generally parallel to first end portion 534 and apertures 522A and apertures 522B are vertically aligned allowing a fastener (not shown) to pass through apertures 522A and apertures 522B.

Referring still to FIGS. 19A-22, upper C-pillar member 76 is coupled to frame member 56 at first mounting location 536 which is configured so that at least one of second end portion 474 of first stamped frame piece 462 and second end portion 492 of second stamped frame piece 464 overlaps at least one of first end portion 380 of second stamped frame piece 378 and first end portion 370 of first stamped frame piece 368. In various embodiments, an eleventh line 'K' extends through first mounting location 536 generally orthogonally to a top surface of first edge 384 at an eleventh location, and line 'K' extends through each of first end portion 380 of second stamped frame piece 378, second end portion 474 of first stamped frame piece 462, and second end portion 492 of second stamped frame piece 464. Further, a twelfth line 'L' extends through first mounting location 536 generally orthogonally to a top surface of first edge 384 at a twelfth location, and line 'L' extends through each of first end portion 380 of second stamped frame piece 378, first end portion 370 of first stamped frame piece 368, and second end portion 492 of second stamped frame piece 464. First mounting location 536 is a lap joint and a plurality of spot welds (i.e., similar to spot welds 231/235, FIG. 11B) and/or adhesive couple each of first end portion 380, second end portion 474, and second end portion 492 and also couple first end portion 380, first end portion 370, and second end portion 492. Further, upper C-pillar member 76 is coupled to first member 116 at second mounting location 538 and second mounting location 538 is configured so that at least one of first end portion 518 and first end portion 534 overlaps at least one of third portion 488 and third end portion 476. In various embodiments, a thirteenth line 'M' extends through second mounting location 538 generally orthogonally to a top surface of second edge 480 at a thirteenth location, and line 'M' extends through each of third portion 470 of first stamped frame piece 462, third portion 488 of second stamped frame piece 464, and first end portion 534 of second stamped frame piece 508. Further, a fourteenth line 'N' extends through second mounting location 538 generally orthogonally to a top surface of first edge 512 at a fourteenth location, and line 'N' extends through each of first end portion 518 of first stamped frame piece 506, third end portion 476 of first stamped frame piece 462, and first end portion 534 of second stamped frame piece 508. Second mounting location 538 is a lap joint and a plurality of spot welds (i.e., similar to spot welds 231/235, FIG. 11B) and/or adhesive couple each of third portion 470, third portion 488, and first end portion 534 and also couple first end portion 518, third end portion 476, and first end portion 534.

Still referring to FIGS. 19A-22, gusset bracket 498 is configured to couple to, and extend between, second stamped frame piece 464 and first end portion 534. Illustratively, tabs 504A are configured to couple to first portion 484 of second stamped frame piece 464 by a plurality of spot welds and/or adhesive. Further, tab 504B is configured to couple to second face 526 and extension 502 is configured to couple to first end portion 534 through a plurality of spot welds (i.e., similar to spot welds 231/235, FIG. 11B) and/or adhesive. Gusset bracket 498 is configured to provide additional support to second mounting location 538.

Figure 21:
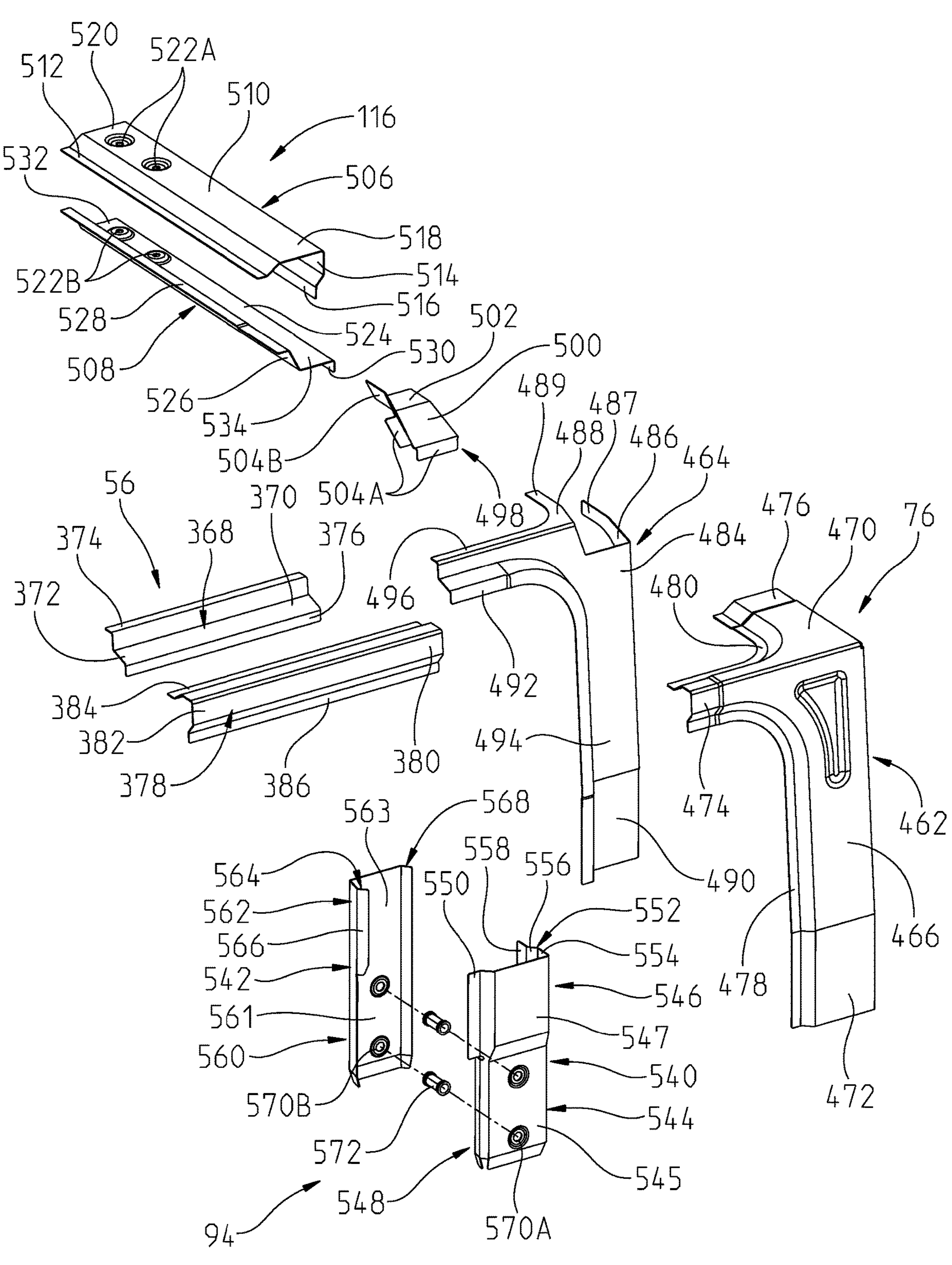
FIG. 21 is an exploded view of each member of the upper C-pillar portion of FIG. 19A.
Figure 22:
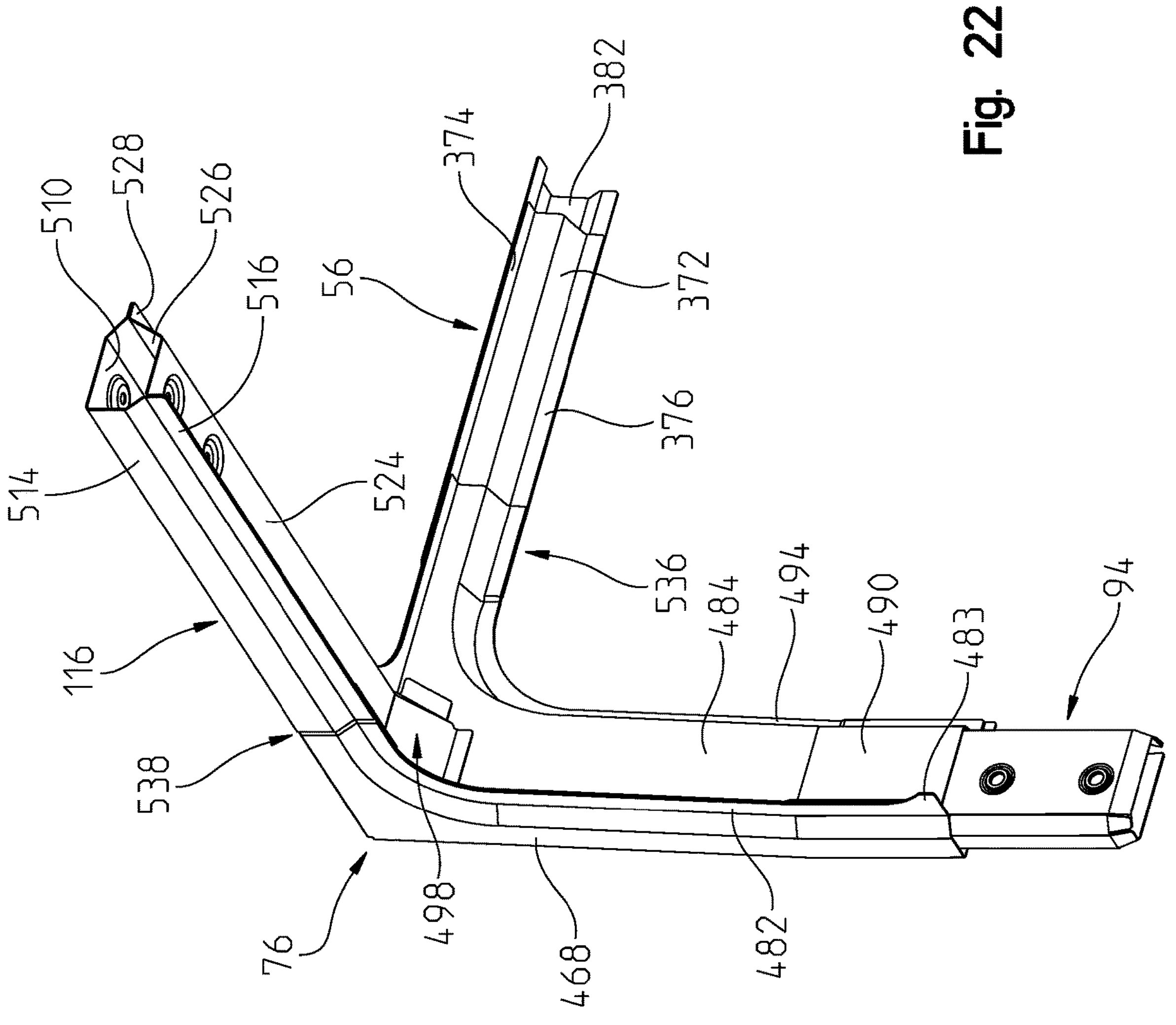
FIG. 22 is a rear right perspective view of the upper C-pillar portion of FIG. 19A.

Referring now to FIG. 21, third joiner 94 includes an outer stamped frame piece, or first stamped frame piece 540 and an inner stamped frame piece, or second stamped frame piece 542. In various embodiments, third joiner 94 is substantially similar to joiner 92 but has a different cross section to accommodate upper C-pillar member 76. That is, first stamped frame piece 540 includes a lower portion 544 with a lower face 545 and an upper portion 546 with an upper face 547. In various embodiments, lower face 545 and upper face 547 do not extend along the same plane. That is, upper face 547 is offset from lower face 545. A first flange 548 extends outwardly from a first side of each of lower portion 544 and upper portion 546 and a second flange 552 extends outward from a second side of each of lower portion 544 and upper portion 546. First flange 548 includes a tab 550 extending outwardly from first flange 548 generally parallel to upper face 547. Second flange 552 includes a first portion 554 extending outwardly from, and generally orthogonal to, lower face 545 and upper face 547. A second portion 556 extends outwardly from, and generally obliquely relative to first portion 554. A tab 558 extends outwardly from second flange 552 generally orthogonal to upper face 547. In various embodiments, tab 558 extends generally orthogonally relative to tab 550. Further, a pair of apertures 570A are positioned within lower portion 544 on lower face 545.

Second stamped frame piece 542 includes a lower portion 560 with a lower face 561 and an upper portion 562 with an upper face 563. In various embodiments, lower face 561 and upper face 563 extend along the same plane. A first flange 564 extends outwardly from a first side of each of lower portion 560 and upper portion 562. In various embodiments, first flange 564 extends outwardly generally orthogonally relative to lower face 561 and upper face 563. A tab 566 extends outwardly from, and obliquely relative to, first flange 564. Second stamped frame piece 542 also includes a second flange 568 which extends outwardly from a second side of each of lower portion 560 and upper portion 562 generally opposite of first flange 564. A pair of apertures 570B are positioned within lower portion 560 on lower face 561. Further, a pair of bushings 572 are configured to extend between apertures 570A and 570B. Bushings 572 are configured to provide additional support to third joiner 94. A plurality of fasteners 616 (FIG. 30) are configured to extend through apertures 570A, 570B and bushings 572.

Still referring to FIG. 21, tab 566 and first flange 548 are angled so that when first stamped frame piece 540 and second stamped frame piece 542 are coupled together, tab 566 sits along first flange 548. A plurality of spot welds (i.e., similar to spot welds 231/235, FIG. 11B) and/or adhesive may be placed between, and couple together tab 566 and first flange 548. Further, second flange 568 and second portion 556 are angled so that when first stamped frame piece 540 and second stamped frame piece 542 are coupled together, second flange 568 sits along second portion 556. A plurality of spot welds and/or adhesive may be placed between, and couple together second flange 568 and second portion 556. Further, in various embodiments, when first stamped frame piece 540 and second stamped frame piece 542 are coupled together, and third joiner 94 is positioned within upper C-pillar member 76, each of tab 550 and tab 558 are configured to sit between first end portion 472 and first end portion 490. A plurality of spot welds and/or adhesive may be placed between, and couple together tab 550 of first stamped frame piece 540, first end portion 490 of second stamped frame piece 464, and first end portion 472 of first stamped frame piece 462 as well as tab 558 of first stamped frame piece 540, first end portion 490 of second stamped frame piece 464, and first end portion 472 of first stamped frame piece 462.

In various embodiments, upper C-pillar member 78 of C-pillar 18 is constructed in a substantially similar way to upper C-pillar member 76 of C-pillar 16. That is, upper C-pillar member 78 is coupled to eighth frame member 60 with a lap joint at a first mounting location 576 in a similar manner that upper C-pillar member 76 is coupled to frame member 56 at first mounting location 536, and upper C-pillar member 78 is coupled to second member 118 with a lap joint at a second mounting location 578 in a similar manner that upper C-pillar member 76 is coupled to first member 116.

As best seen in FIG. 10, each of first joiner 160, second joiner 162, and third joiner 164 are configured to couple between left portion 166 and right portion 168 of upper frame assembly 4. Referring now to FIGS. 23-26, third joiner 164 is exemplary of each of first joiner 160, second joiner 162, and third joiner 164. However, in various embodiments, first joiner 160, second joiner 162, and third joiner 164 may be constructed with varying cross-sections, lengths, or other geometric shapes. Illustratively, third joiner 164 includes a first stamped frame piece 580 and a second stamped frame piece 582. First stamped frame piece 580 includes an outer face 584, a first flange 586 extending downwardly from a first side of outer face 584, and a second flange 588 extending downwardly from a second side of outer face 584, generally opposite first flange 586. A first plurality of tabs 590 extend outwardly from a third side of outer face 584, and a second plurality of tabs 592 extend outwardly from a fourth side of outer face 584, generally opposite tabs 590. A plurality of apertures 188A, 192A are positioned along outer face 584.

Second stamped frame piece 582 includes an outer face 594, a first flange 596 extending upwardly from a first side of outer face 594, and a second flange 598 extending upwardly from a second side of outer face 594 generally opposite of first flange 596. A first plurality of tabs 600 extend outwardly from a third side of outer face 594, and a second plurality of tabs 602 extend outwardly from a fourth side of outer face 594, generally opposite of tabs 600. A plurality of apertures 188B, 192B are positioned along outer face 594 and are configured to align with apertures 188A, 192A.

Still referring to FIGS. 23-26, first stamped frame piece 580 is configured to couple to second stamped frame piece 582 by a plurality of spot welds and/or adhesive between first flange 586 and first flange 596 and a plurality of spot welds and/or adhesive between second flange 588 and second flange 598. In various embodiments, a plurality of spot welds and/or adhesive may be between tabs 590 and tabs 600 and between tabs 592 and tabs 602. A plurality of bushings 604 are configured to extend between apertures 188A and apertures 188B and between apertures 192A and apertures 192B. Bushings 604 are configured to increase the rigidity and strength of third joiner 164 when assembled.

In various embodiments, second member 118 includes an outer stamped frame piece 610 (similar to first stamped frame piece 506) and an inner stamped frame piece 612 (similar to second stamped frame piece 508). Third joiner 164 is inserted into first member 116 between outer stamped frame piece 610 and inner stamped frame piece 612 to a position where apertures 192 are aligned with apertures 190. A plurality of fasteners 606 are configured to extend through apertures 190, apertures 192, and bushings 604. In various embodiments, a nut 608 is configured to secure fasteners 606 to second member 118. Following third joiner 164 being coupled to second member 118, first member 116 may slide over, or otherwise into engagement with, third joiner 164 so that third joiner 164 is positioned between first stamped frame piece 506 and second stamped frame piece 508 of first member 116. In the appropriately assembled configuration, each of first member 116 and second member 118 are aligned. When properly aligned, apertures 186 align with apertures 188 and a plurality of fasteners 606 are configured to extend through apertures 186, apertures 188, and bushings 604. In various embodiments, a nut 608 is configured to secure fasteners 606 to first member 116. In various embodiments, third joiner 164 is inserted into, and coupled to second member 118, and afterwards first member 116 is positioned over third joiner 164.

In the same way third joiner 164 couples between first member 116 and second member 118, first joiner 160 (FIG. 10) is configured to couple between first member 108 and second member 110 and second joiner 162 (FIG. 10) is configured to couple between first member 112 and second member 114.

Referring now to FIG. 8, upper frame assembly 4 is coupled, or joined, to lower frame assembly 6 at each of first mounting location 128 on A-pillar 8, second mounting location 134 on second A-pillar 10, third mounting location 140 on first B-pillar 12, fourth mounting location 146 on second B-pillar 14, fifth mounting location 152 on first C-pillar 16, and sixth mounting location 158 on second C-pillar 18. Illustratively, a first joiner 92 is coupled between upper B-pillar member 72 and lower B-pillar member 84 and a second joiner 92 is coupled between upper B-pillar member 74 and lower B-pillar member 86. Further, third joiner 94 is coupled between upper C-pillar member 76 and lower C-pillar member 88 and fourth joiner 95 is coupled between upper C-pillar member 78 and lower C-pillar member 90.

Figure 27A:
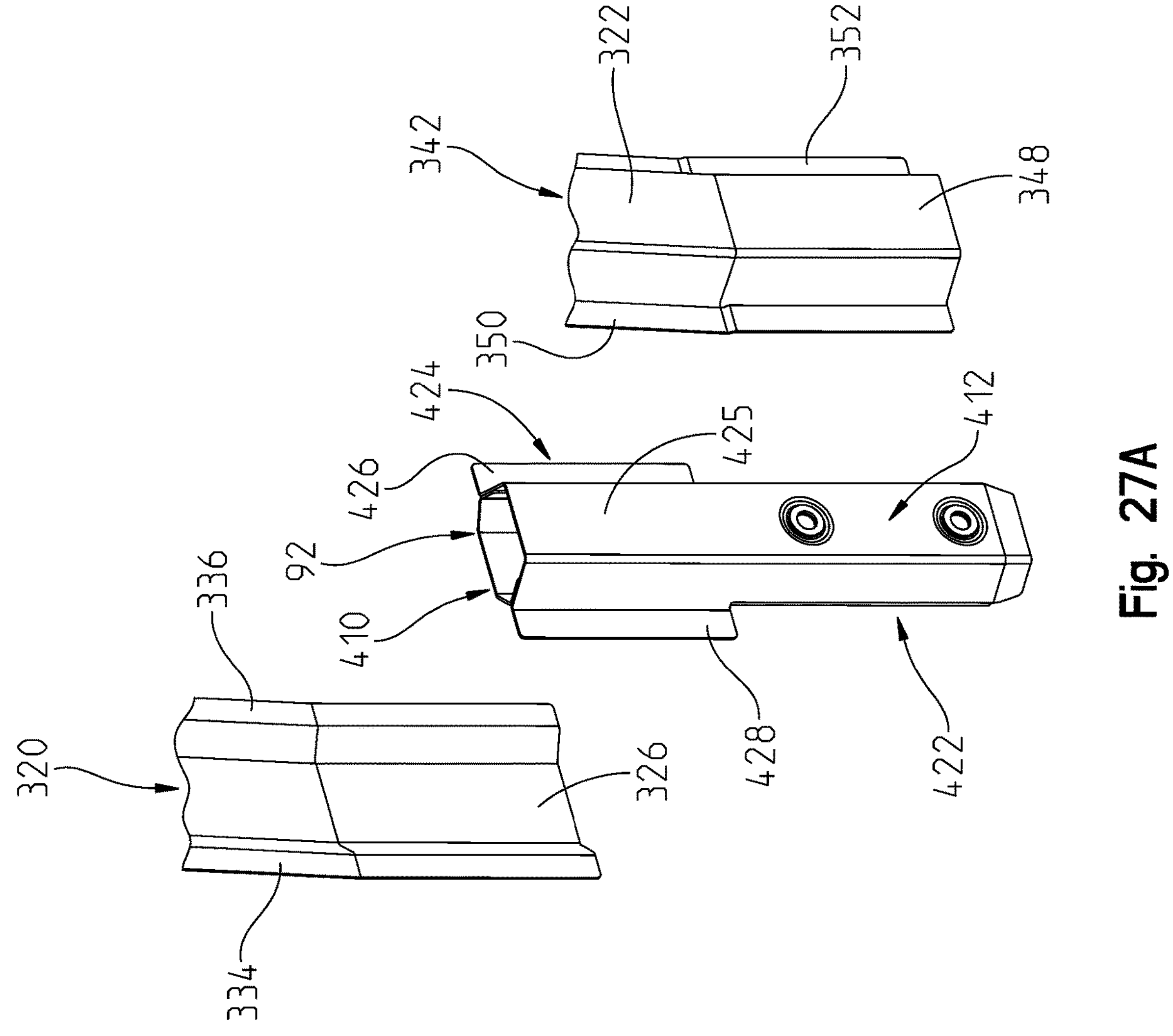
FIG. 27A is a perspective view of a joiner of the upper frame assembly of FIG. 9 prepared to be coupled to the upper frame assembly.
Figures 27B, 27C:
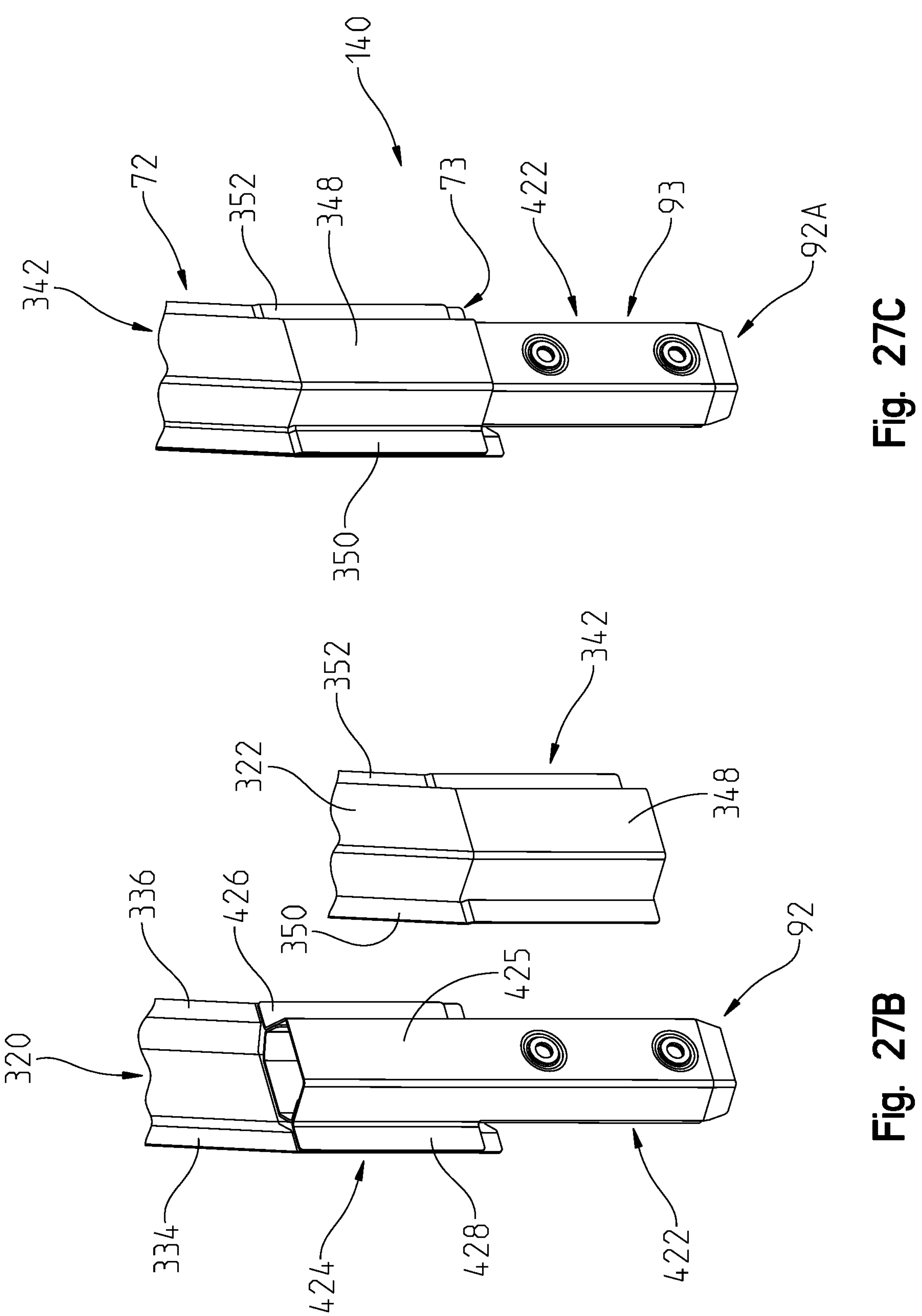
FIG. 27B is a perspective view of the joiner of FIG. 27A coupled to a portion of the upper frame assembly of FIG. 9.
FIG. 27C is a perspective view of the joiner of FIG. 27A coupled to the upper frame assembly of FIG. 9.
Figure 28:
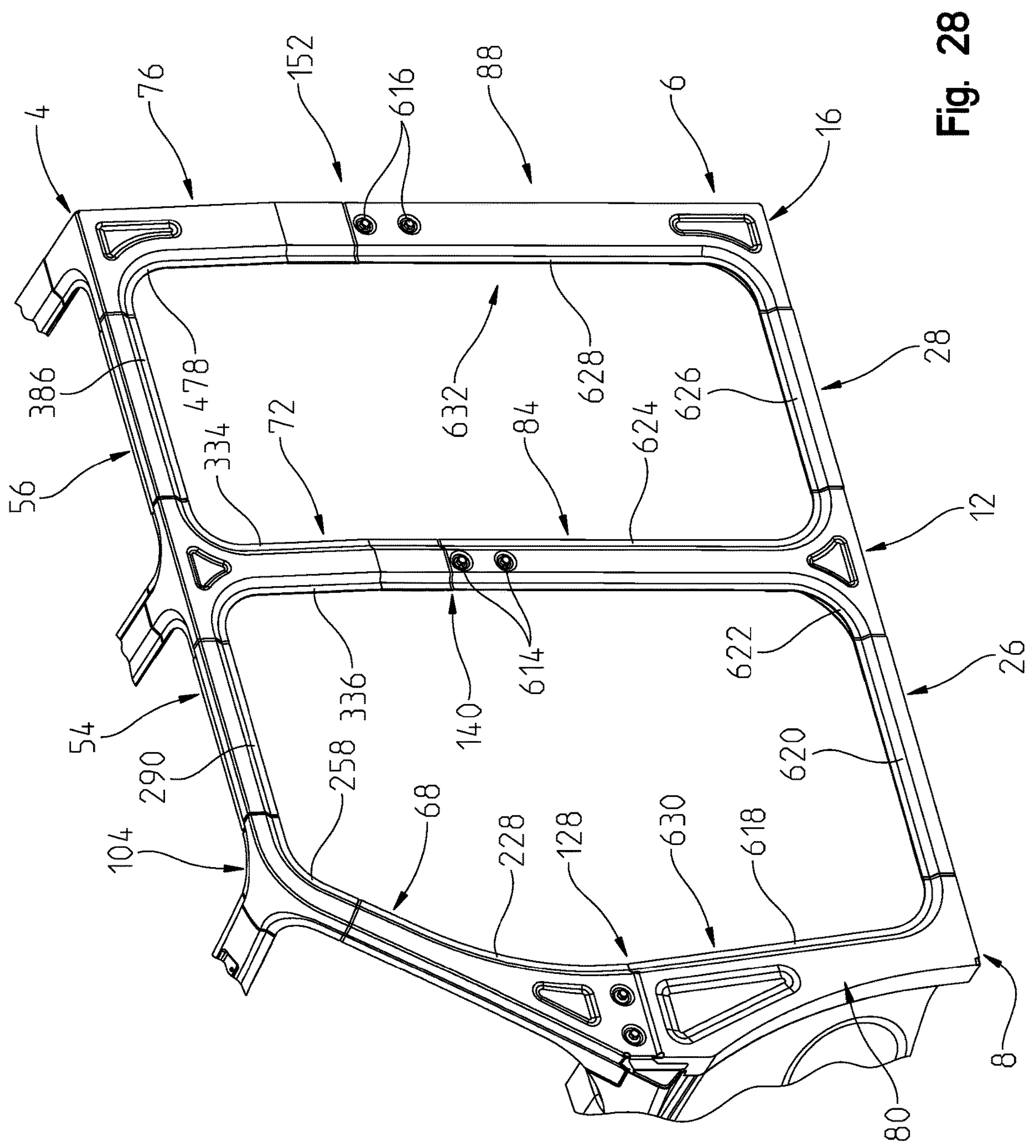
FIG. 28 is a perspective view of a door ring of the frame assembly of FIG. 1.

Referring now to FIGS. 27A-27C, joiner 92 may be coupled to upper B-pillar member 72 before being coupled to both upper B-pillar member 72 and lower B-pillar member 84. As shown in FIG. 27A, in various embodiments, joiner 92 is configured to be coupled to each of first stamped frame piece 320 and second stamped frame piece 342 before or during assembly of upper B-pillar member 72. As shown in FIG. 27B, joiner 92 may be first coupled to first stamped frame piece 320. In various embodiments, first tab 426 interfaces with second edge 336 and second tab 428 interfaces with first edge 334. Joiner 92 may be coupled to first stamped frame piece 320, at first end portion 326, by a plurality of spot welds and/or adhesive between first edge 334 and second tab 428 and a plurality of spot welds and/or adhesive between first tab 426 and second edge 336. Subsequently, second stamped frame piece 342 may be placed in alignment with first stamped frame piece 320 such that joiner 92 is positioned intermediate each of first end portion 326 of first stamped frame piece 320 and first end portion 348 of second stamped frame piece 342. Further, first edge 350 of second stamped frame piece 342 aligns with second tab 428 of joiner 92 and first edge 334 of first stamped frame piece 320, and second edge 352 of second stamped frame piece 342 aligns with first tab 426 of joiner 92 and second edge 336 of first stamped frame piece 320. In various embodiments, a plurality of spot welds and/or adhesive may extend through each of first edge 350, second tab 428, and first edge 334 and a plurality of spot welds may extend through each of second edge 352, first tab 426, and second edge 336. As best seen in FIG. 27C, when joiner 92 is coupled to upper B-pillar member 72, a lower portion 92A of joiner 92 extends below a bottom extent 73 of upper B-pillar member 72.

Now referring to FIGS. 28-31, each of first joiner 92 is coupled to upper B-pillar member 72, the second joiner 93 is coupled to upper B-pillar member 74, the first third joiner 94 is coupled to upper C-pillar member 76, and the fourth joiner 95 is coupled to upper C-pillar member 78. Further, upper frame assembly 4 is configured to be set upon lower frame assembly 6 so that the lower portion 414 of the first joiner 92 extends downwardly into aperture 96 of lower B-pillar member 84, the lower portion (i.e., similar to lower portion 414 of first joiner 92) of the second joiner 93 extends downwardly into aperture 98 of lower B-pillar member 86, the lower portion 544 of first third joiner 94 extends downwardly into aperture 100 of lower C-pillar member 88 and the lower portion (i.e., similar to lower portion 544 of first third joiner 94) of the second third joiner 94 extends downwardly into aperture 102 of lower C-pillar member 90.

Figure 29:
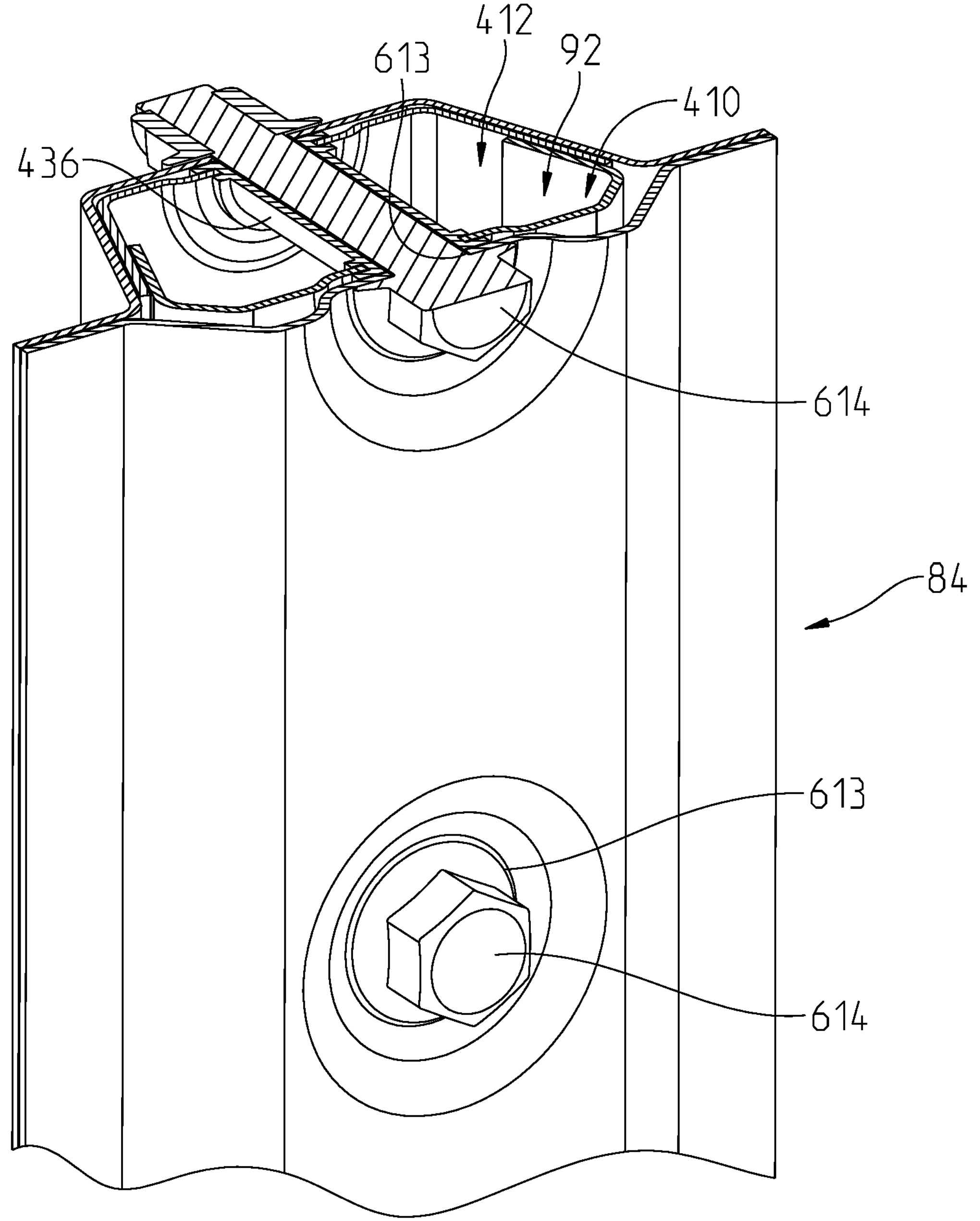
FIG. 29 is a cross-section view through a joint in the B-pillar coupled between the upper frame assembly and lower frame assembly of FIG. 8, taken along line 29-29 in FIG. 1, showing the joiner of FIG. 27A.

Referring to FIG. 29, when the first joiner 92 is inserted into aperture 96 of lower B-pillar member 84, a plurality of fasteners 614 are configured to extend through a pair of apertures 613 in lower B-pillar member 84, apertures 434 of joiner 92 and bushings 436. That is, each of lower B-pillar member 84, joiner 92, and upper B-pillar member 72 are coupled together by fasteners 614. A similar coupling process is used for coupling the second joiner 93 between the upper B-pillar member 74 and lower B-pillar member 86.

Figure 30:
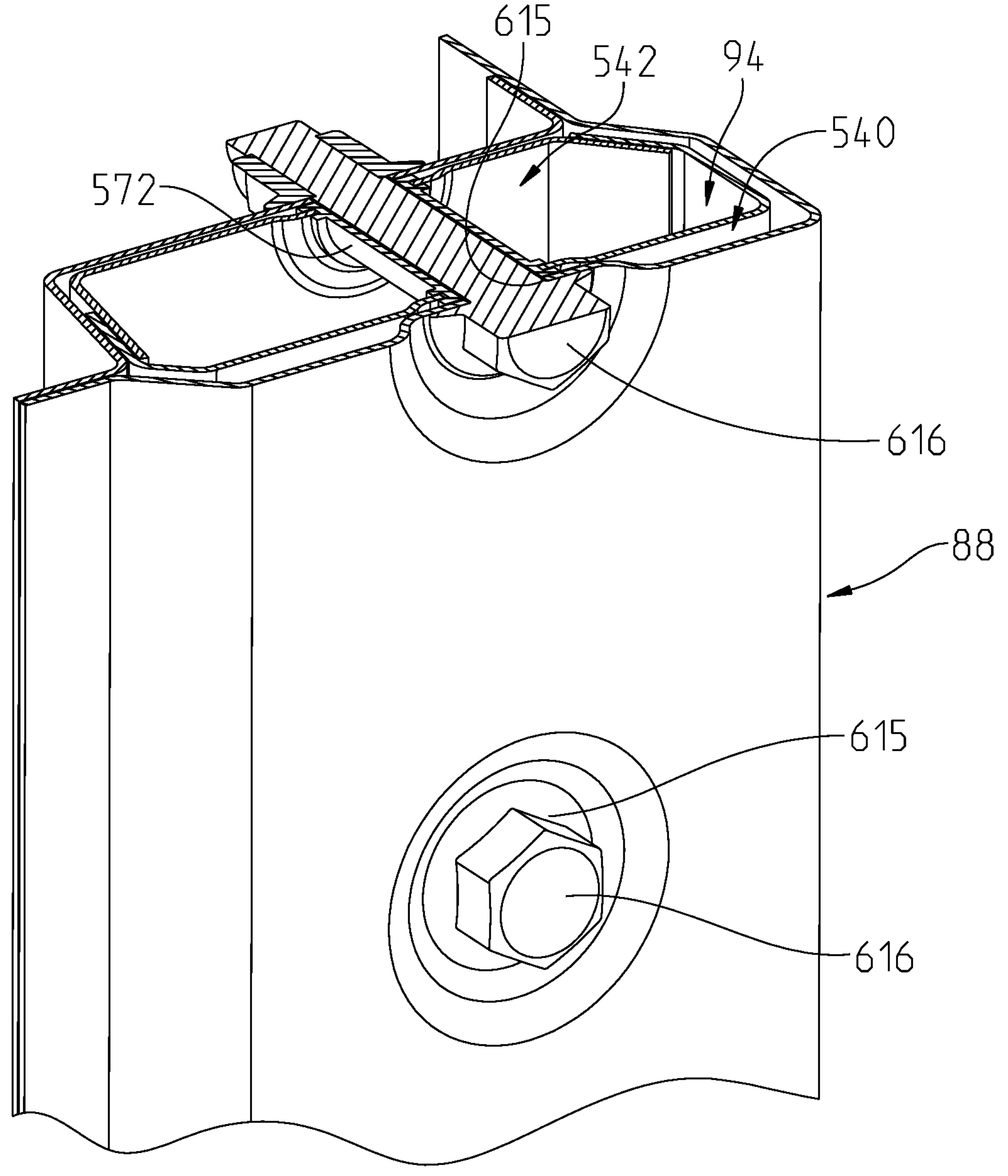
FIG. 30 is a cross-section view through a joint in the C-pillar coupled between the upper frame assembly and lower frame assembly of FIG. 8, taken along line 30-30 in FIG. 1.

Referring to FIG. 30, when the first third joiner 94 is inserted into lower C-pillar member 88, a plurality of fasteners 616 are configured to extend through a pair of apertures 615 in lower C-pillar member 88, apertures 570 of third joiner 94, and bushings 572. That is, each of lower C-pillar member 88, third joiner 94, and upper C-pillar member 76 are coupled together by fasteners 616. A similar coupling process is used for coupling the fourth joiner 95 between the upper C-pillar member 78 and lower C-pillar member 90.

In various embodiments, any or all of joiners 92, 93, 94, 95 may be permanently coupled to upper frame assembly 4 and selectively coupled to lower frame assembly 6. In various embodiments, any or all of joiners 92, 93, 94, 95 may be permanently coupled to lower frame assembly 6 and selectively coupled to upper frame assembly 4. In various embodiments, any or all of joiners 92, 93, 94, 95 may be selectively or permanently coupled to each of upper frame assembly 4 and lower frame assembly 6.

As illustrated in FIGS. 27A-30, joiners 92, 93, 94, 95 are coupling assemblies between upper frame assembly 4 and lower frame assembly 6. In various embodiments, joiners 92, 93, 94, 95 are registration features between upper frame assembly 4 and lower frame assembly 6, allowing for simpler assembly of upper frame assembly 4 onto lower frame assembly 6. In various embodiments, there are six locations for coupling upper frame assembly 4 to lower frame assembly 6, and two locations are configured for directly bolting upper frame assembly 4 to lower frame assembly 6 and four locations are configured to have joiners 92, 93, 94, 95 coupled between upper frame assembly 4 and lower frame assembly 6. That is, a plurality of the mounting locations (e.g., four mounting locations) have indirect couplings between upper frame assembly 4 and lower frame assembly 6 and a plurality of the mounting locations (e.g., two mounting locations) have direct couplings between upper frame assembly 4 and lower frame assembly 6.

Figure 31:
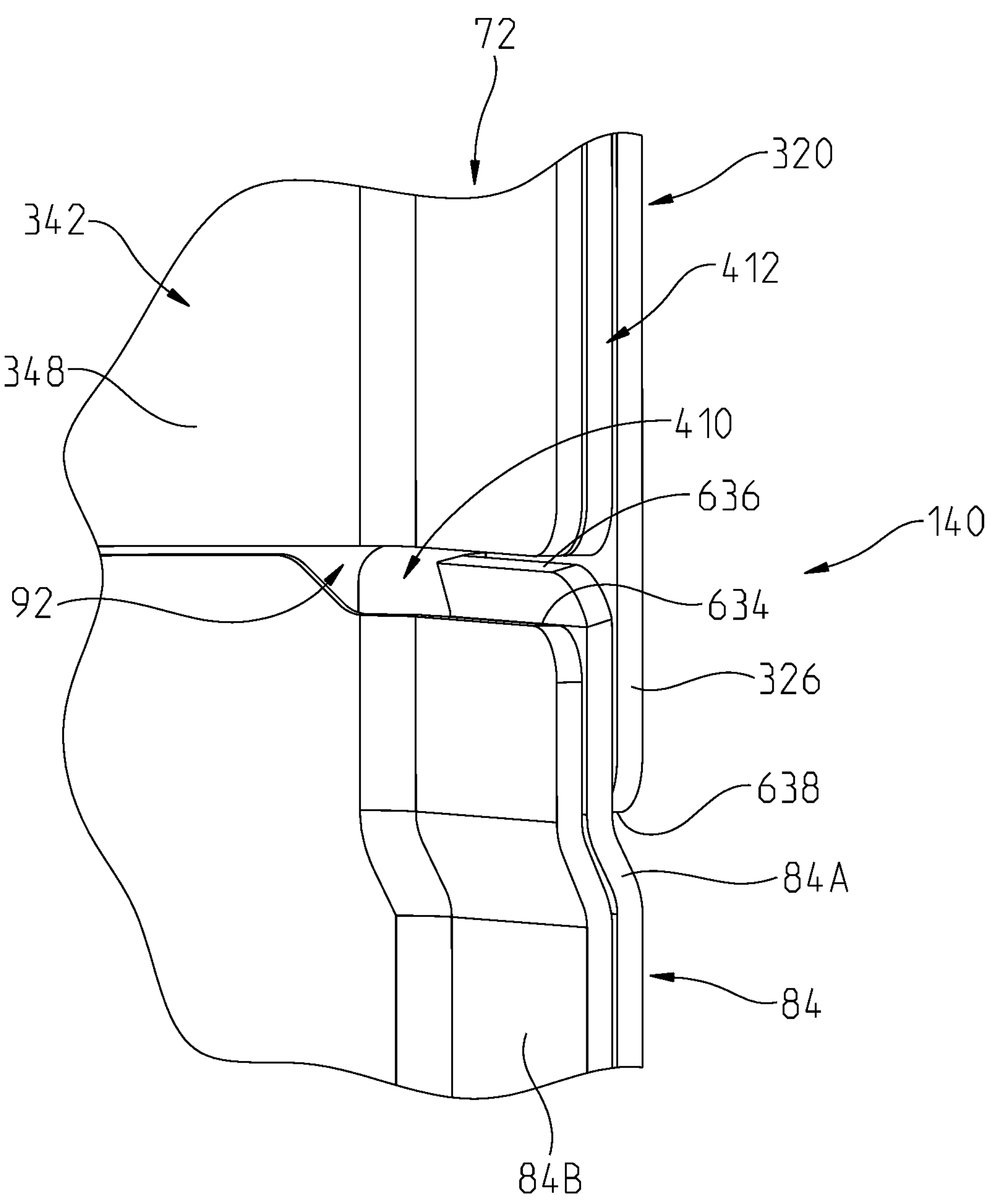
FIG. 31 is a perspective view of a lap joint along the B-pillar between the upper frame assembly and the lower assembly.

Referring now to FIG. 31, joiner 92 is positioned between upper B-pillar member 72 and lower B-pillar member 84. Further, an upper portion of joiner 92 (e.g., upper portion 416 and upper portion 424) is positioned between first end portion 348 of second stamped frame piece 342 and first end portion 326 of first stamped frame piece 320 and a lower portion of joiner 92 (e.g., lower portion 414 and lower portion 422) is positioned between an outer stamped frame member 84A of lower B-pillar member 84 and an inner stamped frame member 84B of lower B-pillar member 84. Outer stamped frame member 84A extends upwardly and has an upper extent 636 and inner stamped frame member 84B extends upwardly and has an upper extent 634. Illustratively, first end portion 326 of first stamped frame piece 320 extends downwardly to a lower extent 638 that is positioned vertically lower than either of upper extent 634 or upper extent 636. Additionally, first end portion 326 is positioned exterior relative to both second stamped frame piece 342 and inner stamped frame member 84B and overlaps outer stamped frame member 84A such that first end portion 326 of first stamped frame piece 320 covers from an exterior, or outside perspective, the upper extent 636 of outer stamped frame member 84A. First end portion 326 of first stamped frame piece 320 provides additional sealing to mounting location 140 and in the event water, mud, other fluids, or debris flows down along mounting location 140, it will flow past mounting location 140, past first end portion 326 and on downwardly along outer stamped frame member 84A. Therefore, any water, mud, other fluids, or debris will be inhibited from flowing upwardly to upper extent 636 due to gravity as well as the tolerance between outer stamped frame member 84A and first end portion 326 thereby increasing the sealed nature of mounting location 140.

Referring again to FIG. 28, lower A-pillar member 80 includes an inner edge 618, first frame member 26 includes an inner edge 620, lower B-pillar member 84 includes a forward inner edge 622 and a rearward inner edge 624, second frame member 28 includes an inner edge 626, and lower C-pillar member 88 includes an inner edge 628. Illustratively, a generally continuous and flat surface is created around a first egress perimeter 630 defined by first edge 228 of upper A-pillar member 68, third edge 258 of left joint member 104, second edge 290 of frame member 54, second edge 336 of upper B-pillar member 72, forward inner edge 622 of lower B-pillar member 84, inner edge 620 of frame member 26, and inner edge 618 of lower A-pillar member 80. Further, a generally continuous and flat surface is created around a second egress perimeter 632 defined by first edge 334 of upper B-pillar member 72, second edge 386 of frame member 56, first edge 478 of upper C-pillar member 76, inner edge 628 of lower C-pillar member 88, inner edge 626 of frame member 28, and rearward inner edge 624 of lower B-pillar member 84.

Figure 32:
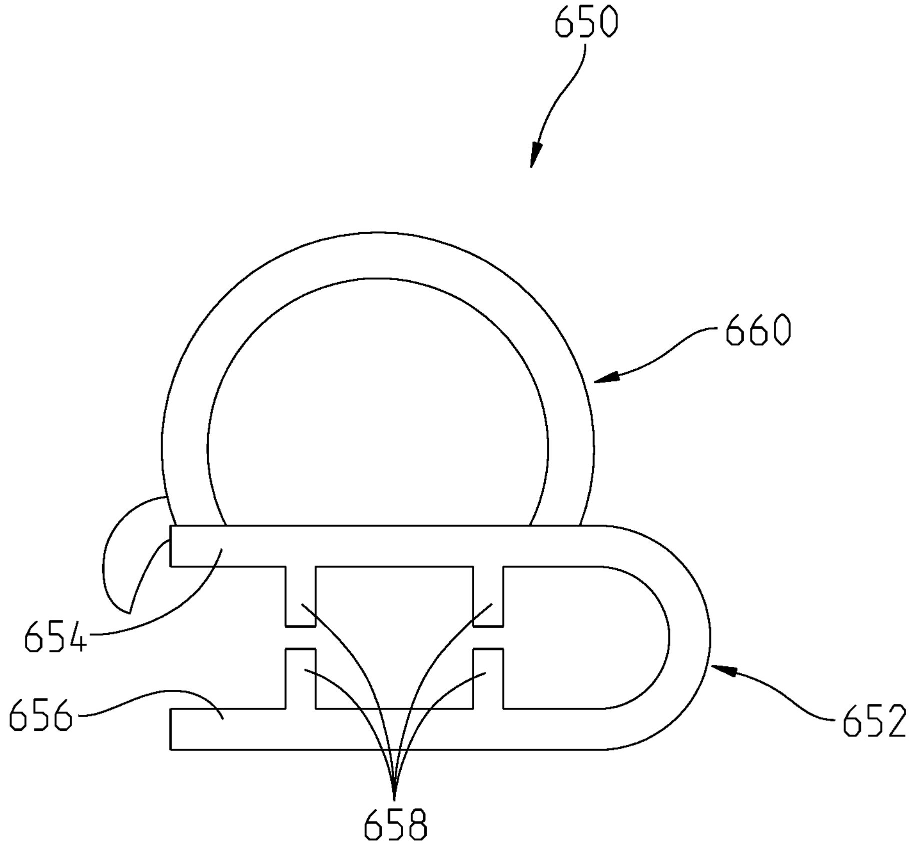
FIG. 32 is a cross-section view of a seal of the present disclosure.
Figure 33:
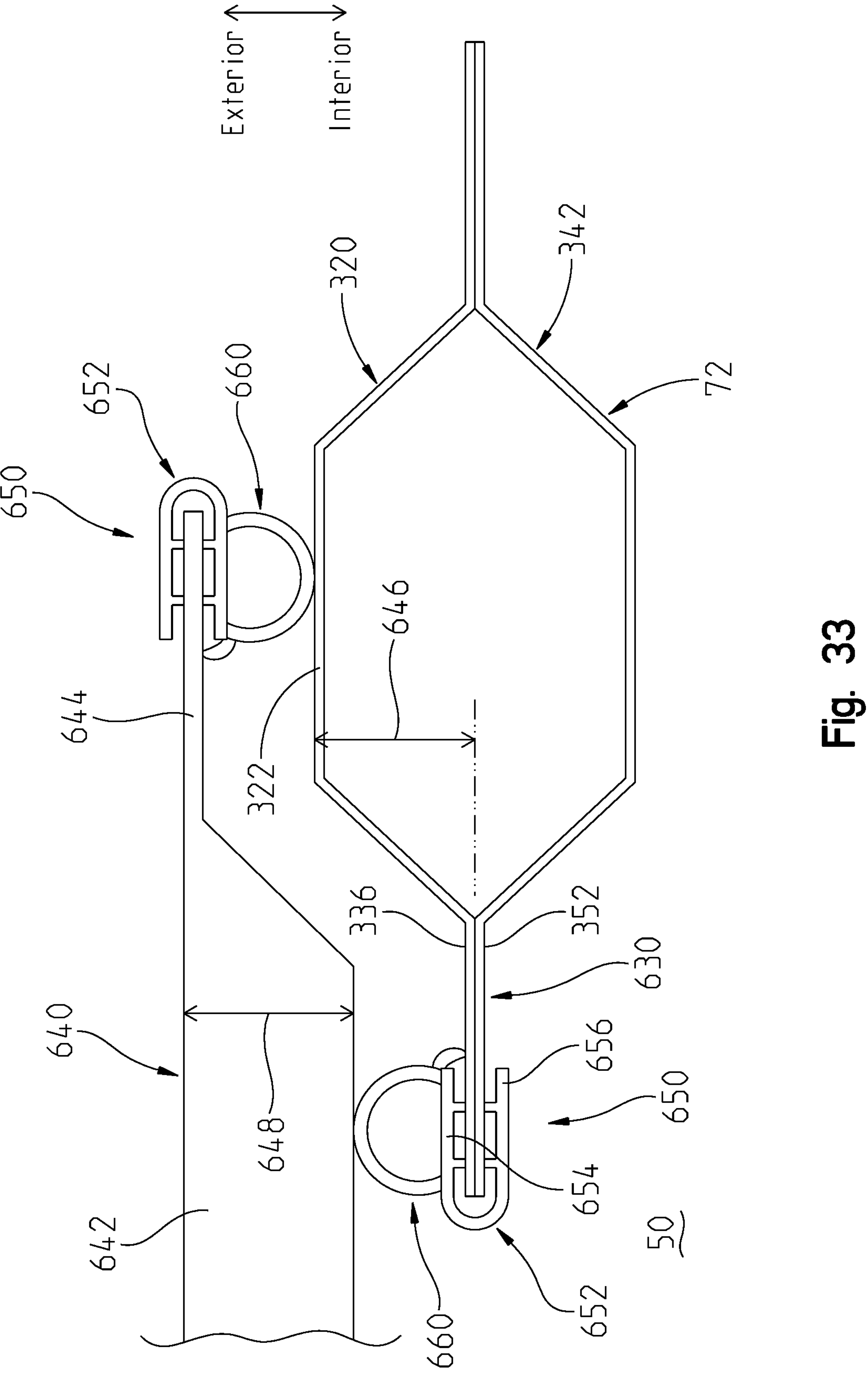
FIG. 33 is a cross-section view of a seal system of the present disclosure assembled at an interface of a door and a frame member of the present disclosure.

In various embodiments, vehicle frame 2 is configured to receive a door 640, as shown in FIG. 33, which may be one of a plurality of doors to close in and/or surround operator area 50 and secure an operator and/or passengers within operator area 50. In various embodiments, door 640 is sealingly coupled to vehicle frame 2 to reduce, deter, or prohibit fluid and debris from entering into operator area 50 through door 640. Now referring to FIG. 32, a seal 650 includes a mounting portion 652 and a sealing portion 660. Mounting portion 652 is generally U-shaped and includes a first arm 654, a second arm 656 spaced from the first arm 654, and a plurality of tabs 658 on an inside of first arm 654 and second arm 656. Each of the tabs 658 are extending inwardly at least a portion of the distance between first arm 654 and second arm 656. Sealing portion 660 is generally arcuate shaped and extends outwardly from first arm 654 of mounting portion 652. In various embodiments, seal 650 is made of a resilient polymeric material. In various embodiments, seal 650 is made of a hard plastic, a polymer, a rubber, or another type of resilient material.

Referring now to FIG. 33, seal 650 is configured to be placed along various edges of vehicle frame 2. In various embodiments, seal 650 is configured to be placed around the entirety of first egress perimeter 630. That is, first arm 654 and second arm 656 of mounting portion 652 of seal 650 are configured to fit around both of second edge 336 of first portion 322 and second edge 352 of second stamped frame piece 342 of upper B-pillar member 72. Further, tabs 658 of first arm 654 and second arm 656 provide frictional adherence to each of second edge 336 and second edge 352 in order to couple seal 650 to upper B-pillar member 72. In various embodiments, seal 650 is an extruded component. Further, seal 650 is a uniform seal cut to a length approximately equal to that of the length of first egress perimeter 630. First egress perimeter 630 is a generally continuous and flat surface, which allows a single, uniform seal to be placed around first egress perimeter 630. Seal 650 may be coupled to first egress perimeter 630 through solely frictional adherence, however, seal 650 may also be coupled to first egress perimeter 630 through an adhesive or other bonding method. Scaling portion 660 of the seal 650 on first egress perimeter 630 extends generally towards an exterior of vehicle frame 2, away from operator area 50.

Still referring to FIG. 33, door 640 is shown in a closed position. Door 640 is rotatably coupled to vehicle frame 2 (e.g., about first A-pillar 8). Door 640 includes a first portion 642 and a second portion 644. In various embodiments, second portion 644 is generally an edge of door 640. Illustratively, first portion 642 is configured to engage a first seal 650 on first egress perimeter 630 and second portion 644 is configured to receive a second seal 650. The sealing portion 660 of the second seal 650 extends towards an interior of vehicle frame 2, towards operator area 50, and sealing portion 660 is configured to engage first portion 322 of upper B-pillar member 72. When door 640 is in a closed position, a double seal is created, and each of the first seal 650 and the second seal 650 are sealing the operator area 50 from an exterior of vehicle frame 2. Further, first seal 650 is configured to engage a flat surface (e.g., a flat surface on first portion 642 of door 640) and second seal 650 is configured to engage a flat surface (e.g., first portion 322). Allowing each seal 650 to contact a flat surface increases the effectiveness of each seal 650 and reduces the chances of intrusion through both seals.

In various embodiments, each seal 650 is configured to compress under the force of door 640 closing, and to remain in a compressed or deformed state when door 640 is latched or otherwise retained in its closed position. Seal 650 is configured to compress a predetermined amount, or distance, which provides additional range of motion for door 640 to rotate when approaching the closed position. Additional range of motion for door 640 to rotate when approaching the closed position increases the potential range of locations that door 640 may latch when approaching the closed position. This improves the user experience by enhancing the user feel of latching door 640 and increases the repeatability and consistency of closing door 640.

In various embodiments, vehicle frame 2 is created so that each egress perimeter 630, 632 (and corresponding egress perimeters on passenger side, or right portion 168) has a generally continuous and flat surface, allowing seal 650 to be adequately coupled to each of the egress perimeters. That is, a plurality of doors 640 (e.g., driver, passenger, rear driver, rear passenger) may be coupled to vehicle frame 2, and each of door 640 may be sealingly coupled to vehicle frame 2 with double seals (e.g., FIG. 33). Similarly, forward opening 52 includes a generally continuous and flat surface around perimeter 318, and a seal 650 may be coupled along the perimeter 318 so that a windshield or other accessory may be coupled to forward opening 52. Similarly, a second seal 650 may be coupled to an accessory windshield so that a double scal may be created at forward opening 52. Further, a rear window perimeter 684 is created by each of upper C-pillar member 76, first member 116, second member 118, upper C-pillar member 78, and rear wall 64. A seal 650 may be coupled along rear window perimeter 684 so that a rear windshield or other accessory may be coupled to a rear of vehicle frame 2, around rear window perimeter 684. Similarly, a second seal 650 may be coupled to an accessory rear windshield so that a double seal may be created around a rear windshield at rear window perimeter 684.

Still referring to FIG. 33, upper B-pillar member 72 is shaped such that first egress perimeter 630 is recessed towards the interior of vehicle frame 2 relative to first portion 322. That is, first egress perimeter 630 is spaced from first portion 322 by a first distance 646, meaning that seal 650 on first egress perimeter 630 is positioned inwardly relative to first portion 322. Further, first portion 642 of door 640 has a width 648 that is approximately equal to first distance 646. Second portion 644 of door 640 has a smaller width than first portion 642. As seen in FIG. 33, door 640 can be rotated to a closed position such that at least a portion of door 640 is recessed inwardly toward the interior relative to first portion 322. Vehicle frame 2 has a slimmer profile when door 640 is recessed relative to first portion 322 (i.e., an outer face of vehicle frame 2) which reduces the overall width of the vehicle and increases the visual aesthetic of the vehicle. Further, first portion 642 is then positioned closer to longitudinal centerline 120 than second portion 644.

Referring now to FIGS. 34A-34D, a door ring 662 may be constructed and assembled in a variety of ways in order to meet certain shipping, manufacturing, assembly, and/or aesthetic considerations. In various embodiments, it may be desirable for door ring 662 to be constructed of as few pieces as possible to increase the aesthetic appeal of door ring 662. In various embodiments, it may be desirable to create door ring 662 in a plurality of pieces to decrease shipping size.

Figures 34A, 34B:
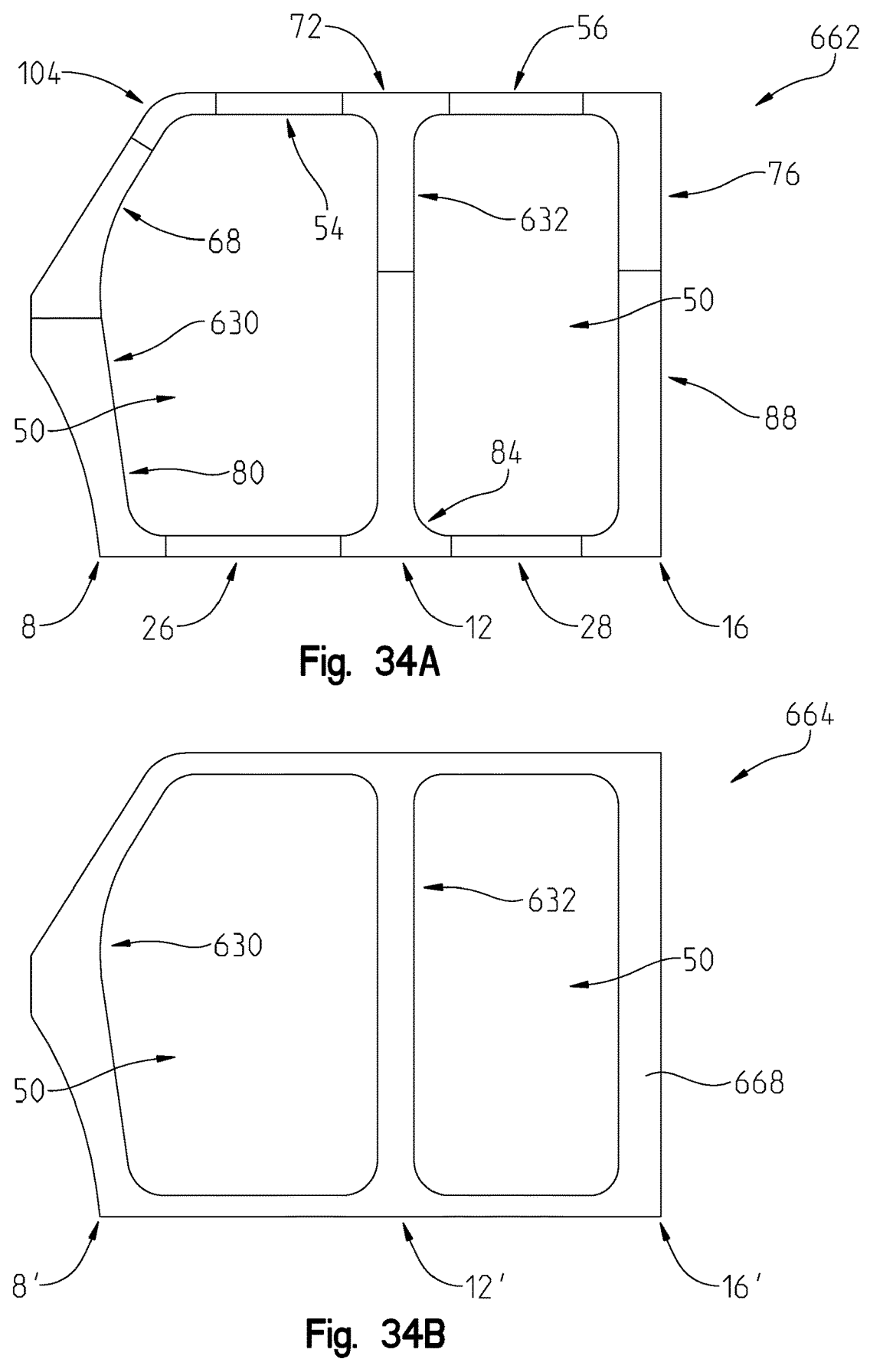

Referring to FIG. 34A, door ring 662 includes first A-pillar 8 which includes lower A-pillar member 80, upper A-pillar member 68 and first joint member 104. Door ring 662 also includes first B-pillar 12 which includes upper B-pillar member 72 and lower B-pillar member 84, as well as first C-pillar 16 which includes upper C-pillar member 76 and lower C-pillar member 88. Fifth frame member 54 extends between first joint member 104 and upper B-pillar member 72, first frame member 26 extends between lower A-pillar member 80 and first B-pillar 12, sixth frame member 56 extends between upper B-pillar member 72 and upper C-pillar member 76, and second frame member 28 extends between first B-pillar 12 and first C-pillar 16. As previously discussed, any or all of the components of door ring 662 are stamped frame members and may be comprised of one or more stamped frame pieces.

Referring now to FIG. 34B, an alternative door ring 664 includes a single frame member 668 which includes an alternative construction of an A-pillar 8', a B-pillar 12', and a C-pillar 16'. Door ring 664 is sized similarly or identical to door ring 662, surrounds a portion of operator area 50, and creates first egress perimeter 630 and second egress perimeter 632. Door ring 664 may be constructed of a single stamped frame piece or may be comprised of a single outer stamped frame piece (facing outwardly from operator area 50) and a single inner stamped frame piece (facing inwardly toward operator area 50) that are layered together and coupled together. In various embodiments, the outer stamped frame piece and inner stamped frame piece are coupled by a plurality spot welds and/or adhesive. In various embodiments, alternative door ring 664 is constructed of more than two stamped pieces layered together.

Figures 34C, 34D:
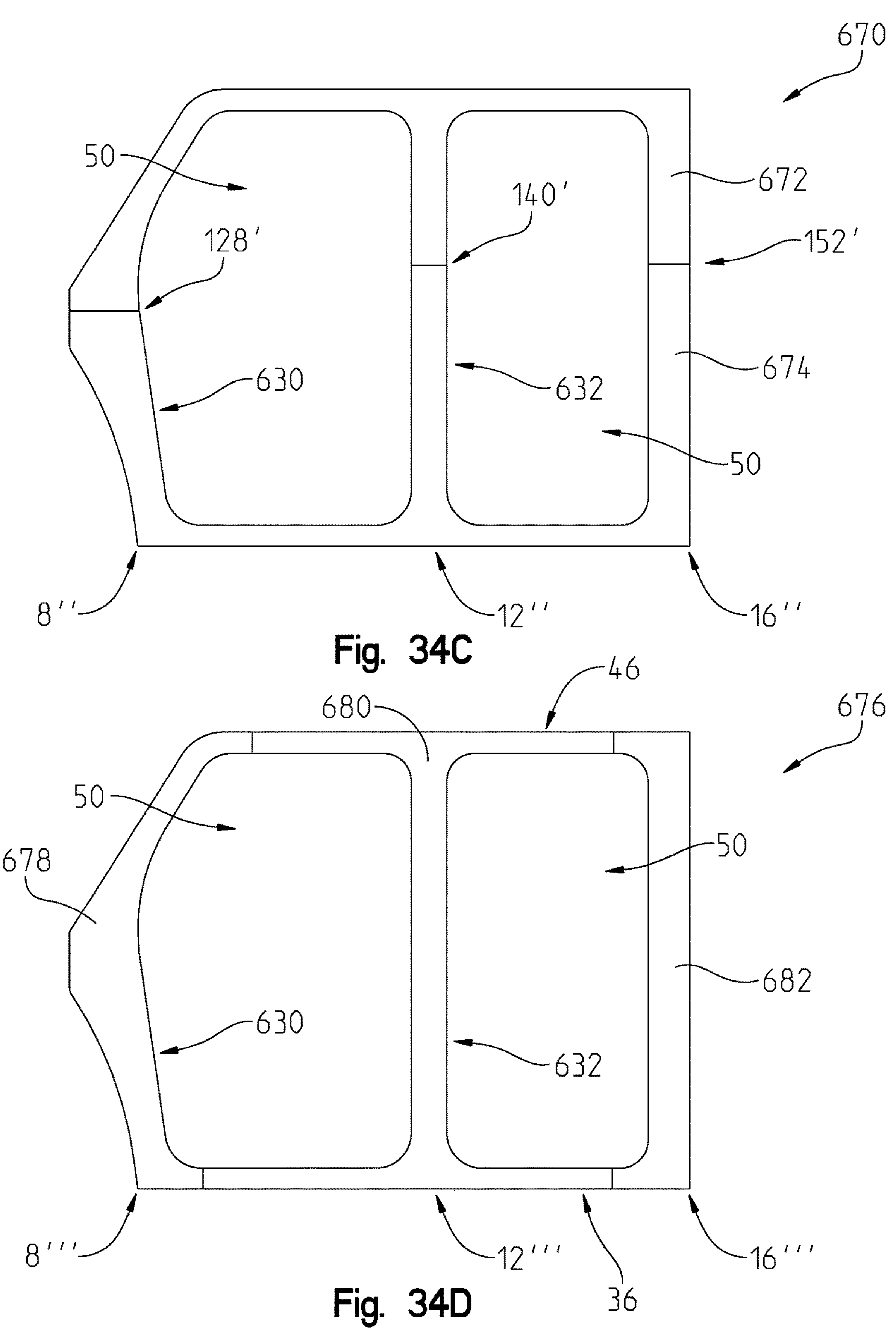
FIG. 34C is an alternative embodiment of a door ring comprised of an upper frame piece and a lower frame piece of the present disclosure.
FIG. 34D is an alternative embodiment of a door ring comprised of a plurality of frame members of the present disclosure.

Referring now to FIG. 34C, an alternative door ring 670 includes an upper door ring member 672 and a lower door ring member 674. Upper door ring member 672 and lower door ring member 674 includes an alternative construction of an A-pillar 8'', a B-pillar 12'', and a C-pillar 16''. Door ring 670 is sized similarly or identical to door ring 662 shown in FIG. 34A and discussed above, and similarly surrounds a portion of operator area 50, and creates first egress perimeter 630 and second egress perimeter 632. However, each of upper door ring member 672 and lower door ring member 674 may be constructed of a single stamped frame piece or may also be constructed of an outer stamped frame piece (facing outwardly from operator area 50) and an inner stamped frame piece (facing inwardly toward operator area 50) that are layered together and coupled together, rather than the multi-piece construction used for corresponding portions of door ring 662. In various embodiments, the outer stamped frame piece and inner stamped frame piece are coupled by a plurality spot welds and/or adhesive. In various embodiments, one or both of upper door ring member 672 and lower door ring member 674 is constructed of more than two stamped pieces layered together. In various embodiments, upper door ring member 672 may be coupled to lower door ring member 674 at a first mounting location 128' which may be similar or identical to mounting location 128 (i.e., a bolted joint). Upper door ring member 672 may also be coupled to lower door ring member 674 at a second mounting location 140' which may be similar or identical to mounting location 140 and at a third mounting location 152' which may be similar or identical to mounting location 152. That is, joiner 92 may be coupled between upper door ring member 672 and lower door ring member 674 at mounting location 140' and third joiner 94 may be coupled between upper door ring member 672 and lower door ring member 674 at mounting location 152'.

Now referring to FIG. 34D, an alternative door ring 676 includes a first pillar member 678, a second pillar member 680, and a third pillar member 682. First pillar member 678 generally includes an A-pillar 8''', second pillar member 680 includes a B-pillar 12'''', and third pillar member 682 includes a C-pillar 16''. In alternative door ring 676, each of first pillar member 678, second pillar member 680, and third pillar member 682 includes a generally vertical portion and a generally horizontal portion. Further, each of first pillar member 678, second pillar member 680, and third pillar member 682 extends between lower extent 36 and upper extent 46. Door ring 676 is sized similarly or identical to door ring 662 shown in FIG. 34A and discussed above, and similarly surrounds a portion of operator area 50, and creates first egress perimeter 630 and second egress perimeter 632. However, each of first pillar member 678, second pillar member 680, and third pillar member 682 may be constructed of a single stamped frame piece or may also be constructed of an outer stamped frame piece (facing outwardly from operator area 50) and an inner stamped frame piece (facing inwardly toward operator area 50) that are layered together and coupled together, rather than the multi-piece construction used for corresponding portions door ring 662. In various embodiments, the outer stamped frame piece and inner stamped frame piece are coupled by a plurality spot welds and/or adhesive. In various embodiments, one or more of first pillar member 678, second pillar member 680, and third pillar member 682 is constructed of more than two stamped pieces layered together.

Figure 35:
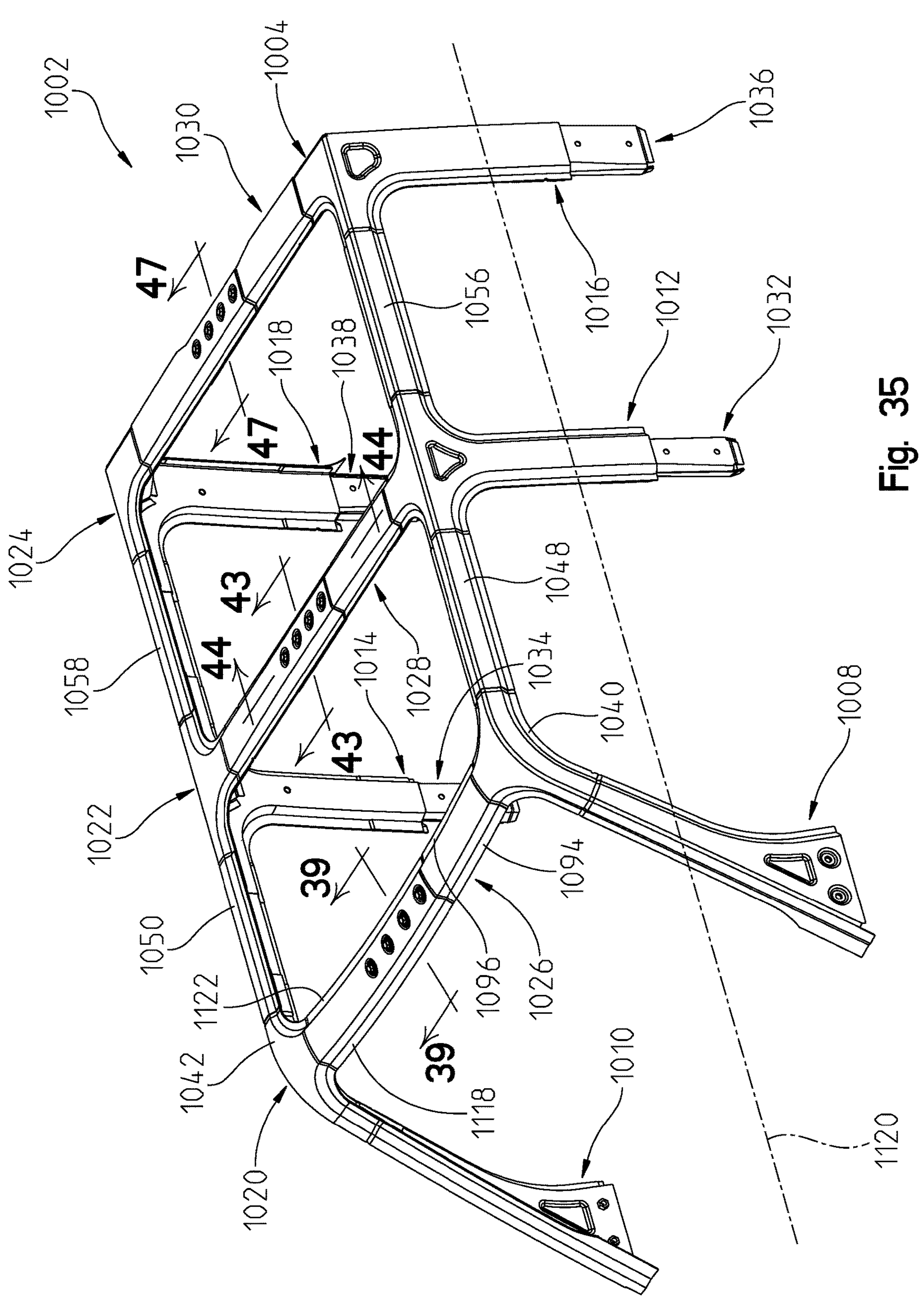
FIG. 35 is an alternative embodiment of a portion of a frame assembly of the present disclosure.

Referring now to FIG. 35, an alternative frame assembly 1002 is provided including an upper frame assembly 1004. In embodiments, portions of alternative frame assembly 1002 may be the same as, or interchangeable with, frame assembly 2. Further, in embodiments, upper frame assembly 1004 may be the same as, or interchange with, upper frame assembly 4. In embodiments, frame assembly 1002 extends along longitudinal centerline 1120 and defines a front portion 1020, a middle portion 1022, and a rear portion 1024.

Referring still to FIG. 35, front portion 1020 (similar to front portion 20 (FIG. 1)) of upper frame assembly 1004 includes a first or left upper A-pillar 1008 (similar to upper A-pillar member 68 (FIG. 8( ) a second or right upper A-pillar 1010 (similar to upper A-pillar member 70 (FIG. 8)), a first joint member 1040 (similar to left joint member 104 (FIG. 8)) coupled to first upper A-pillar 1008, a second joint member 1042 (similar to right joint member 106 (FIG. 8)) coupled to second upper A-pillar 1010, and a cross-member assembly 1026 (similar to second cross member 40 (FIG. 1)) coupled between first joint member 1040 and second joint member 1042.

Referring still to FIG. 35, middle portion 1022 (similar to middle portion 22 (FIG. 1)) includes a first or left upper B-pillar 1012 (similar to upper B-pillar member 72 (FIG. 8)), a second or right upper B-pillar 1014 (similar to upper B-pillar member 74 (FIG. 8)), and a cross-member assembly 1028 (similar to third cross member 42 (FIG. 8)) coupled between first upper B-pillar 1012 and second upper B-pillar 1014. Further, a frame member 1048 (similar to frame member 54 (FIG. 8)) extends generally longitudinally between first joint member 1040 and first upper B-pillar 1012, and a frame member 1050 (similar to frame member 58 (FIG. 8)) extends generally longitudinally between second joint member 1042 and second upper B-pillar 1014.

Referring still to FIG. 35, rear portion 1024 (similar to rear portion 24 (FIG. 1)) includes a first or left upper C-pillar 1016 (similar to upper C-pillar member 76 (FIG. 8)), a second or right upper C-pillar 1018 (similar to upper C-pillar member 78 (FIG. 8)), and a cross-member assembly 1030 (similar to fourth cross member 44 (FIG. 8)) coupled between first upper C-pillar 1016 and second upper C-pillar 1018. Further, a frame member 1056 (similar to frame member 56 (FIG. 8)) extends generally longitudinally between first upper B-pillar 1012 and first upper C-pillar 1016, and a frame member 1058 (similar to frame member 60 (FIG. 8)) extends generally between second upper B-pillar 1014 and second upper C-pillar 1018.

Figure 36:
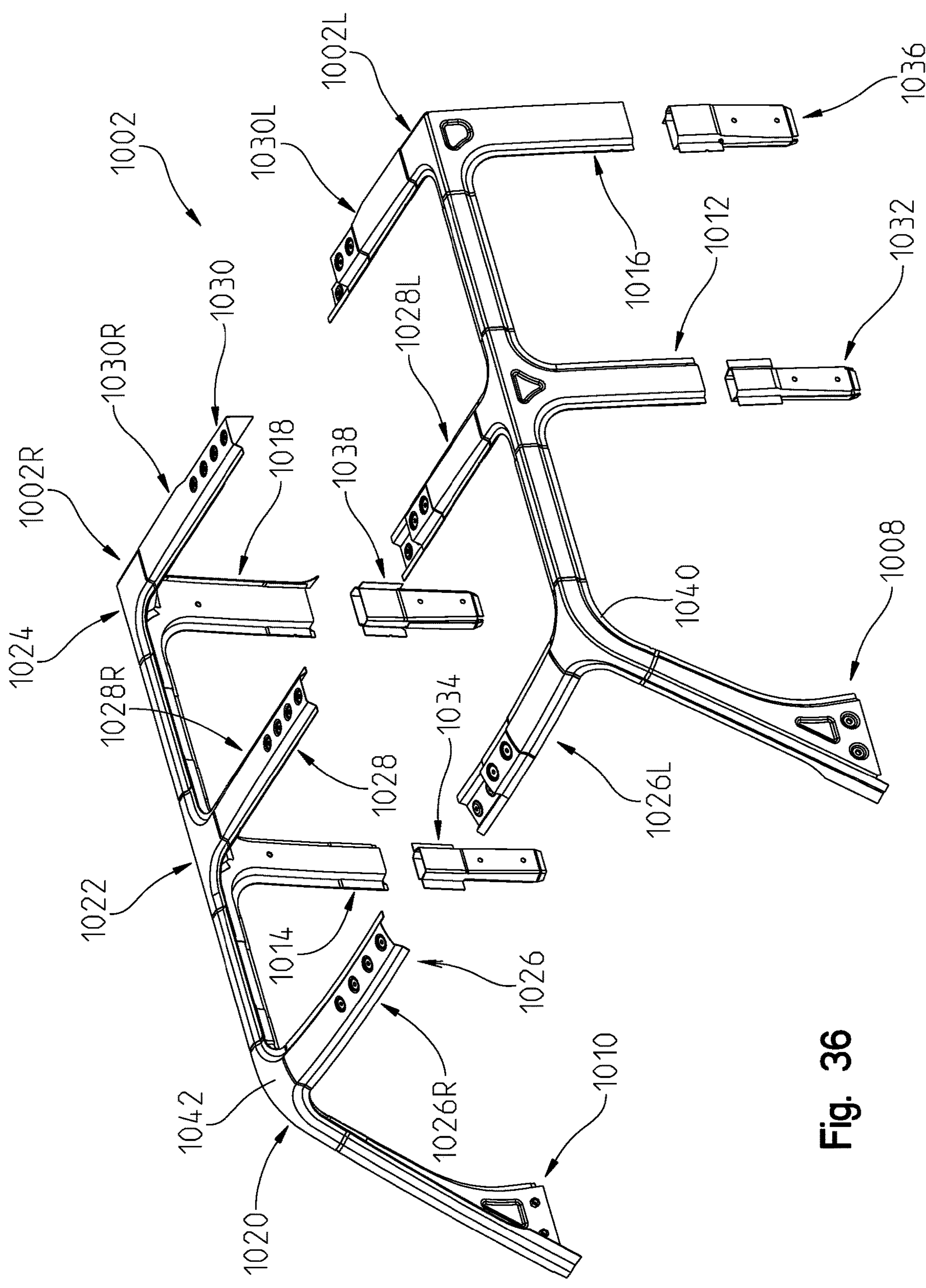
FIG. 36 is an exploded view of the frame assembly of FIG. 35.

Referring to FIG. 36, frame assembly 1002 includes a first joiner or coupler 1032 (similar to first joiner 92), a second joiner or coupler 1034 (similar to second joiner 93 (FIG. 8)), a third joiner 1036 or third coupler 1036 (similar to third joiner 94 (FIG. 8)), a fourth joiner 1038 or fourth coupler 1038 (similar to fourth joiner 95 (FIG. 8)).

Referring still to FIG. 36, cross-member assembly 1026 includes a left portion 1026L and a right portion 1026R. Cross-member assembly 1028 includes a left portion 1028L and a right portion 1028R. Cross-member 1030 includes a left portion 1030L and a right portion 1030R. Illustratively, left portion 1026L is coupled to first joint member 1040, right portion 1026R is coupled to second joint member 1042, left portion 1028L is coupled to first upper B-pillar 1012, right portion 1028R is coupled to second upper B-pillar 1014, left portion 1030L is coupled to first upper C-pillar 1016, and right portion 1030R is coupled to second upper C-pillar 1018.

Figure 37:
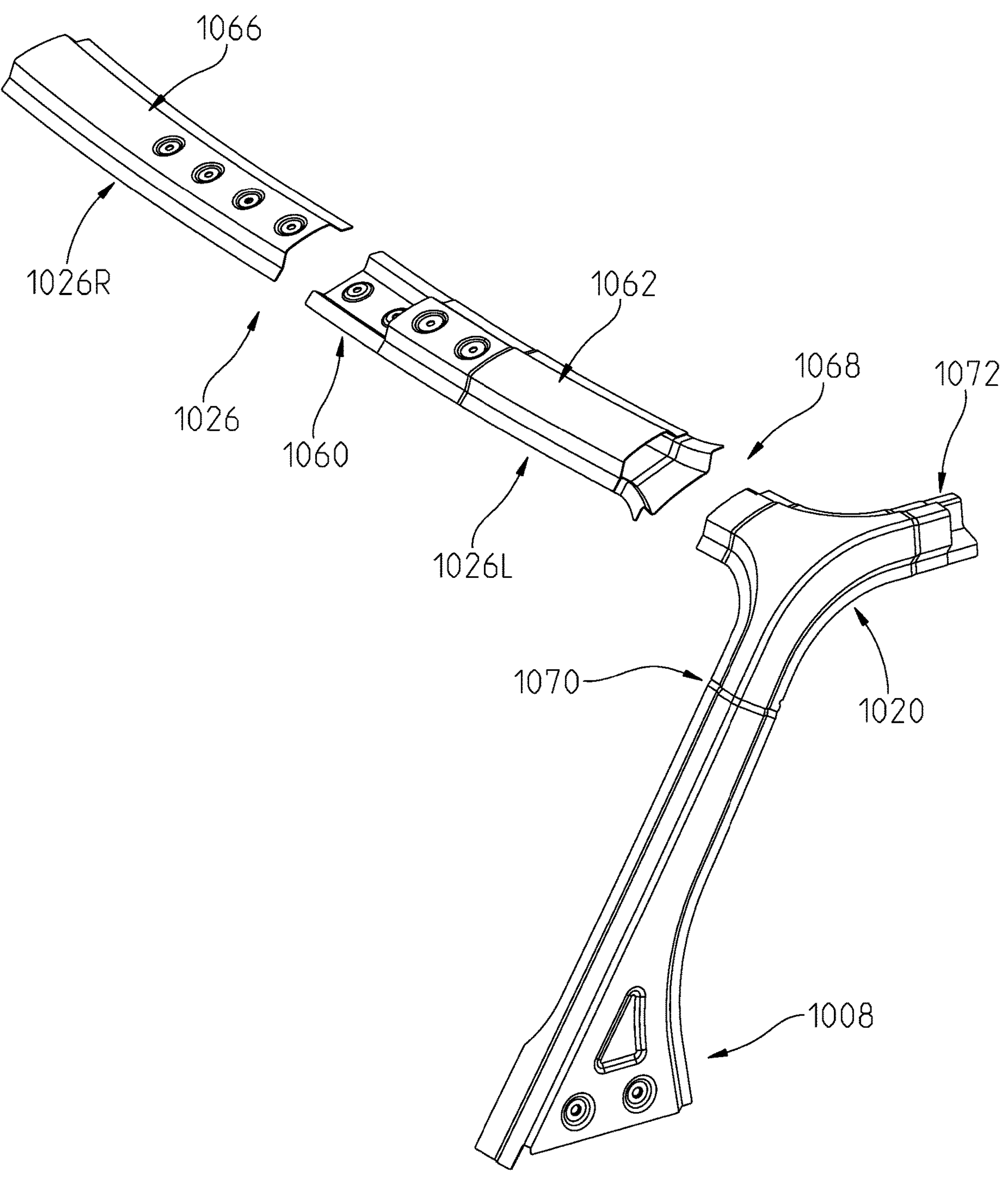
FIG. 37 is an exploded view of an upper A-pillar portion of the frame assembly of FIG. 35.

In embodiments, referring now to FIGS. 36-37, cross-member assembly 1026 is assembled to create a lap joint. That is, the lap joint of cross-member assembly 1026 includes a first member 1060, a second member 1062, a third member 1064, a fourth member 1066, and a plurality of spacers 1128, 1130.

Figure 38:
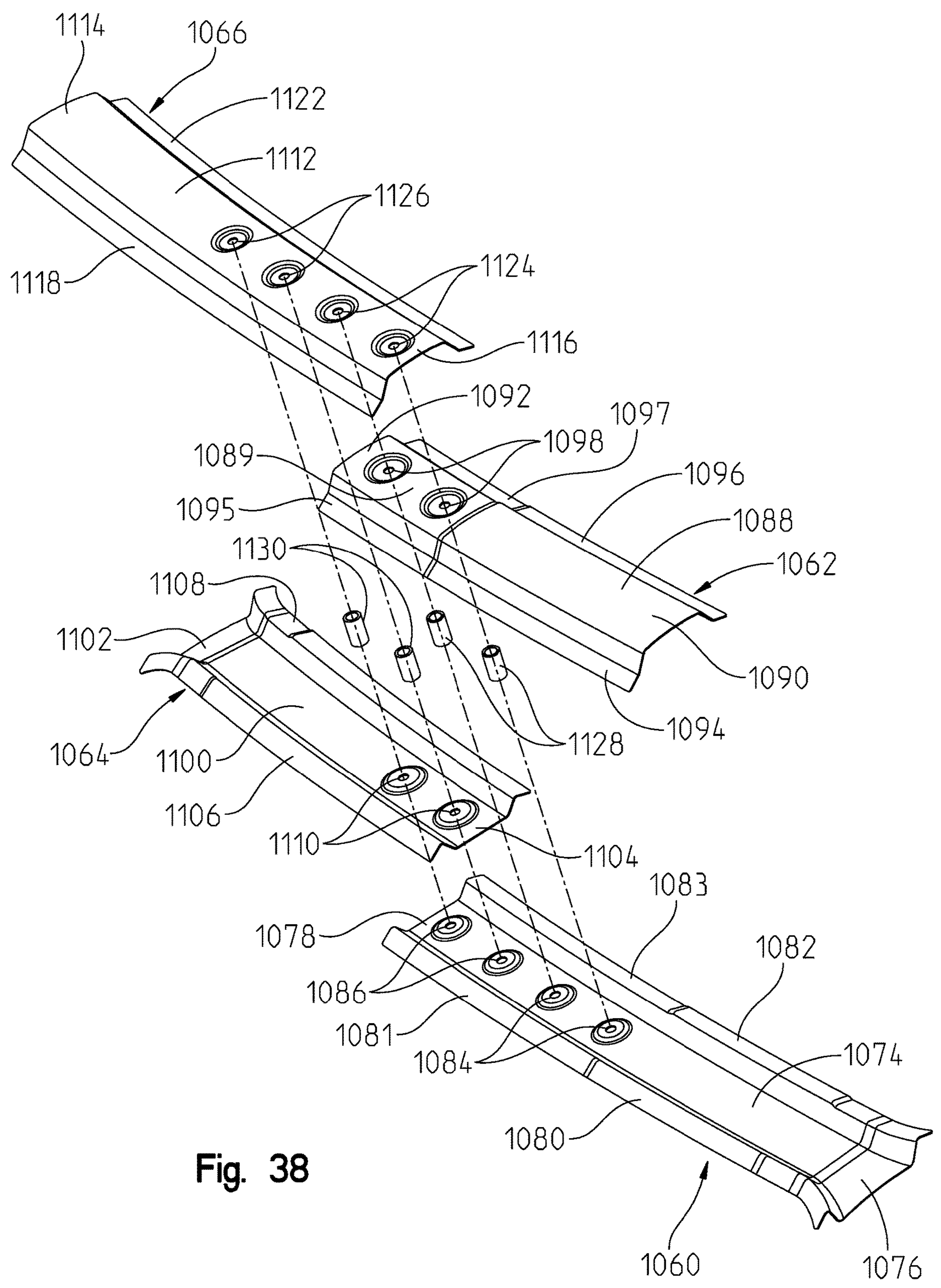
FIG. 38 is an exploded view of a cross-member of the frame assembly of FIG. 35.

Referring now to FIG. 38, first member 1060 includes a main body portion 1074 defining a first end 1076 and a second end 1078, and a first edge portion 1080, a second edge portion 1081, a third edge portion 1082, and a fourth edge portion 1083. Further, main body portion 1074 defines a plurality of apertures including a pair of apertures 1084 and a pair of apertures 1086. Illustratively, apertures 1084, 1086 are positioned intermediate second edge portion 1081 and fourth edge portion 1083.

Referring still to FIG. 38, second member 1062 includes a first body portion 1088 and a second body portion 1089. First body portion 1088 defines a first end 1090, a first edge portion 1094, and a third edge portion 1096. Second body portion 1089 defines a second end 1092 opposite the first end, and a second edge portion 1095 and a fourth edge portion 1097. Further, second body portion 1089 defines a plurality of apertures including a pair of apertures 1098. In embodiments, second body portion 1089 is generally recessed relative to first body portion 1088.

Referring still to FIG. 38, third member 1064 includes a main body portion 1100 defining a first end 1102 and a second end 1104, a first edge 1106 and a second edge 1108. Further, main body portion 1100 defines a plurality of apertures including a pair of apertures 1110.

Referring still to FIG. 38, fourth member 1066 includes a main body portion 1112 defining a first end 1114 and a second end 1116, a first edge 1118 and a second edge 1122. Further, main body portion 1112 defines a plurality of apertures including a pair of apertures 1124 and a pair of apertures 1126.

In embodiments, each of first member 1060, second member 1062, third member 1064, and fourth member 1066 are stamped frame members.

Figure 39:
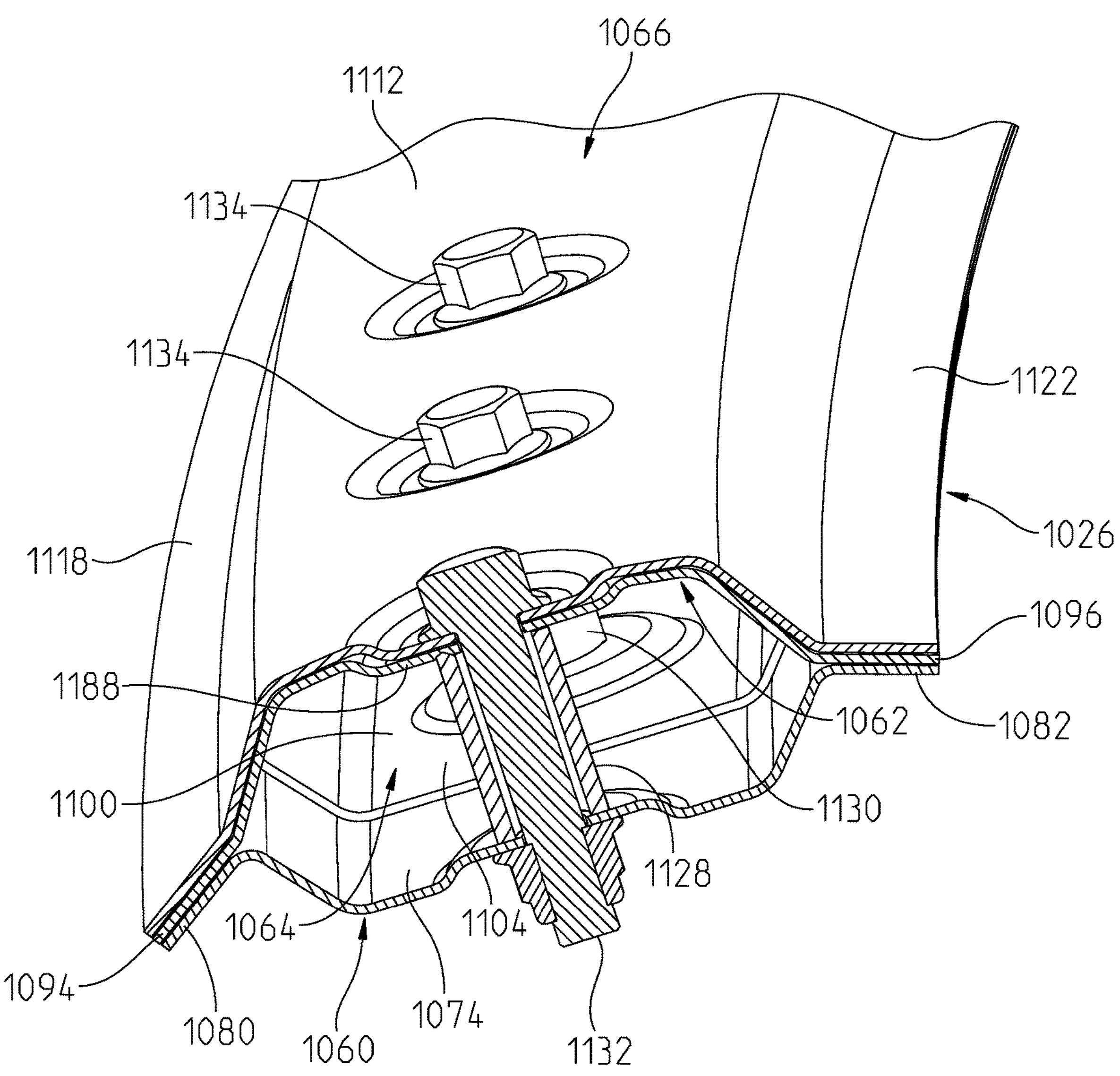
FIG. 39 is a cross-section view of the cross-member of FIG. 38 taken along line 39-39 of FIG. 35.

Referring to FIGS. 37-39, each of first member 1060, second member 1062, third member 1064, and fourth member 1066 are coupled together to create a lap joint. That is, first member 1060 may be coupled to third member 1064 such that apertures 1110 align with apertures 1086 and first edge 1106 aligns with, and sits upon, second edge portion 1081, and second edge 1108 aligns with, and sits upon, fourth edge portion 1083. Further, first member 1060 may be coupled to third member 1064 by coupling second edge portion 1081 to first edge 1106 and coupling fourth edge portion 1083 to second edge 1108. In embodiments, first member 1060 may be coupled to third member 1064 by one or more spot welds or adhesive along second edge portion 1081 and first edge 1106 and along fourth edge portion 1083 and second edge 1108. Further, second member 1062 may be coupled to first member 1060 such that apertures 1098 are aligned with apertures 1084. Further, second member 1062 may be coupled to first member 1060 such that first edge portion 1094 algins with, and sits upon, first edge portion 1080, second edge portion 1095 aligns with, and sits upon, second edge portion 1081, third edge portion 1096 aligns with, and sits upon, third edge portion 1082, and fourth edge portion 1097 aligns with, and sits upon, fourth edge portion 1083. In embodiments, first member 1060 may be coupled to second member 1062 by one or more spot welds or adhesive along first edge portion 1080 and first edge portion 1094, along second edge portion 1081 and second edge portion 1095, and along third edge portion 1082 and third edge portion 1096, and along fourth edge portion 1083 and fourth edge portion 1097. In embodiments, first member 1060 is coupled to each of second member 1062 and third member 1064.

Referring still to FIGS. 37-39, fourth member 1066 may be coupled to each of second member 1062 and third member 1064. That is, fourth member 1066 is coupled to second member 1062 such that second end 1116 aligns with, and sits upon, the recessed second body portion 1089 of second member 1062 such that second end 1116 is generally planar with first body portion 1088. Further, first edge 1118 aligns with, and sits upon, second edge portion 1095, and second edge 1122 aligns with, and sits upon, fourth edge portion 1097. Further, each of apertures 1124 are aligned with each of apertures 1098 and apertures 1084. Further, fourth member 1066 is coupled to third member 1064 such that first edge 1118 aligns with, and sits upon, first edge 1106 and second edge 1122 aligns with, and sits upon, second edge 1108 and apertures 1126 aligns with apertures 1110. In embodiments, fourth member 1066 may be coupled to second member 1062 by one or more spot welds or adhesive along first edge 1118 and second edge portion 1095 and along second edge 1122 and fourth edge portion 1097 and fourth member 1066 may be coupled to third member 1064 by one or more spot welds or adhesive along first edge 1118 and first edge 1106 and along second edge 1122 and second edge 1108.

Still referring to FIG. 39, one or more spot welds or adhesives may be used along the front edge (e.g., first edge portion 1080, second edge portion 1081, first edge portion 1094, second edge portion 1095, first edge 1118) of cross-member assembly 1026 and one or more spot welds or adhesives may be used along the rear edge (e.g., third edge portion 1082, fourth edge portion 1083, third edge portion 1096, fourth edge portion 1097, second edge 1122) of cross-member assembly 1026. That is, in embodiments, spot welds may couple two stamped members together, three stamped members together, or more stamped members together (e.g., four members, five members, or more members).

Still referring to FIG. 39, a plurality of fasteners are configured to increase the strength of the lap joint, creating a clamping force at the lap joint. Further, a pair of spacers 1128 are positioned intermediate apertures 1084 of first member 1060 and apertures 1098 of second member 1062, and a pair of spacers 1130 are positioned intermediate apertures 1110 of third member 1064 and apertures 1126 of fourth member 1066. Further, a first pair of fasteners 1132 extend through apertures 1124, apertures 1098, spacers 1128, and apertures 1084, and a second pair of fasteners 1134 extend through apertures 1126, spacers 1130, apertures 1110, and apertures 1086. In embodiments, spacers 1128 are welded, or otherwise coupled, to second body portion 1089 of second member 1062, each aligned with apertures 1098 to ensure alignment of spacers 1128 during assembly of the lap joint. In embodiments, spacers 1130 are welded, or otherwise coupled, to main body portion 1112 of fourth member 1066 to ensure alignment of spacers 1130 during assembly of the lap joint. In embodiments, spacers 1128, 1130 extend the distance D1 between the bottom stamped frame member (e.g., first member 1060 or third member 1064) and the upper stamped frame member (e.g., second member 1062 or fourth member 1066) to increase the rigidity of the cross-member assembly 1026 and increase the clamping load provided by fasteners 1132, 1134.

Referring to FIG. 39, the lap joint created by first member 1060, second member 1062, third member 1064, and fourth member 1066 is defined by a plurality of layers along the edges and/or main body portions, thereby creating a strong and rigid joint and reducing fluid or debris intrusion through the cross-member assembly 1026. That is, fluid must flow through each member interface, creating a tortious path for the fluid to make it through, thereby increasing sealing.

Figure 40:
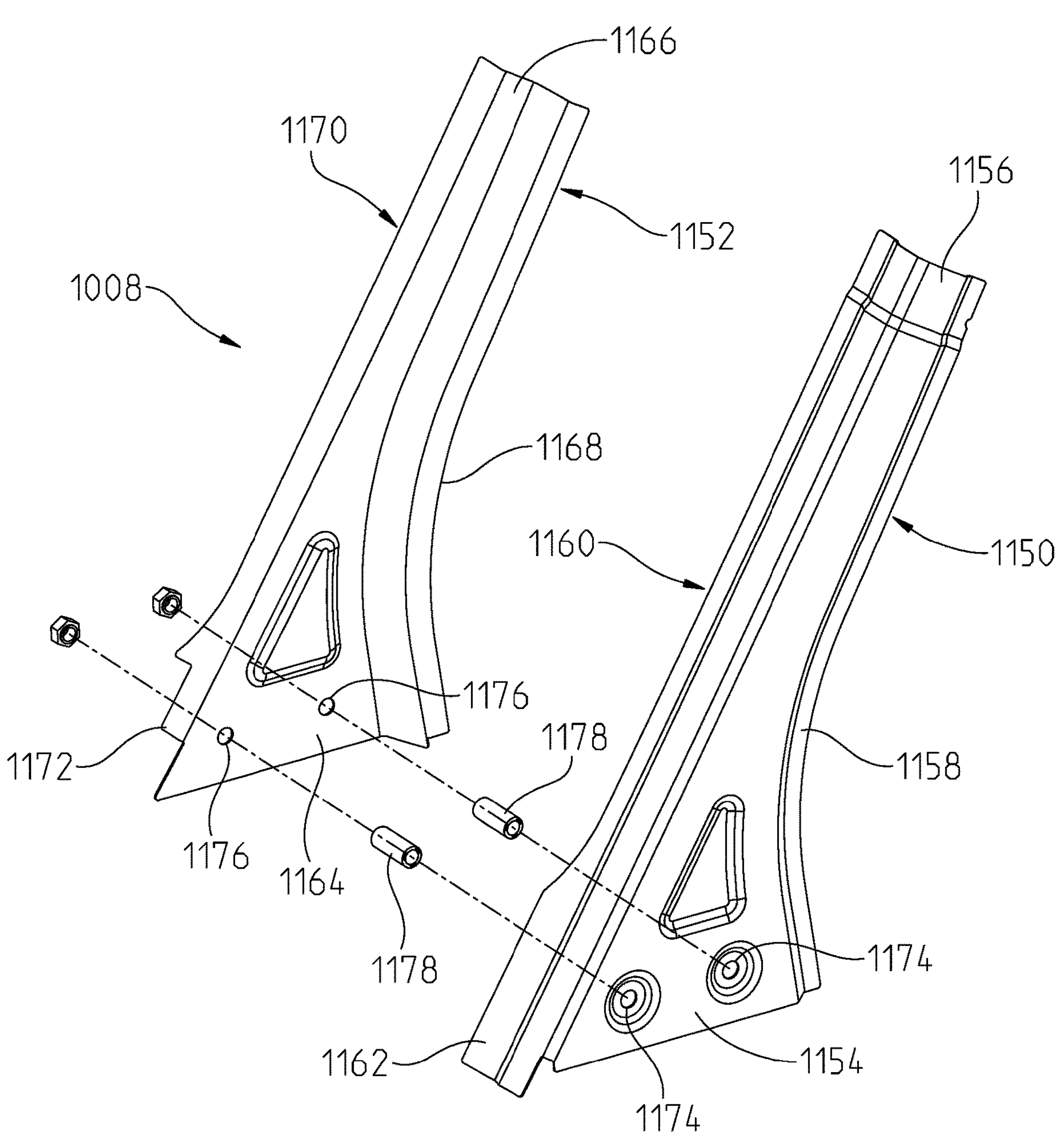
FIG. 40 is an exploded view of a lower portion of the upper A-pillar portion of the frame assembly of FIG. 37.
Figure 41:
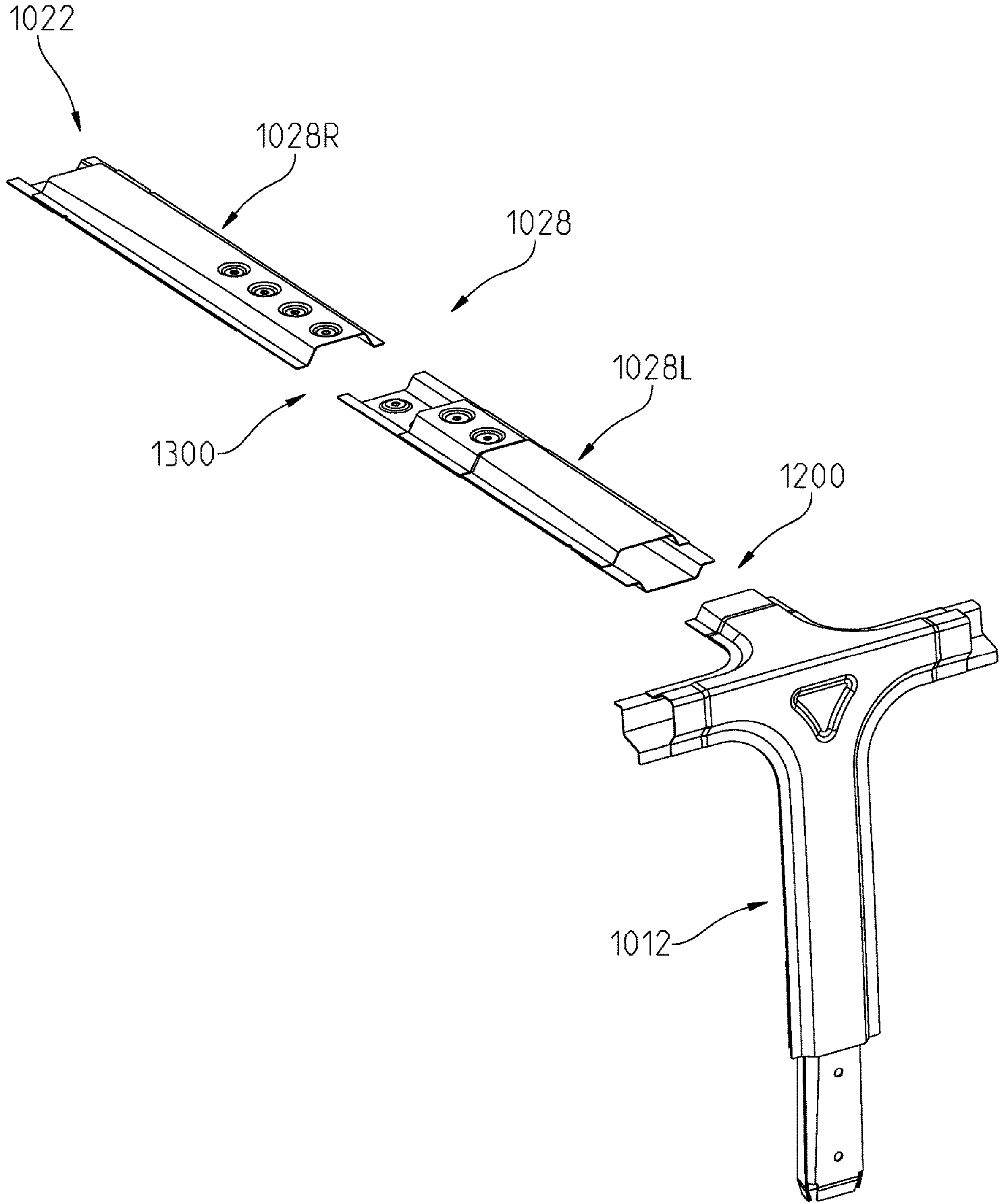
FIG. 41 is an exploded view of an upper B-pillar portion of the frame assembly of FIG. 35.

Referring now to FIG. 40, first upper A-pillar 1008 may be substantially similar to, or the same as, upper A-pillar member 68 (FIG. 8). That is, first upper A-pillar 1008 may be interchanged with upper A-pillar member 68 with no modification, or slight modification. Upper A-pillar 1008 may be formed of a first stamped frame member 1150 and a second stamped frame member 1152. In embodiments, first stamped frame member 1150 includes a first end portion 1154 and a second end portion 1156 generally opposite the first end portion 1154. In embodiments, first stamped frame member 1150 includes a first or rear edge 1158, and a second or front edge 1160. Front edge 1160 defines a bottom flange 1162 that is generally wider than the remaining portion of front edge 1160. In embodiments, second stamped frame member 1152 includes a first end portion 1164 and a second end portion 1166 generally opposite the first end portion 1164. In embodiments, second stamped frame member 1152 includes a first or rear edge 1168, and a second or front edge 1170. In embodiments, front edge 1170 defines a bottom flange 1172.

Still referring to FIG. 40, first end portion 1154 defines a pair of apertures 1174 and first end portion 1164 defines a pair of apertures 1176. A pair of spacers 1178 extend between first stamped frame member 1150 and second stamped frame member 1152 generally coaxial to apertures 1174, 1176. A pair of fasteners (not shown) extend through apertures 1174, 1176, and spacers 1178 to clamp first stamped frame member 1150 and second stamped frame member 1152 together.

First stamped frame member 1150 couples to second stamped frame member 1152 substantially similar to the way first stamped frame piece 200 couples with second stamped frame piece 202. That is, a plurality of spot welds and/or adhesive may be placed along rear edge 1158 and rear edge 1168 and may be placed along front edge 1160 and front edge 1170. Upper A-pillar may then extend between first joint member 1040 and a chassis member (e.g., similar to upper A-pillar member 68 (FIG. 8) extending between left joint member 104 and first cross member 38 (FIG. 14E)).

In embodiments, front edge 1160 is substantially longer than bottom flange 1172 to interface with a lower chassis 1180 (FIG. (e.g., outer surface 298 of first cross member 38 (FIG. 14E)) to increase the sealing capability of upper A-pillar 1008 as well as strength of the joint between first cross member 38 and upper A-pillar member 68 (FIG. 14E). In embodiments, upper A-pillar 1008 is substantially similar to second upper A-pillar 1010. In embodiments, first upper A-pillar 1008 and second upper A-pillar 1010 are mirrored assemblies.

Figure 16:
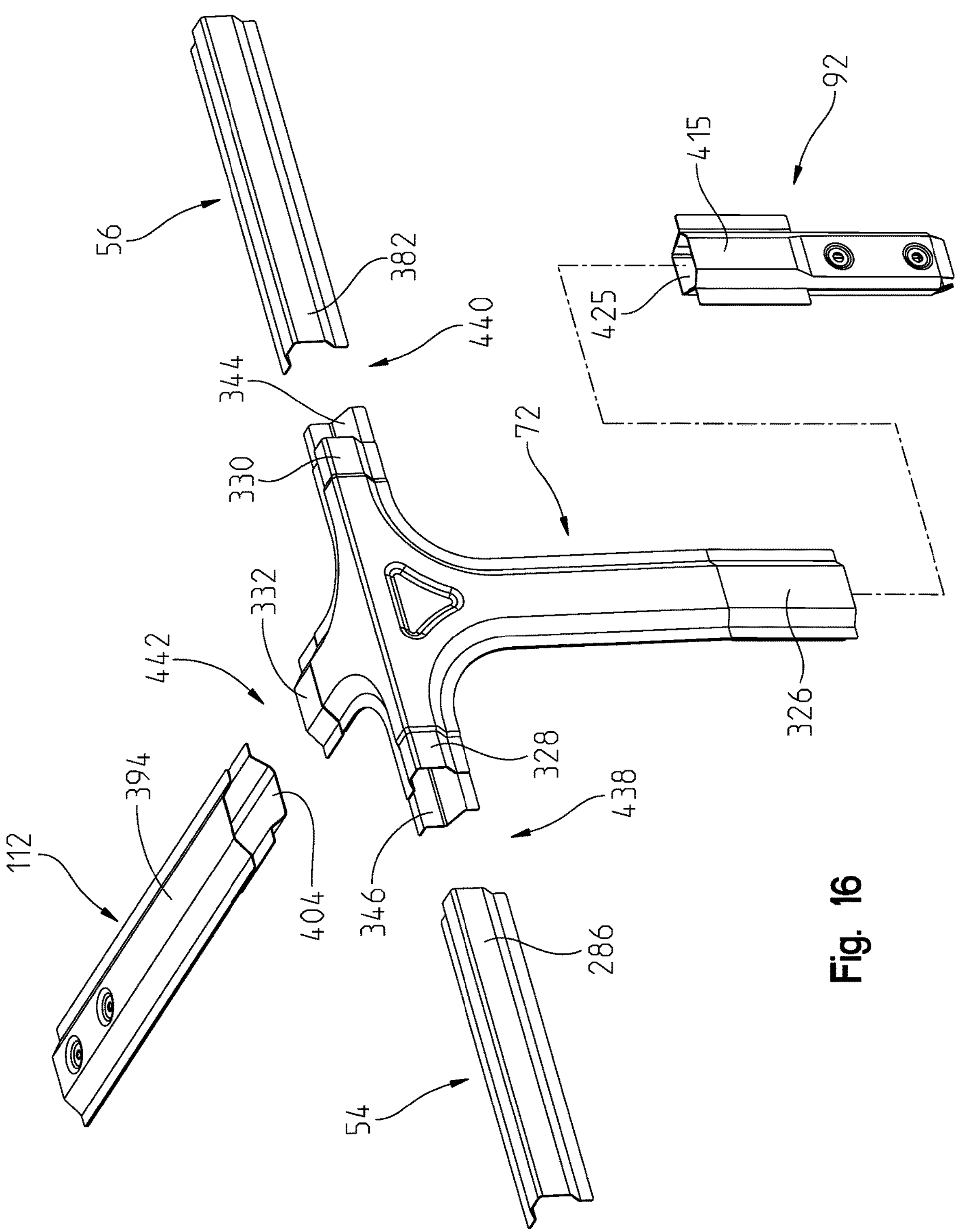
FIG. 16 is an exploded view of the upper B-pillar portion of FIG. 15A.

Referring now to FIGS. 41-44, middle portion 1022 includes first upper B-pillar 1012 and second upper B-pillar 1014 (FIG. 35). In embodiments, first upper B-pillar 1012 is substantially similar to, or the same as, upper B-pillar member 72 (FIG. 16). Referring back to FIG. 35, cross-member assembly 1028 extends between first upper B-pillar 1012 and second upper B-pillar 1014, and cross-member assembly 1028 includes left portion 1028L and right portion 1028R. Illustratively, left portion 1028L of cross-member assembly 1028 couples to first upper B-pillar 1012 at mounting portion 1200. In embodiments, mounting portion 1200 is similar to, or the same as second mounting location 442 (FIG. 16). Further, left portion 1028L of cross-member assembly 1028 couples to right portion 1028R of cross-member assembly 1028 at mounting portion 1300.

Figure 42:
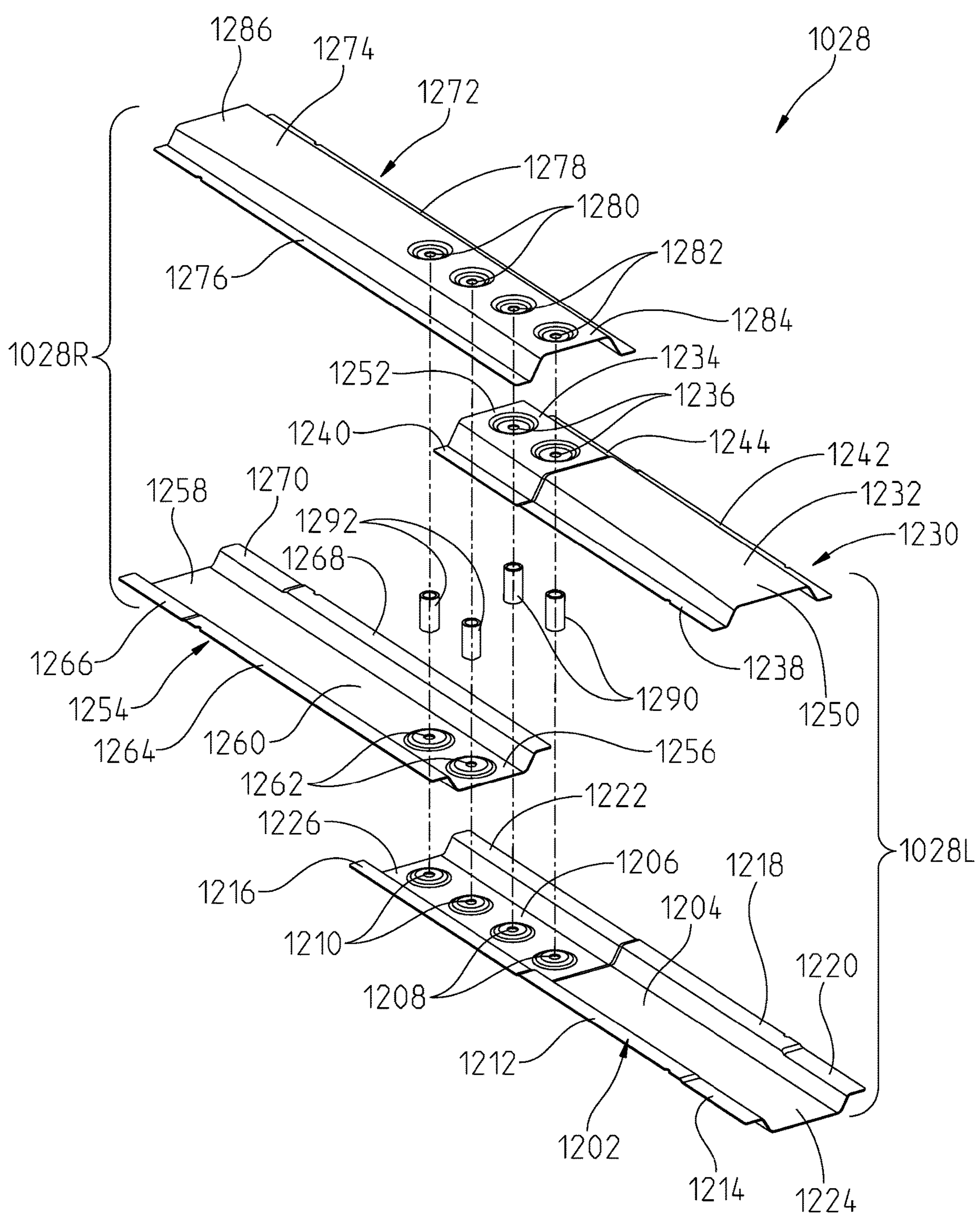
FIG. 42 is an exploded view of a cross-member of the frame assembly of FIG. 35.

Referring now to FIG. 42, cross-member assembly 1028 includes a first stamped frame member 1202, a second stamped frame member 1230, a third stamped frame member 1254, and a fourth stamped frame member 1272. Illustratively, left portion 1028L of cross-member assembly 1028 includes first stamped frame member 1202 and second stamped frame member 1230 and right portion 1028R of cross-member assembly 1028 includes third stamped frame member 1254 and fourth stamped frame member 1272. In embodiments, each of first stamped frame member 1202, second stamped frame member 1230, third stamped frame member 1254, and fourth stamped frame member 1272 are stamped frame members.

Still referring to FIG. 42, first stamped frame member 1202 includes a first body portion 1204 and a second body portion 1206 offset from the first body portion 1204. First stamped frame member 1202 also includes a first end portion 1224 adjacent first body portion 1204 and a second end portion 1226 adjacent second body portion 1206. A first front edge portion 1212 extends forwardly from first body portion 1204, a second front edge portion 1214 extends forwardly from first body portion 1204 and is offset from first front edge portion 1212, and a third front edge portion 1216 extends forwardly from second body portion 1206 and is offset from first front edge portion 1212. A first rear edge portion 1218 extends rearwardly from first body portion 1204, a second rear edge portion 1220 extends rearwardly from first body portion 1204 and is offset from first rear edge portion 1218, and a third rear edge portion 1222 extends rearwardly from second body portion 1206 and is offset from first rear edge portion 1218. Further, second body portion 1206 defines a first pair of apertures 1208 and a second pair of apertures 1210.

Still referring to FIG. 42, second stamped frame member 1230 includes a first body portion 1232 and a second body portion 1234 offset from the first body portion 1232, and second body portion 1234 defines a pair of apertures 1236. Second stamped frame member 1230 also includes a first end portion 1250 adjacent first body portion 1232 and a second end portion 1252 opposite the first end portion 1250 and positioned adjacent second body portion 1234. A first front edge 1238 extends forwardly from first body portion 1232 and a second front edge 1240 extends forwardly from second body portion 1234 and offset from first front edge 1238. Further, a first rear edge 1242 extends rearwardly from first body portion 1232 and a second rear edge 1244 extends rearwardly from second body portion 1234.

Still referring to FIG. 42, third stamped frame member 1254 includes a first end portion 1256 and a second end portion 1258 opposite the first end portion 1256. A main body portion 1260 extends between first end portion 1256 and second end portion 1258. Further, third stamped frame member 1254 includes a first front edge portion 1264 extending forwardly from main body portion 1260 and a second front edge portion 1266 extending forwardly from main body portion 1260 and offset from first front edge portion 1264, and a first rear edge portion 1268 extending rearwardly from main body portion 1260 and a second rear edge portion 1270 extending rearwardly from main body portion 1260 and offset from first rear edge portion 1268. Further, main body portion 1260 defines a pair of apertures 1262.

Still referring to FIG. 42, fourth stamped frame member 1272 includes a first end portion 1284 and a second end portion 1286 opposite the first end portion 1284. A main body portion 1274 extends between first end portion 1284 and second end portion 1286, and main body portion 1274 defines a first pair of apertures 1280 and a second pair of apertures 1282. Further, a front edge 1276 extends forwardly from main body portion 1274 and a rear edge 1278 extends rearwardly from main body portion 1274.

Figure 43:
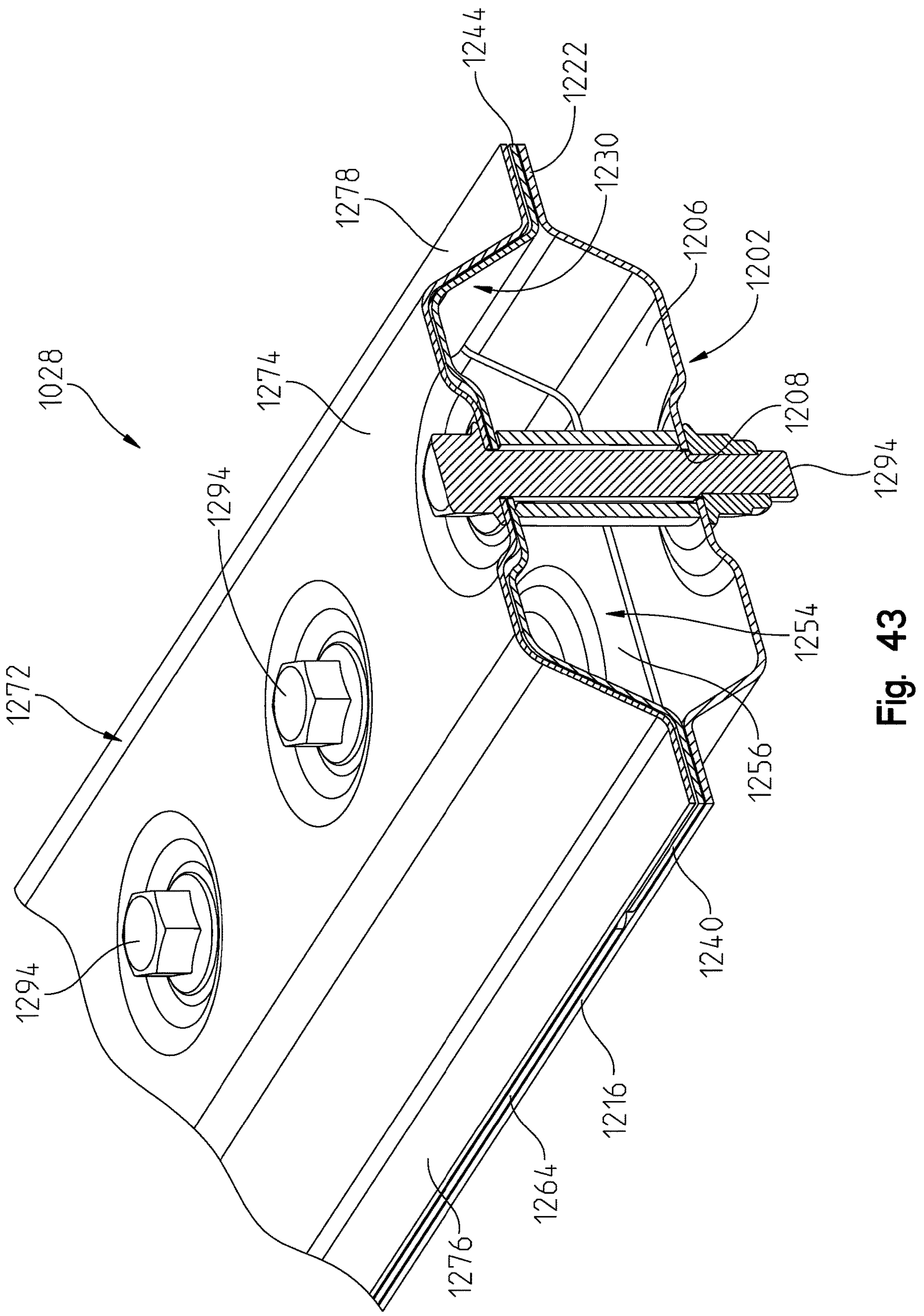
FIG. 43 is a cross-section view of the cross-member of FIG. 42 taken along line 43-43 of FIG. 35.

Referring to FIGS. 42-43, each of first stamped frame member 1202, second stamped frame member 1230, third stamped frame member 1254, and fourth stamped frame member 1272 are coupled together by one or more couplers and one or more welds, adhesives, or other coupling mechanisms. In embodiments, each of first stamped frame member 1202, second stamped frame member 1230, third stamped frame member 1254, and fourth stamped frame member 1272 are layered together to increase the strength, rigidity, bending resistance, and sealing capability of cross-member assembly 1028. In embodiments, the mounting portion 1300 is assembled by layering together each of first stamped frame member 1202, second stamped frame member 1230, third stamped frame member 1254, and fourth stamped frame member 1272, allowing cross-member assembly 1028 to be assembled with first upper B-pillar 1012 and second upper B-pillar 1014 in their assembled location. That is, each of first stamped frame member 1202, second stamped frame member 1230, third stamped frame member 1254, and fourth stamped frame member 1272 may be vertically translated either upwardly or downwardly (e.g., on an assembly line) to be coupled to one or more of first stamped frame member 1202, second stamped frame member 1230, third stamped frame member 1254, and fourth stamped frame member 1272 and one of first upper B-pillar 1012 or second upper B-pillar 1014.

In embodiments, each of first end portion 1224 of first stamped frame member 1202 and first end portion 1250 of second stamped frame member 1230 are coupled to first upper B-pillar 1012 at mounting portion 1200 by a plurality of spot welds and/or adhesives along one or more of second front edge portion 1214, first end portion 1224, second rear edge portion 1220 of first stamped frame member 1202 and along one or more of first front edge 1238, first end portion 1250, and first rear edge 1242 of second stamped frame member 1230 (e.g., similar to, or the same as, first member 112 coupling to upper B-pillar member 72 at second mounting location 442 (FIG. 16)).

In embodiments, second stamped frame member 1230 is coupled to first stamped frame member 1202 by one or more of spot welds, adhesives, fasteners, or other coupling methods. In embodiments, one or more spot welds and/or adhesives are placed along or between first front edge 1238 and first front edge portion 1212, one or more spot welds and/or adhesives are placed along or between first rear edge 1242 and first rear edge portion 1218, one or more spot welds and/or adhesives are placed along or between second front edge 1240 and third front edge portion 1216, and one or more spot welds and/or adhesives are placed along or between second rear edge 1244 and third rear edge portion 1222. In embodiments, spacers 1290 are positioned between first stamped frame member 1202 and second stamped frame member 1230, generally aligned, or coaxial, with apertures 1208 and apertures 1236. In embodiments, spacers 1290 are welded to second body portion 1206 of first stamped frame member 1202 to assist in assembly of cross-member assembly 1028.

Figure 44:
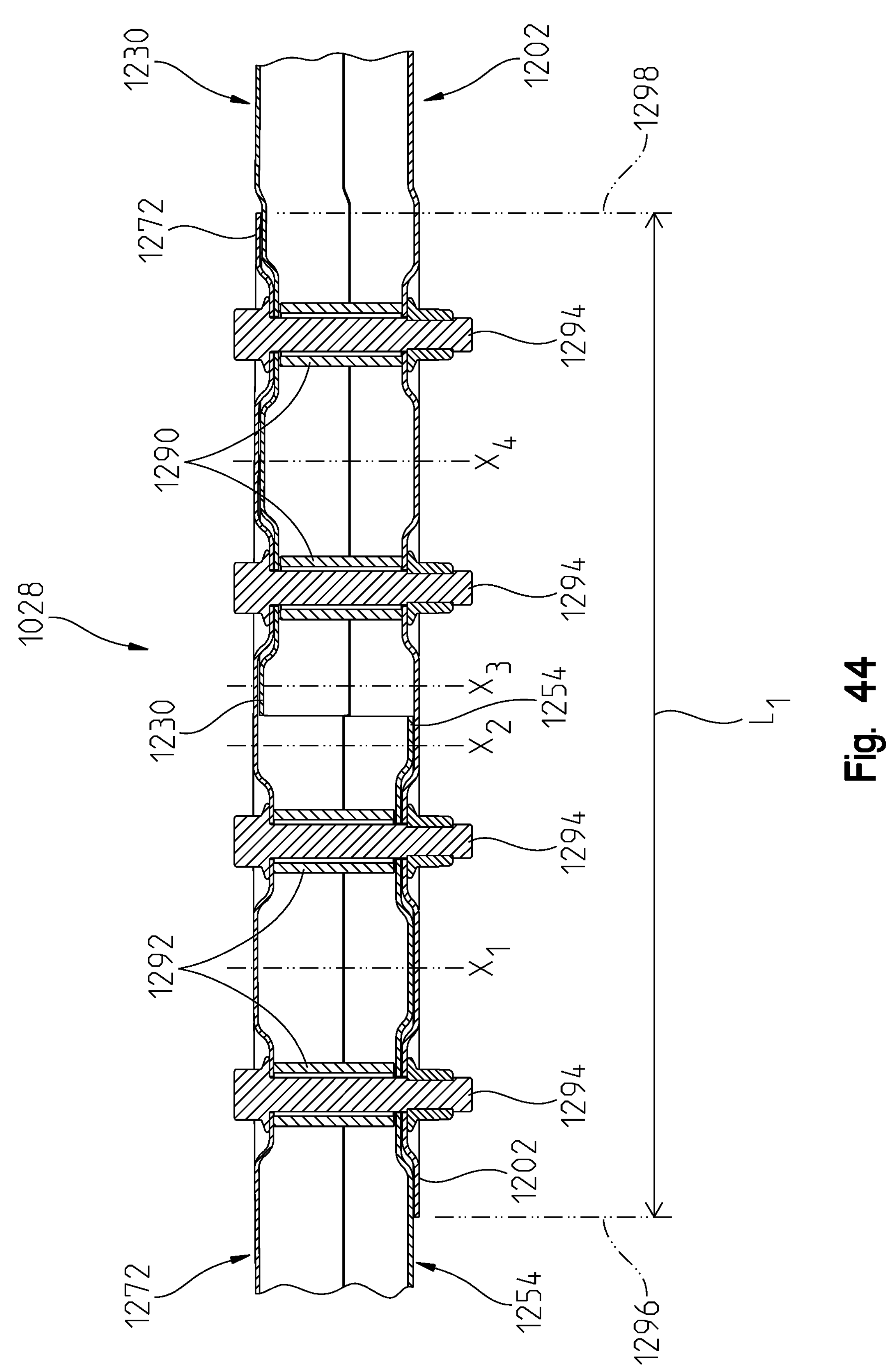
FIG. 44 is a cross-section view of the cross-member of FIG. 42 taken along line 44-44 of FIG. 35.

Still referring to FIGS. 42-43, third stamped frame member 1254 is coupled to first stamped frame member 1202 by one or more of spot welds, adhesives, fasteners, or other coupling methods. In embodiments, one or more spot welds and/or adhesives are placed along or between first front edge portion 1264 of third stamped frame member 1254 and third front edge portion 1216 of first stamped frame member 1202 and one or more spot welds and/or adhesives are placed along or between first rear edge portion 1268 of third stamped frame member 1254 and third rear edge portion 1222 of first stamped frame member 1202. Illustratively, third stamped frame member 1254 is coupled to first stamped frame member 1202 such that apertures 1262 are aligned, or coaxial with, apertures 1210. As best seen in FIG. 44, each of second stamped frame member 1230 and third stamped frame member 1254 are coupled to first stamped frame member 1202 such that second end portion 1252 of second stamped frame member 1230 and first end portion 1256 of third stamped frame member 1254 are generally adjacent each other at mounting portion 1300. That is, in embodiments, neither of second stamped frame member 1230 or third stamped frame member 1254 overlap each other when viewed from, for example, the front of the vehicle along the vehicle centerline.

Still referring to FIGS. 42-43, fourth stamped frame member 1272 is coupled to each of third stamped frame member 1254 and second stamped frame member 1230 by one or more spot welds, adhesives, fasteners, or other coupling methods. In embodiments, one or more spot welds and/or adhesives are placed along or between front edge 1276 of fourth stamped frame member 1272 and first front edge portion 1264 of third stamped frame member 1254, one or more spot welds and/or adhesives are placed along or between front edge 1276 of fourth stamped frame member 1272 and second front edge 1240 of second stamped frame member 1230, one or more spot welds and/or adhesives are placed along or between rear edge 1278 of fourth stamped frame member 1272 and first rear edge portion 1268 of third stamped frame member 1254, and one or more spot welds and/or adhesives are placed along or between rear edge 1278 of fourth stamped frame member 1272 and second rear edge 1244 of second stamped frame member 1230. In embodiments, spacers 1292 are positioned between third stamped frame member 1254 and fourth stamped frame member 1272, generally aligned, or coaxial, with apertures 1262 and apertures 1280. In embodiments, spacers 1292 are welded to main body portion 1260 of third stamped frame member 1254 to assist in assembly of cross-member assembly 1028.

Referring now to FIGS. 43-44, a plurality of fasteners 1294 are configured to extend through the apertures of cross-member assembly 1028 to couple first stamped frame member 1202, second stamped frame member 1230, third stamped frame member 1254, and fourth stamped frame member 1272. That is, a first pair of fasteners 1294 extend through apertures 1208, apertures 1236, apertures 1282, and spacers 1290, and a second pair of fasteners 1294 extend through apertures 1210, apertures 1262, apertures 1280, and spacers 1292.

Referring to FIG. 44, cross-member assembly 1028 is constructed so that a length L1 is defined between a first extent 1296 of first stamped frame member 1202 and a second extent 1298 of fourth stamped frame member 1272, and a cross-section taken along cross-member assembly 1028 along length L1 will intersect at least three of first stamped frame member 1202, second stamped frame member 1230, third stamped frame member 1254, and fourth stamped frame member 1272. In embodiments, a cross-section taken along cross-member assembly 1028 along length L1 will intersect at least two of first stamped frame member 1202, second stamped frame member 1230, third stamped frame member 1254, and fourth stamped frame member 1272. In embodiments, a cross-section taken along cross-member assembly 1028 along length L1 will intersect at least four of first stamped frame member 1202, second stamped frame member 1230, third stamped frame member 1254, and fourth stamped frame member 1272. In embodiments, a cross-section taken along a plane X1 extending through an upper surface of cross-member assembly 1028 (e.g., through main body portion 1274 of fourth stamped frame member 1272) will extend through each of fourth stamped frame member 1272, third stamped frame member 1254, and first stamped frame member 1202. In embodiments, a cross-section taken along a plane X2 extending through an upper surface of cross-member assembly 1028 (e.g., through main body portion 1274 of fourth stamped frame member 1272) will extend through each of fourth stamped frame member 1272, third stamped frame member 1254, and first stamped frame member 1202. In embodiments, a cross-section taken along a plane X3 extending through an upper surface of cross-member assembly 1028 (e.g., through main body portion 1274 of fourth stamped frame member 1272) will extend through each of fourth stamped frame member 1272, second stamped frame member 1230, and first stamped frame member 1202. In embodiments, a cross-section taken along a plane X4 extending through an upper surface of cross-member assembly 1028 (e.g., through main body portion 1274 of fourth stamped frame member 1272) will extend through each of fourth stamped frame member 1272, second stamped frame member 1230, and first stamped frame member 1202. In embodiments, a cross-section taken along any plane extending through an upper surface of cross-member assembly 1028 (e.g., through main body portion 1274 of fourth stamped frame member 1272) will extend through each of first stamped frame member 1202 and fourth stamped frame member 1272.

Figure 19A:
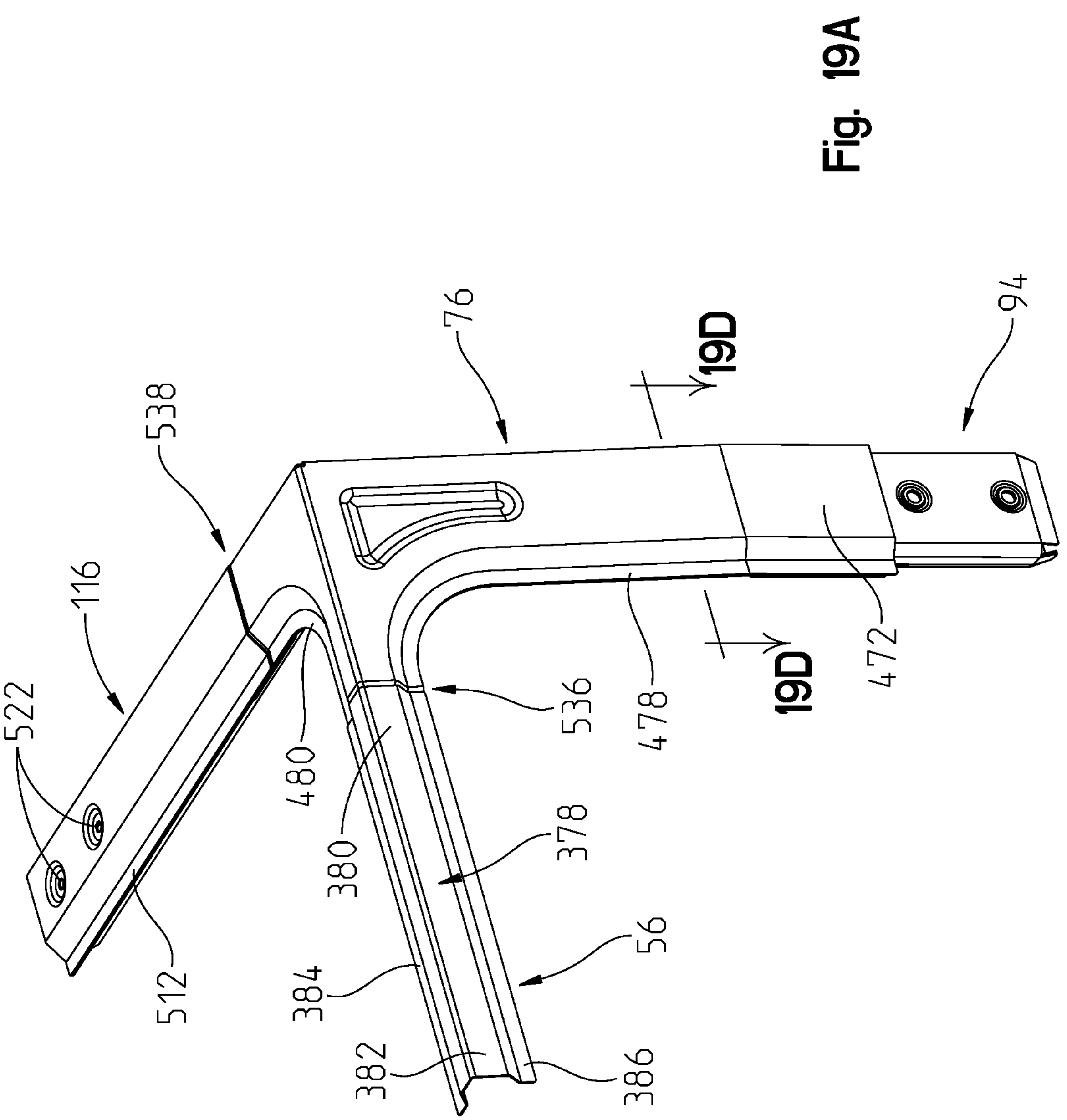
FIG. 19A is a front left perspective view of an upper C-pillar portion of the upper frame assembly of FIG. 9.
Figure 19B:
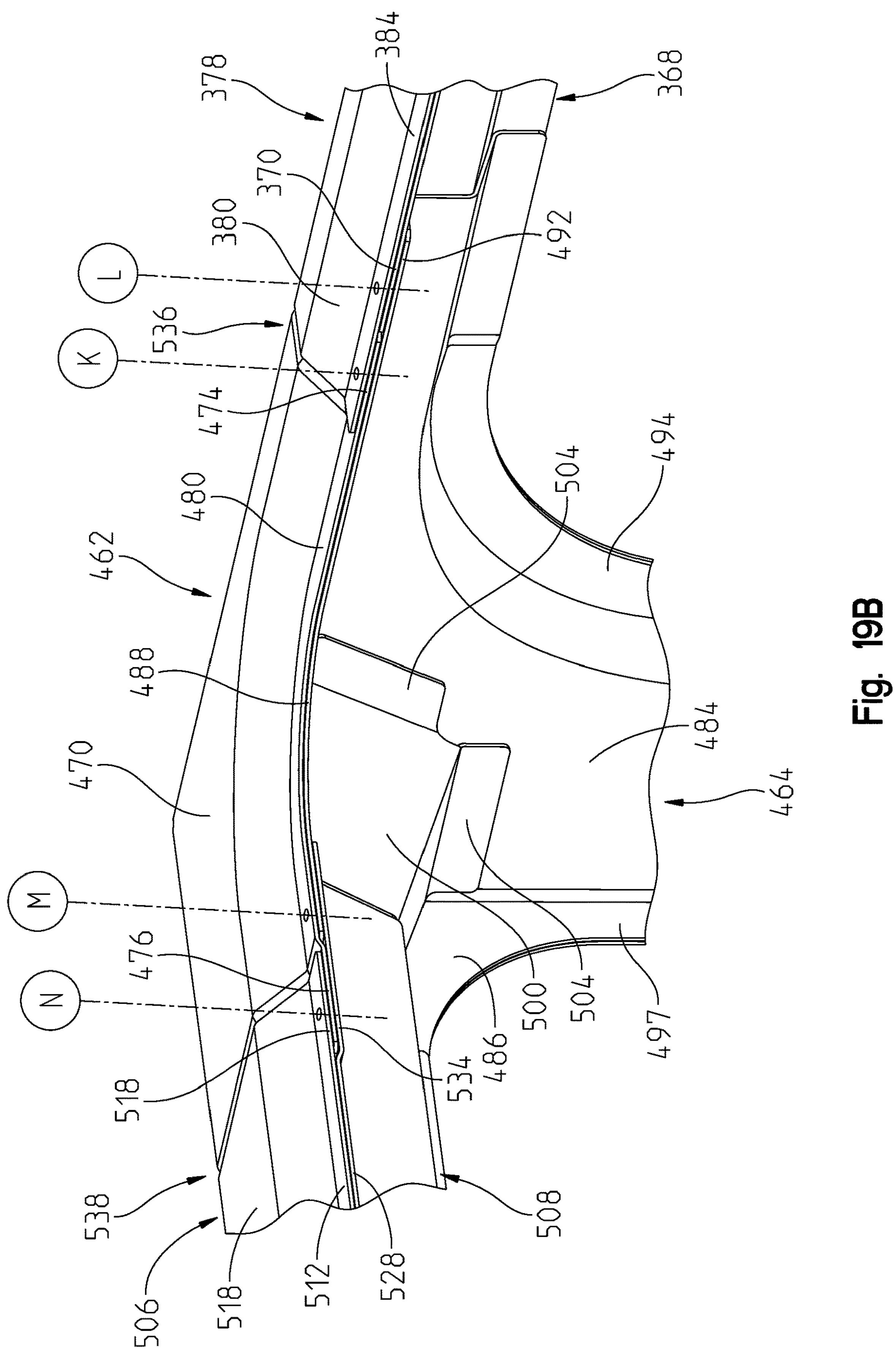
FIG. 19B is a perspective view of a joint member of the upper C-pillar portion of FIG. 19A.
Figure 19C:
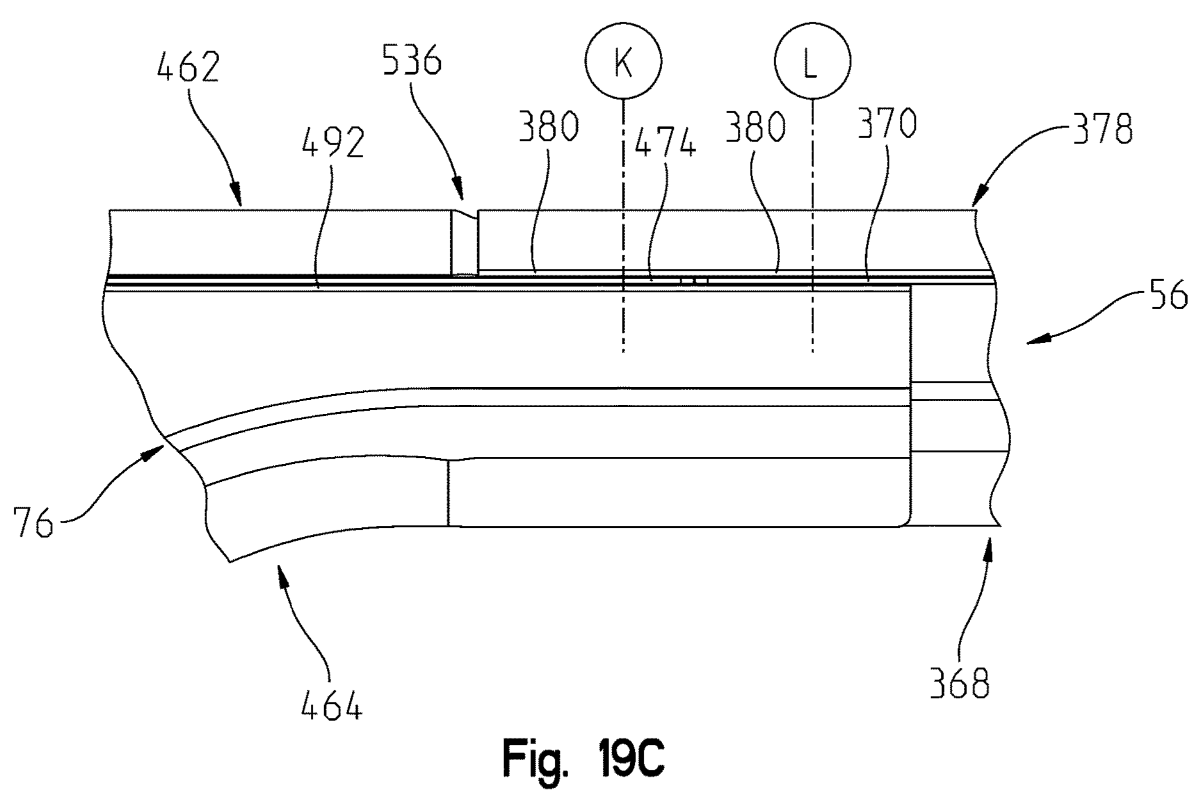
FIG. 19C is a side view of a lap joint of the joint member of FIG. 19B and a frame member of the upper C-pillar portion of FIG. 19A.
Figure 19D:
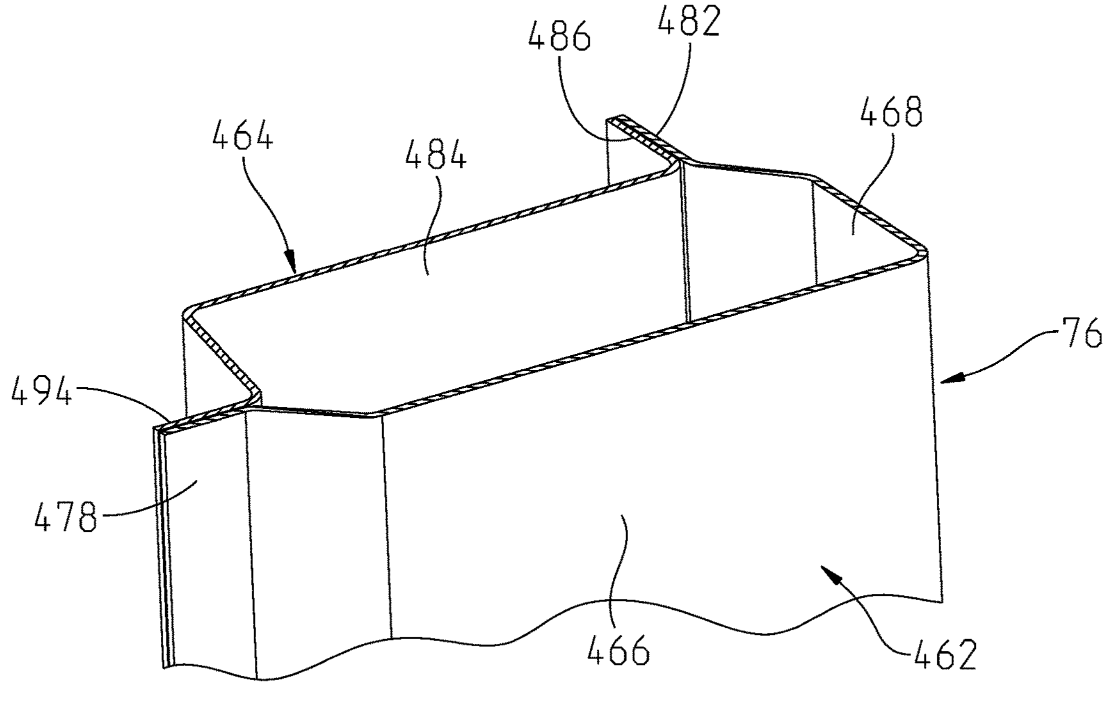
FIG. 19D is a cross-section of the C-pillar of the upper C-pillar portion of FIG. 19A, taken along 19D-19D in FIG. 19A.
Figure 20:
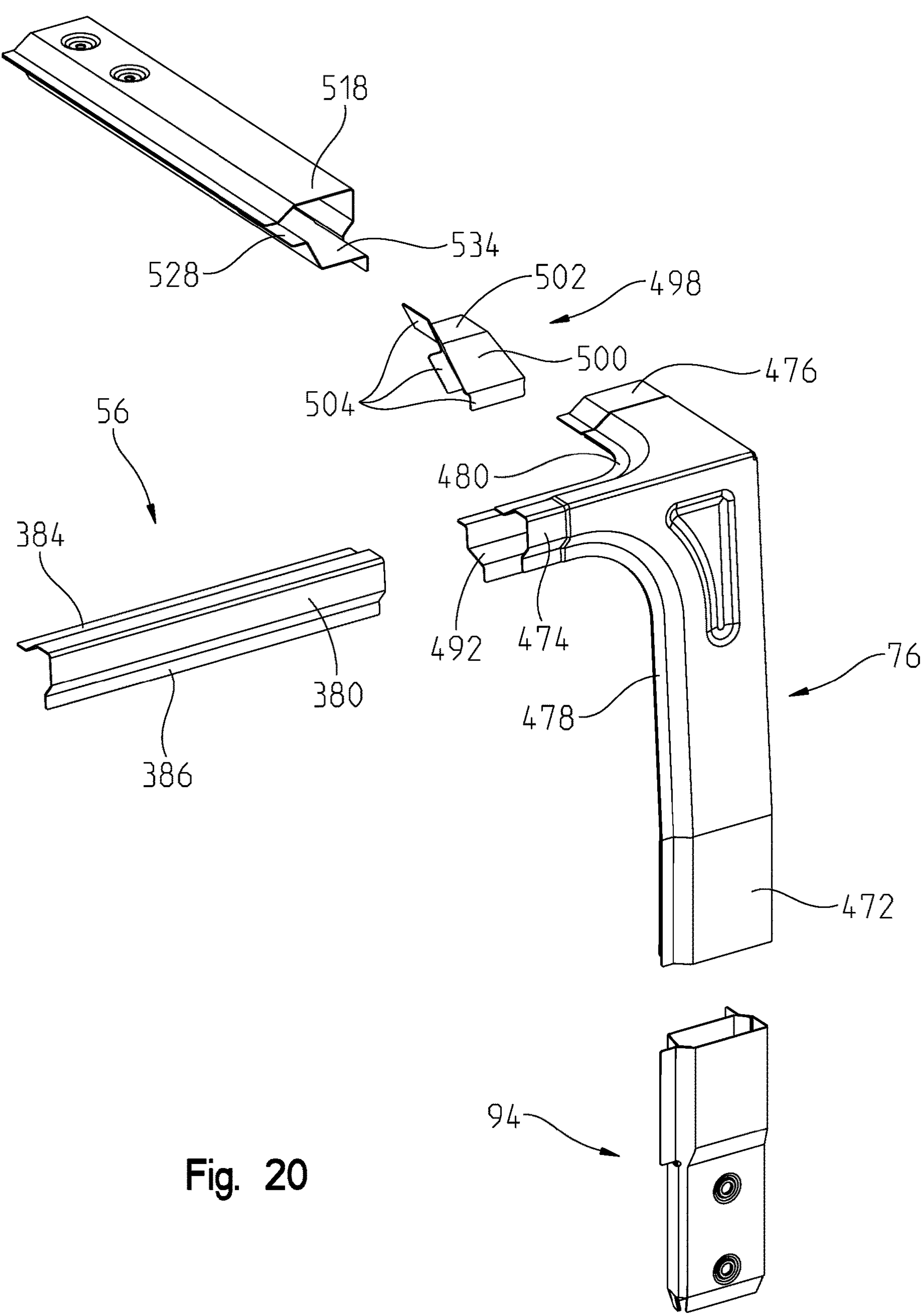
FIG. 20 is an exploded view of the upper C-pillar portion of FIG. 19A.
Figure 46:
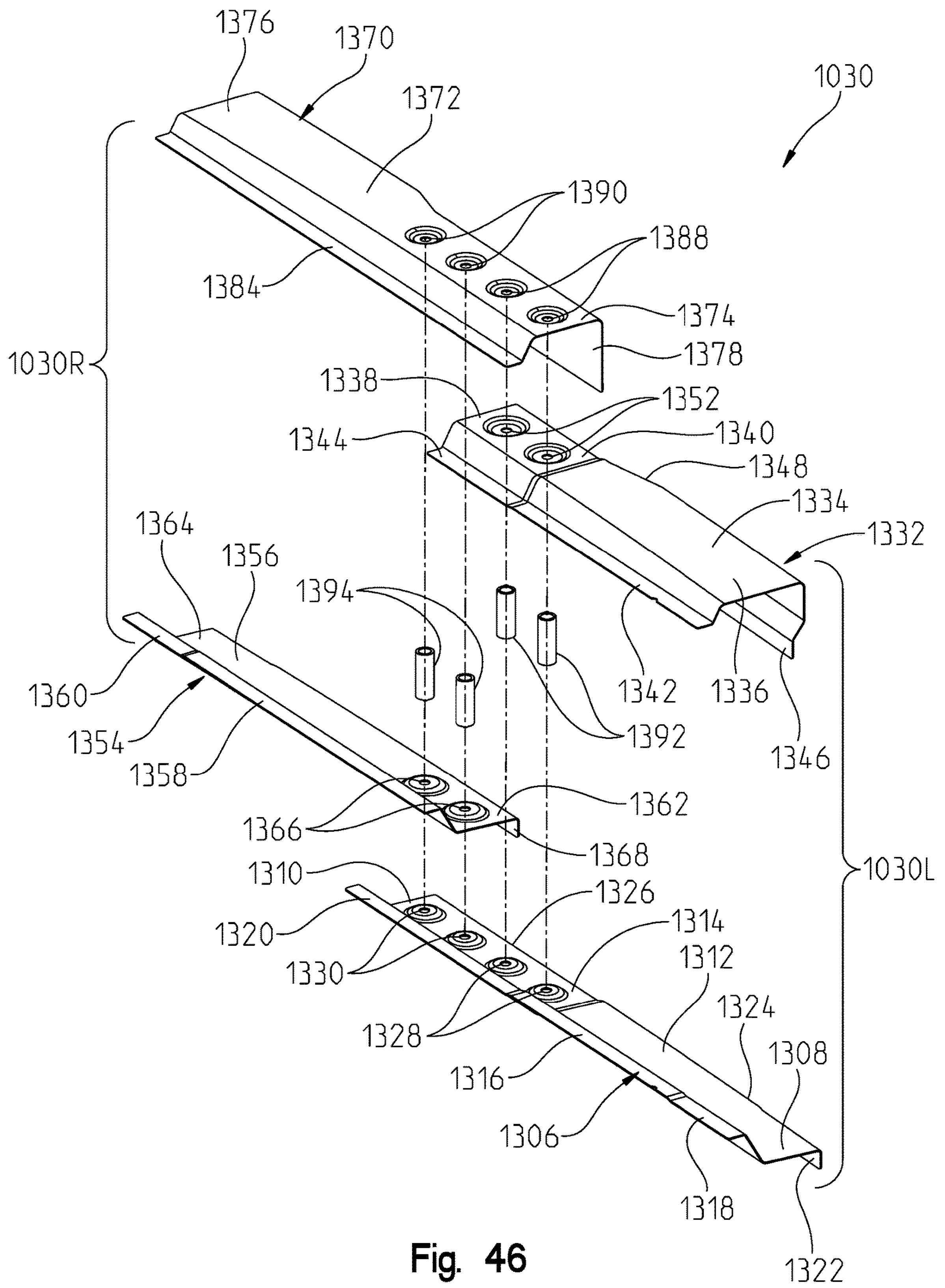
FIG. 46 is an exploded view of a cross-member of the frame assembly of FIG. 35.
Figure 47:
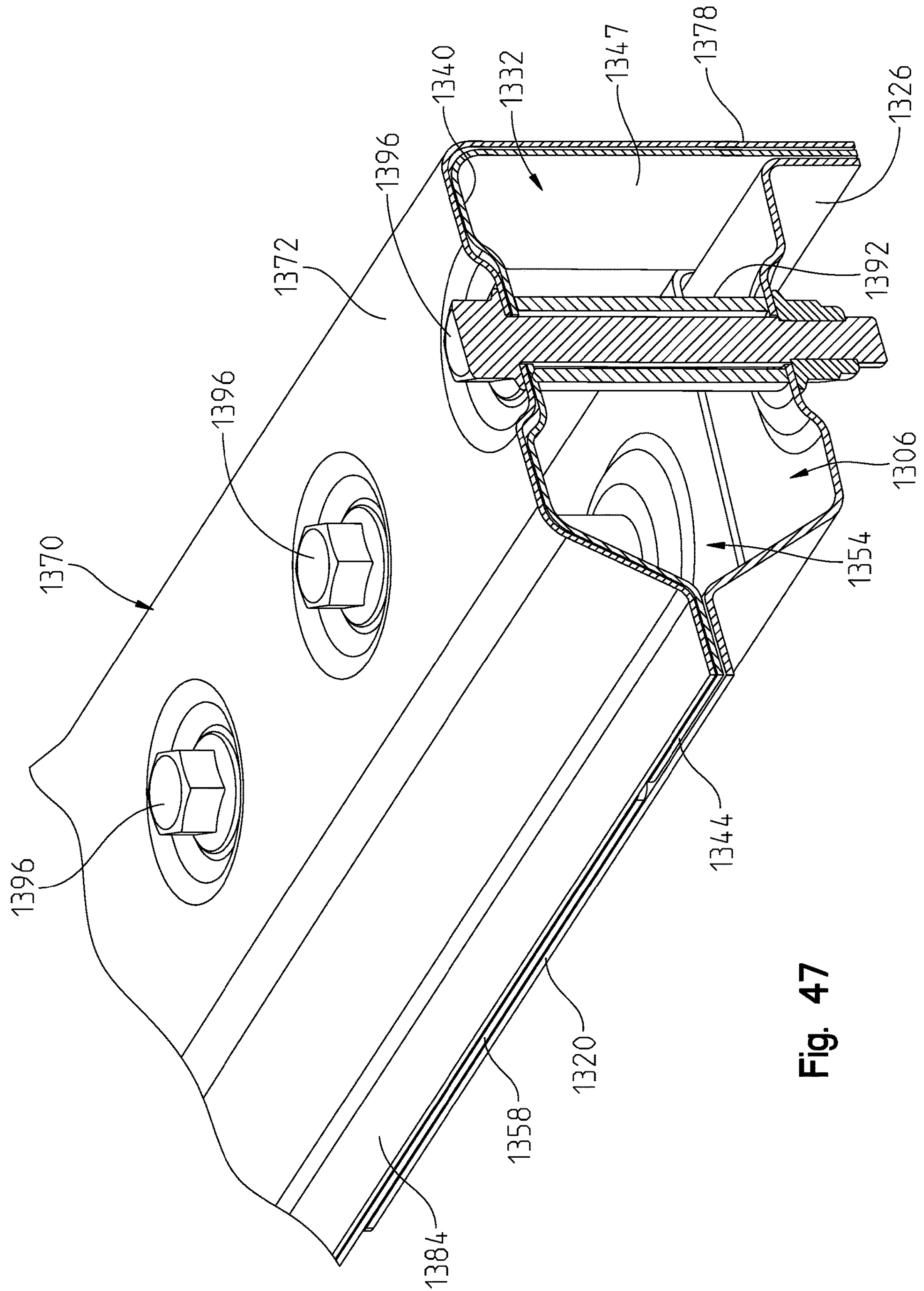
FIG. 47 is a cross-section view of the cross-member of FIG. 46 taken along line 47-47 of FIG. 35.
Figure 48:
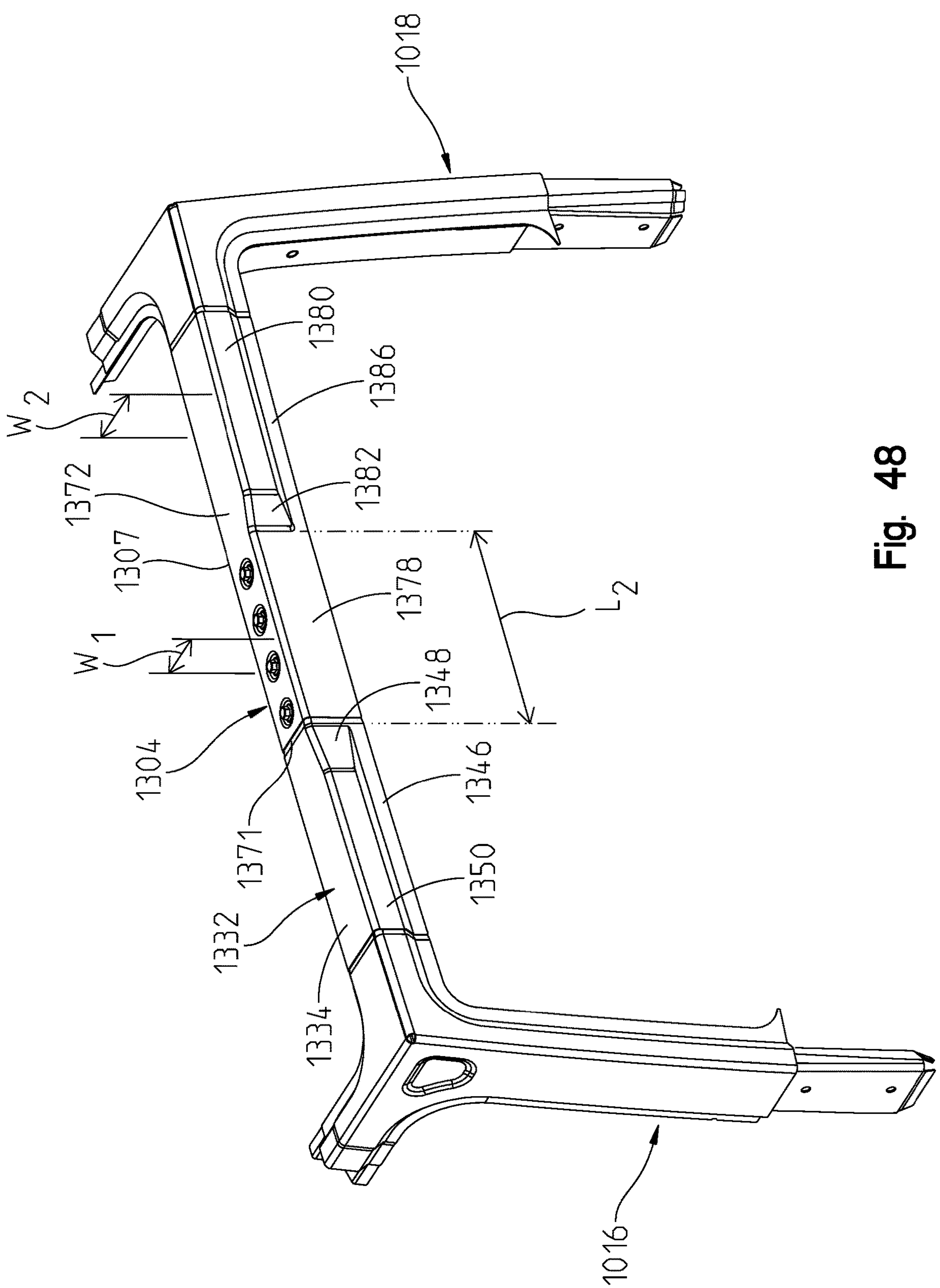
FIG. 48 is a rear view of an upper C-pillar portion of the frame assembly of FIG. 35.

Referring now to FIGS. 45-48, rear portion 1024 includes first upper C-pillar 1016 and second upper C-pillar 1018 (FIG. 48). In embodiments, first upper C-pillar 1016 is substantially similar to, or the same as, upper C-pillar member 76 (FIG. 21). Referring back to FIG. 45, cross-member assembly 1030 extends between first upper C-pillar 1016 and second upper C-pillar 1018, and cross-member assembly 1030 includes left portion 1030L and right portion 1030R. Illustratively, left portion 1030L of cross-member assembly 1030 couples to first upper C-pillar 1016 at mounting portion 1302. In embodiments, mounting portion 1302 is similar to, or the same as second mounting location 538 (FIG. 19A). Further, left portion 1030L of cross-member assembly 1030 couples to right portion 1030R of cross-member assembly 1030 at mounting portion 1304.

Figure 45:
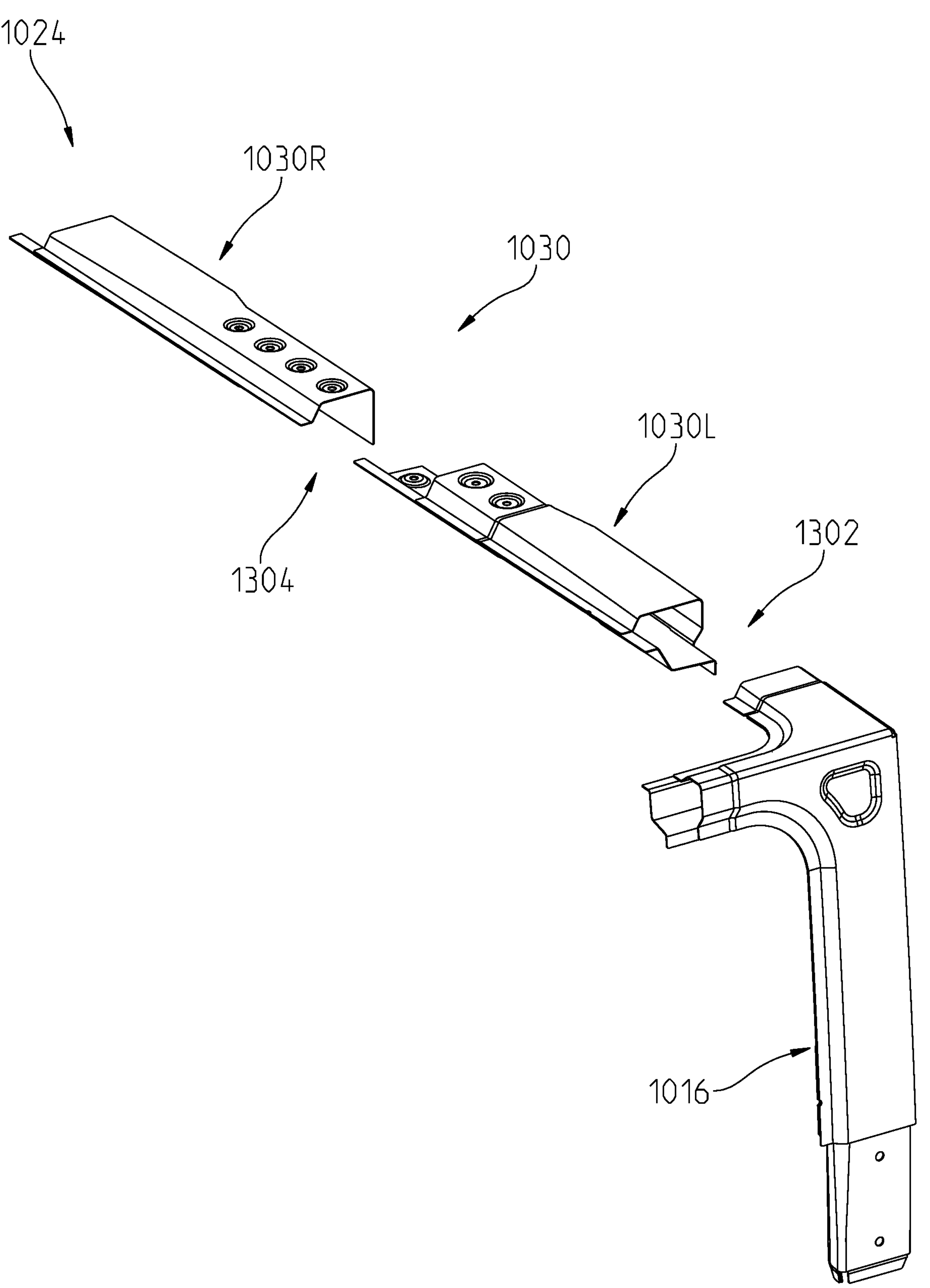
FIG. 45 is an exploded view of an upper C-pillar portion of the frame assembly of FIG. 35.

Referring now to FIG. 45, cross-member assembly 1030 includes a first stamped frame member 1306, a second stamped frame member 1332, a third stamped frame member 1354, and a fourth stamped frame member 1370. Illustratively, left portion 1030L of cross-member assembly 1030 includes first stamped frame member 1306 and second stamped frame member 1332 and right portion 1030R of cross-member assembly 1030 includes third stamped frame member 1354 and fourth stamped frame member 1370. In embodiments, each of first stamped frame member 1306, second stamped frame member 1332, third stamped frame member 1354, and fourth stamped frame member 1370 are stamped frame members.

Referring now to FIG. 46, first stamped frame member 1306 includes a first end portion 1308 and a second end portion 1310 generally opposite the first end portion 1308. First stamped frame member 1306 includes a first body portion 1312 and a second body portion 1314 offset from the first body portion, and second body portion 1314 defines a first pair of apertures 1328 and a second pair of apertures 1330. A first front edge portion 1316 extends forwardly from first body portion 1312, a second front edge portion 1318 extends forwardly from first body portion 1312 adjacent first end portion 1308 and second front edge portion 1318 is offset from first front edge portion 1316, and a third front edge portion 1320 extends forwardly from second body portion 1314 adjacent second end portion 1310 and third front edge portion 1320 offset from first front edge portion 1316. A first rear edge portion 1324 extends generally downwardly from first body portion 1312, a second rear edge portion 1322 extends generally downwardly from first body portion 1312 adjacent first end portion 1308 and second rear edge portion 1322 is offset from first rear edge portion 1324, and a third rear edge portion 1326 (also FIG. 47) extends generally downwardly from second body portion 1314 adjacent second end portion 1310 and third rear edge portion 1326 is offset from first rear edge portion 1324.

Still referring to FIG. 46, second stamped frame member 1332 includes a first end portion 1336 and a second end portion 1338 generally opposite the first end portion 1336, and a first body portion 1334 and a second body portion 1340 extend between first end portion 1336 and second end portion 1338, and the first body portion 1334 is adjacent first end portion 1336 and second body portion 1340 is adjacent second end portion 1338 and second body portion 1340 is offset from first body portion 1334. Further, second body portion 1340 defines a pair of apertures 1352. A first front edge portion 1342 extends forwardly from first body portion 1334 and a second front edge portion 1344 extends forwardly from second body portion 1340 and second front edge portion 1344 is offset from first front edge portion 1342. A first rear edge portion 1346 extends downwardly from first body portion 1334 and a second rear edge portion 1347 (FIG. 47) extends downwardly from second body portion 1340 and offset from first rear edge portion 1346. Referring to FIG. 48, second stamped frame member 1332 includes a ridge portion 1350 between first body portion 1334 and first rear edge portion 1346, and a sloped portion 1348 extending toward first rear edge portion 1346 and second rear edge portion 1347 from ridge portion 1350.

Still referring to FIG. 46, third stamped frame member 1354 includes a first end portion 1362, a second end portion 1364, and a body portion 1356 extending between first end portion 1362 and second end portion 1364. Body portion 1356 defines a pair of apertures 1366. A first edge portion 1358 extends forwardly from body portion 1356 and a second edge portion 1360 extends forwardly from body portion 1356, and second edge portion 1360 is offset from first edge portion 1358. A rear edge portion 1368 extends generally downwardly from body portion 1356.

Still referring to FIGS. 46-47, fourth stamped frame member 1370 includes a first end portion 1374 and a second end portion 1376 opposite the first end portion, and a body portion 1372 extends between the first end portion 1374 and second end portion 1376. Body portion 1372 defines a first pair of apertures 1388 and a second pair of apertures 1390. A first edge portion 1384 extends forwardly from body portion 1372, a first rear edge portion 1378 extends generally downwardly from body portion 1372, a second rear edge portion 1386 extends generally downwardly from body portion 1372, and a ridge 1380 is positioned between body portion 1372 and second rear edge portion 1386. A sloped portion 1382 extends from ridge 1380 to first rear edge portion 1378.

Referring now to FIGS. 46-47, in embodiments, each of first end portion 1308 of first stamped frame member 1306 and first end portion 1336 of second stamped frame member 1332 are coupled to first upper C-pillar 1016 at mounting portion 1302 by a plurality of spot welds and/or adhesives along one or more of second front edge portion 1318, first end portion 1308, second rear edge portion 1322 of first stamped frame member 1306 and along one or more of first front edge portion 1342, first end portion 1336, first rear edge portion 1346, ridge portion 1350 of second stamped frame member 1332 (e.g., similar to, or the same as, first member 116 coupling to upper C-pillar member 76 at second mounting location 538).

In embodiments, second stamped frame member 1332 is coupled to first stamped frame member 1306 by one or more of spot welds, adhesives, fasteners, or other coupling methods. In embodiments, one or more spot welds and/or adhesives may be placed along or between first front edge portion 1342 and first stamped frame member 1306. In embodiments, one or more spot welds and/or adhesives may be placed along or between first rear edge portion 1346 and first rear edge portion 1324. In embodiments, one or more spot welds and/or adhesives may be placed along or between second front edge portion 1344 and third front edge portion 1320, and one or more spot welds and/or adhesives may be placed along or between second rear edge portion 1347 and third rear edge portion 1326. In embodiments, spacers 1392 are positioned between first stamped frame member 1306 and second stamped frame member 1332, generally aligned, or coaxial, with apertures 1328 and apertures 1352. In embodiments, spacers 1392 are welded to second body portion 1314 of first stamped frame member 1306 to assist in assembly of cross-member assembly 1030.

Referring still to FIG. 46, third stamped frame member 1354 is coupled to first stamped frame member 1306 by one or more of spot welds, adhesives, fasteners, or other coupling methods. In embodiments, one or more spot welds and/or adhesives may be placed along or in between first edge portion 1358 and third front edge portion 1320, one or more spot welds and/or adhesives may be placed along or in between body portion 1356 and second body portion 1314, and one or more spot welds and/or adhesives may be placed along or in between rear edge portion 1368 and third rear edge portion 1326.

Referring still to FIG. 46, fourth stamped frame member 1370 is coupled to each of third stamped frame member 1354 and second stamped frame member 1332 by one or more of spot welds, adhesives, fasteners, or other coupling methods. In embodiments, one or more spot welds and/or adhesives may be placed along or in between first edge portion 1384 and first edge portion 1358, one or more spot welds and/or adhesives may be placed along or in between first edge portion 1384 and second front edge portion 1344, one or more spot welds and/or adhesives may be placed along or in between body portion 1372 and second body portion 1340, one or more spot welds and/or adhesives may be placed along or in between first rear edge portion 1378 and rear edge portion 1368, and one or more spot welds and/or adhesives may be placed along or in between first rear edge portion 1378 and second rear edge portion 1347. In embodiments, spacers 1394 are positioned between third stamped frame member 1354 and fourth stamped frame member 1370, generally aligned, or coaxial, with apertures 1366 and apertures 1390. In embodiments, spacers 1394 are welded to body portion 1356 of third stamped frame member 1354 to assist in assembly of cross-member assembly 1030.

Referring now to FIGS. 47-48, a plurality of fasteners 1396 are configured to extend through the apertures of cross-member assembly 1030 to couple first stamped frame member 1306, second stamped frame member 1332, third stamped frame member 1354, and fourth stamped frame member 1370. That is, a first pair of fasteners 1396 extend through apertures 1328, apertures 1352, apertures 1388, and spacers 1392 and a second pair of fasteners 1396 extend through apertures 1330, apertures 1366, apertures 1390, and spacers 1394.

In embodiments, cross-member assembly 1030 is layered, similar to cross-member assembly 1028 (FIG. 42), to increase the strength, rigidity, bending resistance, and sealing capability of cross-member assembly 1030. In embodiments, cross-member assembly 1030 has a variable width to accommodate the layered members. That is, cross-member assembly 1030 has a first width W1 at a generally center portion (adjacent fasteners 1396) and a second width W2 at an outer edge of cross-member assembly 1030, adjacent first upper C-pillar 1016 and/or second upper C-pillar 1018, and the second width W2 is greater than the first width W1. Illustratively, the ridge portions 1350, 1380 increase the width of cross-member assembly 1030 toward the outer edges. A portion of cross-member 1030 has a length L2 defined between the extent 1371 of fourth stamped frame member 1370 and the extent 1307 of first stamped frame member 1306. Illustratively, the portion of cross-member 1030 along length L2 has a narrower width (e.g., first width W1) so that the overlapping frame pieces can easily fit over one another (e.g., fourth stamped frame member 1370 may be translated downwardly over second stamped frame member 1332) increasing the case of assembly of cross-member 1030.

Figure 49:
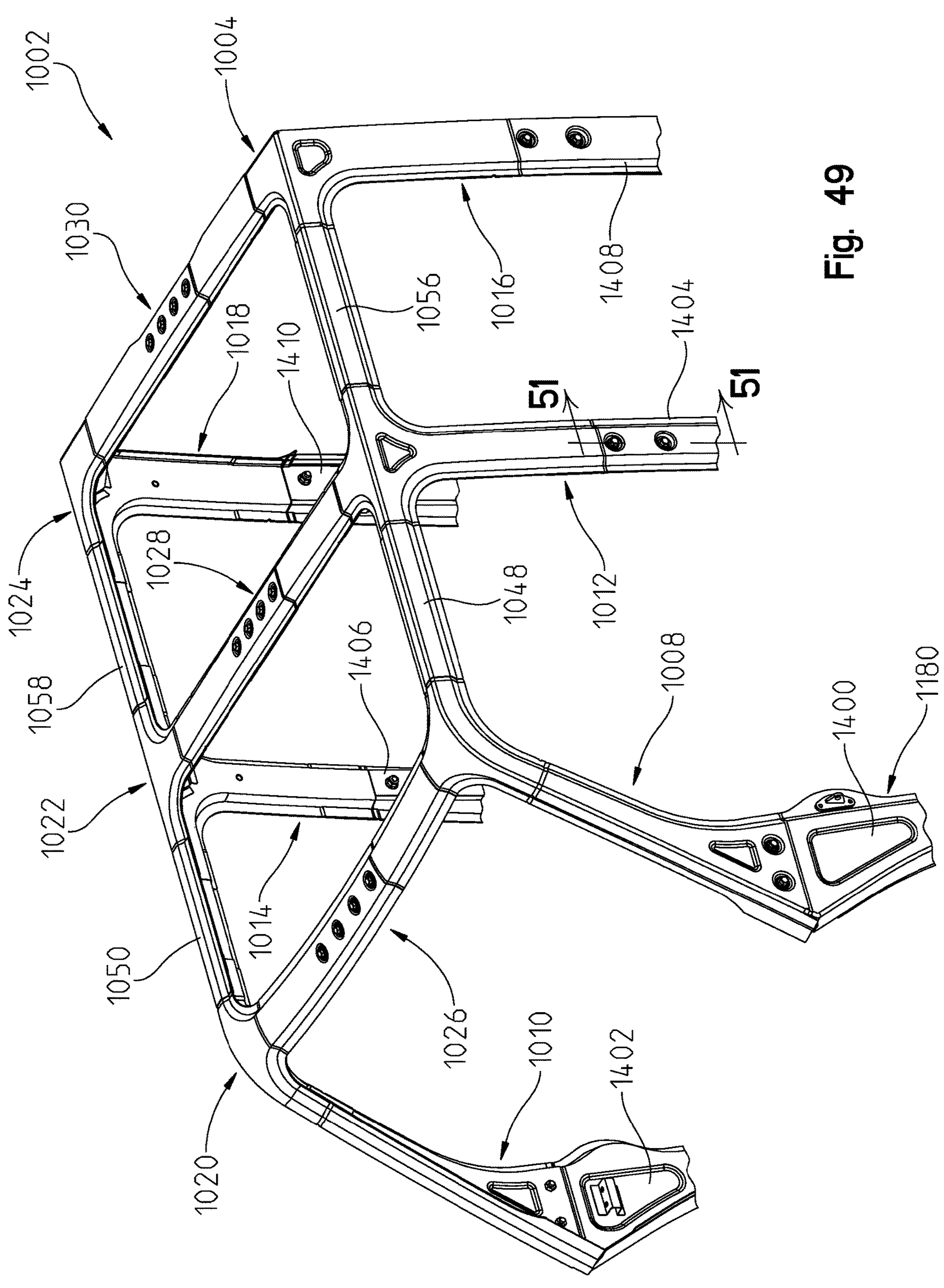
FIG. 49 is a perspective view of an alternative embodiment a frame assembly of the present disclosure with the portion of a frame assembly of FIG. 35.
Figure 50:
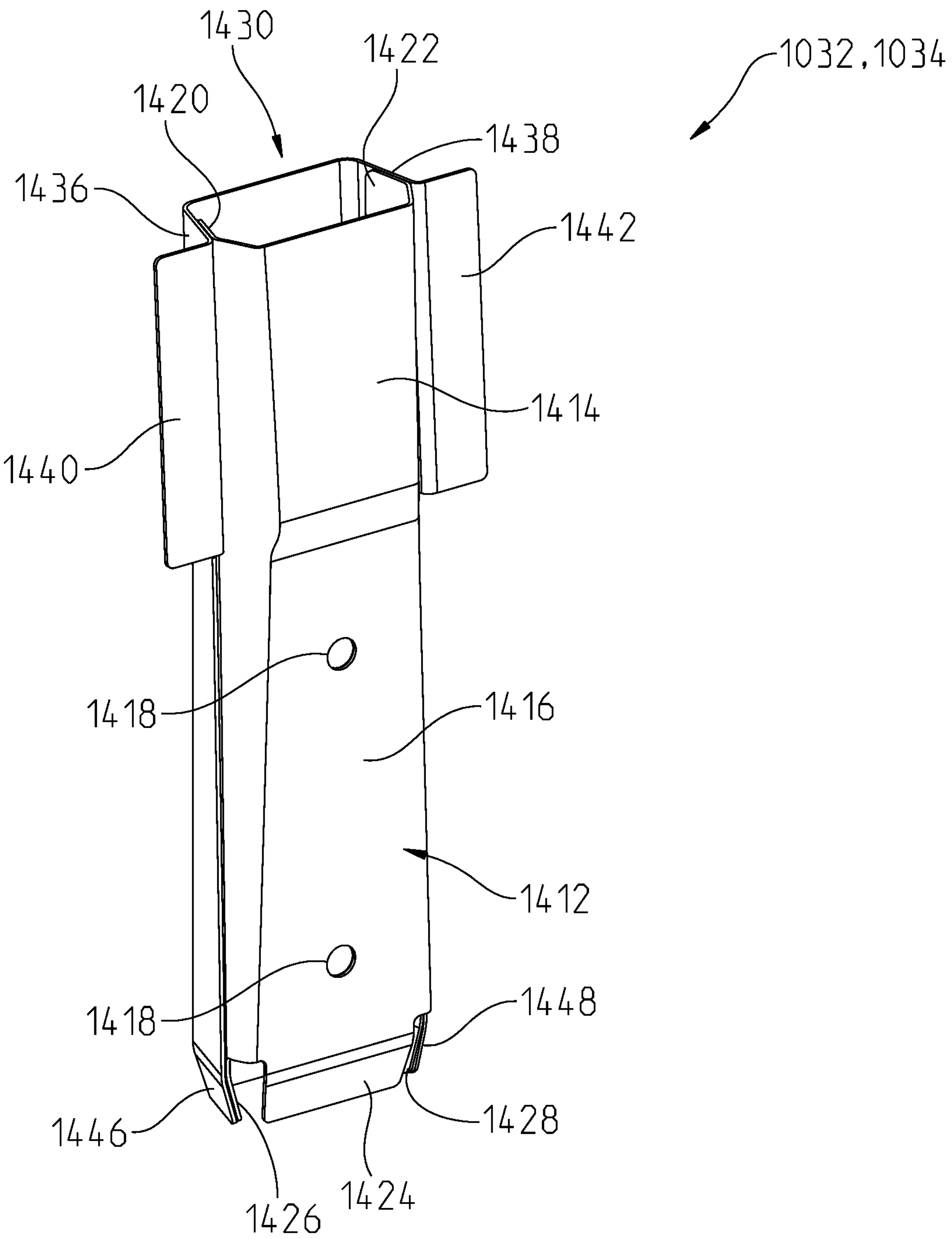
FIG. 50 is a perspective view of a coupler of the present disclosure.
Figure 51:
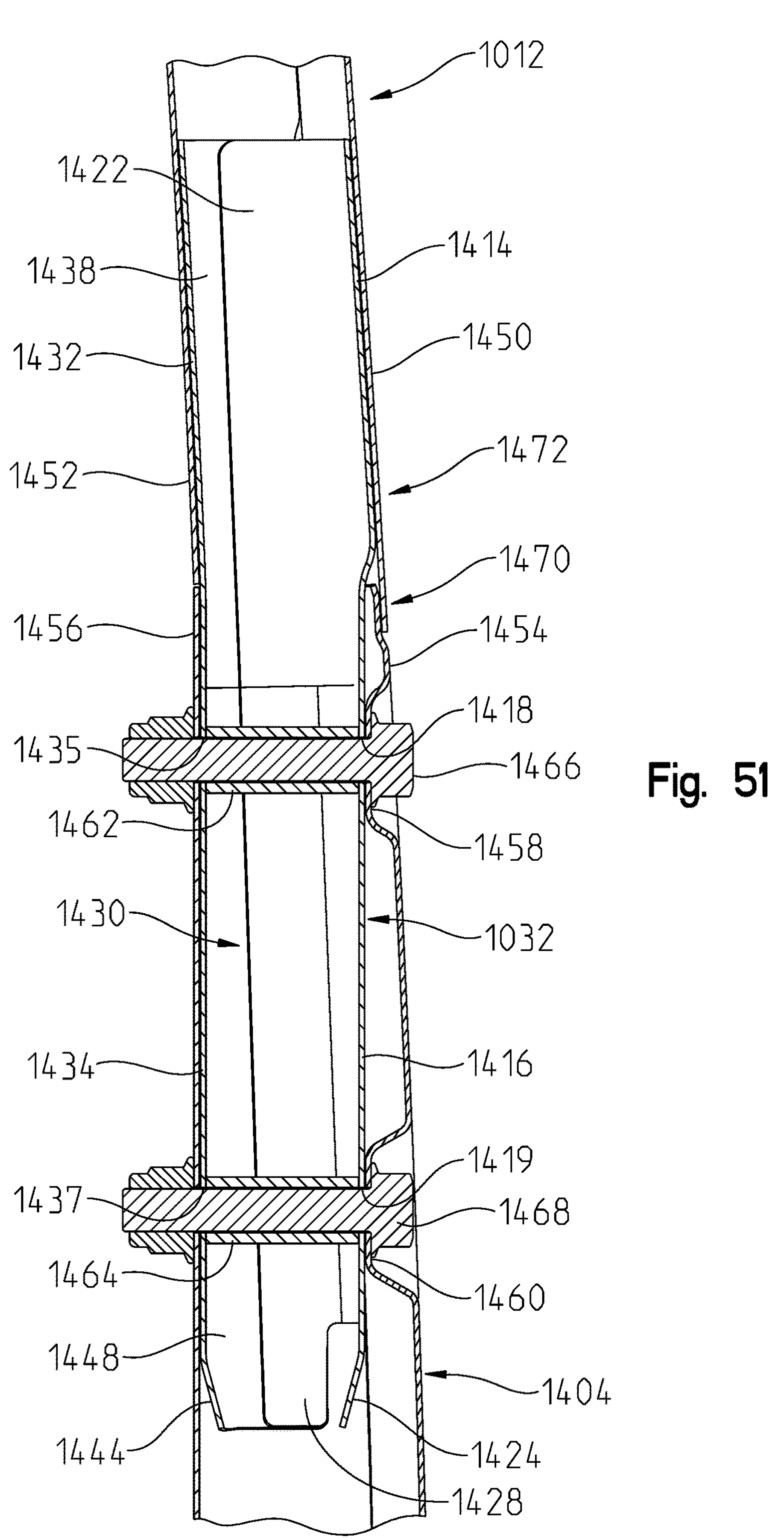
FIG. 51 is a cross-section view of the coupler of FIG. 50 assembled with the alternative frame assembly of FIG. 49, taken along line 51-51 of FIG. 49.

Referring now to FIGS. 49-51, alternative frame assembly 1002 includes upper frame assembly 1004 and lower chassis 1180. In embodiments, lower chassis 1180 includes a first lower A-pillar 1400 coupled with first upper A-pillar 1008, a second lower A-pillar 1402 laterally spaced from first lower A-pillar 1400 and coupled with second upper A-pillar 1010, a first lower B-pillar 1404 longitudinally spaced from first lower A-pillar 1400 and coupled with first upper B-pillar 1012, a second lower B-pillar 1406 laterally spaced from second lower A-pillar 1402 and coupled with second upper B-pillar 1014, a first lower C-pillar 1408 longitudinally spaced from first lower B-pillar 1404 and coupled with first upper C-pillar 1016, and a second lower C-pillar 1410 laterally spaced from first lower C-pillar 1408 and coupled to second upper C-pillar 1018. Referring to FIG. 35 again, a first coupler 1032 is positioned within a bottom of first upper B-pillar 1012, a second coupler 1034 is positioned within a bottom of second upper B-pillar 1014, a third coupler 1036 is positioned within a bottom of first upper C-pillar 1016, and a fourth coupler 1038 is positioned within a bottom of second upper C-pillar 1018. In embodiments, first coupler 1032 and second coupler 1034 are coupled to first upper B-pillar 1012 and second upper B-pillar 1014, respectively, similar to, or the same as, first joiner 92 coupled to upper B-pillar member 72 and second joiner 93 coupled to upper B-pillar member 74 (FIG. 9).

Referring now to FIGS. 50-51, coupler 1032 will be described. In embodiments, coupler 1034 is similar to, or the same as, coupler 1032. In embodiments, couplers 1036, 1038 are substantially similar to, or the same as, coupler 1032. In embodiments, couplers 1036, 1038 vary only to the extent necessary to accommodate a different cross-section of first upper C-pillar 1016, first lower C-pillar 1408 and second upper C-pillar 1018, second lower C-pillar 1410.

In embodiments, coupler 1032 may be a subassembly comprising a first frame piece 1412 and a second frame piece 1430. In embodiments, each of first frame piece 1412 and second frame piece 1430 are stamped frame pieces. First frame piece 1412 includes a first body portion 1414 and a second body portion 1416 extending generally downwardly from first body portion 1414 and second body portion 1416 is angled relative to first body portion 1414. Second body portion 1416 defines a pair of apertures 1418, 1419. A first extension 1420 extends outwardly from a first side of first body portion 1414 at a generally normal angle (e.g., 45-135 degrees), and a second extension 1422 extends outwardly from a second side of first body portion 1414, opposite first extension 1420, at a generally normal angle (e.g., 45-135 degrees). A plurality of extensions 1424, 1426, 1428 extend downwardly from second body portion 1416, first extension 1420, and second extension 1422, and each of extensions 1424, 1426, 1428 are angled generally inwardly to create a chamfered effect of the bottom of first frame piece 1412.

Second frame piece 1430 includes a first body portion 1432 and a second body portion 1434 extending generally downwardly from first body portion 1432 and second body portion 1434 is angled relative to first body portion 1432. Second body portion 1434 defines a pair of apertures 1435, 1437. A first extension 1436 extends outwardly from a first side of first body portion 1432 at an angle generally supplementary to the angle of first extension 1420 relative to first body portion 1414 (e.g., the angle defined by first extension 1436 relative to second frame piece 1430 is generally supplementary to the angle defined by first extension 1420 relative to first body portion 1414 such that the two angles generally equal or sum to 180 degrees). A second extension 1438 extends outwardly from a second side of first body portion 1432, opposite first extension 1436, at an angle generally supplementary to the angle of second extension 1422 relative to first body portion 1414 (e.g., the angle defined by second extension 1438 relative to second frame piece 1430 is generally supplementary to the angle defined by second extension 1422 relative to first body portion 1414 such that the two angles generally equal or sum to 180 degrees). A first flange 1440 extends outwardly from first extension 1436, and first flange 1440 is generally parallel to second frame piece 1430. A second flange 1442 extends outwardly from second extension 1438 and second flange 1442 is generally parallel to second frame piece 1430. A plurality of extensions 1444, 14446, 1448 extend downwardly from second body portion 1434, first extension 1436, second extension 1438, and each of extensions 1444, 1446, 1448 are angled generally inwardly to create a chamfered effect of the bottom of second frame piece 1430.

Illustratively, first frame piece 1412 and second frame piece 1430 are coupled together by one or more of spot welds, adhesives, fasteners, or other coupling methods. That is, first frame piece 1412 and second frame piece 1430 may be coupled together by one or more spot welds and/or adhesives between first extension 1420 and first extension 1436 and one or more spot welds and/or adhesives between second extension 1422 and second extension 1438. Further, a plurality of spacers 1462, 1464 may be welded to at least one of first frame piece 1412 and second frame piece 1430, generally coaxial with apertures 1418, 1419 or apertures 1435, 1437, respectively.

Referring now to FIG. 51, first upper B-pillar 1012 includes a first stamped frame piece 1450 (similar to first stamped frame piece 320) and a second stamped frame piece 1452 (similar to second stamped frame piece 342). In embodiments, first upper B-pillar 1012 is substantially similar to and/or constructed substantially similar to upper B-pillar member 72 (FIG. 17). Further, first lower B-pillar 1404 includes a first stamped frame piece 1454 (similar to outer stamped frame member 84A (FIG. 31)) and a second stamped frame piece 1456 (similar to inner stamped frame member 84B (FIG. 31)). In embodiments, first lower B-pillar 1404 is substantially similar to and/or constructed substantially similar to lower B-pillar member 84 (FIG. 29).

Still referring to FIG. 51, first joiner 1032 may be assembled with each of second upper B-pillar 1014 and first lower B-pillar 1404 in a substantially similar manner to first joiner 92 being assembled with each of upper B-pillar member 72 and lower B-pillar member 84. In embodiments, first frame piece 1412 is coupled to second frame piece 1430, as previously disclosed, to create first joiner 1032. Coupler 1032 is coupled to one or both of first stamped frame piece 1450 and second stamped frame piece 1452 of first upper B-pillar 1012 by one or more spot welds and/or adhesives between first joiner 1032 and one or both of first stamped frame piece 1450 and second stamped frame piece 1452 (e.g., at first flange 1440, second flange 1442, first body portion 1432, or first body portion 1414). Further, coupler 1032 may then be inserted into first lower B-pillar 1404 so that the bottom portion of first joiner 1032 (e.g., second body portion 1416 and second body portion 1434) are positioned between first stamped frame piece 1454 and second stamped frame piece 1456. A first fastener 1466 may extend through apertures 1418, spacers 1462, and apertures 1435 and a second fastener 1468 may extend through apertures 1419, spacers 1464, and apertures 1437 to couple first lower B-pillar 1404 to first joiner 1032 and join first lower B-pillar 1404 and first upper B-pillar 1012. In embodiments, the extensions 1424, 1426, 1428, 1444, 1446, 1448 are all angled inwardly towards each other to create a chamfered lower portion of first joiner 1032, which acts as a locating feature during assembly of first joiner 1032 with first lower B-pillar 1404 (e.g., when first joiner 1032 is lowered into first lower B-pillar 1404).

Referring still to FIG. 51, each of first stamped frame piece 1450 and first stamped frame piece 1454 define an outer profile 1472 of B-pillar (e.g., first upper B-pillar 1012 and first lower B-pillar 1404). In embodiments, the outer profile 1472 of the B-pillar is curved (e.g., outwardly convex) to achieve a preferred aesthetic of the B-pillar. In embodiments, the outer profile includes a plurality of recesses. That is, first stamped frame piece 1454 includes a first recess 1458 and a second recess 1460, and first recess 1458 receives a head of first fastener 1466 and second recess 1460 received a head of second fastener 1468 to recess the fastener within the outer profile 1472 of the B-pillar. Further, when first joiner 1032 is inserted into first lower B-pillar 1404, as described above, second body portion 1416 contacts, or is closely mated with, first recess 1458 and second recess 1460. That is, second body portion 1416 is angled relative to first body portion 1414 and second body portion 1434 is angled relative to first body portion 1432 such that each of second stamped frame piece 1456, second body portion 1434, second body portion 1416 are generally parallel with each of recesses 1458, 1460. Fasteners 1466, 1468 then have parallel clamp surfaces, allowing for a stronger, more durable connection to be made by fasteners 1466, 1468. In embodiments, the bottom portion of first joiner 1032 (e.g., second body portion 1416, second body portion 1434) is generally perpendicular to a ground level (e.g., the engagement plane of ground engaging members on a flat surface) and the upper portion of first joiner 1032 (e.g., first body portion 1414, first body portion 1432) is angled relative to the ground level.

Still referring to FIG. 51, first upper B-pillar 1012 and first lower B-pillar 1404 are coupled together such that first stamped frame piece 1450 of first upper B-pillar 1012 extends over first stamped frame piece 1454 of first lower B-pillar 1404 on an exterior side of the B-pillar to create a lapped connection 1470. The lapped connection 1470 increases the water resistance of the joint between first upper B-pillar 1012 and first lower B-pillar 1404 because fluid or other debris will naturally drain down the side of first stamped frame piece 1450, down across lapped connection 1470, and down the side of first stamped frame piece 1454, and fluid or other debris will be inhibited from flowing upwardly through lapped connection 1470 and into space between the outer members of the B-pillar (e.g., first stamped frame piece 1450, first stamped frame piece 1454) and the inner members of the B-pillar (e.g., second stamped frame piece 1452, second stamped frame piece 1456).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

The following clauses illustrate example subject matter described herein.

Clause 1. An upper frame assembly for a utility vehicle, comprising: a first generally upstanding frame member comprising a first stamped frame piece coupled to a second stamped frame piece; a first longitudinally extending frame member at least partially longitudinally aligned from a top view with the first generally upstanding frame member, the first longitudinally extending frame member comprising a third stamped frame piece coupled to a fourth stamped frame piece; a first joint member defining a first coupling location and a second coupling location, the first joint member comprising a first joint stamped piece and a second joint stamped piece; and the first longitudinally extending frame member is coupled to the first joint member at the first coupling location, and the first generally upstanding frame member is coupled to the first joint member at the second coupling location.

Clause 2. The upper frame assembly of clause 1, wherein, at a first cross-section of the first stamped frame piece, each of the first stamped frame piece, the second stamped frame piece, and the second joint stamped piece overlap each other, and at a second cross-section of the first stamped frame piece, each of the first stamped frame piece, the first joint stamped piece, and the second joint stamped piece overlap each other.

Clause 3. The upper frame assembly of clause 2, wherein a generally continuous surface is created along and across a junction between the first stamped frame piece and the first joint stamped piece when the first generally upstanding frame member is coupled to the first joint member.

Clause 4. The upper frame assembly of clause 2, wherein the first cross-section of the first stamped frame piece is taken along a first plane orthogonal to a top surface of the first stamped frame piece, and the second cross-section of the first stamped frame piece is taken along a second plane orthogonal to the top surface of the first stamped frame piece.

Clause 5. The upper frame assembly of clause 1, further comprising: a second generally upstanding frame member laterally spaced from the first generally upstanding frame member, the second generally upstanding frame member comprising a fifth stamped frame piece and a sixth stamped frame piece; a second longitudinally extending frame member at least partially longitudinally aligned from the top view with the second generally upstanding frame member, the second longitudinally extending frame member comprising a seventh stamped frame piece coupled to an eighth stamped frame piece; a second joint member defining a third coupling location and a fourth coupling location, the second joint member comprising a third joint stamped piece and a fourth joint stamped piece; and the second longitudinally extending frame member is coupled to the second joint member at the third coupling location, and the second generally upstanding frame member is coupled to the second joint member at the fourth coupling location.

Clause 6. The upper frame assembly of clause 5, wherein the first joint member comprises a fifth coupling location and the second joint member comprises a sixth coupling location, and a cross member extends between the fifth coupling location and the sixth coupling location.

Clause 7. A frame assembly for a utility vehicle, comprising: an upper frame assembly, comprising: a first generally upstanding member positioned at a front portion of the upper frame assembly, the first generally upstanding member comprising a first stamped frame piece and a second stamped frame piece; a second generally upstanding member positioned at the front portion of the upper frame assembly, the second generally upstanding member laterally spaced from the first generally upstanding member, the second generally upstanding member comprising a third stamped frame piece and a fourth stamped frame piece; an upper cross-member extending between the first generally upstanding member and the second generally upstanding member, the upper cross-member comprising a fifth stamped frame piece and a sixth stamped frame piece; a lower frame assembly, comprising: a third generally upstanding member at least partially longitudinally aligned with the first generally upstanding member; a fourth generally upstanding member at least partially longitudinally aligned with the second generally upstanding member; a lower cross-member extending between the third generally upstanding member and the fourth generally upstanding member, the lower cross-member comprising a seventh stamped frame piece; the first generally upstanding member, the second generally upstanding member, the upper cross-member, and the lower cross-member cooperating to define a front opening; and the seventh stamped frame piece is coupled to, and at least partially overlaps the first stamped frame piece.

Clause 8. The frame assembly of clause 7, wherein the upper cross-member comprises a first cross-member and a second cross-member, the first cross-member comprises the fifth stamped frame piece and the sixth stamped frame piece.

Clause 9. The frame assembly of clause 8, wherein a generally continuous surface extends along each of the first generally upstanding member, the second generally upstanding member, the first cross-member, the second cross-member and the lower cross-member.

Clause 10. The frame assembly of clause 8, further comprising a coupling frame member configured to couple between the first cross-member and the second cross-member.

Clause 11. The frame assembly of clause 10, wherein the coupling frame member comprises a plurality of stamped frame pieces.

Clause 12. The frame assembly of clause 7, wherein the first generally upstanding member comprises a first joint member and the second generally upstanding member comprises a second joint member, and the upper cross-member extends between the first joint member and the second joint member.

Clause 13. An upper frame assembly configured to surround an operator area, comprising: a first generally upstanding frame piece coupled to a second generally upstanding frame piece, the first generally upstanding frame piece facing generally outwardly from the operator area and having a first portion and the second generally upstanding frame piece facing generally inwardly toward the operator area and having a second portion; a first generally horizontal frame piece coupled to a second generally horizontal frame piece, the first generally horizontal frame piece facing generally outwardly from the operator area and having a third portion and the second generally horizontal frame piece facing generally inwardly toward the operator area and having a fourth portion; a first joint frame piece coupled to a second joint frame piece, the first joint frame piece facing generally outwardly from the operator area and having a fifth portion and a sixth portion, and the second joint frame piece facing generally inwardly toward the operator area and having a seventh portion and an eighth portion; the first generally horizontal frame piece is coupled to the first joint frame piece and the third portion overlaps the fifth portion such that the third portion is positioned outwardly from the fifth portion relative to the operator area; and the first generally upstanding frame piece is coupled to the first joint frame piece and the sixth portion overlaps the first portion such that the sixth portion is positioned outwardly from the first portion relative to the operator area.

Clause 14. The upper frame assembly of clause 13, wherein the second generally horizontal frame piece is coupled to the second joint frame piece and the fourth portion overlaps the seventh portion, and the second generally upstanding frame piece is coupled to the second joint frame piece and the eighth portion overlaps the second portion.

Clause 15. The upper frame assembly of clause 14, wherein a plane extending orthogonally to an outer surface of the first portion extends through the first portion, the sixth portion, and the eighth portion.

Clause 16. The upper frame assembly of clause 13, wherein a generally continuous surface extends along the first joint frame piece and the first generally upstanding frame piece.

Clause 17. The upper frame assembly of clause 13, wherein the first joint frame piece further comprises a ninth portion, and a first cross-member is configured to couple to the first joint frame piece, the first joint frame piece extending generally orthogonal relative to the first generally horizontal frame piece.

Clause 18. The upper frame assembly of clause 17, wherein a generally continuous surface extends along and across a junction between the first cross-member, the first joint frame piece, and the first generally upstanding frame piece.

Clause 19. An upper frame assembly configured to surround an operator area, comprising: a first generally upstanding frame member comprising a first edge; a first generally horizontal frame member comprising a second edge, the first generally horizontal frame member longitudinally aligned with the first generally upstanding frame member from a top view; a first joint frame member coupled between each of the first generally upstanding frame member and the first generally horizontal frame member, the first joint frame member having a third edge and a fourth edge; a first cross-member coupled to the first joint frame member, the first cross-member having a fifth edge and a sixth edge; a first generally continuous edge extends along the fifth edge, the third edge, and the first edge; and a second generally continuous edge extends along the sixth edge, the fourth edge, and the second edge.

Clause 20. The upper frame assembly of clause 19, further comprising a second generally upstanding frame member laterally spaced from the first generally upstanding frame member, the second generally upstanding frame member comprising a seventh edge, a second joint frame member coupled to the second generally upstanding frame member, the second joint frame member comprising an eighth edge, and a second cross-member coupled between the second joint frame member and the first cross-member, the second cross-member comprising a ninth edge, the ninth edge coplanar with the fifth edge.

Clause 21. The upper frame assembly of clause 20, wherein a generally continuous surface extends along the seventh edge, eighth edge, the ninth edge, the fifth edge, the third edge, and the first edge.

Clause 22. The upper frame assembly of clause 20, further comprising a third cross-member configured to extend between the first generally upstanding frame member and the second generally upstanding frame member.

Clause 23. The upper frame assembly of clause 22, wherein a generally continuous surface extends along the third cross-member, the seventh edge, eighth edge, the ninth edge, the fifth edge, the third edge, and the first edge.

Clause 24. A frame for a utility vehicle configured to surround an operator area, the frame comprising: a lower frame assembly comprising: a lower forward pillar; a lower rearward pillar longitudinally spaced from the lower forward pillar, the lower rearward pillar having an upper extent comprising a first opening; and a first generally horizontal frame member coupled between the lower forward pillar and the lower rearward pillar; an upper frame assembly comprising: an upper forward pillar configured to couple with the lower forward pillar; an upper rearward pillar longitudinally spaced from the upper forward pillar, the upper rearward pillar configured to couple with the lower rearward pillar, the upper rearward pillar comprises a first frame piece and a second frame piece coupled to the first frame piece; a frame subassembly comprising a first frame subassembly piece and a second frame subassembly piece coupled to the first frame subassembly piece, the first frame subassembly piece coupled to the first frame piece and the second frame subassembly piece coupled to the second frame piece; and the frame subassembly is configured to fit within the first opening.

Clause 25. The frame of clause 24, wherein the frame subassembly is configured to be coupled to the lower rearward pillar.

Clause 26. The frame of clause 24, wherein the frame subassembly has an upper portion and a lower portion, and the upper portion is configured to couple to the upper rearward pillar and the lower portion is configured to couple to the lower rearward pillar.

Clause 27. The frame of clause 24, wherein the first frame piece extends downwardly to a position vertically lower than the lower rearward pillar upper extent, and the first frame piece is positioned exterior to the operator area relative to the frame subassembly.

Clause 28. A method of joining an upper frame assembly to a lower frame assembly, the upper frame assembly including a first upper generally upstanding frame member comprising a first frame piece and a second frame piece, the lower frame assembly including a first lower generally upstanding frame member comprising a third frame piece and a fourth frame piece coupled to the third frame piece, the first lower generally upstanding frame member comprising an opening between the third frame piece and the fourth frame piece, and a first frame subassembly comprising a first subassembly piece and a second subassembly piece coupled to the first subassembly piece, the first frame subassembly having an upper portion and a lower portion, the method comprising: coupling the first subassembly piece to the first frame piece; coupling the second frame piece to each of the first subassembly piece and the first frame piece; inserting the lower portion of the first frame subassembly into the opening; and coupling the first lower generally upstanding frame member to the lower portion of the frame subassembly.

Clause 29. The method of clause 28, wherein coupling the first subassembly piece to the first frame piece includes providing at least one spot weld between the first subassembly piece and the first frame piece.

Clause 30. The method of clause 29, wherein coupling the first lower generally upstanding frame member to the frame subassembly includes at least one fastener coupled between the frame subassembly and the first lower generally upstanding frame member.

Clause 31. The method of clause 28, further comprising: providing a second upper generally upstanding frame member comprising a fifth frame piece and a sixth frame piece, the second upper generally upstanding frame member being longitudinally spaced from the first upper generally upstanding frame member; providing a second lower generally upstanding frame member comprising a seventh frame piece and an eighth frame piece coupled to the seventh frame piece, the second lower generally upstanding frame member comprising a second opening between the seventh frame piece and the eighth frame piece; providing a second frame subassembly comprising a third subassembly piece and a fourth subassembly piece coupled to the third subassembly piece, the second frame subassembly having an upper portion and a lower portion; coupling the third subassembly piece to the fifth frame piece; coupling the sixth frame piece to each of the third subassembly piece and the fifth frame piece; inserting the lower portion of the second frame subassembly into the second opening; coupling the second lower generally upstanding frame member to the lower portion of the second frame subassembly.

Clause 32. The method of clause 31, wherein coupling the third subassembly piece to the fifth frame piece includes providing at least one spot weld between the third subassembly piece and the fifth frame piece.

Clause 33. The method of clause 32, wherein coupling the second lower generally upstanding frame member to the second frame subassembly includes at least one fastener coupled between the second frame subassembly and the second lower generally upstanding frame member.

Clause 34. A frame assembly configured to surround an operator area, comprising: an upper frame assembly comprising a first generally upstanding member, the first generally upstanding member comprising an upper outer frame piece facing an exterior of the operator area and an upper inner frame piece facing an interior of the operator area; a lower frame assembly comprising a second generally upstanding member positioned vertically below the first generally upstanding member, the second generally upstanding member comprising a lower outer frame piece facing an exterior of the operator area and a lower inner frame piece facing an interior of the operator area; a frame subassembly, the frame subassembly configured to couple between the upper outer frame piece and the upper inner frame piece and configured to couple between the lower outer frame piece and the lower inner frame piece; and the upper outer frame piece configured to extend below, and cover from an outside perspective, a top portion of the lower outer frame piece.

Clause 35. The frame assembly of clause 34, wherein the frame subassembly comprises a first portion and a second portion, and the first portion is configured to be permanently coupled to one of the upper frame assembly and the lower frame assembly, and the second portion is configured to be selectively coupled to the other of the upper frame assembly and the lower frame assembly.

Clause 36. The frame assembly of clause 34, wherein each of the upper outer frame piece comprises a first edge and the upper inner frame piece comprises a second edge, and the frame subassembly comprises a first flange configured to couple between the first edge and the second edge.

Clause 37. A method of assembling an upper frame assembly with a coupling member, the upper frame assembly including a first upper frame portion, a second upper frame portion, a first cross-member, and a second cross-member, the first upper frame portion comprising a first generally upstanding member, a second generally upstanding member longitudinally spaced from the first generally upstanding member, and a first generally longitudinally extending member coupled to each of the first generally upstanding member and the second generally upstanding member, the second upper frame portion comprising a third generally upstanding member, a fourth generally upstanding member longitudinally spaced from the third generally upstanding member, a second generally longitudinally extending member coupled to each of the third generally upstanding member and the fourth generally upstanding member, and the first cross-member coupled to the first upper frame portion and the second cross-member coupled to the second upper frame portion, the upper frame assembly the method comprising: coupling a coupling member between each of the first cross-member and the second cross-member such that the first upper frame portion is coupled to the second upper frame portion.

Clause 38. The method of clause 37, wherein the coupling member is comprised of a first stamped frame piece coupled to a second stamped frame piece.

Clause 39. The method of clause 37, wherein the first cross-member comprises a first opening and the second cross-member comprises a second opening, and the coupling member is configured to sit within each of the first opening and the second opening.

Clause 40. The method of clause 37, further comprising: inserting a first end portion of the coupling member into the first cross-member; and inserting a second end portion of the coupling member into the second cross-member.

Clause 41. The method of clause 40, further comprising: attaching the coupling member to each of the first upper frame portion and the second upper frame portion by a plurality of removable couplers.

Clause 42. A utility vehicle, comprising: a frame assembly comprising an upper frame assembly surrounding an operator area and a lower frame assembly coupled to the upper frame assembly, the frame assembly extending along a vehicle centerline, the upper frame assembly comprising a first generally upstanding frame member and a second generally upstanding frame member; the first generally upstanding frame member comprising a first frame piece coupled to a second frame piece, the first frame piece facing generally outwardly from the operator area, the first frame piece comprising a first portion and a second portion, the first portion positioned further from the vehicle centerline than the second portion; a first seal positioned on the second portion of the first frame piece; and a door supported by the second generally upstanding frame member, the door comprising an edge portion configured to receive a second seal, the second seal configured to engage the first portion of the first frame piece when the door is in a closed position.

Clause 43. The utility vehicle of clause 42, further comprising a door ring comprising the first generally upstanding frame member, and the first seal is configured to extend around a perimeter of the door ring.

Clause 44. The utility vehicle of clause 43, wherein the door ring is defined by a generally continuous surface.

Clause 45. The utility vehicle of clause 42, wherein a portion of the door is configured to be positioned closer to the vehicle centerline than the first portion of the first frame piece.

The invention claimed is:

1. An upper frame assembly for a utility vehicle, comprising:

a first generally upstanding frame member comprising a first stamped frame piece coupled to a second stamped frame piece;

a first longitudinally extending frame member at least partially longitudinally aligned from a top view with the first generally upstanding frame member, the first longitudinally extending frame member comprising a third stamped frame piece coupled to a fourth stamped frame piece;

a first joint member defining a first coupling location and a second coupling location, the first joint member comprising a first joint stamped piece and a second joint stamped piece; and the first longitudinally extending frame member is coupled to the first joint member at the first coupling location, and the first generally upstanding frame member is coupled to the first joint member at the second coupling location.

2. The upper frame assembly of claim 1, wherein, at a first cross-section of the first stamped frame piece, each of the first stamped frame piece, the second stamped frame piece, and the second joint stamped piece overlap each other, and at a second cross-section of the first stamped frame piece, each of the first stamped frame piece, the first joint stamped piece, and the second joint stamped piece overlap each other.

3. The upper frame assembly of claim 2, wherein a generally continuous surface is created along and across a junction between the first stamped frame piece and the first joint stamped piece when the first generally upstanding frame member is coupled to the first joint member.

4. The upper frame assembly of claim 2, wherein the first cross-section of the first stamped frame piece is taken along a first plane orthogonal to a top surface of the first stamped frame piece, and the second cross-section of the first stamped frame piece is taken along a second plane orthogonal to the top surface of the first stamped frame piece.

5. The upper frame assembly of claim 1, further comprising:

a second generally upstanding frame member laterally spaced from the first generally upstanding frame member, the second generally upstanding frame member comprising a fifth stamped frame piece and a sixth stamped frame piece;

a second longitudinally extending frame member at least partially longitudinally aligned from the top view with the second generally upstanding frame member, the second longitudinally extending frame member comprising a seventh stamped frame piece coupled to an eighth stamped frame piece;

a second joint member defining a third coupling location and a fourth coupling location, the second joint member comprising a third joint stamped piece and a fourth joint stamped piece; and the second longitudinally extending frame member is coupled to the second joint member at the third coupling location, and the second generally upstanding frame member is coupled to the second joint member at the fourth coupling location.

6. The upper frame assembly of claim 5, wherein the first joint member comprises a fifth coupling location and the second joint member comprises a sixth coupling location, and a cross member extends between the fifth coupling location and the sixth coupling location.

7. A frame assembly for a utility vehicle, comprising:

an upper frame assembly, comprising:

a first generally upstanding member positioned at a front portion of the upper frame assembly, the first generally upstanding member comprising a first stamped frame piece and a second stamped frame piece;

a second generally upstanding member positioned at the front portion of the upper frame assembly, the second generally upstanding member laterally spaced from the first generally upstanding member, the second generally upstanding member comprising a third stamped frame piece and a fourth stamped frame piece;

an upper cross-member extending between the first generally upstanding member and the second generally upstanding member, the upper cross-member comprising a fifth stamped frame piece and a sixth stamped frame piece;

a lower frame assembly, comprising:

a third generally upstanding member at least partially longitudinally aligned with the first generally upstanding member;

a fourth generally upstanding member at least partially longitudinally aligned with the second generally upstanding member;

a lower cross-member extending between the third generally upstanding member and the fourth generally upstanding member, the lower cross-member comprising a seventh stamped frame piece;

the first generally upstanding member, the second generally upstanding member, the upper cross-member, and the lower cross-member cooperating to define a front opening; and the seventh stamped frame piece is coupled to, and at least partially overlaps the first stamped frame piece.

8. The frame assembly of claim 7, wherein the upper cross-member comprises a first cross-member and a second cross-member, the first cross-member comprises the fifth stamped frame piece and the sixth stamped frame piece.

9. The frame assembly of claim 8, wherein a generally continuous surface extends along each of the first generally upstanding member, the second generally upstanding member, the first cross-member, the second cross-member and the lower cross-member.

10. The frame assembly of claim 8, further comprising a coupling frame member configured to couple between the first cross-member and the second cross-member.

11. The frame assembly of claim 10, wherein the coupling frame member comprises a plurality of stamped frame pieces.

12. The frame assembly of claim 7, wherein the first generally upstanding member comprises a first joint member and the second generally upstanding member comprises a second joint member, and the upper cross-member extends between the first joint member and the second joint member.

13. An upper frame assembly configured to surround an operator area, comprising:

a first generally upstanding frame piece coupled to a second generally upstanding frame piece, the first generally upstanding frame piece facing generally outwardly from the operator area and having a first portion and the second generally upstanding frame piece facing generally inwardly toward the operator area and having a second portion;

a first generally horizontal frame piece coupled to a second generally horizontal frame piece, the first generally horizontal frame piece facing generally outwardly from the operator area and having a third portion and the second generally horizontal frame piece facing generally inwardly toward the operator area and having a fourth portion;

a first joint frame piece coupled to a second joint frame piece, the first joint frame piece facing generally outwardly from the operator area and having a fifth portion and a sixth portion, and the second joint frame piece facing generally inwardly toward the operator area and having a seventh portion and an eighth portion;

the first generally horizontal frame piece is coupled to the first joint frame piece and the third portion overlaps the fifth portion such that the third portion is positioned outwardly from the fifth portion relative to the operator area; and the first generally upstanding frame piece is coupled to the first joint frame piece and the sixth portion overlaps the first portion such that the sixth portion is positioned outwardly from the first portion relative to the operator area.

14. The upper frame assembly of claim 13, wherein the second generally horizontal frame piece is coupled to the second joint frame piece and the fourth portion overlaps the seventh portion, and the second generally upstanding frame piece is coupled to the second joint frame piece and the eighth portion overlaps the second portion.

15. The upper frame assembly of claim 14, wherein a plane extending orthogonally to an outer surface of the first portion extends through the first portion, the sixth portion, and the eighth portion.

16. The upper frame assembly of claim 13, wherein a generally continuous surface extends along the first joint frame piece and the first generally upstanding frame piece.

17. The upper frame assembly of claim 13, wherein the first joint frame piece further comprises a ninth portion, and a first cross-member is configured to couple to the first joint frame piece, the first joint frame piece extending generally orthogonal relative to the first generally horizontal frame piece.

18. The upper frame assembly of claim 17, wherein a generally continuous surface extends along and across a junction between the first cross-member, the first joint frame piece, and the first generally upstanding frame piece.

* * * * *